US008370272B2

(12) United States Patent
Wickel et al.

(10) Patent No.: US 8,370,272 B2
(45) Date of Patent: Feb. 5, 2013

(54) MANAGING CONSISTENT INTERFACES FOR BUSINESS DOCUMENT MESSAGE MONITORING VIEW, CUSTOMS ARRANGEMENT, AND FREIGHT LIST BUSINESS OBJECTS ACROSS HETEROGENEOUS SYSTEMS

(75) Inventors: Jochen Wickel, Rauenberg (DE); Robert Getzner, Heidelberg (DE); Thomas Hammer, Walldorf (DE); Tanjana Preiser-Funke, Wiesloch (DE); Monica Reidl, Sandhausen (DE); Michael Seubert, Sinsheim (DE); Claudia Diesner, Sankt Leon-Rot (DE); Volker Vogelmann, Karlsruhe (DE); Andre Adam, Walldorf (DE); Waldemar Kramer, Hockenheim (DE); Werner Gnan, Angelbachtal (DE); Eli Pripaz Cohen, Ramat Gan (IL); Pablo Roisman, Eilat (IL); Jochen Hirth, Meckesheim (DE); Yuval Morad, Zur Moshe (IL); Elad Heart, Omer (IL); Hofit Koren, Ashdod (IL); Orit Harel, Qadima (IL); Michele Kemp, Kfar Yaavetz (IL); Lars Hoenig, Schwetzingen (DE); Thilo Kraehmer, Heidelberg (DE)

(73) Assignee: SAP AG, Walldorf (DE)

( * ) Notice: Subject to any disclaimer, the term of this patent is extended or adjusted under 35 U.S.C. 154(b) by 164 days.

(21) Appl. No.: 12/815,639

(22) Filed: Jun. 15, 2010

(65) Prior Publication Data

US 2011/0307404 A1 Dec. 15, 2011

(51) Int. Cl.
*G06Q 10/00* (2012.01)

(52) U.S. Cl. ........................................ 705/342; 705/1.1

(58) Field of Classification Search .................. 705/342, 705/346, 330, 331, 1.1, 30, 31, 35, 64; 715/764, 715/771

See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — Igor Borissov
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a business document message monitoring view, a customs arrangement, and/or a freight list business object.

6 Claims, 354 Drawing Sheets

U.S. PATENT DOCUMENTS

| | | | | |
|---|---|---|---|---|
| 5,255,181 | A | 10/1993 | Chapman et al. | |
| 5,321,605 | A | 6/1994 | Chapman et al. | |
| 5,463,555 | A | 10/1995 | Ward et al. | |
| 5,787,237 | A | 7/1998 | Reilly | |
| 5,812,987 | A | 9/1998 | Luskin et al. | |
| 5,966,695 | A | 10/1999 | Melchione et al. | |
| 5,970,465 | A | 10/1999 | Dietrich et al. | |
| 5,970,475 | A | 10/1999 | Barnes et al. | |
| 5,983,284 | A | 11/1999 | Argade | |
| 6,047,264 | A | 4/2000 | Fisher et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwarzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Hauryluck et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,069,278 | B2 * | 6/2006 | Telkowski et al. | 1/1 |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,536,697 | B2 | 5/2009 | Wiseman et al. | |
| 7,574,383 | B1 | 8/2009 | Parasnis et al. | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 | 1/2004 | Wiseman et al. | |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0187140 | A1 | 9/2004 | Aigner et al. | |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0065987 | A1 * | 3/2005 | Telkowski et al. | 707/204 |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |

| | | | |
|---|---|---|---|
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026552 | A1 | 2/2006 | Mazzitelli et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0078799 | A1 | 4/2007 | Huber-Buschbeck et al. |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0214065 | A1 | 9/2007 | Kahlon et al. |
| 2007/0225949 | A1 | 9/2007 | Sundararajan et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0294159 | A1 | 12/2007 | Cottle |
| 2008/0005012 | A1 | 1/2008 | Deneef |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0133303 | A1 | 6/2008 | Singh et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248431 | A1 | 10/2009 | Schoknecht et al. |
| 2009/0248547 | A1 | 10/2009 | Doenig et al. |
| 2009/0271245 | A1 | 10/2009 | Joshi et al. |
| 2009/0300578 | A1 | 12/2009 | Neil |
| 2009/0326988 | A1 | 12/2009 | Barth et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0161425 | A1 | 6/2010 | Sideman |
| 2011/0046775 | A1 | 2/2011 | Bailey et al. |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm> retrieved on Mar. 17, 2005.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3. Retrieved on Mar. 17, 2005.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; 1999; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159 (2 parts).
Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.

International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 12/060,171 on Jan. 26, 2011; 17 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.

Notice of Allowance issued in related U.S. Appl. No. 11/864,866 on Jul. 22, 2011; 6 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Notice of Allowance issued in related U.S. Appl. No. 11/803,178 on May 17, 2011; 13 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) issued in European Application No. 05766672.9 on Jul. 14, 2011; 4 pages.
Office Action issued in U.S. Appl. No. 13/349,477 on Jun. 29, 2012; 13 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/323,116 on Jan. 27, 2012; 7 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Office Action issued in U.S. Appl. No. 12/571,140 on Sep. 26, 2011; 14 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,192 on Sep. 6, 2011; 18 pages.
Notice of Allowance issued in U.S. Appl. No. 12/060,192 on Mar. 2, 2012; 18 pages.
Notice of Allowance issued in related U.S. Appl. No. 12/060,178 on Sep. 2, 2011; 9 pages.
Notice of Allowance issued in U.S. Appl. No. 12/060,062 on Mar. 20, 2012; 16 pages.
Office Action issued in related U.S. Appl. No. 12/060,155 on Oct. 31, 2011; 15 pages.
Notice of Allowance issued in U.S. Appl. No. 12/060,155 on Apr. 24, 2012; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in U.S. Appl. No. 12/815,618 on May 10, 2012; 7 pages.
Office Action issued in U.S. Appl. No. 12/816,083 on May 9, 2012; 20 pages.
Office Action issued in U.S. Appl. No. 12/816,293 on Apr. 25, 2012; 10 pages.
Notice of Allowance issued in related U.S. Appl. No. 11/864,866 on Mar. 13, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012;12 pages.

Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.
Notice of Allowance issued in U.S. Appl. No. 11/640,422 on May 22, 2012; 7 pages.
Communication Pursuant to Article 94(3) EPC issued in European Application No. 07835755.5 on Feb. 22, 2012; 7 pages.

* cited by examiner

FIG. 33-1

| Package | | | Level 1 | Level 2 | Level 3 | Level 4 | Cardinality | Data Type Name |
|---|---|---|---|---|---|---|---|---|
| Business-Document-MessageStatusNotification 33000 | | | Business-Document-MessageStatusNotification 33002 | | | | | BusinessDocumentMessageStatusNotificationMessage 33004 |
| | Message-Header 33006 | | | Message-Header 33008 | | | 1 33010 | BusinessDocumentMessage-Header 33012 |
| | | | | | ID 33014 | | 0..1 33016 | BusinessDocumentMessageID 33018 |
| | | | | | UUID 33020 | | 0..1 33022 | UUID 33024 |
| | | | | | ReferenceID 33026 | | 0..1 33028 | BusinessDocumentMessageID 33030 |

FIG. 33-2

| Package | | | Level 1 | Level 2 | Level 3 | Level 4 | Cardinality | Data Type Name |
|---|---|---|---|---|---|---|---|---|
| | | | | | ReferenceUUID 33032 | | 0..1 33034 | UUID 33036 |
| | | | | | CreationDateTime 33038 | | 1 33040 | GLOBAL_DateTime 33042 |
| | | | | | TestDataIndicator 33044 | | 0..1 33046 | Indicator 33048 |
| | | | | | ReconciliationIndicator 33050 | | 0..1 33052 | Indicator 33054 |
| | | | | | SenderBusinessSys-temID 33056 | | 0..1 33058 | BusinessSystemID 33060 |
| | | | | | RecipientBusinessSys-temID 33062 | | 0..1 33064 | BusinessSystemID 33066 |

FIG. 33-3

| Package | | | | Level 1 | Level 2 | Level 3 | Level 4 | Cardinality | Data Type Name |
|---|---|---|---|---|---|---|---|---|---|
| | | Party 33068 | | | | SenderParty 33070 | | 0..1 33072 | BusinessDocumentMessage-HeaderParty 33074 |
| | | | | | | | InternalID 33076 | 0..1 33078 | PartyInternalID 33080 |
| | | | | | | | StandardID 33082 | 0..N 33084 | PartyStandardID 33086 |
| | | | | | | RecipientParty 33088 | | 0..N 33090 | BusinessDocumentMessage-HeaderParty 33092 |
| | | | | | | | InternalID 33094 | 0..1 33096 | PartyInternalID 33098 |
| | | | | | | | StandardID 33100 | 0..N 33102 | PartyStandardID 33104 |

FIG. 33-4

| Package | | | Level 1 | Level 2 | Level 3 | Level 4 | Cardinality | Data Type Name |
|---|---|---|---|---|---|---|---|---|
| | | BusinessScope 33106 | | | BusinessScope 33108 | | 0..N 33110 | BusinessScope 33112 |
| | BusinessDocumentMessageStatus 33114 | | | BusinessDocumentMessageStatusNotification 33116 | | | 1 33118 | BusinessDocumentMessageStatusNotification 33120 |
| | | | | | @actionCode 33122 | | 1 33124 | ActionCode 33126 |
| | | | | | BusinessDocumentMessageID 33128 | | 1 33130 | BusinessDocumentMessageID 33132 |

FIG. 33-5

| Package | | | Level 1 | Level 2 | Level 3 | Level 4 | Cardinality | Data Type Name |
|---|---|---|---|---|---|---|---|---|
| | | | | | ReferenceBusiness-DocumentMessageID 33134 | | 0..1 33136 | BusinessDocumentMessageID 33138 |
| | | | | | MessageTypeCode 33140 | | 1 33142 | MessageTypeCode 33144 |
| | | | | | BusinessDocumentMes-sageDirectionCode 33146 | | 0..1 33148 | BusinessDocumentMessageDi-rectionCode 33150 |
| | | | | | BusinessDocumentMes-sageCreationDateTime 33152 | | 0..1 33154 | GLOBAL_DateTime 33156 |
| | | | | | BusinessDocumentMes-sageTransmission-StatusCode 33158 | | 1 33160 | BusinessDocumentMes-sageTransmissionStatusCode 33162 |

FIG. 33-6

| Package | Level 1 | Level 2 | Level 3 | Level 4 | Cardinality | Data Type Name |
|---|---|---|---|---|---|---|
| | | | BusinessDocumentMessageTransmissionStatusLastChangeDateTime 33164 | | 0..1 33166 | GLOBAL_DateTime 33168 |
| | | | BusinessDocumentMessageTransmissionStatusReasonDescription 33170 | | 0..1 33172 | LONG_Description 33174 |
| | | | TransmissionCompletedIndicator 33176 | | 1 33178 | Indicator 33180 |
| Party 33182 | | | LocalParty 33184 | | 0..1 33186 | BusinessDocumentMessageHeaderParty 33188 |
| | | | | InternalID 33190 | 0..1 33192 | PartyInternalID 33194 |

FIG. 33-7

| Package | | | | Level 1 | Level 2 | Level 3 | Level 4 | Cardinality | Data Type Name |
|---|---|---|---|---|---|---|---|---|---|
| | | | | | | | StandardID 33196 | 0..N 33198 | PartyStandardID 33200 |
| | | | | | | RemoteParty 33202 | | 0..1 33204 | BusinessDocumentMessage-HeaderParty 33206 |
| | | | | | | | InternalID 33208 | 0..1 33210 | PartyInternalID 33212 |
| | | | | | | | StandardID 33214 | 0..N 33216 | PartyStandardID 33218 |
| | | TechnicalMes-sageReference 33220 | | | | TechnicalMes-sageReference 33222 | | 1 33224 | BusinessDocumentMessageStatusNotificationTechnicalMes-sageReference 33226 |
| | | | | | | | MessageID 33228 | 1 33230 | MessageID 33232 |

FIG. 33-8

| Package | Level 1 | Level 2 | Level 3 | Level 4 | Cardinality | Data Type Name |
|---|---|---|---|---|---|---|
| | | | | SenderBusiness-TransactionDocu-mentReference 33234 | 0..1 33236 | BusinessTransactionDocumen-tReference 33238 |
| | | | | RecipientBusiness-TransactionDocu-mentReference 33240 | 0..1 33242 | BusinessTransactionDocumen-tReference 33244 |
| | | | | MessageFormat-tedContentWebURI 33246 | 0..1 33248 | WebURI 33250 |
| | | | | MessageProcess-ingLogWebURI 33252 | 0..1 33254 | WebURI 33256 |
| | | | | SenderPartyID 33258 | 1 33260 | PartyID 33262 |

FIG. 33-9

| Package | | | | Level 1 | Level 2 | Level 3 | Level 4 | Cardinality | Data Type Name |
|---|---|---|---|---|---|---|---|---|---|
| | | | | | | | RecipientPartyID 33264 | 1 33266 | PartyID 33268 |

| Package | | Level 1 | Level 2 | Level 3 | Level 4 | Level 5 | Level 6 | Level 7 | Level 8 | Cardinality | Data Type Name |
|---|---|---|---|---|---|---|---|---|---|---|---|
| Form Waybill Notification 380000 | | Form Waybill Notification 380002 | | | | | | | | | FormWaybillNotificationMessage 380004 |
| | Freight List 380006 | | FreightList 380008 | | | | | | | 1 380010 | FormWaybillNotificationFreightList 380012 |
| | | | | ID 380014 | | | | | | 1 380016 | BusinessTransactionDocumentID 380018 |
| | | | | CashOnDeliveryAmount 380020 | | | | | | 0..1 380022 | Amount 380024 |
| | | | | DeclaredAmount 380026 | | | | | | 0..1 380028 | Amount 380030 |

FIG. 38-2

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | FreightChargesPrepaidIndicator 380032 | | | | | | 0..1 380034 | Indicator 380036 |
| | | | CashOnDeliveryFeePrepaidIndicator 380038 | | | | | | 0..1 380040 | Indicator 380042 |
| | | | CustomerCheckAllowedIndicator 380044 | | | | | | 0..1 380046 | Indicator 380048 |
| | | | ThirdPartyInitiatedActionIndicator 380050 | | | | | | 0..1 380052 | Indicator 380054 |

FIG. 38-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | FreightLoaderPartyRoleCategoryCode 380056 | | | | | | 0..1 380058 | PartyRoleCategoryCode 380060 |
| | | | LoadedByDescription 380062 | | | | | | 0..1 380064 | SHORT_Description 380066 |
| | | | FreightCountingCode 380068 | | | | | | 0..1 380070 | FreightCountingCode 380072 |
| | | | CountedByDescription 380074 | | | | | | 0..1 380076 | SHORT_Description 380078 |
| | | | Incoterms 380080 | | | | | | 0..1 380082 | FormIncoterms 380084 |

FIG. 38-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ClassificationCode 380086 | | | | | 1 380088 | IncotermsClassificationCode 380090 |
| | | | | ClassificationName 380092 | | | | | 1 380094 | Name 380096 |
| | | | | TransferLocationName 380098 | | | | | 0..1 380100 | IncotermsTransferLocationName 380102 |
| | | | SealIDs 380104 | | | | | | 0..1 380106 | LANGUAGEINDEPENDENT_LONG_Description 380108 |
| | | | TruckID 380110 | | | | | | 0..1 380112 | TransportMeansID 380114 |

FIG. 38-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | TrailerID 380116 | | | | | | 0..1 380118 | TransportMeansID 380120 |
| | | | TransportModeCode 380122 | | | | | | 0..1 380124 | TransportModeCode 380126 |
| | | | TransportModeName 380128 | | | | | | 0..1 380130 | LONG_Name 380132 |
| | | | TotalGrossWeight 380134 | | | | | | 0..1 380136 | FormMeasure 380138 |
| | | | | Measure 380140 | | | | | 1 380142 | Measure 380144 |

FIG. 38-6

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | MeasureUnitCodeName <u>380146</u> | | | | | 0..1 <u>380148</u> | Name <u>380150</u> |
| | | | | | TotalGrossVolume <u>380152</u> | | | | | | 0..1 <u>380154</u> | FormMeasure <u>380156</u> |
| | | | | | | Measure <u>380158</u> | | | | | 1 <u>380160</u> | Measure <u>380162</u> |
| | | | | | | MeasureUnitCodeName <u>380164</u> | | | | | 0..1 <u>380166</u> | Name <u>380168</u> |
| | | | | | ShippingDateTime <u>380170</u> | | | | | | 0..1 <u>380172</u> | LOCALNORMALISED_DateTime <u>380174</u> |

FIG. 38-7

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | CreationDateTime 380176 | | | | | | 0..1 380178 | LOCALNORMALISED_DateTime 380180 |
| | | | PrintDateTime 380182 | | | | | | 0..1 380184 | LOCALNORMALISED_DateTime 380186 |
| | | | ShippersInstructionText 380188 | | | | | | 0..N 380190 | Text 380192 |
| | | | SpecialAgreementsText 380194 | | | | | | 0..N 380196 | Text 380198 |
| | | | MaterialContentDescriptionText 380200 | | | | | | 0..N 380202 | Text 380204 |

FIG. 38-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | InternalText 380206 | | | | | | 0..N 380208 | Text 380210 |
| | | | ShipFromLocation 380214 | | | | | | 0..1 380216 | FormWaybillNotificationFreightListShipFromLocation 380218 |
| | | | | LocationID 380220 | | | | | 0..1 380222 | LocationID 380224 |
| | | | | LocationAlternativeID 380226 | | | | | 0..N 380228 | LocationStandardID 380230 |
| | | | | PartyID 380232 | | | | | 0..1 380234 | PartyID 380236 |
| | | | | Address 380238 | | | | | 0..1 380240 | Address 380242 |

FIG. 38-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 380244 | | | | 0..1 380246 | FormOfAddress 380248 |
| | | | | | OrganisationFormattedName 380250 | | | | 0..N 380252 | LANGUAGEINDEPENDENT_MEDIUM_Name 380254 |
| | | | | | PersonName 380256 | | | | 0..1 380258 | PersonName 380260 |
| | | | | | FunctionalTitleName 380262 | | | | 0..1 380264 | LANGUAGEINDEPENDENT_MEDIUM_Name 380266 |
| | | | | | DepartmentName 380268 | | | | 0..1 380270 | LANGUAGEINDEPENDENT_MEDIUM_Name 380272 |

FIG. 38-10

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Office 380276 | | | | 0..1 380278 | Office 380280 |
| | | | | | Physical Address 380284 | | | | 0..1 380286 | PhysicalAddress 380288 |
| | | | | | | CountryCode 380290 | | | 0..1 380292 | CountryCode 380294 |
| | | | | | | CountryName 380296 | | | 0..1 380298 | MEDIUM_Name 380300 |
| | | | | | | RegionCode 380302 | | | 0..1 380304 | RegionCode 380306 |
| | | | | | | RegionName 380308 | | | 0..1 380310 | LANGUAGEINDEPENDENT_MEDIUM_Name 380312 |

FIG. 38-11

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPostalCode 380314 | | | 0..1 380316 | PostalCode 380318 |
| | | | | | | POBoxPostalCode 380320 | | | 0..1 380322 | PostalCode 380324 |
| | | | | | | CompanyPostalCode 380326 | | | 0..1 380328 | PostalCode 380330 |
| | | | | | | CityName 380332 | | | 0..1 380334 | LANGUAGEINDEPENDENT_MEDIUM_Name 380336 |
| | | | | | | AdditionalCityName 380338 | | | 0..1 380340 | LANGUAGEINDEPENDENT_MEDIUM_Name 380342 |

FIG. 38-12

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | DistrictName 380344 | | | 0..1 380346 | LANGUAGEINDEPENDENT_MEDIUM_Name 380348 |
| | | | | | | | | POBoxID 380350 | | | 0..1 380352 | POBoxID 380354 |
| | | | | | | | | POBoxIndicator 380356 | | | 0..1 380358 | Indicator 380360 |
| | | | | | | | | POBoxCountryCode 380362 | | | 0..1 380364 | CountryCode 380366 |
| | | | | | | | | POBoxCountryName 380368 | | | 0..1 380370 | MEDIUM_Name 380372 |

FIG. 38-13

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | | POBoxRegionCode 380374 | | | 0..1 380376 | RegionCode 380378 |
| | | | | | | | | | POBoxRegionName 380380 | | | 0..1 380382 | LANGUAGEINDEPENDENT_MEDIUM_Name 380384 |
| | | | | | | | | | POBoxCityName 380386 | | | 0..1 380388 | LANGUAGEINDEPENDENT_MEDIUM_Name 380390 |
| | | | | | | | | | StreetName 380392 | | | 0..1 380394 | StreetName 380396 |
| | | | | | | | | | StreetPrefixName 380398 | | | 0..N 380400 | LANGUAGEINDEPENDENT_MEDIUM_Name 380402 |

FIG. 38-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 380404 | | | 0..N 380406 | LANGUAGEINDEPENDENT_MEDIUM_Name 380408 |
| | | | | | | HouseID 380410 | | | 0..1 380412 | HouseID 380414 |
| | | | | | | AdditionalHouseID 380416 | | | 0..1 380418 | HouseID 380420 |
| | | | | | | BuildingID 380422 | | | 0..1 380424 | BuildingID 380426 |
| | | | | | | FloorID 380428 | | | 0..1 380430 | FloorID 380432 |
| | | | | | | RoomID 380434 | | | 0..1 380436 | RoomID 380438 |

FIG. 38-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CareOfName 380440 | | | 0..1 380442 | LANGUAGEINDEPENDENT_MEDIUM_Name 380444 |
| | | | | | | Description 380446 | | | 0..N 380448 | Description 380450 |
| | | | | | TaxJurisdictionCode 380452 | | | | 0..1 380454 | TaxJurisdictionCode 380456 |
| | | | | | TimeZoneDifferenceValue 380458 | | | | 0..1 380460 | TimeZoneDifferenceValue 380462 |
| | | | | | GeoCoordinates 380464 | | | | 0..1 380466 | GeoCoordinates 380468 |

FIG. 38-16

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | Communication 380472 | | | | 0..1 380474 | Communication 380476 |
| | | | | | | | | CorrespondenceLanguageCode 380478 | | | 0..1 380480 | LanguageCode 380482 |
| | | | | | | | | CorrespondenceLanguageName 380484 | | | 0..1 380486 | MEDIUM_Name 380488 |
| | | | | | | | | Telephone 380490 | | | 0..N 380492 | Telephone 380494 |
| | | | | | | | | | Number 380496 | | 1 380498 | PhoneNumber 380500 |

FIG. 38-17

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | SMSEnabledIndicator 380502 | | 0..1 380504 | Indicator 380506 |
| | | | | | | | | | NumberDefaultIndicator 380508 | | 1 380510 | Indicator 380512 |
| | | | | | | | | | NumberDescription 380514 | | 0..N 380516 | Description 380518 |
| | | | | | | | | | NumberUsageDenialIndicator 380520 | | 1 380522 | Indicator 380524 |
| | | | | | | | | MobilePhone 380526 | | | 0..N 380528 | Telephone 380530 |

FIG. 38-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 380532 | | 1 380534 | PhoneNumber 380536 |
| | | | | | | | SMSEnabledIndicator 380538 | | 0..1 380540 | Indicator 380542 |
| | | | | | | | NumberDefaultIndicator 380544 | | 1 380546 | Indicator 380548 |
| | | | | | | | NumberDescription 380550 | | 0..N 380552 | Description 380554 |
| | | | | | | | NumberUsageDenialIndicator 380556 | | 1 380558 | Indicator 380560 |

FIG. 38-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 380562 | | | 0..N 380564 | Facsimile 380566 |
| | | | | | | | Number 380568 | | 1 380570 | PhoneNumber 380572 |
| | | | | | | | NumberDefaultIndicator 380574 | | 1 380576 | Indicator 380578 |
| | | | | | | | NumberDescription 380580 | | 0..N 380582 | Description 380584 |
| | | | | | | | NumberUsageDenialIndicator 380586 | | 1 380588 | Indicator 380590 |
| | | | | | | Email 380592 | | | 0..N 380594 | Email 380596 |

FIG. 38-20

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URI 380598 | | 1 380600 | EmailURI 380602 |
| | | | | | | | URIDefaultIndicator 380604 | | 1 380606 | Indicator 380608 |
| | | | | | | | URIDescription 380610 | | 0..N 380612 | Description 380614 |
| | | | | | | | URIUsageDenialIndicator 380616 | | 1 380618 | Indicator 380620 |
| | | | | | | Web 380622 | | | 0..N 380624 | Web 380626 |
| | | | | | | | URI 380628 | | 1 380630 | WebURI 380632 |

FIG. 38-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 380634 | | 1 380636 | Indicator 380638 |
| | | | | | | | URIDescription 380640 | | 0..N 380642 | Description 380644 |
| | | | ShipToLocation 380648 | | | | | | 0..1 380650 | FormWaybillNotificationFreightListShipToLocation 380652 |
| | | | | LocationID 380654 | | | | | 0..1 380656 | LocationID 380658 |
| | | | | LocationAlternativeID 380660 | | | | | 0..N 380662 | LocationStandardID 380664 |
| | | | | PartyID 380666 | | | | | 0..1 380668 | PartyID 380670 |

FIG. 38-22

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | Address 380672 | | | | | 0..1 380674 | Address 380676 |
| | | | | | | | OrganisationFormOfAddress 380678 | | | | 0..1 380680 | FormOfAddress 380682 |
| | | | | | | | OrganisationFormattedName 380684 | | | | 0..N 380686 | LANGUAGEINDEPENDENT_MEDIUM_Name 380688 |
| | | | | | | | PersonName 380690 | | | | 0..1 380692 | PersonName 380694 |
| | | | | | | | FunctionalTitleName 380696 | | | | 0..1 380698 | LANGUAGEINDEPENDENT_MEDIUM_Name 380700 |

FIG. 38-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | DepartmentName 380702 | | | | 0..1 380704 | LANGUAGEINDEPENDENT_MEDIUM_Name 380706 |
| | | | | | Office 380710 | | | | 0..1 380712 | Office 380714 |
| | | | | | PhysicalAddress 380718 | | | | 0..1 380720 | PhysicalAddress 380722 |
| | | | | | | CountryCode 380724 | | | 0..1 380726 | CountryCode 380728 |
| | | | | | | CountryName 380730 | | | 0..1 380732 | MEDIUM_Name 380734 |
| | | | | | | RegionCode 380736 | | | 0..1 380738 | RegionCode 380740 |

FIG. 38-24

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | RegionName 380742 | | | 0..1 380744 | LANGUAGEINDEPENDENT_MEDIUM_Name 380746 |
| | | | | | | | | StreetPostalCode 380748 | | | 0..1 380750 | PostalCode 380752 |
| | | | | | | | | POBoxPostalCode 380754 | | | 0..1 380756 | PostalCode 380758 |
| | | | | | | | | CompanyPostalCode 380760 | | | 0..1 380762 | PostalCode 380764 |
| | | | | | | | | CityName 380766 | | | 0..1 380768 | LANGUAGEINDEPENDENT_MEDIUM_Name 380770 |

FIG. 38-25

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | AdditionalCityName 380772 | | | 0..1 380774 | LANGUAGEINDEPENDENT_MEDIUM_Name 380776 |
| | | | | | | | | DistrictName 380778 | | | 0..1 380780 | LANGUAGEINDEPENDENT_MEDIUM_Name 380782 |
| | | | | | | | | POBoxID 380784 | | | 0..1 380786 | POBoxID 380788 |
| | | | | | | | | POBoxIndicator 380790 | | | 0..1 380792 | Indicator 380794 |
| | | | | | | | | POBoxCountryCode 380796 | | | 0..1 380798 | CountryCode 380800 |

FIG. 38-26

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCountryName 380802 | | | 0..1 380804 | MEDIUM_Name 380806 |
| | | | | | | POBoxRegionCode 380808 | | | 0..1 380810 | RegionCode 380812 |
| | | | | | | POBoxRegionName 380814 | | | 0..1 380816 | LANGUAGEINDEPENDENT_MEDIUM_Name 380818 |
| | | | | | | POBoxCityName 380820 | | | 0..1 380822 | LANGUAGEINDEPENDENT_MEDIUM_Name 380824 |
| | | | | | | StreetName 380826 | | | 0..1 380828 | StreetName 380830 |

FIG. 38-27

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPrefixName 380832 | | | 0..N 380834 | LANGUAGEINDEPENDENT_MEDIUM_Name 380836 |
| | | | | | | StreetSuffixName 380838 | | | 0..N 380840 | LANGUAGEINDEPENDENT_MEDIUM_Name 380842 |
| | | | | | | HouseID 380844 | | | 0..1 380846 | HouseID 380848 |
| | | | | | | AdditionalHouseID 380850 | | | 0..1 380852 | HouseID 380854 |
| | | | | | | BuildingID 380856 | | | 0..1 380858 | BuildingID 380860 |
| | | | | | | FloorID 380862 | | | 0..1 380864 | FloorID 380866 |

FIG. 38-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RoomID 380868 | | | 0..1 380870 | RoomID 380872 |
| | | | | | | CareOfName 380874 | | | 0..1 380876 | LANGUAGEINDEPENDENT_MEDIUM_Name 380878 |
| | | | | | | Description 380880 | | | 0..N 380882 | Description 380884 |
| | | | | | TaxJurisdictionCode 380886 | | | | 0..1 380888 | TaxJurisdictionCode 380890 |
| | | | | | TimeZoneDifferenceValue 380892 | | | | 0..1 380894 | TimeZoneDifferenceValue 380896 |

FIG. 38-29

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GeoCoordinates 380898 | | | | 0..1 380900 | GeoCoordinates 380902 |
| | | | | | Communication 380906 | | | | 0..1 380908 | Communication 380910 |
| | | | | | | CorrespondenceLanguageCode 380912 | | | 0..1 380914 | LanguageCode 380916 |
| | | | | | | CorrespondenceLanguageName 380918 | | | 0..1 380920 | MEDIUM_Name 380922 |
| | | | | | | Telephone 380924 | | | 0..N 380926 | Telephone 380928 |

FIG. 38-30

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 380930 | | 1 380932 | PhoneNumber 380934 |
| | | | | | | | SMSEnabledIndicator 380936 | | 0..1 380938 | Indicator 380940 |
| | | | | | | | NumberDefaultIndicator 380942 | | 1 380944 | Indicator 380946 |
| | | | | | | | NumberDescription 380948 | | 0..N 380950 | Description 380952 |
| | | | | | | | NumberUsageDenialIndicator 380954 | | 1 380956 | Indicator 380958 |

FIG. 38-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MobilePhone 380960 | | | 0..N 380962 | Telephone 380964 |
| | | | | | | | Number 380966 | | 1 380968 | PhoneNumber 380970 |
| | | | | | | | SMSEnabledIndicator 380972 | | 0..1 380974 | Indicator 380976 |
| | | | | | | | NumberDefaultIndicator 380978 | | 1 380980 | Indicator 380982 |
| | | | | | | | NumberDescription 380984 | | 0..N 380986 | Description 380988 |

FIG. 38-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number UsageDenialIndicator 380990 | | 1 380992 | Indicator 380994 |
| | | | | | | Facsimile 380996 | | | 0..N 380998 | Facsimile 381000 |
| | | | | | | | Number 381002 | | 1 381004 | PhoneNumber 381006 |
| | | | | | | | Number DefaultIndicator 381008 | | 1 381010 | Indicator 381012 |
| | | | | | | | Number Description 381014 | | 0..N 381016 | Description 381018 |

FIG. 38-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 381020 | | 1 381022 | Indicator 381024 |
| | | | | | | Email 381026 | | | 0..N 381028 | Email 381030 |
| | | | | | | | URI 381032 | | 1 381034 | EmailURI 381036 |
| | | | | | | | URIDefaultIndicator 381038 | | 1 381040 | Indicator 381042 |
| | | | | | | | URIDescription 381044 | | 0..N 381046 | Description 381048 |
| | | | | | | | URIUsageDenialIndicator 381050 | | 1 381052 | Indicator 381054 |

FIG. 38-34

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | Web 381056 | | | 0..N 381058 | Web 381060 |
| | | | | | | | | | URI 381062 | | 1 381064 | WebURI 381066 |
| | | | | | | | | | URIDefaultIndicator 381068 | | 1 381070 | Indicator 381072 |
| | | | | | | | | | URIDescription 381074 | | 0..N 381076 | Description 381078 |
| | | | | | BillToParty 381082 | | | | | | 0..1 381084 | FormWaybillNotificationFreightListBillToParty 381086 |
| | | | | | | PartyID 381088 | | | | | 0..1 381090 | PartyID 381092 |
| | | | | | | Address 381094 | | | | | 0..1 381096 | Address 381098 |

FIG. 38-35

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 381100 | | | | 0..1 381102 | FormOfAddress 381104 |
| | | | | | OrganisationFormattedName 381106 | | | | 0..N 381108 | LANGUAGEINDEPENDENT_MEDIUM_Name 381110 |
| | | | | | PersonName 381112 | | | | 0..1 381114 | PersonName 381116 |
| | | | | | FunctionalTitleName 381118 | | | | 0..1 381120 | LANGUAGEINDEPENDENT_MEDIUM_Name 381122 |
| | | | | | DepartmentName 381124 | | | | 0..1 381126 | LANGUAGEINDEPENDENT_MEDIUM_Name 381128 |

FIG. 38-36

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | Office 381132 | | | | 0..1 381134 | Office 381136 |
| | | | | | | | Physical Address 381140 | | | | 0..1 381142 | PhysicalAddress 381144 |
| | | | | | | | | CountryCode 381146 | | | 0..1 381148 | CountryCode 381150 |
| | | | | | | | | CountryName 381152 | | | 0..1 381154 | MEDIUM_Name 381156 |
| | | | | | | | | RegionCode 381158 | | | 0..1 381160 | RegionCode 381162 |
| | | | | | | | | RegionName 381164 | | | 0..1 381166 | LANGUAGEINDEPENDENT_MEDIUM_Name 381168 |

FIG. 38-37

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPostalCode 381170 | | | 0..1 381172 | PostalCode 381174 |
| | | | | | | POBoxPostalCode 381176 | | | 0..1 381178 | PostalCode 381180 |
| | | | | | | CompanyPostalCode 381182 | | | 0..1 381184 | PostalCode 381186 |
| | | | | | | CityName 381188 | | | 0..1 381190 | LANGUAGEINDEPENDENT_MEDIUM_Name 381192 |
| | | | | | | AdditionalCityName 381194 | | | 0..1 381196 | LANGUAGEINDEPENDENT_MEDIUM_Name 381198 |

FIG. 38-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | DistrictName 381200 | | | 0..1 381202 | LANGUAGEINDEPENDENT_MEDIUM_Name 381204 |
| | | | | | | POBoxID 381206 | | | 0..1 381208 | POBoxID 381210 |
| | | | | | | POBoxIndicator 381212 | | | 0..1 381214 | Indicator 381216 |
| | | | | | | POBoxCountryCode 381218 | | | 0..1 381220 | CountryCode 381222 |
| | | | | | | POBoxCountryName 381224 | | | 0..1 381226 | MEDIUM_Name 381228 |

FIG. 38-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionCode 381230 | | | 0..1 381232 | RegionCode 381234 |
| | | | | | | POBoxRegionName 381236 | | | 0..1 381238 | LANGUAGEINDEPENDENT_MEDIUM_Name 381240 |
| | | | | | | POBoxCityName 381242 | | | 0..1 381244 | LANGUAGEINDEPENDENT_MEDIUM_Name 381246 |
| | | | | | | StreetName 381248 | | | 0..1 381250 | StreetName 381252 |
| | | | | | | StreetPrefixName 381254 | | | 0..N 381256 | LANGUAGEINDEPENDENT_MEDIUM_Name 381258 |

FIG. 38-40

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 381260 | | | 0..N 381262 | LANGUAGEINDEPENDENT_MEDIUM_Name 381264 |
| | | | | | | HouseID 381266 | | | 0..1 381268 | HouseID 381270 |
| | | | | | | AdditionalHouseID 381272 | | | 0..1 381274 | HouseID 381276 |
| | | | | | | BuildingID 381278 | | | 0..1 381280 | BuildingID 381282 |
| | | | | | | FloorID 381284 | | | 0..1 381286 | FloorID 381288 |
| | | | | | | RoomID 381290 | | | 0..1 381292 | RoomID 381294 |

FIG. 38-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CareOfName 381296 | | | 0..1 381298 | LANGUAGEINDEPENDENT_MEDIUM_Name 381300 |
| | | | | | | Description 381302 | | | 0..N 381304 | Description 381306 |
| | | | | | TaxJurisdictionCode 381308 | | | | 0..1 381310 | TaxJurisdictionCode 381312 |
| | | | | | TimeZoneDifferenceValue 381314 | | | | 0..1 381316 | TimeZoneDifferenceValue 381318 |
| | | | | | GeoCoordinates 381320 | | | | 0..1 381322 | GeoCoordinates 381324 |

FIG. 38-42

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Commun ication 381328 | | | | 0..1 381330 | Communication 381332 |
| | | | | | | Correspo ndenceL anguage Code 381334 | | | 0..1 381336 | LanguageCode 381338 |
| | | | | | | Correspo ndenceL anguage Name 381340 | | | 0..1 381342 | MEDIUM_Name 381344 |
| | | | | | | Telephon e 381346 | | | 0..N 381348 | Telephone 381350 |
| | | | | | | | Number 381352 | | 1 381354 | PhoneNumber 381356 |

FIG. 38-43

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 381358 | | 0..1 381360 | Indicator 381362 |
| | | | | | | | NumberDefaultIndicator 381364 | | 1 381366 | Indicator 381368 |
| | | | | | | | NumberDescription 381370 | | 0..N 381372 | Description 381374 |
| | | | | | | | NumberUsageDenialIndicator 381376 | | 1 381378 | Indicator 381380 |
| | | | | | | MobilePhone 381382 | | | 0..N 381384 | Telephone 381386 |

FIG. 38-44

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 381388 | | 1 381390 | PhoneNumber 381392 |
| | | | | | | | SMSEnabledIndicator 381394 | | 0..1 381396 | Indicator 381398 |
| | | | | | | | NumberDefaultIndicator 381400 | | 1 381402 | Indicator 381404 |
| | | | | | | | NumberDescription 381406 | | 0..N 381408 | Description 381410 |
| | | | | | | | NumberUsageDenialIndicator 381412 | | 1 381414 | Indicator 381416 |

FIG. 38-45

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 381418 | | | 0..N 381420 | Facsimile 381422 |
| | | | | | | | Number 381424 | | 1 381426 | PhoneNumber 381428 |
| | | | | | | | NumberDefaultIndicator 381430 | | 1 381432 | Indicator 381434 |
| | | | | | | | NumberDescription 381436 | | 0..N 381438 | Description 381440 |
| | | | | | | | NumberUsageDenialIndicator 381442 | | 1 381444 | Indicator 381446 |
| | | | | | | Email 381448 | | | 0..N 381450 | Email 381452 |

FIG. 38-46

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URI 381454 | | 1 381456 | EmailURI 381458 |
| | | | | | | | URIDefaultIndicator 381460 | | 1 381462 | Indicator 381464 |
| | | | | | | | URIDescription 381466 | | 0..N 381468 | Description 381470 |
| | | | | | | | URIUsageDenialIndicator 381472 | | 1 381474 | Indicator 381476 |
| | | | | | | Web 381478 | | | 0..N 381480 | Web 381482 |
| | | | | | | | URI 381484 | | 1 381486 | WebURI 381488 |

FIG. 38-47

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 381490 | | 1 381492 | Indicator 381494 |
| | | | | | | | URIDescription 381496 | | 0..N 381498 | Description 381500 |
| | | | | ContactPerson 381502 | | | | | 0..1 381504 | INTERNAL_ContactPerson 381506 |
| | | | | | InternalID 381508 | | | | 0..1 381510 | ContactPersonInternalID 381512 |
| | | | | | Address 381516 | | | | 0..1 381518 | Address 381520 |
| | | | | | | OrganisationFormOfAddress 381522 | | | 0..1 381524 | FormOfAddress 381526 |

FIG. 38-48

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 381528 | | | 0..N 381530 | LANGUAGEINDEPENDENT_MEDIUM_Name 381532 |
| | | | | | | PersonName 381534 | | | 0..1 381536 | PersonName 381538 |
| | | | | | | FunctionalTitleName 381540 | | | 0..1 381542 | LANGUAGEINDEPENDENT_MEDIUM_Name 381544 |
| | | | | | | DepartmentName 381546 | | | 0..1 381548 | LANGUAGEINDEPENDENT_MEDIUM_Name 381550 |
| | | | | | | Office 381554 | | | 0..1 381556 | Office 381558 |

FIG. 38-49

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 381562 | | | 0..1 381564 | PhysicalAddress 381566 |
| | | | | | | | CountryCode 381568 | | 0..1 381570 | CountryCode 381572 |
| | | | | | | | CountryName 381574 | | 0..1 381576 | MEDIUM_Name 381578 |
| | | | | | | | RegionCode 381580 | | 0..1 381582 | RegionCode 381584 |
| | | | | | | | RegionName 381586 | | 0..1 381588 | LANGUAGEINDEPENDENT_MEDIUM_Name 381590 |
| | | | | | | | StreetPostalCode 381592 | | 0..1 381594 | PostalCode 381596 |

FIG. 38-50

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 381598 | | 0..1 381600 | PostalCode 381602 |
| | | | | | | | CompanyPostalCode 381604 | | 0..1 381606 | PostalCode 381608 |
| | | | | | | | CityName 381610 | | 0..1 381612 | LANGUAGEINDEPENDENT_MEDIUM_Name 381614 |
| | | | | | | | AdditionalCityName 381616 | | 0..1 381618 | LANGUAGEINDEPENDENT_MEDIUM_Name 381620 |
| | | | | | | | DistrictName 381622 | | 0..1 381624 | LANGUAGEINDEPENDENT_MEDIUM_Name 381626 |

FIG. 38-51

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 381628 | | 0..1 381630 | POBoxID 381632 |
| | | | | | | | POBoxIndicator 381634 | | 0..1 381636 | Indicator 381638 |
| | | | | | | | POBoxCountryCode 381640 | | 0..1 381642 | CountryCode 381644 |
| | | | | | | | POBoxCountryName 381646 | | 0..1 381648 | MEDIUM_Name 381650 |
| | | | | | | | POBoxRegionCode 381652 | | 0..1 381654 | RegionCode 381656 |

FIG. 38-52

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 381658 | | 0..1 381660 | LANGUAGEINDEPENDENT_MEDIUM_Name 381662 |
| | | | | | | | POBoxCityName 381664 | | 0..1 381666 | LANGUAGEINDEPENDENT_MEDIUM_Name 381668 |
| | | | | | | | StreetName 381670 | | 0..1 381672 | StreetName 381674 |
| | | | | | | | StreetPrefixName 381676 | | 0..N 381678 | LANGUAGEINDEPENDENT_MEDIUM_Name 381680 |
| | | | | | | | StreetSuffixName 381682 | | 0..N 381684 | LANGUAGEINDEPENDENT_MEDIUM_Name 381686 |

FIG. 38-53

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 381688 | | 0..1 381690 | HouseID 381692 |
| | | | | | | | AdditionalHouseID 381694 | | 0..1 381696 | HouseID 381698 |
| | | | | | | | BuildingID 381700 | | 0..1 381702 | BuildingID 381704 |
| | | | | | | | FloorID 381706 | | 0..1 381708 | FloorID 381710 |
| | | | | | | | RoomID 381712 | | 0..1 381714 | RoomID 381716 |
| | | | | | | | CareOfName 381718 | | 0..1 381720 | LANGUAGEINDEPENDENT_MEDIUM_Name 381722 |

FIG. 38-54

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 381724 | | 0..N 381726 | Description 381728 |
| | | | | | | TaxJurisdictionCode 381730 | | | 0..1 381732 | TaxJurisdictionCode 381734 |
| | | | | | | TimeZoneDifferenceValue 381736 | | | 0..1 381738 | TimeZoneDifferenceValue 381740 |
| | | | | | | GeoCoordinates 381742 | | | 0..1 381744 | GeoCoordinates 381746 |
| | | | | | | Communication 381750 | | | 0..1 381752 | Communication 381754 |

FIG. 38-55

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 381756 | | 0..1 381758 | LanguageCode 381760 |
| | | | | | | | CorrespondenceLanguageName 381762 | | 0..1 381764 | MEDIUM_Name 381766 |
| | | | | | | | Telephone 381768 | | 0..N 381770 | Telephone 381772 |
| | | | | | | | | Number 381774 | 1 381776 | PhoneNumber 381778 |
| | | | | | | | | SMSEnabledIndicator 381780 | 0..1 381782 | Indicator 381784 |

FIG. 38-56

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 381786 | 1 381788 | Indicator 381790 |
| | | | | | | | | NumberDescription 381792 | 0..N 381794 | Description 381796 |
| | | | | | | | | NumberUsageDenialIndicator 381798 | 1 381800 | Indicator 381802 |
| | | | | | | | MobilePhone 381804 | | 0..N 381806 | Telephone 381808 |
| | | | | | | | | Number 381810 | 1 381812 | PhoneNumber 381814 |

FIG. 38-57

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | SMSEnabledIndicator 381816 | 0..1 381818 | Indicator 381820 |
| | | | | | | | | | | NumberDefaultIndicator 381822 | 1 381824 | Indicator 381826 |
| | | | | | | | | | | NumberDescription 381828 | 0..N 381830 | Description 381832 |
| | | | | | | | | | | NumberUsageDenialIndicator 381834 | 1 381836 | Indicator 381838 |
| | | | | | | | | | Facsimile 381840 | | 0..N 381842 | Facsimile 381844 |

FIG. 38-58

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | Number 381846 | 1 381848 | PhoneNumber 381850 |
| | | | | | | | | | | NumberDefaultIndicator 381852 | 1 381854 | Indicator 381856 |
| | | | | | | | | | | NumberDescription 381858 | 0..N 381860 | Description 381862 |
| | | | | | | | | | | NumberUsageDenialIndicator 381864 | 1 381866 | Indicator 381868 |
| | | | | | | | | | Email 381870 | | 0..N 381872 | Email 381874 |
| | | | | | | | | | | URI 381876 | 1 381878 | EmailURI 381880 |

FIG. 38-59

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | URIDefaultIndicator 381882 | 1 381884 | Indicator 381886 |
| | | | | | | | | | | URIDescription 381888 | 0..N 381890 | Description 381892 |
| | | | | | | | | | | URIUsageDenialIndicator 381894 | 1 381896 | Indicator 381898 |
| | | | | | | | | | Web 381900 | | 0..N 381902 | Web 381904 |
| | | | | | | | | | | URI 381906 | 1 381908 | WebURI 381910 |
| | | | | | | | | | | URIDefaultIndicator 381912 | 1 381914 | Indicator 381916 |

FIG. 38-60

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | URIDescription 381918 | 0..N 381920 | Description 381922 |
| | | | | | FreightForwarderParty 381926 | | | | | | 0..1 381928 | FormWaybillNotificationFreightListFreightForwarderParty 381930 |
| | | | | | | PartyID 381932 | | | | | 0..1 381934 | PartyID 381936 |
| | | | | | | Address 381938 | | | | | 0..1 381940 | Address 381942 |
| | | | | | | | OrganisationFormOfAddress 381944 | | | | 0..1 381946 | FormOfAddress 381948 |

FIG. 38-61

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | OrganisationFormattedName 381950 | | | | 0..N 381952 | LANGUAGEINDEPENDENT_MEDIUM_Name 381954 |
| | | | | | | | PersonName 381956 | | | | 0..1 381958 | PersonName 381960 |
| | | | | | | | FunctionalTitleName 381962 | | | | 0..1 381964 | LANGUAGEINDEPENDENT_MEDIUM_Name 381966 |
| | | | | | | | DepartmentName 381968 | | | | 0..1 381970 | LANGUAGEINDEPENDENT_MEDIUM_Name 381972 |
| | | | | | | | Office 381976 | | | | 0..1 381978 | Office 381980 |

FIG. 38-62

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | PhysicalAddress 381984 | | | | 0..1 381986 | PhysicalAddress 381988 |
| | | | | | | | | CountryCode 381990 | | | 0..1 381992 | CountryCode 381994 |
| | | | | | | | | CountryName 381996 | | | 0..1 381998 | MEDIUM_Name 382000 |
| | | | | | | | | RegionCode 382002 | | | 0..1 382004 | RegionCode 382006 |
| | | | | | | | | RegionName 382008 | | | 0..1 382010 | LANGUAGEINDEPENDENT_MEDIUM_Name 382012 |
| | | | | | | | | StreetPostalCode 382014 | | | 0..1 382016 | PostalCode 382018 |

FIG. 38-63

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | | POBoxPostalCode 382020 | | | 0..1 382022 | PostalCode 382024 |
| | | | | | | | | | CompanyPostalCode 382026 | | | 0..1 382028 | PostalCode 382030 |
| | | | | | | | | | CityName 382032 | | | 0..1 382034 | LANGUAGEINDEPENDENT_MEDIUM_Name 382036 |
| | | | | | | | | | AdditionalCityName 382038 | | | 0..1 382040 | LANGUAGEINDEPENDENT_MEDIUM_Name 382042 |
| | | | | | | | | | DistrictName 382044 | | | 0..1 382046 | LANGUAGEINDEPENDENT_MEDIUM_Name 382048 |

FIG. 38-64

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 382050 | | | 0..1 382052 | POBoxID 382054 |
| | | | | | | POBoxIndicator 382056 | | | 0..1 382058 | Indicator 382060 |
| | | | | | | POBoxCountryCode 382062 | | | 0..1 382064 | CountryCode 382066 |
| | | | | | | POBoxCountryName 382068 | | | 0..1 382070 | MEDIUM_Name 382072 |
| | | | | | | POBoxRegionCode 382074 | | | 0..1 382076 | RegionCode 382078 |

FIG. 38-65

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 382080 | | | 0..1 382082 | LANGUAGEINDEPENDENT_MEDIUM_Name 382084 |
| | | | | | | POBoxCityName 382086 | | | 0..1 382088 | LANGUAGEINDEPENDENT_MEDIUM_Name 382090 |
| | | | | | | StreetName 382092 | | | 0..1 382094 | StreetName 382096 |
| | | | | | | StreetPrefixName 382098 | | | 0..N 382100 | LANGUAGEINDEPENDENT_MEDIUM_Name 382102 |
| | | | | | | StreetSuffixName 382104 | | | 0..N 382106 | LANGUAGEINDEPENDENT_MEDIUM_Name 382108 |

FIG. 38-66

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 382110 | | | 0..1 382112 | HouseID 382114 |
| | | | | | | AdditionalHouseID 382116 | | | 0..1 382118 | HouseID 382120 |
| | | | | | | BuildingID 382122 | | | 0..1 382124 | BuildingID 382126 |
| | | | | | | FloorID 382128 | | | 0..1 382130 | FloorID 382132 |
| | | | | | | RoomID 382134 | | | 0..1 382136 | RoomID 382138 |
| | | | | | | CareOfName 382140 | | | 0..1 382142 | LANGUAGEINDEPENDENT_MEDIUM_Name 382144 |

FIG. 38-67

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 382146 | | | 0..N 382148 | Description 382150 |
| | | | | | TaxJurisdictionCode 382152 | | | | 0..1 382154 | TaxJurisdictionCode 382156 |
| | | | | | TimeZoneDifferenceValue 382158 | | | | 0..1 382160 | TimeZoneDifferenceValue 382162 |
| | | | | | GeoCoordinates 382164 | | | | 0..1 382166 | GeoCoordinates 382168 |
| | | | | | Communication 382172 | | | | 0..1 382174 | Communication 382176 |

FIG. 38-68

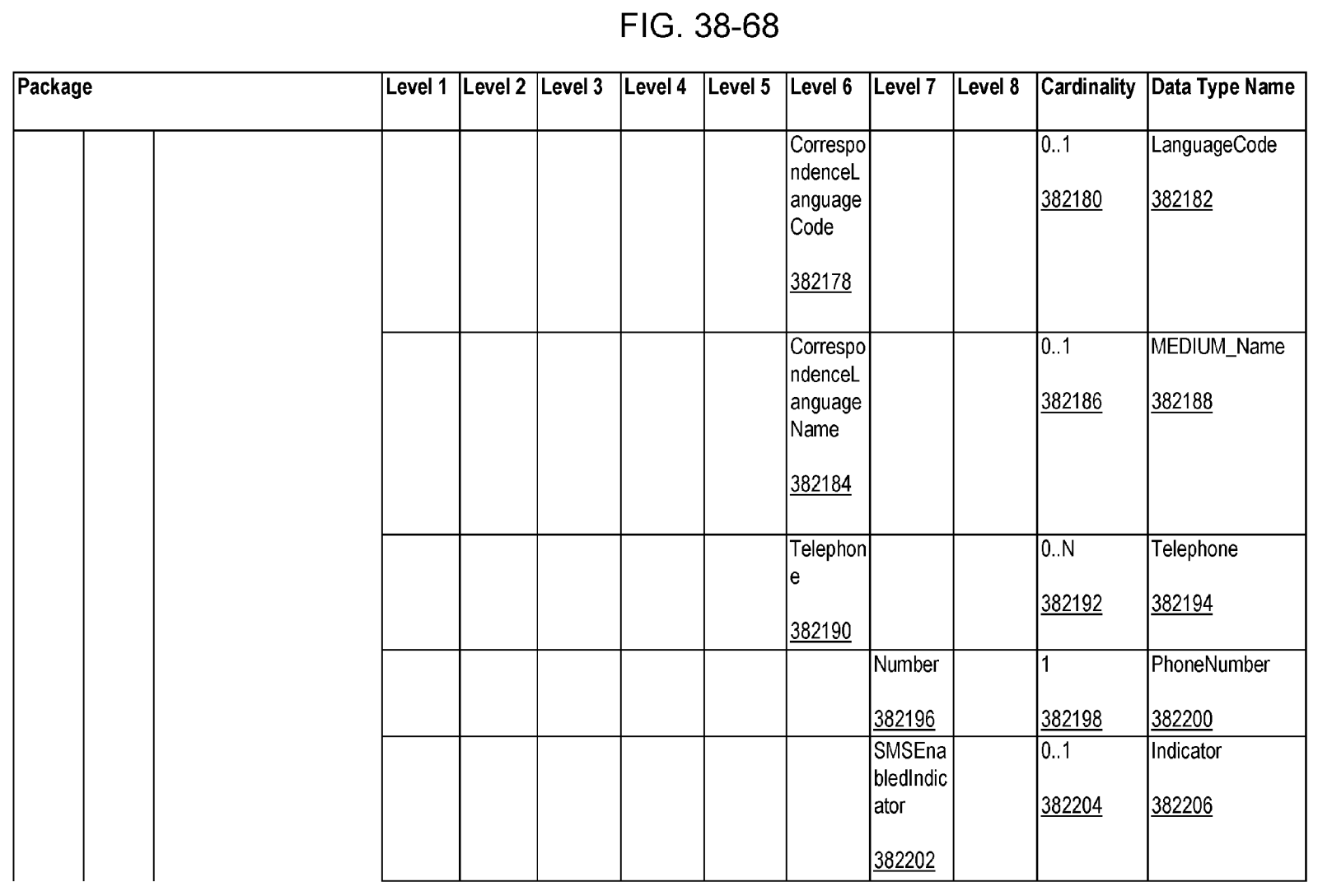

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | CorrespondenceLanguageCode 382178 | | | 0..1 382180 | LanguageCode 382182 |
| | | | | | | | | CorrespondenceLanguageName 382184 | | | 0..1 382186 | MEDIUM_Name 382188 |
| | | | | | | | | Telephone 382190 | | | 0..N 382192 | Telephone 382194 |
| | | | | | | | | | Number 382196 | | 1 382198 | PhoneNumber 382200 |
| | | | | | | | | | SMSEnabledIndicator 382202 | | 0..1 382204 | Indicator 382206 |

FIG. 38-69

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 382208 | | 1 382210 | Indicator 382212 |
| | | | | | | | NumberDescription 382214 | | 0..N 382216 | Description 382218 |
| | | | | | | | NumberUsageDenialIndicator 382220 | | 1 382222 | Indicator 382224 |
| | | | | | | MobilePhone 382226 | | | 0..N 382228 | Telephone 382230 |
| | | | | | | | Number 382232 | | 1 382234 | PhoneNumber 382236 |

FIG. 38-70

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | SMSEnabledIndicator 382238 | | 0..1 382240 | Indicator 382242 |
| | | | | | | | | | NumberDefaultIndicator 382244 | | 1 382246 | Indicator 382248 |
| | | | | | | | | | NumberDescription 382250 | | 0..N 382252 | Description 382254 |
| | | | | | | | | | NumberUsageDenialIndicator 382256 | | 1 382258 | Indicator 382260 |
| | | | | | | | | Facsimile 382262 | | | 0..N 382264 | Facsimile 382266 |

FIG. 38-71

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 382268 | | 1 382270 | PhoneNumber 382272 |
| | | | | | | | Number DefaultIn dicator 382274 | | 1 382276 | Indicator 382278 |
| | | | | | | | Number Descripti on 382280 | | 0..N 382282 | Description 382284 |
| | | | | | | | Number UsageDe nialIndica tor 382286 | | 1 382288 | Indicator 382290 |
| | | | | | | Email 382292 | | | 0..N 382294 | Email 382296 |
| | | | | | | | URI 382298 | | 1 382300 | EmailURI 382302 |

FIG. 38-72

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 382304 | | 1 382306 | Indicator 382308 |
| | | | | | | | URIDescription 382310 | | 0..N 382312 | Description 382314 |
| | | | | | | | URIUsageDenialIndicator 382316 | | 1 382318 | Indicator 382320 |
| | | | | | | Web 382322 | | | 0..N 382324 | Web 382326 |
| | | | | | | | URI 382328 | | 1 382330 | WebURI 382332 |
| | | | | | | | URIDefaultIndicator 382334 | | 1 382336 | Indicator 382338 |

FIG. 38-73

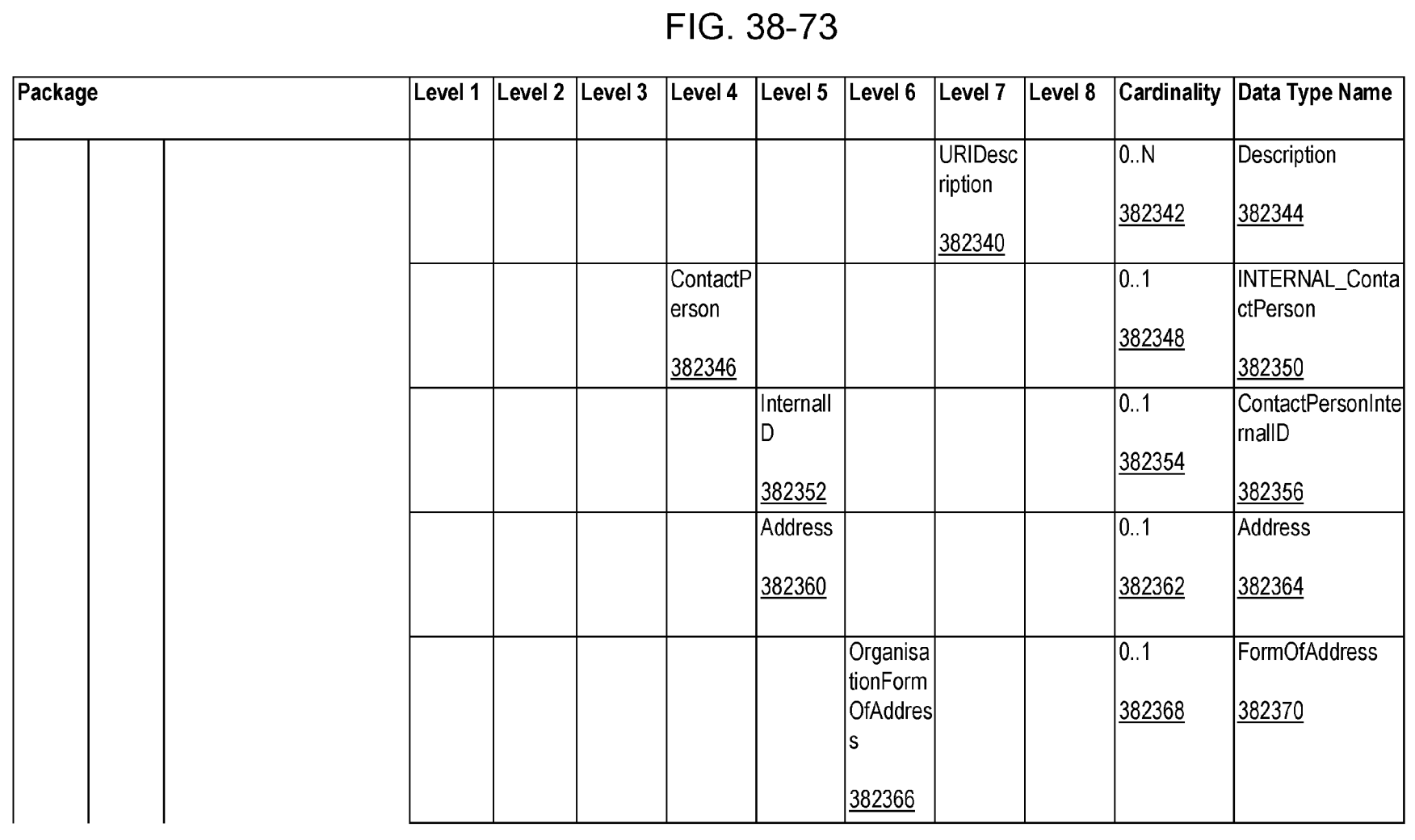

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 382340 | | 0..N 382342 | Description 382344 |
| | | | | ContactPerson 382346 | | | | | 0..1 382348 | INTERNAL_ContactPerson 382350 |
| | | | | | InternalID 382352 | | | | 0..1 382354 | ContactPersonInternalID 382356 |
| | | | | | Address 382360 | | | | 0..1 382362 | Address 382364 |
| | | | | | | OrganisationFormOfAddress 382366 | | | 0..1 382368 | FormOfAddress 382370 |

FIG. 38-74

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 382372 | | | 0..N 382374 | LANGUAGEINDEPENDENT_MEDIUM_Name 382376 |
| | | | | | | PersonName 382378 | | | 0..1 382380 | PersonName 382382 |
| | | | | | | FunctionalTitleName 382384 | | | 0..1 382386 | LANGUAGEINDEPENDENT_MEDIUM_Name 382388 |
| | | | | | | DepartmentName 382390 | | | 0..1 382392 | LANGUAGEINDEPENDENT_MEDIUM_Name 382394 |
| | | | | | | Office 382398 | | | 0..1 382400 | Office 382402 |

FIG. 38-75

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 382406 | | | 0..1 382408 | PhysicalAddress 382410 |
| | | | | | | | CountryCode 382412 | | 0..1 382414 | CountryCode 382416 |
| | | | | | | | CountryName 382418 | | 0..1 382420 | MEDIUM_Name 382422 |
| | | | | | | | RegionCode 382424 | | 0..1 382426 | RegionCode 382428 |
| | | | | | | | RegionName 382430 | | 0..1 382432 | LANGUAGEINDEPENDENT_MEDIUM_Name 382434 |
| | | | | | | | StreetPostalCode 382436 | | 0..1 382438 | PostalCode 382440 |

FIG. 38-76

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 382442 | | 0..1 382444 | PostalCode 382446 |
| | | | | | | | CompanyPostalCode 382448 | | 0..1 382450 | PostalCode 382452 |
| | | | | | | | CityName 382454 | | 0..1 382456 | LANGUAGEINDEPENDENT_MEDIUM_Name 382458 |
| | | | | | | | AdditionalCityName 382460 | | 0..1 382462 | LANGUAGEINDEPENDENT_MEDIUM_Name 382464 |
| | | | | | | | DistrictName 382466 | | 0..1 382468 | LANGUAGEINDEPENDENT_MEDIUM_Name 382470 |

FIG. 38-77

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxID 382472 | | 0..1 382474 | POBoxID 382476 |
| | | | | | | | | | POBoxIndicator 382478 | | 0..1 382480 | Indicator 382482 |
| | | | | | | | | | POBoxCountryCode 382484 | | 0..1 382486 | CountryCode 382488 |
| | | | | | | | | | POBoxCountryName 382490 | | 0..1 382492 | MEDIUM_Name 382494 |
| | | | | | | | | | POBoxRegionCode 382496 | | 0..1 382498 | RegionCode 382500 |

FIG. 38-78

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 382502 | | 0..1 382504 | LANGUAGEINDEPENDENT_MEDIUM_Name 382506 |
| | | | | | | | POBoxCityName 382508 | | 0..1 382510 | LANGUAGEINDEPENDENT_MEDIUM_Name 382512 |
| | | | | | | | StreetName 382514 | | 0..1 382516 | StreetName 382518 |
| | | | | | | | StreetPrefixName 382520 | | 0..N 382522 | LANGUAGEINDEPENDENT_MEDIUM_Name 382524 |
| | | | | | | | StreetSuffixName 382526 | | 0..N 382528 | LANGUAGEINDEPENDENT_MEDIUM_Name 382530 |

FIG. 38-79

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 382532 | | 0..1 382534 | HouseID 382536 |
| | | | | | | | AdditionalHouseID 382538 | | 0..1 382540 | HouseID 382542 |
| | | | | | | | BuildingID 382544 | | 0..1 382546 | BuildingID 382548 |
| | | | | | | | FloorID 382550 | | 0..1 382552 | FloorID 382554 |
| | | | | | | | RoomID 382556 | | 0..1 382558 | RoomID 382560 |
| | | | | | | | CareOfName 382562 | | 0..1 382564 | LANGUAGEINDEPENDENT_MEDIUM_Name 382566 |

FIG. 38-80

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 382568 | | 0..N 382570 | Description 382572 |
| | | | | | | TaxJurisdictionCode 382574 | | | 0..1 382576 | TaxJurisdictionCode 382578 |
| | | | | | | TimeZoneDifferenceValue 382580 | | | 0..1 382582 | TimeZoneDifferenceValue 382584 |
| | | | | | | GeoCoordinates 382586 | | | 0..1 382588 | GeoCoordinates 382590 |
| | | | | | | Communication 382594 | | | 0..1 382596 | Communication 382598 |

FIG. 38-81

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 382600 | | 0..1 382602 | LanguageCode 382604 |
| | | | | | | | CorrespondenceLanguageName 382606 | | 0..1 382608 | MEDIUM_Name 382610 |
| | | | | | | | Telephone 382612 | | 0..N 382614 | Telephone 382616 |
| | | | | | | | | Number 382618 | 1 382620 | PhoneNumber 382622 |
| | | | | | | | | SMSEnabledIndicator 382624 | 0..1 382626 | Indicator 382628 |

FIG. 38-82

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 382630 | 1 382632 | Indicator 382634 |
| | | | | | | | | NumberDescription 382636 | 0..N 382638 | Description 382640 |
| | | | | | | | | NumberUsageDenialIndicator 382642 | 1 382644 | Indicator 382646 |
| | | | | | | | MobilePhone 382648 | | 0..N 382650 | Telephone 382652 |
| | | | | | | | | Number 382654 | 1 382656 | PhoneNumber 382658 |

FIG. 38-83

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 382660 | 0..1 382662 | Indicator 382664 |
| | | | | | | | | NumberDefaultIndicator 382666 | 1 382668 | Indicator 382670 |
| | | | | | | | | NumberDescription 382672 | 0..N 382674 | Description 382676 |
| | | | | | | | | NumberUsageDenialIndicator 382678 | 1 382680 | Indicator 382682 |
| | | | | | | | Facsimile 382684 | | 0..N 382686 | Facsimile 382688 |

FIG. 38-84

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 382690 | 1 382692 | PhoneNumber 382694 |
| | | | | | | | | Number DefaultIndicator 382696 | 1 382698 | Indicator 382700 |
| | | | | | | | | Number Description 382702 | 0..N 382704 | Description 382706 |
| | | | | | | | | Number UsageDenialIndicator 382708 | 1 382710 | Indicator 382712 |
| | | | | | | | Email 382714 | | 0..N 382716 | Email 382718 |
| | | | | | | | | URI 382720 | 1 382722 | EmailURI 382724 |

FIG. 38-85

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 382726 | 1 382728 | Indicator 382730 |
| | | | | | | | | URIDescription 382732 | 0..N 382734 | Description 382736 |
| | | | | | | | | URIUsageDenialIndicator 382738 | 1 382740 | Indicator 382742 |
| | | | | | | | Web 382744 | | 0..N 382746 | Web 382748 |
| | | | | | | | | URI 382750 | 1 382752 | WebURI 382754 |
| | | | | | | | | URIDefaultIndicator 382756 | 1 382758 | Indicator 382760 |

FIG. 38-86

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 382762 | 0..N 382764 | Description 382766 |
| | | | | SCAC 382768 | | | | | 0..1 382770 | PartyID 382772 |
| | | | | CarrierProgressiveNumber 382774 | | | | | 0..1 382776 | BusinessTransactionDocumentReference 382778 |
| | | | ProductRecipientParty 382782 | | | | | | 0..1 382784 | FormWaybillNotificationFreightListProductRecipientParty 382786 |
| | | | | PartyID 382788 | | | | | 0..1 382790 | PartyID 382792 |
| | | | | Address 382794 | | | | | 0..1 382796 | Address 382798 |

FIG. 38-87

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 382800 | | | | 0..1 382802 | FormOfAddress 382804 |
| | | | | | OrganisationFormattedName 382806 | | | | 0..N 382808 | LANGUAGEINDEPENDENT_MEDIUM_Name 382810 |
| | | | | | PersonName 382812 | | | | 0..1 382814 | PersonName 382816 |
| | | | | | FunctionalTitleName 382818 | | | | 0..1 382820 | LANGUAGEINDEPENDENT_MEDIUM_Name 382822 |
| | | | | | DepartmentName 382824 | | | | 0..1 382826 | LANGUAGEINDEPENDENT_MEDIUM_Name 382828 |

FIG. 38-88

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | Office<br>382832 | | | | 0..1<br>382834 | Office<br>382836 |
| | | | | | | | Physical Address<br>382840 | | | | 0..1<br>382842 | PhysicalAddress<br>382844 |
| | | | | | | | | CountryCode<br>382846 | | | 0..1<br>382848 | CountryCode<br>382850 |
| | | | | | | | | CountryName<br>382852 | | | 0..1<br>382854 | MEDIUM_Name<br>382856 |
| | | | | | | | | RegionCode<br>382858 | | | 0..1<br>382860 | RegionCode<br>382862 |
| | | | | | | | | RegionName<br>382864 | | | 0..1<br>382866 | LANGUAGEINDEPENDENT_MEDIUM_Name<br>382868 |

FIG. 38-89

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPostalCode 382870 | | | 0..1 382872 | PostalCode 382874 |
| | | | | | | POBoxPostalCode 382876 | | | 0..1 382878 | PostalCode 382880 |
| | | | | | | CompanyPostalCode 382882 | | | 0..1 382884 | PostalCode 382886 |
| | | | | | | CityName 382888 | | | 0..1 382890 | LANGUAGEINDEPENDENT_MEDIUM_Name 382892 |
| | | | | | | AdditionalCityName 382894 | | | 0..1 382896 | LANGUAGEINDEPENDENT_MEDIUM_Name 382898 |

FIG. 38-90

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | DistrictName 382900 | | | 0..1 382902 | LANGUAGEINDEPENDENT_MEDIUM_Name 382904 |
| | | | | | | POBoxID 382906 | | | 0..1 382908 | POBoxID 382910 |
| | | | | | | POBoxIndicator 382912 | | | 0..1 382914 | Indicator 382916 |
| | | | | | | POBoxCountryCode 382918 | | | 0..1 382920 | CountryCode 382922 |
| | | | | | | POBoxCountryName 382924 | | | 0..1 382926 | MEDIUM_Name 382928 |

FIG. 38-91

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | POBoxRegionCode 382930 | | | 0..1 382932 | RegionCode 382934 |
| | | | | | | | | POBoxRegionName 382936 | | | 0..1 382938 | LANGUAGEINDEPENDENT_MEDIUM_Name 382940 |
| | | | | | | | | POBoxCityName 382942 | | | 0..1 382944 | LANGUAGEINDEPENDENT_MEDIUM_Name 382946 |
| | | | | | | | | StreetName 382948 | | | 0..1 382950 | StreetName 382952 |
| | | | | | | | | StreetPrefixName 382954 | | | 0..N 382956 | LANGUAGEINDEPENDENT_MEDIUM_Name 382958 |

FIG. 38-92

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 382960 | | | 0..N 382962 | LANGUAGEINDEPENDENT_MEDIUM_Name 382964 |
| | | | | | | HouseID 382966 | | | 0..1 382968 | HouseID 382970 |
| | | | | | | AdditionalHouseID 382972 | | | 0..1 382974 | HouseID 382976 |
| | | | | | | BuildingID 382978 | | | 0..1 382980 | BuildingID 382982 |
| | | | | | | FloorID 382984 | | | 0..1 382986 | FloorID 382988 |
| | | | | | | RoomID 382990 | | | 0..1 382992 | RoomID 382994 |

FIG. 38-93

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CareOfName 382996 | | | 0..1 382998 | LANGUAGEINDEPENDENT_MEDIUM_Name 383000 |
| | | | | | | Description 383002 | | | 0..N 383004 | Description 383006 |
| | | | | | TaxJurisdictionCode 383008 | | | | 0..1 383010 | TaxJurisdictionCode 383012 |
| | | | | | TimeZoneDifferenceValue 383014 | | | | 0..1 383016 | TimeZoneDifferenceValue 383018 |
| | | | | | GeoCoordinates 383020 | | | | 0..1 383022 | GeoCoordinates 383024 |

FIG. 38-94

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Communication 383028 | | | | 0..1 383030 | Communication 383032 |
| | | | | | | CorrespondenceLanguageCode 383034 | | | 0..1 383036 | LanguageCode 383038 |
| | | | | | | CorrespondenceLanguageName 383040 | | | 0..1 383042 | MEDIUM_Name 383044 |
| | | | | | | Telephone 383046 | | | 0..N 383048 | Telephone 383050 |
| | | | | | | | Number 383052 | | 1 383054 | PhoneNumber 383056 |

FIG. 38-95

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 383058 | | 0..1 383060 | Indicator 383062 |
| | | | | | | | NumberDefaultIndicator 383064 | | 1 383066 | Indicator 383068 |
| | | | | | | | NumberDescription 383070 | | 0..N 383072 | Description 383074 |
| | | | | | | | NumberUsageDenialIndicator 383076 | | 1 383078 | Indicator 383080 |
| | | | | | | MobilePhone 383082 | | | 0..N 383084 | Telephone 383086 |

FIG. 38-96

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 383088 | | 1 383090 | PhoneNumber 383092 |
| | | | | | | | SMSEnabledIndicator 383094 | | 0..1 383096 | Indicator 383098 |
| | | | | | | | NumberDefaultIndicator 383100 | | 1 383102 | Indicator 383104 |
| | | | | | | | NumberDescription 383106 | | 0..N 383108 | Description 383110 |
| | | | | | | | NumberUsageDenialIndicator 383112 | | 1 383114 | Indicator 383116 |

FIG. 38-97

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 383118 | | | 0..N 383120 | Facsimile 383122 |
| | | | | | | | Number 383124 | | 1 383126 | PhoneNumber 383128 |
| | | | | | | | NumberDefaultIndicator 383130 | | 1 383132 | Indicator 383134 |
| | | | | | | | NumberDescription 383136 | | 0..N 383138 | Description 383140 |
| | | | | | | | NumberUsageDenialIndicator 383142 | | 1 383144 | Indicator 383146 |
| | | | | | | Email 383148 | | | 0..N 383150 | Email 383152 |

FIG. 38-98

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URI 383154 | | 1 383156 | EmailURI 383158 |
| | | | | | | | URIDefaultIndicator 383160 | | 1 383162 | Indicator 383164 |
| | | | | | | | URIDescription 383166 | | 0..N 383168 | Description 383170 |
| | | | | | | | URIUsageDenialIndicator 383172 | | 1 383174 | Indicator 383176 |
| | | | | | | Web 383178 | | | 0..N 383180 | Web 383182 |
| | | | | | | | URI 383184 | | 1 383186 | WebURI 383188 |

FIG. 38-99

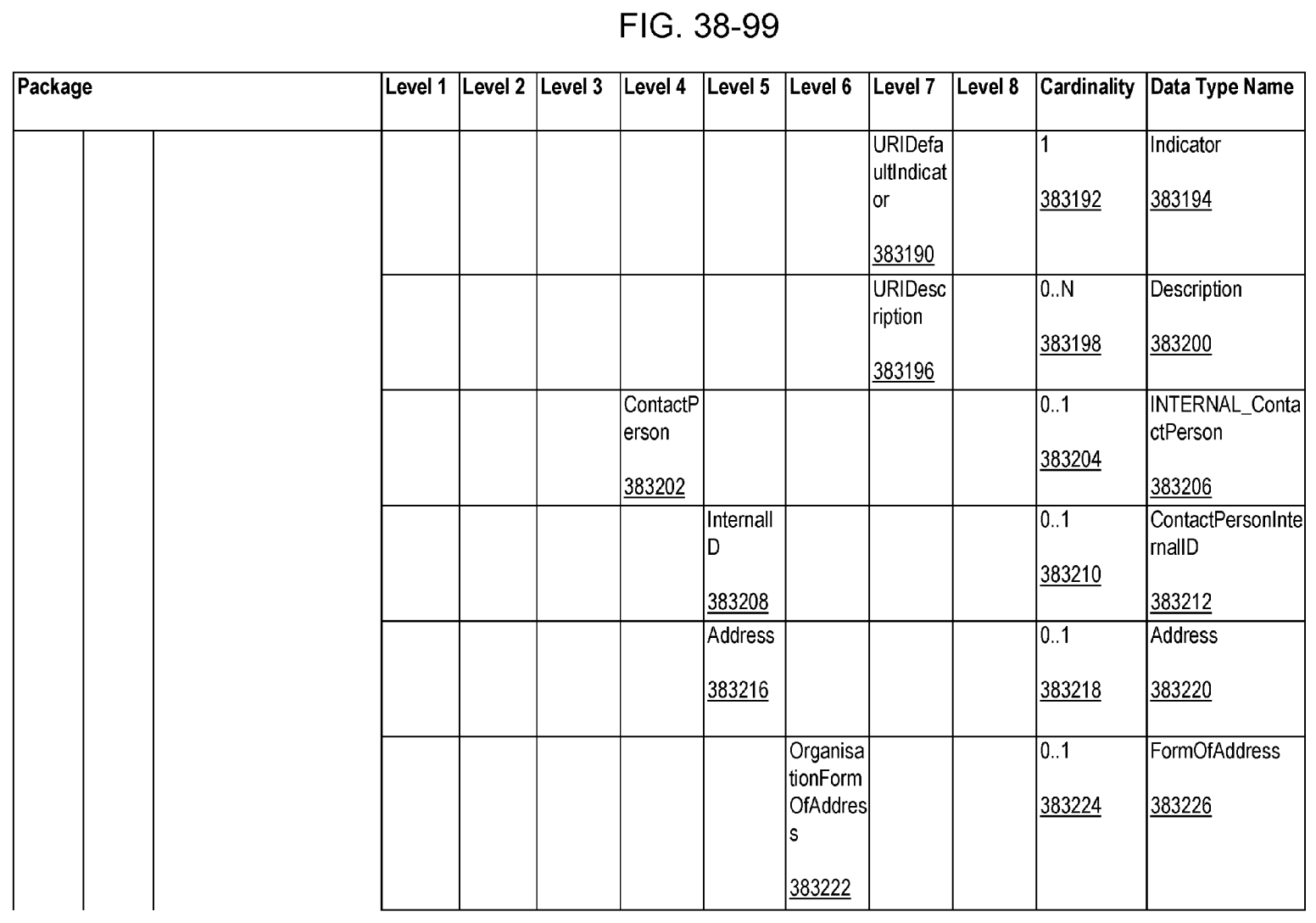

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 383190 | | 1 383192 | Indicator 383194 |
| | | | | | | | URIDescription 383196 | | 0..N 383198 | Description 383200 |
| | | | | ContactPerson 383202 | | | | | 0..1 383204 | INTERNAL_ContactPerson 383206 |
| | | | | | InternalID 383208 | | | | 0..1 383210 | ContactPersonInternalID 383212 |
| | | | | | Address 383216 | | | | 0..1 383218 | Address 383220 |
| | | | | | | OrganisationFormOfAddress 383222 | | | 0..1 383224 | FormOfAddress 383226 |

FIG. 38-100

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 383228 | | | 0..N 383230 | LANGUAGEINDEPENDENT_MEDIUM_Name 383232 |
| | | | | | | PersonName 383234 | | | 0..1 383236 | PersonName 383238 |
| | | | | | | FunctionalTitleName 383240 | | | 0..1 383242 | LANGUAGEINDEPENDENT_MEDIUM_Name 383244 |
| | | | | | | DepartmentName 383246 | | | 0..1 383248 | LANGUAGEINDEPENDENT_MEDIUM_Name 383250 |
| | | | | | | Office 383254 | | | 0..1 383256 | Office 383258 |

FIG. 38-101

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 383262 | | | 0..1 383264 | PhysicalAddress 383266 |
| | | | | | | | CountryCode 383268 | | 0..1 383270 | CountryCode 383272 |
| | | | | | | | CountryName 383274 | | 0..1 383276 | MEDIUM_Name 383278 |
| | | | | | | | RegionCode 383280 | | 0..1 383282 | RegionCode 383284 |
| | | | | | | | RegionName 383286 | | 0..1 383288 | LANGUAGEINDEPENDENT_MEDIUM_Name 383290 |
| | | | | | | | StreetPostalCode 383292 | | 0..1 383294 | PostalCode 383296 |

FIG. 38-102

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 383298 | | 0..1 383300 | PostalCode 383302 |
| | | | | | | | CompanyPostalCode 383304 | | 0..1 383306 | PostalCode 383308 |
| | | | | | | | CityName 383310 | | 0..1 383312 | LANGUAGEINDEPENDENT_MEDIUM_Name 383314 |
| | | | | | | | AdditionalCityName 383316 | | 0..1 383318 | LANGUAGEINDEPENDENT_MEDIUM_Name 383320 |
| | | | | | | | DistrictName 383322 | | 0..1 383324 | LANGUAGEINDEPENDENT_MEDIUM_Name 383326 |

FIG. 38-103

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 383328 | | 0..1 383330 | POBoxID 383332 |
| | | | | | | | POBoxIndicator 383334 | | 0..1 383336 | Indicator 383338 |
| | | | | | | | POBoxCountryCode 383340 | | 0..1 383342 | CountryCode 383344 |
| | | | | | | | POBoxCountryName 383346 | | 0..1 383348 | MEDIUM_Name 383350 |
| | | | | | | | POBoxRegionCode 383352 | | 0..1 383354 | RegionCode 383356 |

FIG. 38-104

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxRegionName 383358 | | 0..1 383360 | LANGUAGEINDEPENDENT_MEDIUM_Name 383362 |
| | | | | | | | | | POBoxCityName 383364 | | 0..1 383366 | LANGUAGEINDEPENDENT_MEDIUM_Name 383368 |
| | | | | | | | | | StreetName 383370 | | 0..1 383372 | StreetName 383374 |
| | | | | | | | | | StreetPrefixName 383376 | | 0..N 383378 | LANGUAGEINDEPENDENT_MEDIUM_Name 383380 |
| | | | | | | | | | StreetSuffixName 383382 | | 0..N 383384 | LANGUAGEINDEPENDENT_MEDIUM_Name 383386 |

FIG. 38-105

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 383388 | | 0..1 383390 | HouseID 383392 |
| | | | | | | | AdditionalHouseID 383394 | | 0..1 383396 | HouseID 383398 |
| | | | | | | | BuildingID 383400 | | 0..1 383402 | BuildingID 383404 |
| | | | | | | | FloorID 383406 | | 0..1 383408 | FloorID 383410 |
| | | | | | | | RoomID 383412 | | 0..1 383414 | RoomID 383416 |
| | | | | | | | CareOfName 383418 | | 0..1 383420 | LANGUAGEINDEPENDENT_MEDIUM_Name 383422 |

FIG. 38-106

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 383424 | | 0..N 383426 | Description 383428 |
| | | | | | | TaxJurisdictionCode 383430 | | | 0..1 383432 | TaxJurisdictionCode 383434 |
| | | | | | | TimeZoneDifferenceValue 383436 | | | 0..1 383438 | TimeZoneDifferenceValue 383440 |
| | | | | | | GeoCoordinates 383442 | | | 0..1 383444 | GeoCoordinates 383446 |
| | | | | | | Communication 383450 | | | 0..1 383452 | Communication 383454 |

FIG. 38-107

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 383456 | | 0..1 383458 | LanguageCode 383460 |
| | | | | | | | CorrespondenceLanguageName 383462 | | 0..1 383464 | MEDIUM_Name 383466 |
| | | | | | | | Telephone 383468 | | 0..N 383470 | Telephone 383472 |
| | | | | | | | | Number 383474 | 1 383476 | PhoneNumber 383478 |
| | | | | | | | | SMSEnabledIndicator 383480 | 0..1 383482 | Indicator 383484 |

FIG. 38-108

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | Number DefaultIndicator 383486 | 1 383488 | Indicator 383490 |
| | | | | | | | | | | Number Description 383492 | 0..N 383494 | Description 383496 |
| | | | | | | | | | | Number UsageDenialIndicator 383498 | 1 383500 | Indicator 383502 |
| | | | | | | | | | MobilePhone 383504 | | 0..N 383506 | Telephone 383508 |
| | | | | | | | | | | Number 383510 | 1 383512 | PhoneNumber 383514 |

FIG. 38-109

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 383516 | 0..1 383518 | Indicator 383520 |
| | | | | | | | | NumberDefaultIndicator 383522 | 1 383524 | Indicator 383526 |
| | | | | | | | | NumberDescription 383528 | 0..N 383530 | Description 383532 |
| | | | | | | | | NumberUsageDenialIndicator 383534 | 1 383536 | Indicator 383538 |
| | | | | | | | Facsimile 383540 | | 0..N 383542 | Facsimile 383544 |

FIG. 38-110

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 383546 | 1 383548 | PhoneNumber 383550 |
| | | | | | | | | NumberDefaultIndicator 383552 | 1 383554 | Indicator 383556 |
| | | | | | | | | NumberDescription 383558 | 0..N 383560 | Description 383562 |
| | | | | | | | | NumberUsageDenialIndicator 383564 | 1 383566 | Indicator 383568 |
| | | | | | | | Email 383570 | | 0..N 383572 | Email 383574 |
| | | | | | | | | URI 383576 | 1 383578 | EmailURI 383580 |

FIG. 38-111

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 383582 | 1 383584 | Indicator 383586 |
| | | | | | | | | URIDescription 383588 | 0..N 383590 | Description 383592 |
| | | | | | | | | URIUsageDenialIndicator 383594 | 1 383596 | Indicator 383598 |
| | | | | | | | Web 383600 | | 0..N 383602 | Web 383604 |
| | | | | | | | | URI 383606 | 1 383608 | WebURI 383610 |
| | | | | | | | | URIDefaultIndicator 383612 | 1 383614 | Indicator 383616 |

FIG. 38-112

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | | | | URIDescription 383618 | 0..N 383620 | Description 383622 |
| | | | | | | AttachmentFolderDocument 383626 | | | | | | 0..N 383628 | FormWaybillNotificationFreightListAttachmentFolderDocument 383630 |
| | | | | | | | TypeCode 383632 | | | | | 0..1 383634 | DocumentTypeCode 383636 |
| | | | | | | | TypeDescription 383638 | | | | | 0..1 383640 | SHORT_Description 383642 |
| | | Delivery 383644 | | | | Delivery 383646 | | | | | | 1..N 383648 | FormWaybillNotificationFreightListDelivery 383650 |

FIG. 38-113

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | DeliveryID 383652 | | | | | 1..N 383654 | BusinessTransactionDocumentID 383656 |
| | | | | GrandTotalWeight 383658 | | | | | 1 383660 | FormMeasure 383662 |
| | | | | | Measure 383664 | | | | 1 383666 | Measure 383668 |
| | | | | | MeasureUnitCodeName 383670 | | | | 0..1 383672 | Name 383674 |
| | | | | GrandTotalVolume 383676 | | | | | 0..1 383678 | FormMeasure 383680 |

FIG. 38-114

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Measure 383682 | | | | 1 383684 | Measure 383686 |
| | | | | | MeasureUnitCodeName 383688 | | | | 0..1 383690 | Name 383692 |
| | | | | DeliveryText 383694 | | | | | 0..1 383696 | Text 383698 |
| | | | | ShipToLocation 383702 | | | | | 0..N 383704 | FormWaybillNotificationFreightListDeliveryShipToLocation 383706 |
| | | | | | LocationID 383708 | | | | 0..1 383710 | LocationID 383712 |

FIG. 38-115

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | LocationAlternativeID 383714 | | | | 0..N 383716 | LocationStandardID 383718 |
| | | | | | PartyID 383720 | | | | 0..1 383722 | PartyID 383724 |
| | | | | | Address 383726 | | | | 0..1 383728 | Address 383730 |
| | | | | | | OrganisationFormOfAddress 383732 | | | 0..1 383734 | FormOfAddress 383736 |
| | | | | | | OrganisationFormattedName 383738 | | | 0..N 383740 | LANGUAGEINDEPENDENT_MEDIUM_Name 383742 |

FIG. 38-116

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | PersonName 383744 | | | 0..1 383746 | PersonName 383748 |
| | | | | | | FunctionalTitleName 383750 | | | 0..1 383752 | LANGUAGEINDEPENDENT_MEDIUM_Name 383754 |
| | | | | | | DepartmentName 383756 | | | 0..1 383758 | LANGUAGEINDEPENDENT_MEDIUM_Name 383760 |
| | | | | | | Office 383764 | | | 0..1 383766 | Office 383768 |
| | | | | | | PhysicalAddress 383772 | | | 0..1 383774 | PhysicalAddress 383776 |
| | | | | | | | CountryCode 383778 | | 0..1 383780 | CountryCode 383782 |

FIG. 38-117

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CountryName 383784 | | 0..1 383786 | MEDIUM_Name 383788 |
| | | | | | | | RegionCode 383790 | | 0..1 383792 | RegionCode 383794 |
| | | | | | | | RegionName 383796 | | 0..1 383798 | LANGUAGEINDEPENDENT_MEDIUM_Name 383800 |
| | | | | | | | StreetPostalCode 383802 | | 0..1 383804 | PostalCode 383806 |
| | | | | | | | POBoxPostalCode 383808 | | 0..1 383810 | PostalCode 383812 |

FIG. 38-118

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CompanyPostalCode 383814 | | 0..1 383816 | PostalCode 383818 |
| | | | | | | | CityName 383820 | | 0..1 383822 | LANGUAGEINDEPENDENT_MEDIUM_Name 383824 |
| | | | | | | | AdditionalCityName 383826 | | 0..1 383828 | LANGUAGEINDEPENDENT_MEDIUM_Name 383830 |
| | | | | | | | DistrictName 383832 | | 0..1 383834 | LANGUAGEINDEPENDENT_MEDIUM_Name 383836 |
| | | | | | | | POBoxID 383838 | | 0..1 383840 | POBoxID 383842 |

FIG. 38-119

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxIndicator 383844 | | 0..1 383846 | Indicator 383848 |
| | | | | | | | POBoxCountryCode 383850 | | 0..1 383852 | CountryCode 383854 |
| | | | | | | | POBoxCountryName 383856 | | 0..1 383858 | MEDIUM_Name 383860 |
| | | | | | | | POBoxRegionCode 383862 | | 0..1 383864 | RegionCode 383866 |
| | | | | | | | POBoxRegionName 383868 | | 0..1 383870 | LANGUAGEINDEPENDENT_MEDIUM_Name 383872 |

FIG. 38-120

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCityName 383874 | | 0..1 383876 | LANGUAGEINDEPENDENT_MEDIUM_Name 383878 |
| | | | | | | | StreetName 383880 | | 0..1 383882 | StreetName 383884 |
| | | | | | | | StreetPrefixName 383886 | | 0..N 383888 | LANGUAGEINDEPENDENT_MEDIUM_Name 383890 |
| | | | | | | | StreetSuffixName 383892 | | 0..N 383894 | LANGUAGEINDEPENDENT_MEDIUM_Name 383896 |
| | | | | | | | HouseID 383898 | | 0..1 383900 | HouseID 383902 |

FIG. 38-121

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | AdditionalHouseID 383904 | | 0..1 383906 | HouseID 383908 |
| | | | | | | | BuildingID 383910 | | 0..1 383912 | BuildingID 383914 |
| | | | | | | | FloorID 383916 | | 0..1 383918 | FloorID 383920 |
| | | | | | | | RoomID 383922 | | 0..1 383924 | RoomID 383926 |
| | | | | | | | CareOfName 383928 | | 0..1 383930 | LANGUAGEINDEPENDENT_MEDIUM_Name 383932 |
| | | | | | | | Description 383934 | | 0..N 383936 | Description 383938 |

FIG. 38-122

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | TaxJurisdictionCode 383940 | | | 0..1 383942 | TaxJurisdictionCode 383944 |
| | | | | | | TimeZoneDifferenceValue 383946 | | | 0..1 383948 | TimeZoneDifferenceValue 383950 |
| | | | | | | GeoCoordinates 383952 | | | 0..1 383954 | GeoCoordinates 383956 |
| | | | | | | Communication 383960 | | | 0..1 383962 | Communication 383964 |
| | | | | | | | CorrespondenceLanguageCode 383966 | | 0..1 383968 | LanguageCode 383970 |

FIG. 38-123

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageName 383972 | | 0..1 383974 | MEDIUM_Name 383976 |
| | | | | | | | Telephone 383978 | | 0..N 383980 | Telephone 383982 |
| | | | | | | | | Number 383984 | 1 383986 | PhoneNumber 383988 |
| | | | | | | | | SMSEnabledIndicator 383990 | 0..1 383992 | Indicator 383994 |
| | | | | | | | | NumberDefaultIndicator 383996 | 1 383998 | Indicator 384000 |

FIG. 38-124

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDescription 384002 | 0..N 384004 | Description 384006 |
| | | | | | | | | NumberUsageDenialIndicator 384008 | 1 384010 | Indicator 384012 |
| | | | | | | | MobilePhone 384014 | | 0..N 384016 | Telephone 384018 |
| | | | | | | | | Number 384020 | 1 384022 | PhoneNumber 384024 |
| | | | | | | | | SMSEnabledIndicator 384026 | 0..1 384028 | Indicator 384030 |

FIG. 38-125

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 384032 | 1 384034 | Indicator 384036 |
| | | | | | | | | NumberDescription 384038 | 0..N 384040 | Description 384042 |
| | | | | | | | | NumberUsageDenialIndicator 384044 | 1 384046 | Indicator 384048 |
| | | | | | | | Facsimile 384050 | | 0..N 384052 | Facsimile 384054 |
| | | | | | | | | Number 384056 | 1 384058 | PhoneNumber 384060 |

FIG. 38-126

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 384062 | 1 384064 | Indicator 384066 |
| | | | | | | | | NumberDescription 384068 | 0..N 384070 | Description 384072 |
| | | | | | | | | NumberUsageDenialIndicator 384074 | 1 384076 | Indicator 384078 |
| | | | | | | | Email 384080 | | 0..N 384082 | Email 384084 |
| | | | | | | | | URI 384086 | 1 384088 | EmailURI 384090 |
| | | | | | | | | URIDefaultIndicator 384092 | 1 384094 | Indicator 384096 |

FIG. 38-127

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 384098 | 0..N 384100 | Description 384102 |
| | | | | | | | | URIUsageDenialIndicator 384104 | 1 384106 | Indicator 384108 |
| | | | | | | | Web 384110 | | 0..N 384112 | Web 384114 |
| | | | | | | | | URI 384116 | 1 384118 | WebURI 384120 |
| | | | | | | | | URIDefaultIndicator 384122 | 1 384124 | Indicator 384126 |
| | | | | | | | | URIDescription 384128 | 0..N 384130 | Description 384132 |

FIG. 38-128

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | Item 384134 | | | | | | Logistics Package 384136 | | | | | 0..N 384138 | FormWaybillNotificationFreightListDeliveryLogisticsPackage 384140 |
| | | | | | | | | | | LogisticUnitID 384142 | | | | 0..1 384144 | LogisticUnitID 384146 |
| | | | | | | | | | | LogisticUnitDescription 384148 | | | | 0..1 384150 | SHORT_Description 384152 |
| | | | | | | | | | | LogisticPackgeQuantity 384154 | | | | 0..1 384156 | Quantity 384158 |
| | | | | | | | | | | PackageTypeCode 384160 | | | | 0..1 384162 | PackageTypeCode 384164 |

FIG. 38-129

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PackageTypeDescription 384166 | | | | 0..1 384168 | SHORT_Description 384170 |
| | | | | | GrossWeightMeasure 384172 | | | | 0..1 384174 | FormMeasure 384176 |
| | | | | | | Measure 384178 | | | 1 384180 | Measure 384182 |
| | | | | | | MeasureUnitCodeName 384184 | | | 0..1 384186 | Name 384188 |
| | | | | | GrossVolumeMeasure 384190 | | | | 0..1 384192 | FormMeasure 384194 |

FIG. 38-130

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Measure<br>384196 | | | 1<br>384198 | Measure<br>384200 |
| | | | | | | Measure UnitCode Name<br>384202 | | | 0..1<br>384204 | Name<br>384206 |
| | | | | | OuterPackageIndicator<br>384208 | | | | 0..1<br>384210 | Indicator<br>384212 |
| | | | | | Content Reported Indicator<br>384214 | | | | 0..1<br>384216 | Indicator<br>384218 |

FIG. 38-131

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | DeliveryItem 384220 | | | | | | PackedItem 384222 | | | | 0..N 384224 | FormWaybillNotificationFreightListDeliveryLogisticsPackagePackedItem 384226 |
| | | | | | | | | | | | DeliveryItemID 384228 | | | 1 384230 | BusinessTransactionDocumentItemID 384232 |
| | | | | | | | | | | | ProductID 384234 | | | 0..1 384236 | ProductID 384238 |
| | | | | | | | | | | | ProductDescription 384240 | | | 0..1 384242 | SHORT_Description 384244 |
| | | | | | | | | | | | ProductQuantity 384246 | | | 0..1 384248 | Quantity 384250 |

FIG. 38-132

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | ProductQuantityTypeCode 384252 | | | 0..1 384254 | QuantityTypeCode 384256 |
| | | | | | | GrossWeightMeasure 384258 | | | 0..1 384260 | FormMeasure 384262 |
| | | | | | | | Measure 384264 | | 1 384266 | Measure 384268 |
| | | | | | | | MeasureUnitCodeName 384270 | | 0..1 384272 | Name 384274 |
| | | | | | | GrossVolumeMeasure 384276 | | | 0..1 384278 | FormMeasure 384280 |

FIG. 38-133

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Measure 384282 | | 1 384284 | Measure 384286 |
| | | | | | | | MeasureUnitCodeName 384288 | | 0..1 384290 | Name 384292 |
| | | | | | | DeliveryItemText 384294 | | | 0..N 384296 | Text 384298 |
| | | | | | LogisticsPackageDetail 384302 | | | | 1..N 384304 | FormWaybillNotificationFreightListDeliveryLogisticsPackageLogisticsPackageDetail 384306 |
| | | | | | | LogisticUnitID 384308 | | | 0..1 384310 | LogisticUnitID 384312 |

FIG. 38-134

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | LogisticUnitDescription 384314 | | | 0..1 384316 | SHORT_Description 384318 |
| | | | | | | LogisticPackgeQuantity 384320 | | | 0..1 384322 | Quantity 384324 |
| | | | | | | PackageTypeCode 384326 | | | 0..1 384328 | PackageTypeCode 384330 |
| | | | | | | PackageTypeDescription 384332 | | | 0..1 384334 | SHORT_Description 384336 |
| | | | | | | GrossWeightMeasure 384338 | | | 0..1 384340 | FormMeasure 384342 |

FIG. 38-135

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Measure 384344 | | 1 384346 | Measure 384348 |
| | | | | | | | MeasureUnitCodeName 384350 | | 0..1 384352 | Name 384354 |
| | | | | | | GrossVolumeMeasure 384356 | | | 0..1 384358 | FormMeasure 384360 |
| | | | | | | | Measure 384362 | | 1 384364 | Measure 384366 |
| | | | | | | | MeasureUnitCodeName 384368 | | 0..1 384370 | Name 384372 |

FIG. 38-136

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | PackedItemDetail 384376 | | | 0..N 384378 | FormWbillNotifFrtListDelivLogisticsPackageLogisticsPackageDetailPackedItemDetail 384380 |
| | | | | | | | DeliveryItemID 384382 | | 0..1 384384 | BusinessTransactionDocumentItemID 384386 |
| | | | | | | | ProductID 384388 | | 0..1 384390 | ProductID 384392 |
| | | | | | | | ProductDescription 384394 | | 0..1 384396 | SHORT_Description 384398 |
| | | | | | | | IdentifiedStockID 384400 | | 0..1 384402 | IdentifiedStockID 384404 |

FIG. 38-137

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | IdentifiedStockDescription 384406 | | 0..1 384408 | SHORT_Description 384410 |
| | | | | | | | ProductQuantity 384412 | | 0..1 384414 | Quantity 384416 |
| | | | | | | | ProductQuantityTypeCode 384418 | | 0..1 384420 | QuantityTypeCode 384422 |
| | | | | | | | GrossWeightMeasure 384424 | | 0..1 384426 | FormMeasure 384428 |
| | | | | | | | | Measure 384430 | 1 384432 | Measure 384434 |

FIG. 38-138

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | MeasureUnitCodeName 384436 | 0..1 384438 | Name 384440 |
| | | | | | | | GrossVolumeMeasure 384442 | | 0..1 384444 | FormMeasure 384446 |
| | | | | | | | | Measure 384448 | 1 384450 | Measure 384452 |
| | | | | | | | | MeasureUnitCodeName 384454 | 0..1 384456 | Name 384458 |

FIG. 38-139

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Identification 384462 | | | 0..N 384464 | FormWbillNotifFrtListDeliveryLogisticsPackageLogisticsPackageDetailIdentification 384466 |
| | | | | | | | GoodsTagID 384468 | | 0..1 384470 | GoodsTagID 384472 |
| | | | | Item 384476 | | | | | 0..N 384478 | FormWaybillNotificationFreightListDeliveryItem 384480 |
| | | | | | DeliveryItemID 384482 | | | | 1 384484 | BusinessTransactionDocumentItemID 384486 |
| | | | | | ProductID 384488 | | | | 0..1 384490 | ProductID 384492 |

FIG. 38-140

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | ProductDescription 384494 | | | | 0..1 384496 | SHORT_Description 384498 |
| | | | | | Product Quantity 384500 | | | | 0..1 384502 | Quantity 384504 |
| | | | | | Product Quantity TypeCode 384506 | | | | 0..1 384508 | QuantityTypeCode 384510 |
| | | | | | DeliveryItemText 384512 | | | | 0..N 384514 | Text 384516 |
| | | | | | UnpackedIndicator 384518 | | | | 0..1 384520 | Indicator 384522 |

FIG. 38-141

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GrossWeightMeasure 384524 | | | | 0..1 384526 | FormMeasure 384528 |
| | | | | | | Measure 384530 | | | 1 384532 | Measure 384534 |
| | | | | | | MeasureUnitCodeName 384536 | | | 0..1 384538 | Name 384540 |
| | | | | | GrossVolumeMeasure 384542 | | | | 0..1 384544 | FormMeasure 384546 |
| | | | | | | Measure 384548 | | | 1 384550 | Measure 384552 |

FIG. 38-142

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MeasureUnitCodeName 384554 | | | 0..1 384556 | Name 384558 |
| | | | | | ItemDetail 384562 | | | | 1..N 384564 | FormWaybillNotificationFreightListDeliveryItemItemDetail 384566 |
| | | | | | | DeliveryItemID 384568 | | | 1 384570 | BusinessTransactionDocumentItemID 384572 |
| | | | | | | ProductID 384574 | | | 0..1 384576 | ProductID 384578 |
| | | | | | | ProductDescription 384580 | | | 0..1 384582 | SHORT_Description 384584 |

FIG. 38-143

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | IdentifiedStockID <u>384586</u> | | | 0..1 <u>384588</u> | IdentifiedStockID <u>384590</u> |
| | | | | | | IdentifiedStockDescription <u>384592</u> | | | 0..1 <u>384594</u> | SHORT_Description <u>384596</u> |
| | | | | | | ProductQuantity <u>384598</u> | | | 0..1 <u>384600</u> | Quantity <u>384602</u> |
| | | | | | | ProductQuantityTypeCode <u>384604</u> | | | 0..1 <u>384606</u> | QuantityTypeCode <u>384608</u> |
| | | | | | | GrossWeightMeasure <u>384610</u> | | | 0..1 <u>384612</u> | FormMeasure <u>384614</u> |

FIG. 38-144

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Measure 384616 | | 1 384618 | Measure 384620 |
| | | | | | | | MeasureUnitCodeName 384622 | | 0..1 384624 | Name 384626 |
| | | | | | | GrossVolumeMeasure 384628 | | | 0..1 384630 | FormMeasure 384632 |
| | | | | | | | Measure 384634 | | 1 384636 | Measure 384638 |
| | | | | | | | MeasureUnitCodeName 384640 | | 0..1 384642 | Name 384644 |

FIG. 38-145

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Identification 384648 | | | 1..N 384650 | FormWaybillNotificationFreightListDeliveryItemItemDetailIdentification 384652 |
| | | | | | | | | | | | GoodsTagID 384654 | | 0..1 384656 | GoodsTagID 384658 |
| | | | ItemReference 384660 | | | | | ItemReference 384662 | | | | | 0..N 384664 | FormWaybillNotificationFreightListDeliveryItemReference 384666 |
| | | | | | | | | | OriginPurchaseOrderReferenceID 384668 | | | | 0..1 384670 | BusinessTransactionDocumentID 384672 |

FIG. 38-146

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PackagesQuantity 384674 | | | | 0..1 384676 | Quantity 384678 |
| | | | | | TotalWeight 384680 | | | | 0..1 384682 | FormMeasure 384684 |
| | | | | | | Measure 384686 | | | 1 384688 | Measure 384690 |
| | | | | | | MeasureUnitCodeName 384692 | | | 0..1 384694 | Name 384696 |
| | | | | | TotalVolume 384698 | | | | 0..1 384700 | FormMeasure 384702 |
| | | | | | | Measure 384704 | | | 1 384706 | Measure 384708 |

FIG. 38-147

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | MeasureUnitCodeName<br><br>384710 | | | 0..1<br><br>384712 | Name<br><br>384714 |
| | | FormFreightListPredefinedExtension<br><br>384716 | | | | | FormFreightListPredefinedExtension<br><br>384718 | | | | | | 0..1<br><br>384720 | FormFreightListPredefinedExtension<br><br>384722 |

FIG. 39-1

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| Waybill Notification 390000 | | | Waybill Notification 390002 | | | | | | | | | WaybillNotification Message 390004 |
| | MessageHeader 390006 | | | MessageHeader 390008 | | | | | | | 1 390010 | BusinessDocumentMessageHeader 390012 |
| | | | | | ID 390014 | | | | | | 0..1 390016 | BusinessDocumentMessageID 390018 |
| | | | | | UUID 390020 | | | | | | 0..1 390022 | UUID 390024 |
| | | | | | ReferenceID 390026 | | | | | | 0..1 390028 | BusinessDocumentMessageID 390030 |
| | | | | | ReferenceUUID 390032 | | | | | | 0..1 390034 | UUID 390036 |

FIG. 39-2

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | CreationDateTime 390038 | | | | | | 1 390040 | GLOBAL_DateTime 390042 |
| | | | | | TestDataIndicator 390044 | | | | | | 0..1 390046 | Indicator 390048 |
| | | | | | ReconciliationIndicator 390050 | | | | | | 0..1 390052 | Indicator 390054 |
| | | | | | SenderBusinessSystemID 390056 | | | | | | 0..1 390058 | BusinessSystemID 390060 |
| | | | | | RecipientBusinessSystemID 390062 | | | | | | 0..1 390064 | BusinessSystemID 390066 |

FIG. 39-3

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | Party 390068 | | | | SenderParty 390070 | | | | | | 0..1 390072 | BusinessDocumentMessageHeaderParty 390074 |
| | | | | | | | InternalID 390076 | | | | | 0..1 390078 | PartyInternalID 390080 |
| | | | | | | | StandardID 390082 | | | | | 0..N 390084 | PartyStandardID 390086 |
| | | | | | | | ContactPerson 390088 | | | | | 0..1 390090 | BusinessDocumentMessageHeaderPartyContactPerson 390092 |
| | | | | | | | | InternalID 390094 | | | | 0..1 390096 | ContactPersonInternalID 390098 |

FIG. 39-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 390100 | | | | 0..N 390102 | LANGUAGEINDEPENDENT_MEDIUM_Name 390104 |
| | | | | | PersonFormattedName 390106 | | | | 0..N 390108 | LANGUAGEINDEPENDENT_LONG_Name 390110 |
| | | | | | PhoneNumber 390112 | | | | 0..N 390114 | PhoneNumber 390116 |
| | | | | | FaxNumber 390118 | | | | 0..N 390120 | PhoneNumber 390122 |
| | | | | | EmailURI 390124 | | | | 0..N 390126 | EmailURI 390128 |

FIG. 39-5

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | Recipient Party 390132 | | | | | | 0..N 390134 | BusinessDocumentMessageHeaderParty 390136 |
| | | | | | | | InternalID 390138 | | | | | 0..1 390140 | PartyInternalID 390142 |
| | | | | | | | StandardID 390144 | | | | | 0..N 390146 | PartyStandardID 390148 |
| | | | | | | | ContactPerson 390150 | | | | | 0..1 390152 | BusinessDocumentMessageHeaderPartyContactPerson 390154 |
| | | | | | | | | InternalID 390156 | | | | 0..1 390158 | ContactPersonInternalID 390160 |

FIG. 39-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 390162 | | | | 0..N 390164 | LANGUAGEINDEPENDENT_MEDIUM_Name 390166 |
| | | | | | PersonFormattedName 390168 | | | | 0..N 390170 | LANGUAGEINDEPENDENT_LONG_Name 390172 |
| | | | | | PhoneNumber 390174 | | | | 0..N 390176 | PhoneNumber 390178 |
| | | | | | FaxNumber 390180 | | | | 0..N 390182 | PhoneNumber 390184 |
| | | | | | EmailURI 390186 | | | | 0..N 390188 | EmailURI 390190 |

FIG. 39-7

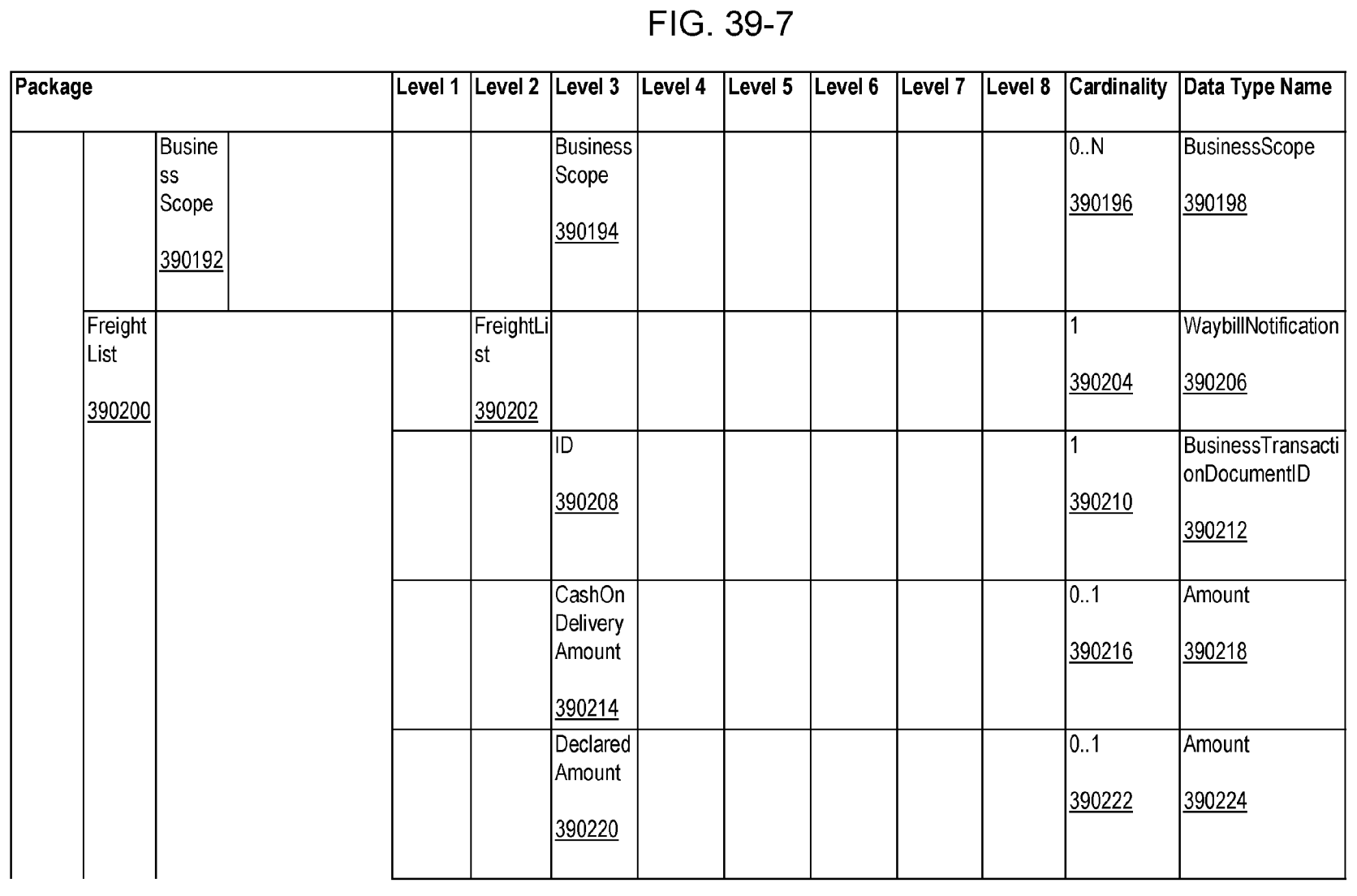

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | Business Scope 390192 | | | | Business Scope 390194 | | | | | | 0..N 390196 | BusinessScope 390198 |
| | Freight List 390200 | | | | FreightList 390202 | | | | | | | 1 390204 | WaybillNotification 390206 |
| | | | | | | ID 390208 | | | | | | 1 390210 | BusinessTransactionDocumentID 390212 |
| | | | | | | CashOn Delivery Amount 390214 | | | | | | 0..1 390216 | Amount 390218 |
| | | | | | | Declared Amount 390220 | | | | | | 0..1 390222 | Amount 390224 |

FIG. 39-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | FreightChargesPrepaidIndicator 390226 | | | | | | 0..1 390228 | Indicator 390230 |
| | | | CashOnDeliveryFeePrepaidIndicator 390232 | | | | | | 0..1 390234 | Indicator 390236 |
| | | | CustomerCheckAllowedIndicator 390238 | | | | | | 0..1 390240 | Indicator 390242 |
| | | | ThirdPartyInitiatedActionIndicator 390244 | | | | | | 0..1 390246 | Indicator 390248 |

FIG. 39-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | FreightLoaderPartyRoleCategoryCode 390250 | | | | | | 0..1 390252 | PartyRoleCategoryCode 390254 |
| | | | LoadedByDescription 390256 | | | | | | 0..1 390258 | SHORT_Description 390260 |
| | | | FreightCountingCode 390262 | | | | | | 0..1 390264 | FreightCountingCode 390266 |
| | | | CountedByDescription 390268 | | | | | | 0..1 390270 | SHORT_Description 390272 |
| | | | Incoterms 390274 | | | | | | 0..1 390276 | Incoterms 390278 |

FIG. 39-10

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SealIDs 390280 | | | | | | 0..1 390282 | LANGUAGEINDEPENDENT_LONG_Description 390284 |
| | | | TruckID 390286 | | | | | | 0..1 390288 | TransportMeansID 390290 |
| | | | TrailerID 390292 | | | | | | 0..1 390294 | TransportMeansID 390296 |
| | | | TransportModeCode 390298 | | | | | | 0..1 390300 | TransportModeCode 390302 |
| | | | TransportModeName 390304 | | | | | | 0..1 390306 | LONG_Name 390308 |

FIG. 39-11

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | TotalGrossWeightMeasure 390310 | | | | | | 0..1 390312 | Measure 390314 |
| | | | TotalGrossVolumeMeasure 390316 | | | | | | 0..1 390318 | Measure 390320 |
| | | | ShippingDateTime 390322 | | | | | | 0..1 390324 | LOCALNORMALISED_DateTime 390326 |
| | | | CreationDateTime 390328 | | | | | | 0..1 390330 | LOCALNORMALISED_DateTime 390332 |
| | | | PrintDateTime 390334 | | | | | | 0..1 390336 | LOCALNORMALISED_DateTime 390338 |

FIG. 39-12

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ShippersInstructionText 390340 | | | | | | 0..N 390342 | Text 390344 |
| | | | SpecialAgreementsText 390346 | | | | | | 0..N 390348 | Text 390350 |
| | | | MaterialContentDescriptionText 390352 | | | | | | 0..N 390354 | Text 390356 |
| | | | InternalText 390358 | | | | | | 0..N 390360 | Text 390362 |
| | | | ShipFromLocation 390366 | | | | | | 0..1 390368 | WaybillNotificationShipFromLocation 390370 |

FIG. 39-13

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | LocationID 390372 | | | | | 0..1 390374 | LocationID 390376 |
| | | | | LocationAlternativeID 390378 | | | | | 0..N 390380 | LocationStandardID 390382 |
| | | | | PartyID 390384 | | | | | 0..1 390386 | PartyID 390388 |
| | | | | Address 390390 | | | | | 0..1 390392 | Address 390394 |
| | | | | | OrganisationFormOfAddress 390396 | | | | 0..1 390398 | FormOfAddress 390400 |

FIG. 39-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 390402 | | | | 0..N 390404 | LANGUAGEINDEPENDENT_MEDIUM_Name 390406 |
| | | | | | PersonName 390408 | | | | 0..1 390410 | PersonName 390412 |
| | | | | | FunctionalTitleName 390414 | | | | 0..1 390416 | LANGUAGEINDEPENDENT_MEDIUM_Name 390418 |
| | | | | | DepartmentName 390420 | | | | 0..1 390422 | LANGUAGEINDEPENDENT_MEDIUM_Name 390424 |
| | | | | | Office 390428 | | | | 0..1 390430 | Office 390432 |

FIG. 39-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Physical Address 390436 | | | | 0..1 390438 | PhysicalAddress 390440 |
| | | | | | | CountryCode 390442 | | | 0..1 390444 | CountryCode 390446 |
| | | | | | | CountryName 390448 | | | 0..1 390450 | MEDIUM_Name 390452 |
| | | | | | | RegionCode 390454 | | | 0..1 390456 | RegionCode 390458 |
| | | | | | | RegionName 390460 | | | 0..1 390462 | LANGUAGEINDEPENDENT_MEDIUM_Name 390464 |
| | | | | | | StreetPostalCode 390466 | | | 0..1 390468 | PostalCode 390470 |

FIG. 39-16

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 390472 | | | 0..1 390474 | PostalCode 390476 |
| | | | | | | CompanyPostalCode 390478 | | | 0..1 390480 | PostalCode 390482 |
| | | | | | | CityName 390484 | | | 0..1 390486 | LANGUAGEINDEPENDENT_MEDIUM_Name 390488 |
| | | | | | | AdditionalCityName 390490 | | | 0..1 390492 | LANGUAGEINDEPENDENT_MEDIUM_Name 390494 |
| | | | | | | DistrictName 390496 | | | 0..1 390498 | LANGUAGEINDEPENDENT_MEDIUM_Name 390500 |

FIG. 39-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 390502 | | | 0..1 390504 | POBoxID 390506 |
| | | | | | | POBoxIndicator 390508 | | | 0..1 390510 | Indicator 390512 |
| | | | | | | POBoxCountryCode 390514 | | | 0..1 390516 | CountryCode 390518 |
| | | | | | | POBoxCountryName 390520 | | | 0..1 390522 | MEDIUM_Name 390524 |
| | | | | | | POBoxRegionCode 390526 | | | 0..1 390528 | RegionCode 390530 |

FIG. 39-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 390532 | | | 0..1 390534 | LANGUAGEINDEPENDENT_MEDIUM_Name 390536 |
| | | | | | | POBoxCityName 390538 | | | 0..1 390540 | LANGUAGEINDEPENDENT_MEDIUM_Name 390542 |
| | | | | | | StreetName 390544 | | | 0..1 390546 | StreetName 390548 |
| | | | | | | StreetPrefixName 390550 | | | 0..N 390552 | LANGUAGEINDEPENDENT_MEDIUM_Name 390554 |
| | | | | | | StreetSuffixName 390556 | | | 0..N 390558 | LANGUAGEINDEPENDENT_MEDIUM_Name 390560 |

FIG. 39-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 390562 | | | 0..1 390564 | HouseID 390566 |
| | | | | | | AdditionalHouseID 390568 | | | 0..1 390570 | HouseID 390572 |
| | | | | | | BuildingID 390574 | | | 0..1 390576 | BuildingID 390578 |
| | | | | | | FloorID 390580 | | | 0..1 390582 | FloorID 390584 |
| | | | | | | RoomID 390586 | | | 0..1 390588 | RoomID 390590 |
| | | | | | | CareOfName 390592 | | | 0..1 390594 | LANGUAGEINDEPENDENT_MEDIUM_Name 390596 |

FIG. 39-20

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 390598 | | | 0..N 390600 | Description 390602 |
| | | | | | TaxJurisdictionCode 390604 | | | | 0..1 390606 | TaxJurisdictionCode 390608 |
| | | | | | TimeZoneDifferenceValue 390610 | | | | 0..1 390612 | TimeZoneDifferenceValue 390614 |
| | | | | | GeoCoordinates 390616 | | | | 0..1 390618 | GeoCoordinates 390620 |
| | | | | | Communication 390624 | | | | 0..1 390626 | Communication 390628 |

FIG. 39-21

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | CorrespondenceLanguageCode 390630 | | | 0..1 390632 | LanguageCode 390634 |
| | | | | | | | | CorrespondenceLanguageName 390636 | | | 0..1 390638 | MEDIUM_Name 390640 |
| | | | | | | | | Telephone 390642 | | | 0..N 390644 | Telephone 390646 |
| | | | | | | | | | Number 390648 | | 1 390650 | PhoneNumber 390652 |
| | | | | | | | | | SMSEnabledIndicator 390654 | | 0..1 390656 | Indicator 390658 |

FIG. 39-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 390660 | | 1 390662 | Indicator 390664 |
| | | | | | | | NumberDescription 390666 | | 0..N 390668 | Description 390670 |
| | | | | | | | NumberUsageDenialIndicator 390672 | | 1 390674 | Indicator 390676 |
| | | | | | | MobilePhone 390678 | | | 0..N 390680 | Telephone 390682 |
| | | | | | | | Number 390684 | | 1 390686 | PhoneNumber 390688 |

FIG. 39-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 390690 | | 0..1 390692 | Indicator 390694 |
| | | | | | | | NumberDefaultIndicator 390696 | | 1 390698 | Indicator 390700 |
| | | | | | | | NumberDescription 390702 | | 0..N 390704 | Description 390706 |
| | | | | | | | NumberUsageDenialIndicator 390708 | | 1 390710 | Indicator 390712 |
| | | | | | | Facsimile 390714 | | | 0..N 390716 | Facsimile 390718 |

FIG. 39-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 390720 | | 1 390722 | PhoneNumber 390724 |
| | | | | | | | NumberDefaultIndicator 390726 | | 1 390728 | Indicator 390730 |
| | | | | | | | NumberDescription 390732 | | 0..N 390734 | Description 390736 |
| | | | | | | | NumberUsageDenialIndicator 390738 | | 1 390740 | Indicator 390742 |
| | | | | | | Email 390744 | | | 0..N 390746 | Email 390748 |
| | | | | | | | URI 390750 | | 1 390752 | EmailURI 390754 |

FIG. 39-25

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 390756 | | 1 390758 | Indicator 390760 |
| | | | | | | | URIDescription 390762 | | 0..N 390764 | Description 390766 |
| | | | | | | | URIUsageDenialIndicator 390768 | | 1 390770 | Indicator 390772 |
| | | | | | | Web 390774 | | | 0..N 390776 | Web 390778 |
| | | | | | | | URI 390780 | | 1 390782 | WebURI 390784 |
| | | | | | | | URIDefaultIndicator 390786 | | 1 390788 | Indicator 390790 |

FIG. 39-26

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 390792 | | 0..N 390794 | Description 390796 |
| | | | ShipToLocation 390800 | | | | | | 0..1 390802 | WaybillNotificationShipToLocation 390804 |
| | | | | LocationID 390806 | | | | | 0..1 390808 | LocationID 390810 |
| | | | | LocationAlternativeID 390812 | | | | | 0..N 390814 | LocationStandardID 390816 |
| | | | | PartyID 390818 | | | | | 0..1 390820 | PartyID 390822 |
| | | | | Address 390824 | | | | | 0..1 390826 | Address 390828 |

FIG. 39-27

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 390830 | | | | 0..1 390832 | FormOfAddress 390834 |
| | | | | | OrganisationFormattedName 390836 | | | | 0..N 390838 | LANGUAGEINDEPENDENT_MEDIUM_Name 390840 |
| | | | | | PersonName 390842 | | | | 0..1 390844 | PersonName 390846 |
| | | | | | FunctionalTitleName 390848 | | | | 0..1 390850 | LANGUAGEINDEPENDENT_MEDIUM_Name 390852 |
| | | | | | DepartmentName 390854 | | | | 0..1 390856 | LANGUAGEINDEPENDENT_MEDIUM_Name 390858 |

FIG. 39-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Office 390862 | | | | 0..1 390864 | Office 390866 |
| | | | | | Physical Address 390870 | | | | 0..1 390872 | PhysicalAddress 390874 |
| | | | | | | CountryCode 390876 | | | 0..1 390878 | CountryCode 390880 |
| | | | | | | CountryName 390882 | | | 0..1 390884 | MEDIUM_Name 390886 |
| | | | | | | RegionCode 390888 | | | 0..1 390890 | RegionCode 390892 |
| | | | | | | RegionName 390894 | | | 0..1 390896 | LANGUAGEINDEPENDENT_MEDIUM_Name 390898 |

FIG. 39-29

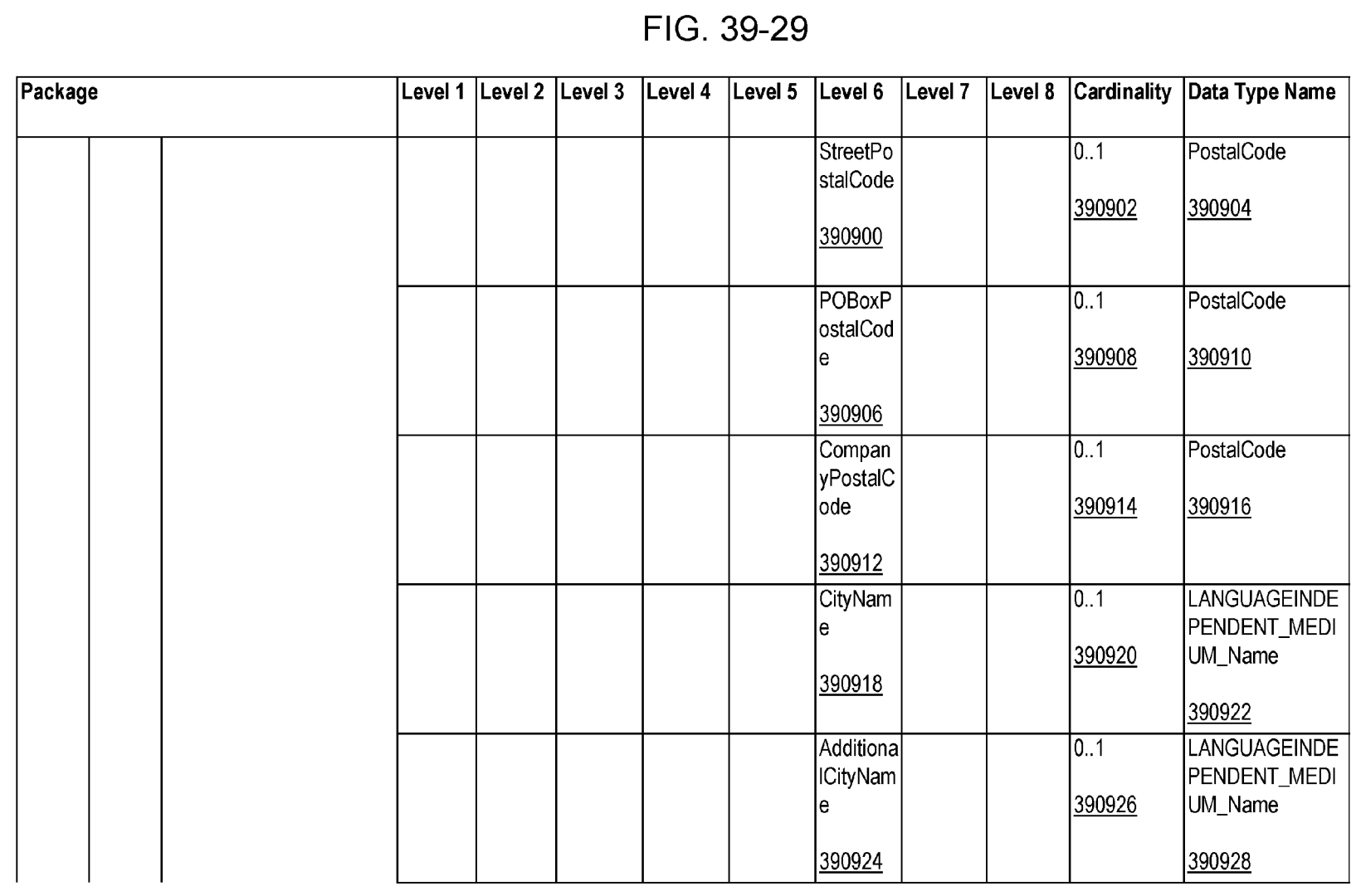

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPostalCode 390900 | | | 0..1 390902 | PostalCode 390904 |
| | | | | | | POBoxPostalCode 390906 | | | 0..1 390908 | PostalCode 390910 |
| | | | | | | CompanyPostalCode 390912 | | | 0..1 390914 | PostalCode 390916 |
| | | | | | | CityName 390918 | | | 0..1 390920 | LANGUAGEINDEPENDENT_MEDIUM_Name 390922 |
| | | | | | | AdditionalCityName 390924 | | | 0..1 390926 | LANGUAGEINDEPENDENT_MEDIUM_Name 390928 |

FIG. 39-30

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | DistrictName 390930 | | | 0..1 390932 | LANGUAGEINDEPENDENT_MEDIUM_Name 390934 |
| | | | | | | POBoxID 390936 | | | 0..1 390938 | POBoxID 390940 |
| | | | | | | POBoxIndicator 390942 | | | 0..1 390944 | Indicator 390946 |
| | | | | | | POBoxCountryCode 390948 | | | 0..1 390950 | CountryCode 390952 |
| | | | | | | POBoxCountryName 390954 | | | 0..1 390956 | MEDIUM_Name 390958 |

FIG. 39-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionCode 390960 | | | 0..1 390962 | RegionCode 390964 |
| | | | | | | POBoxRegionName 390966 | | | 0..1 390968 | LANGUAGEINDEPENDENT_MEDIUM_Name 390970 |
| | | | | | | POBoxCityName 390972 | | | 0..1 390974 | LANGUAGEINDEPENDENT_MEDIUM_Name 390976 |
| | | | | | | StreetName 390978 | | | 0..1 390980 | StreetName 390982 |
| | | | | | | StreetPrefixName 390984 | | | 0..N 390986 | LANGUAGEINDEPENDENT_MEDIUM_Name 390988 |

FIG. 39-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 390990 | | | 0..N 390992 | LANGUAGEINDEPENDENT_MEDIUM_Name 390994 |
| | | | | | | HouseID 390996 | | | 0..1 390998 | HouseID 391000 |
| | | | | | | AdditionalHouseID 391002 | | | 0..1 391004 | HouseID 391006 |
| | | | | | | BuildingID 391008 | | | 0..1 391010 | BuildingID 391012 |
| | | | | | | FloorID 391014 | | | 0..1 391016 | FloorID 391018 |
| | | | | | | RoomID 391020 | | | 0..1 391022 | RoomID 391024 |

FIG. 39-33

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | CareOfName 391026 | | | 0..1 391028 | LANGUAGEINDEPENDENT_MEDIUM_Name 391030 |
| | | | | | | | | Description 391032 | | | 0..N 391034 | Description 391036 |
| | | | | | | | TaxJurisdictionCode 391038 | | | | 0..1 391040 | TaxJurisdictionCode 391042 |
| | | | | | | | TimeZoneDifferenceValue 391044 | | | | 0..1 391046 | TimeZoneDifferenceValue 391048 |
| | | | | | | | GeoCoordinates 391050 | | | | 0..1 391052 | GeoCoordinates 391054 |

FIG. 39-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Communication 391058 | | | | 0..1 391060 | Communication 391062 |
| | | | | | | CorrespondenceLanguageCode 391064 | | | 0..1 391066 | LanguageCode 391068 |
| | | | | | | CorrespondenceLanguageName 391070 | | | 0..1 391072 | MEDIUM_Name 391074 |
| | | | | | | Telephone 391076 | | | 0..N 391078 | Telephone 391080 |
| | | | | | | | Number 391082 | | 1 391084 | PhoneNumber 391086 |

FIG. 39-35

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 391088 | | 0..1 391090 | Indicator 391092 |
| | | | | | | | Number DefaultIndicator 391094 | | 1 391096 | Indicator 391098 |
| | | | | | | | Number Description 391100 | | 0..N 391102 | Description 391104 |
| | | | | | | | Number UsageDenialIndicator 391106 | | 1 391108 | Indicator 391110 |
| | | | | | | MobilePhone 391112 | | | 0..N 391114 | Telephone 391116 |

FIG. 39-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number<br>391118 | | 1<br>391120 | PhoneNumber<br>391122 |
| | | | | | | | SMSEnabledIndicator<br>391124 | | 0..1<br>391126 | Indicator<br>391128 |
| | | | | | | | NumberDefaultIndicator<br>391130 | | 1<br>391132 | Indicator<br>391134 |
| | | | | | | | NumberDescription<br>391136 | | 0..N<br>391138 | Description<br>391140 |
| | | | | | | | NumberUsageDenialIndicator<br>391142 | | 1<br>391144 | Indicator<br>391146 |

FIG. 39-37

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 391148 | | | 0..N 391150 | Facsimile 391152 |
| | | | | | | | Number 391154 | | 1 391156 | PhoneNumber 391158 |
| | | | | | | | NumberDefaultIndicator 391160 | | 1 391162 | Indicator 391164 |
| | | | | | | | NumberDescription 391166 | | 0..N 391168 | Description 391170 |
| | | | | | | | NumberUsageDenialIndicator 391172 | | 1 391174 | Indicator 391176 |
| | | | | | | Email 391178 | | | 0..N 391180 | Email 391182 |

FIG. 39-38

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URI 391184 | | 1 391186 | EmailURI 391188 |
| | | | | | | | URIDefaultIndicator 391190 | | 1 391192 | Indicator 391194 |
| | | | | | | | URIDescription 391196 | | 0..N 391198 | Description 391200 |
| | | | | | | | URIUsageDenialIndicator 391202 | | 1 391204 | Indicator 391206 |
| | | | | | | Web 391208 | | | 0..N 391210 | Web 391212 |
| | | | | | | | URI 391214 | | 1 391216 | WebURI 391218 |

FIG. 39-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 391220 | | 1 391222 | Indicator 391224 |
| | | | | | | | URIDescription 391226 | | 0..N 391228 | Description 391230 |
| | | | BillToParty 391234 | | | | | | 0..1 391236 | WaybillNotification BillToParty 391238 |
| | | | | PartyID 391240 | | | | | 0..1 391242 | PartyID 391244 |
| | | | | Address 391246 | | | | | 0..1 391248 | Address 391250 |
| | | | | | OrganisationFormOfAddress 391252 | | | | 0..1 391254 | FormOfAddress 391256 |

FIG. 39-40

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 391258 | | | | 0..N 391260 | LANGUAGEINDEPENDENT_MEDIUM_Name 391262 |
| | | | | | PersonName 391264 | | | | 0..1 391266 | PersonName 391268 |
| | | | | | FunctionalTitleName 391270 | | | | 0..1 391272 | LANGUAGEINDEPENDENT_MEDIUM_Name 391274 |
| | | | | | DepartmentName 391276 | | | | 0..1 391278 | LANGUAGEINDEPENDENT_MEDIUM_Name 391280 |
| | | | | | Office 391284 | | | | 0..1 391286 | Office 391288 |

FIG. 39-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Physical Address 391292 | | | | 0..1 391294 | PhysicalAddress 391296 |
| | | | | | | CountryCode 391298 | | | 0..1 391300 | CountryCode 391302 |
| | | | | | | CountryName 391304 | | | 0..1 391306 | MEDIUM_Name 391308 |
| | | | | | | RegionCode 391310 | | | 0..1 391312 | RegionCode 391314 |
| | | | | | | RegionName 391316 | | | 0..1 391318 | LANGUAGEINDEPENDENT_MEDIUM_Name 391320 |
| | | | | | | StreetPostalCode 391322 | | | 0..1 391324 | PostalCode 391326 |

FIG. 39-42

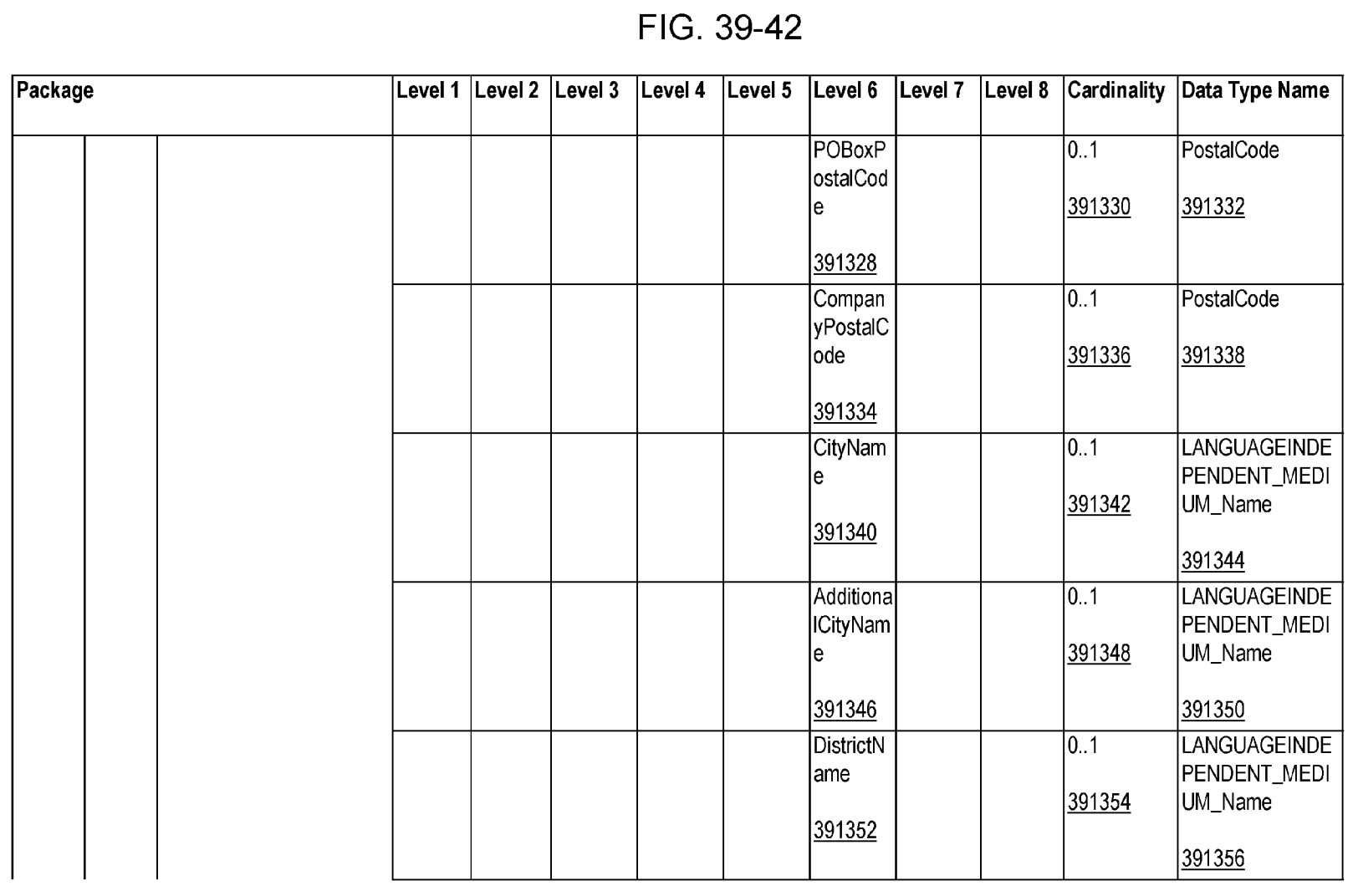

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 391328 | | | 0..1 391330 | PostalCode 391332 |
| | | | | | | CompanyPostalCode 391334 | | | 0..1 391336 | PostalCode 391338 |
| | | | | | | CityName 391340 | | | 0..1 391342 | LANGUAGEINDEPENDENT_MEDIUM_Name 391344 |
| | | | | | | AdditionalCityName 391346 | | | 0..1 391348 | LANGUAGEINDEPENDENT_MEDIUM_Name 391350 |
| | | | | | | DistrictName 391352 | | | 0..1 391354 | LANGUAGEINDEPENDENT_MEDIUM_Name 391356 |

FIG. 39-43

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 391358 | | | 0..1 391360 | POBoxID 391362 |
| | | | | | | POBoxIndicator 391364 | | | 0..1 391366 | Indicator 391368 |
| | | | | | | POBoxCountryCode 391370 | | | 0..1 391372 | CountryCode 391374 |
| | | | | | | POBoxCountryName 391376 | | | 0..1 391378 | MEDIUM_Name 391380 |
| | | | | | | POBoxRegionCode 391382 | | | 0..1 391384 | RegionCode 391386 |

FIG. 39-44

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 391388 | | | 0..1 391390 | LANGUAGEINDEPENDENT_MEDIUM_Name 391392 |
| | | | | | | POBoxCityName 391394 | | | 0..1 391396 | LANGUAGEINDEPENDENT_MEDIUM_Name 391398 |
| | | | | | | StreetName 391400 | | | 0..1 391402 | StreetName 391404 |
| | | | | | | StreetPrefixName 391406 | | | 0..N 391408 | LANGUAGEINDEPENDENT_MEDIUM_Name 391410 |
| | | | | | | StreetSuffixName 391412 | | | 0..N 391414 | LANGUAGEINDEPENDENT_MEDIUM_Name 391416 |

FIG. 39-45

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 391418 | | | 0..1 391420 | HouseID 391422 |
| | | | | | | AdditionalHouseID 391424 | | | 0..1 391426 | HouseID 391428 |
| | | | | | | BuildingID 391430 | | | 0..1 391432 | BuildingID 391434 |
| | | | | | | FloorID 391436 | | | 0..1 391438 | FloorID 391440 |
| | | | | | | RoomID 391442 | | | 0..1 391444 | RoomID 391446 |
| | | | | | | CareOfName 391448 | | | 0..1 391450 | LANGUAGEINDEPENDENT_MEDIUM_Name 391452 |

FIG. 39-46

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 391454 | | | 0..N 391456 | Description 391458 |
| | | | | | TaxJurisdictionCode 391460 | | | | 0..1 391462 | TaxJurisdictionCode 391464 |
| | | | | | TimeZoneDifferenceValue 391466 | | | | 0..1 391468 | TimeZoneDifferenceValue 391470 |
| | | | | | GeoCoordinates 391472 | | | | 0..1 391474 | GeoCoordinates 391476 |
| | | | | | Communication 391480 | | | | 0..1 391482 | Communication 391484 |

FIG. 39-47

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageCode 391486 | | | 0..1 391488 | LanguageCode 391490 |
| | | | | | | CorrespondenceLanguageName 391492 | | | 0..1 391494 | MEDIUM_Name 391496 |
| | | | | | | Telephone 391498 | | | 0..N 391500 | Telephone 391502 |
| | | | | | | | Number 391504 | | 1 391506 | PhoneNumber 391508 |
| | | | | | | | SMSEnabledIndicator 391510 | | 0..1 391512 | Indicator 391514 |

FIG. 39-48

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 391516 | | 1 391518 | Indicator 391520 |
| | | | | | | | NumberDescription 391522 | | 0..N 391524 | Description 391526 |
| | | | | | | | NumberUsageDenialIndicator 391528 | | 1 391530 | Indicator 391532 |
| | | | | | | MobilePhone 391534 | | | 0..N 391536 | Telephone 391538 |
| | | | | | | | Number 391540 | | 1 391542 | PhoneNumber 391544 |

FIG. 39-49

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 391546 | | 0..1 391548 | Indicator 391550 |
| | | | | | | | NumberDefaultIndicator 391552 | | 1 391554 | Indicator 391556 |
| | | | | | | | NumberDescription 391558 | | 0..N 391560 | Description 391562 |
| | | | | | | | NumberUsageDenialIndicator 391564 | | 1 391566 | Indicator 391568 |
| | | | | | | Facsimile 391570 | | | 0..N 391572 | Facsimile 391574 |

FIG. 39-50

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | Number 391576 | | 1 391578 | PhoneNumber 391580 |
| | | | | | | | | | NumberDefaultIndicator 391582 | | 1 391584 | Indicator 391586 |
| | | | | | | | | | NumberDescription 391588 | | 0..N 391590 | Description 391592 |
| | | | | | | | | | NumberUsageDenialIndicator 391594 | | 1 391596 | Indicator 391598 |
| | | | | | | | | Email 391600 | | | 0..N 391602 | Email 391604 |
| | | | | | | | | | URI 391606 | | 1 391608 | EmailURI 391610 |

FIG. 39-51

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 391612 | | 1 391614 | Indicator 391616 |
| | | | | | | | URIDescription 391618 | | 0..N 391620 | Description 391622 |
| | | | | | | | URIUsageDenialIndicator 391624 | | 1 391626 | Indicator 391628 |
| | | | | | | Web 391630 | | | 0..N 391632 | Web 391634 |
| | | | | | | | URI 391636 | | 1 391638 | WebURI 391640 |
| | | | | | | | URIDefaultIndicator 391642 | | 1 391644 | Indicator 391646 |

FIG. 39-52

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 391648 | | 0..N 391650 | Description 391652 |
| | | | | ContactPerson 391654 | | | | | 0..1 391656 | INTERNAL_ContactPerson 391658 |
| | | | | | InternalID 391660 | | | | 0..1 391662 | ContactPersonInternalID 391664 |
| | | | | | Address 391668 | | | | 0..1 391670 | Address 391672 |
| | | | | | | OrganisationFormOfAddress 391674 | | | 0..1 391676 | FormOfAddress 391678 |

FIG. 39-53

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 391680 | | | 0..N 391682 | LANGUAGEINDEPENDENT_MEDIUM_Name 391684 |
| | | | | | | PersonName 391686 | | | 0..1 391688 | PersonName 391690 |
| | | | | | | FunctionalTitleName 391692 | | | 0..1 391694 | LANGUAGEINDEPENDENT_MEDIUM_Name 391696 |
| | | | | | | DepartmentName 391698 | | | 0..1 391700 | LANGUAGEINDEPENDENT_MEDIUM_Name 391702 |
| | | | | | | Office 391706 | | | 0..1 391708 | Office 391710 |

FIG. 39-54

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 391714 | | | 0..1 391716 | PhysicalAddress 391718 |
| | | | | | | | Country Code 391720 | | 0..1 391722 | CountryCode 391724 |
| | | | | | | | Country Name 391726 | | 0..1 391728 | MEDIUM_Name 391730 |
| | | | | | | | RegionC ode 391732 | | 0..1 391734 | RegionCode 391736 |
| | | | | | | | RegionN ame 391738 | | 0..1 391740 | LANGUAGEINDE PENDENT_MEDI UM_Name 391742 |
| | | | | | | | StreetPo stalCode 391744 | | 0..1 391746 | PostalCode 391748 |

FIG. 39-55

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 391750 | | 0..1 391752 | PostalCode 391754 |
| | | | | | | | CompanyPostalCode 391756 | | 0..1 391758 | PostalCode 391760 |
| | | | | | | | CityName 391762 | | 0..1 391764 | LANGUAGEINDEPENDENT_MEDIUM_Name 391766 |
| | | | | | | | AdditionalCityName 391768 | | 0..1 391770 | LANGUAGEINDEPENDENT_MEDIUM_Name 391772 |
| | | | | | | | DistrictName 391774 | | 0..1 391776 | LANGUAGEINDEPENDENT_MEDIUM_Name 391778 |

FIG. 39-56

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxID 391780 | | 0..1 391782 | POBoxID 391784 |
| | | | | | | | | | POBoxIndicator 391786 | | 0..1 391788 | Indicator 391790 |
| | | | | | | | | | POBoxCountryCode 391792 | | 0..1 391794 | CountryCode 391796 |
| | | | | | | | | | POBoxCountryName 391798 | | 0..1 391800 | MEDIUM_Name 391802 |
| | | | | | | | | | POBoxRegionCode 391804 | | 0..1 391806 | RegionCode 391808 |

FIG. 39-57

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxRegionName 391810 | | 0..1 391812 | LANGUAGEINDEPENDENT_MEDIUM_Name 391814 |
| | | | | | | | | | POBoxCityName 391816 | | 0..1 391818 | LANGUAGEINDEPENDENT_MEDIUM_Name 391820 |
| | | | | | | | | | StreetName 391822 | | 0..1 391824 | StreetName 391826 |
| | | | | | | | | | StreetPrefixName 391828 | | 0..N 391830 | LANGUAGEINDEPENDENT_MEDIUM_Name 391832 |
| | | | | | | | | | StreetSuffixName 391834 | | 0..N 391836 | LANGUAGEINDEPENDENT_MEDIUM_Name 391838 |

FIG. 39-58

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 391840 | | 0..1 391842 | HouseID 391844 |
| | | | | | | | AdditionalHouseID 391846 | | 0..1 391848 | HouseID 391850 |
| | | | | | | | BuildingID 391852 | | 0..1 391854 | BuildingID 391856 |
| | | | | | | | FloorID 391858 | | 0..1 391860 | FloorID 391862 |
| | | | | | | | RoomID 391864 | | 0..1 391866 | RoomID 391868 |
| | | | | | | | CareOfName 391870 | | 0..1 391872 | LANGUAGEINDEPENDENT_MEDIUM_Name 391874 |

FIG. 39-59

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 391876 | | 0..N 391878 | Description 391880 |
| | | | | | | TaxJurisdictionCode 391882 | | | 0..1 391884 | TaxJurisdictionCode 391886 |
| | | | | | | TimeZoneDifferenceValue 391888 | | | 0..1 391890 | TimeZoneDifferenceValue 391892 |
| | | | | | | GeoCoordinates 391894 | | | 0..1 391896 | GeoCoordinates 391898 |
| | | | | | | Communication 391902 | | | 0..1 391904 | Communication 391906 |

FIG. 39-60

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 391908 | | 0..1 391910 | LanguageCode 391912 |
| | | | | | | | CorrespondenceLanguageName 391914 | | 0..1 391916 | MEDIUM_Name 391918 |
| | | | | | | | Telephone 391920 | | 0..N 391922 | Telephone 391924 |
| | | | | | | | | Number 391926 | 1 391928 | PhoneNumber 391930 |
| | | | | | | | | SMSEnabledIndicator 391932 | 0..1 391934 | Indicator 391936 |

FIG. 39-61

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number DefaultIndicator 391938 | 1 391940 | Indicator 391942 |
| | | | | | | | | Number Description 391944 | 0..N 391946 | Description 391948 |
| | | | | | | | | Number UsageDenialIndicator 391950 | 1 391952 | Indicator 391954 |
| | | | | | | | MobilePhone 391956 | | 0..N 391958 | Telephone 391960 |
| | | | | | | | | Number 391962 | 1 391964 | PhoneNumber 391966 |

FIG. 39-62

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | SMSEnabledIndicator 391968 | 0..1 391970 | Indicator 391972 |
| | | | | | | | | | | NumberDefaultIndicator 391974 | 1 391976 | Indicator 391978 |
| | | | | | | | | | | NumberDescription 391980 | 0..N 391982 | Description 391984 |
| | | | | | | | | | | NumberUsageDenialIndicator 391986 | 1 391988 | Indicator 391990 |
| | | | | | | | | | Facsimile 391992 | | 0..N 391994 | Facsimile 391996 |

FIG. 39-63

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 391998 | 1 392000 | PhoneNumber 392002 |
| | | | | | | | | NumberDefaultIndicator 392004 | 1 392006 | Indicator 392008 |
| | | | | | | | | NumberDescription 392010 | 0..N 392012 | Description 392014 |
| | | | | | | | | NumberUsageDenialIndicator 392016 | 1 392018 | Indicator 392020 |
| | | | | | | | Email 392022 | | 0..N 392024 | Email 392026 |
| | | | | | | | | URI 392028 | 1 392030 | EmailURI 392032 |

FIG. 39-64

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 392034 | 1 392036 | Indicator 392038 |
| | | | | | | | | URIDescription 392040 | 0..N 392042 | Description 392044 |
| | | | | | | | | URIUsageDeniallndicator 392046 | 1 392048 | Indicator 392050 |
| | | | | | | | Web 392052 | | 0..N 392054 | Web 392056 |
| | | | | | | | | URI 392058 | 1 392060 | WebURI 392062 |
| | | | | | | | | URIDefaultIndicator 392064 | 1 392066 | Indicator 392068 |

FIG. 39-65

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 392070 | 0..N 392072 | Description 392074 |
| | | | FreightForwarderParty 392078 | | | | | | 0..1 392080 | WaybillNotificationFreightForwarderParty 392082 |
| | | | | PartyID 392084 | | | | | 0..1 392086 | PartyID 392088 |
| | | | | Address 392090 | | | | | 0..1 392092 | Address 392094 |
| | | | | | OrganisationFormOfAddress 392096 | | | | 0..1 392098 | FormOfAddress 392100 |

FIG. 39-66

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | OrganisationFormattedName 392102 | | | | 0..N 392104 | LANGUAGEINDEPENDENT_MEDIUM_Name 392106 |
| | | | | | | | PersonName 392108 | | | | 0..1 392110 | PersonName 392112 |
| | | | | | | | FunctionalTitleName 392114 | | | | 0..1 392116 | LANGUAGEINDEPENDENT_MEDIUM_Name 392118 |
| | | | | | | | DepartmentName 392120 | | | | 0..1 392122 | LANGUAGEINDEPENDENT_MEDIUM_Name 392124 |
| | | | | | | | Office 392128 | | | | 0..1 392130 | Office 392132 |

FIG. 39-67

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | Physical Address 392136 | | | | 0..1 392138 | PhysicalAddress 392140 |
| | | | | | | | | CountryCode 392142 | | | 0..1 392144 | CountryCode 392146 |
| | | | | | | | | CountryName 392148 | | | 0..1 392150 | MEDIUM_Name 392152 |
| | | | | | | | | RegionCode 392154 | | | 0..1 392156 | RegionCode 392158 |
| | | | | | | | | RegionName 392160 | | | 0..1 392162 | LANGUAGEINDEPENDENT_MEDIUM_Name 392164 |
| | | | | | | | | StreetPostalCode 392166 | | | 0..1 392168 | PostalCode 392170 |

FIG. 39-68

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode <u>392172</u> | | | 0..1 <u>392174</u> | PostalCode <u>392176</u> |
| | | | | | | CompanyPostalCode <u>392178</u> | | | 0..1 <u>392180</u> | PostalCode <u>392182</u> |
| | | | | | | CityName <u>392184</u> | | | 0..1 <u>392186</u> | LANGUAGEINDEPENDENT_MEDIUM_Name <u>392188</u> |
| | | | | | | AdditionalCityName <u>392190</u> | | | 0..1 <u>392192</u> | LANGUAGEINDEPENDENT_MEDIUM_Name <u>392194</u> |
| | | | | | | DistrictName <u>392196</u> | | | 0..1 <u>392198</u> | LANGUAGEINDEPENDENT_MEDIUM_Name <u>392200</u> |

FIG. 39-69

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 392202 | | | 0..1 392204 | POBoxID 392206 |
| | | | | | | POBoxIndicator 392208 | | | 0..1 392210 | Indicator 392212 |
| | | | | | | POBoxCountryCode 392214 | | | 0..1 392216 | CountryCode 392218 |
| | | | | | | POBoxCountryName 392220 | | | 0..1 392222 | MEDIUM_Name 392224 |
| | | | | | | POBoxRegionCode 392226 | | | 0..1 392228 | RegionCode 392230 |

FIG. 39-70

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | POBoxRegionName 392232 | | | 0..1 392234 | LANGUAGEINDEPENDENT_MEDIUM_Name 392236 |
| | | | | | | | | POBoxCityName 392238 | | | 0..1 392240 | LANGUAGEINDEPENDENT_MEDIUM_Name 392242 |
| | | | | | | | | StreetName 392244 | | | 0..1 392246 | StreetName 392248 |
| | | | | | | | | StreetPrefixName 392250 | | | 0..N 392252 | LANGUAGEINDEPENDENT_MEDIUM_Name 392254 |
| | | | | | | | | StreetSuffixName 392256 | | | 0..N 392258 | LANGUAGEINDEPENDENT_MEDIUM_Name 392260 |

FIG. 39-71

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 392262 | | | 0..1 392264 | HouseID 392266 |
| | | | | | | AdditionalHouseID 392268 | | | 0..1 392270 | HouseID 392272 |
| | | | | | | BuildingID 392274 | | | 0..1 392276 | BuildingID 392278 |
| | | | | | | FloorID 392280 | | | 0..1 392282 | FloorID 392284 |
| | | | | | | RoomID 392286 | | | 0..1 392288 | RoomID 392290 |
| | | | | | | CareOfName 392292 | | | 0..1 392294 | LANGUAGEINDEPENDENT_MEDIUM_Name 392296 |

FIG. 39-72

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description <u>392298</u> | | | 0..N <u>392300</u> | Description <u>392302</u> |
| | | | | | TaxJurisdictionCode <u>392304</u> | | | | 0..1 <u>392306</u> | TaxJurisdictionCode <u>392308</u> |
| | | | | | TimeZoneDifferenceValue <u>392310</u> | | | | 0..1 <u>392312</u> | TimeZoneDifferenceValue <u>392314</u> |
| | | | | | GeoCoordinates <u>392316</u> | | | | 0..1 <u>392318</u> | GeoCoordinates <u>392320</u> |
| | | | | | Communication <u>392324</u> | | | | 0..1 <u>392326</u> | Communication <u>392328</u> |

FIG. 39-73

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | CorrespondenceLanguageCode 392330 | | | 0..1 392332 | LanguageCode 392334 |
| | | | | | | | | CorrespondenceLanguageName 392336 | | | 0..1 392338 | MEDIUM_Name 392340 |
| | | | | | | | | Telephone 392342 | | | 0..N 392344 | Telephone 392346 |
| | | | | | | | | | Number 392348 | | 1 392350 | PhoneNumber 392352 |
| | | | | | | | | | SMSEnabledIndicator 392354 | | 0..1 392356 | Indicator 392358 |

FIG. 39-74

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number DefaultIndicator 392360 | | 1 392362 | Indicator 392364 |
| | | | | | | | Number Description 392366 | | 0..N 392368 | Description 392370 |
| | | | | | | | Number UsageDenialIndicator 392372 | | 1 392374 | Indicator 392376 |
| | | | | | | MobilePhone 392378 | | | 0..N 392380 | Telephone 392382 |
| | | | | | | | Number 392384 | | 1 392386 | PhoneNumber 392388 |

FIG. 39-75

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 392390 | | 0..1 392392 | Indicator 392394 |
| | | | | | | | NumberDefaultIndicator 392396 | | 1 392398 | Indicator 392400 |
| | | | | | | | NumberDescription 392402 | | 0..N 392404 | Description 392406 |
| | | | | | | | NumberUsageDenialIndicator 392408 | | 1 392410 | Indicator 392412 |
| | | | | | | Facsimile 392414 | | | 0..N 392416 | Facsimile 392418 |

FIG. 39-76

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 392420 | | 1 392422 | PhoneNumber 392424 |
| | | | | | | | Number DefaultIn dicator 392426 | | 1 392428 | Indicator 392430 |
| | | | | | | | Number Descripti on 392432 | | 0..N 392434 | Description 392436 |
| | | | | | | | Number UsageDe nialIndic ator 392438 | | 1 392440 | Indicator 392442 |
| | | | | | | Email 392444 | | | 0..N 392446 | Email 392448 |
| | | | | | | | URI 392450 | | 1 392452 | EmailURI 392454 |

FIG. 39-77

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 392456 | | 1 392458 | Indicator 392460 |
| | | | | | | | URIDescription 392462 | | 0..N 392464 | Description 392466 |
| | | | | | | | URIUsageDenialIndicator 392468 | | 1 392470 | Indicator 392472 |
| | | | | | | Web 392474 | | | 0..N 392476 | Web 392478 |
| | | | | | | | URI 392480 | | 1 392482 | WebURI 392484 |
| | | | | | | | URIDefaultIndicator 392486 | | 1 392488 | Indicator 392490 |

FIG. 39-78

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDescription 392492 | | 0..N 392494 | Description 392496 |
| | | | | ContactPerson 392498 | | | | | 1 392500 | INTERNAL_ContactPerson 392502 |
| | | | | | InternalID 392504 | | | | 0..1 392506 | ContactPersonInternalID 392508 |
| | | | | | Address 392512 | | | | 0..1 392514 | Address 392516 |
| | | | | | | OrganisationFormOfAddress 392518 | | | 0..1 392520 | FormOfAddress 392522 |

FIG. 39-79

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | OrganisationFormattedName 392524 | | | 0..N 392526 | LANGUAGEINDEPENDENT_MEDIUM_Name 392528 |
| | | | | | | | | PersonName 392530 | | | 0..1 392532 | PersonName 392534 |
| | | | | | | | | FunctionalTitleName 392536 | | | 0..1 392538 | LANGUAGEINDEPENDENT_MEDIUM_Name 392540 |
| | | | | | | | | DepartmentName 392542 | | | 0..1 392544 | LANGUAGEINDEPENDENT_MEDIUM_Name 392546 |
| | | | | | | | | Office 392550 | | | 0..1 392552 | Office 392554 |

FIG. 39-80

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Physical Address 392558 | | | 0..1 392560 | PhysicalAddress 392562 |
| | | | | | | | Country Code 392564 | | 0..1 392566 | CountryCode 392568 |
| | | | | | | | Country Name 392570 | | 0..1 392572 | MEDIUM_Name 392574 |
| | | | | | | | RegionCode 392576 | | 0..1 392578 | RegionCode 392580 |
| | | | | | | | RegionName 392582 | | 0..1 392584 | LANGUAGEINDEPENDENT_MEDIUM_Name 392586 |
| | | | | | | | StreetPostalCode 392588 | | 0..1 392590 | PostalCode 392592 |

FIG. 39-81

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 392594 | | 0..1 392596 | PostalCode 392598 |
| | | | | | | | CompanyPostalCode 392600 | | 0..1 392602 | PostalCode 392604 |
| | | | | | | | CityName 392606 | | 0..1 392608 | LANGUAGEINDEPENDENT_MEDIUM_Name 392610 |
| | | | | | | | AdditionalCityName 392612 | | 0..1 392614 | LANGUAGEINDEPENDENT_MEDIUM_Name 392616 |
| | | | | | | | DistrictName 392618 | | 0..1 392620 | LANGUAGEINDEPENDENT_MEDIUM_Name 392622 |

FIG. 39-82

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxID 392624 | | 0..1 392626 | POBoxID 392628 |
| | | | | | | | | | POBoxIndicator 392630 | | 0..1 392632 | Indicator 392634 |
| | | | | | | | | | POBoxCountryCode 392636 | | 0..1 392638 | CountryCode 392640 |
| | | | | | | | | | POBoxCountryName 392642 | | 0..1 392644 | MEDIUM_Name 392646 |
| | | | | | | | | | POBoxRegionCode 392648 | | 0..1 392650 | RegionCode 392652 |

FIG. 39-83

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 392654 | | 0..1 392656 | LANGUAGEINDEPENDENT_MEDIUM_Name 392658 |
| | | | | | | | POBoxCityName 392660 | | 0..1 392662 | LANGUAGEINDEPENDENT_MEDIUM_Name 392664 |
| | | | | | | | StreetName 392666 | | 0..1 392668 | StreetName 392670 |
| | | | | | | | StreetPrefixName 392672 | | 0..N 392674 | LANGUAGEINDEPENDENT_MEDIUM_Name 392676 |
| | | | | | | | StreetSuffixName 392678 | | 0..N 392680 | LANGUAGEINDEPENDENT_MEDIUM_Name 392682 |

FIG. 39-84

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 392684 | | 0..1 392686 | HouseID 392688 |
| | | | | | | | AdditionalHouseID 392690 | | 0..1 392692 | HouseID 392694 |
| | | | | | | | BuildingID 392696 | | 0..1 392698 | BuildingID 392700 |
| | | | | | | | FloorID 392702 | | 0..1 392704 | FloorID 392706 |
| | | | | | | | RoomID 392708 | | 0..1 392710 | RoomID 392712 |
| | | | | | | | CareOfName 392714 | | 0..1 392716 | LANGUAGEINDEPENDENT_MEDIUM_Name 392718 |

FIG. 39-85

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 392720 | | 0..N 392722 | Description 392724 |
| | | | | | | TaxJurisdictionCode 392726 | | | 0..1 392728 | TaxJurisdictionCode 392730 |
| | | | | | | TimeZoneDifferenceValue 392732 | | | 0..1 392734 | TimeZoneDifferenceValue 392736 |
| | | | | | | GeoCoordinates 392738 | | | 0..1 392740 | GeoCoordinates 392742 |
| | | | | | | Communication 392746 | | | 0..1 392748 | Communication 392750 |

FIG. 39-86

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | CorrespondenceLanguageCode 392752 | | 0..1 392754 | LanguageCode 392756 |
| | | | | | | | | | CorrespondenceLanguageName 392758 | | 0..1 392760 | MEDIUM_Name 392762 |
| | | | | | | | | | Telephone 392764 | | 0..N 392766 | Telephone 392768 |
| | | | | | | | | | | Number 392770 | 1 392772 | PhoneNumber 392774 |
| | | | | | | | | | | SMSEnabledIndicator 392776 | 0..1 392778 | Indicator 392780 |

FIG. 39-87

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | | Number DefaultIndicator 392782 | 1 392784 | Indicator 392786 |
| | | | | | | | | | | Number Description 392788 | 0..N 392790 | Description 392792 |
| | | | | | | | | | | Number UsageDenialIndicator 392794 | 1 392796 | Indicator 392798 |
| | | | | | | | | | MobilePhone 392800 | | 0..N 392802 | Telephone 392804 |
| | | | | | | | | | | Number 392806 | 1 392808 | PhoneNumber 392810 |

FIG. 39-88

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 392812 | 0..1 392814 | Indicator 392816 |
| | | | | | | | | NumberDefaultIndicator 392818 | 1 392820 | Indicator 392822 |
| | | | | | | | | NumberDescription 392824 | 0..N 392826 | Description 392828 |
| | | | | | | | | NumberUsageDenialIndicator 392830 | 1 392832 | Indicator 392834 |
| | | | | | | | Facsimile 392836 | | 0..N 392838 | Facsimile 392840 |

FIG. 39-89

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 392842 | 1 392844 | PhoneNumber 392846 |
| | | | | | | | | NumberDefaultIndicator 392848 | 1 392850 | Indicator 392852 |
| | | | | | | | | NumberDescription 392854 | 0..N 392856 | Description 392858 |
| | | | | | | | | NumberUsageDenialIndicator 392860 | 1 392862 | Indicator 392864 |
| | | | | | | | Email 392866 | | 0..N 392868 | Email 392870 |
| | | | | | | | | URI 392872 | 1 392874 | EmailURI 392876 |

FIG. 39-90

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 392878 | 1 392880 | Indicator 392882 |
| | | | | | | | | URIDescription 392884 | 0..N 392886 | Description 392888 |
| | | | | | | | | URIUsageDenialIndicator 392890 | 1 392892 | Indicator 392894 |
| | | | | | | | Web 392896 | | 0..N 392898 | Web 392900 |
| | | | | | | | | URI 392902 | 1 392904 | WebURI 392906 |
| | | | | | | | | URIDefaultIndicator 392908 | 1 392910 | Indicator 392912 |

FIG. 39-91

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 392914 | 0..N 392916 | Description 392918 |
| | | | | SCAC 392920 | | | | | 0..1 392922 | PartyID 392924 |
| | | | | CarrierProgressiveNumber 392926 | | | | | 0..1 392928 | BusinessTransactionDocumentReference 392930 |
| | | | ProductRecipientParty 392934 | | | | | | 0..1 392936 | WaybillNotificationProductRecipientParty 392938 |
| | | | | PartyID 392940 | | | | | 0..1 392942 | PartyID 392944 |
| | | | | Address 392946 | | | | | 0..1 392948 | Address 392950 |

FIG. 39-92

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormOfAddress 392952 | | | | 0..1 392954 | FormOfAddress 392956 |
| | | | | | OrganisationFormattedName 392958 | | | | 0..N 392960 | LANGUAGEINDEPENDENT_MEDIUM_Name 392962 |
| | | | | | PersonName 392964 | | | | 0..1 392966 | PersonName 392968 |
| | | | | | FunctionalTitleName 392970 | | | | 0..1 392972 | LANGUAGEINDEPENDENT_MEDIUM_Name 392974 |
| | | | | | DepartmentName 392976 | | | | 0..1 392978 | LANGUAGEINDEPENDENT_MEDIUM_Name 392980 |

FIG. 39-93

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Office 392984 | | | | 0..1 392986 | Office 392988 |
| | | | | | Physical Address 392992 | | | | 0..1 392994 | PhysicalAddress 392996 |
| | | | | | | CountryCode 392998 | | | 0..1 393000 | CountryCode 393002 |
| | | | | | | CountryName 393004 | | | 0..1 393006 | MEDIUM_Name 393008 |
| | | | | | | RegionCode 393010 | | | 0..1 393012 | RegionCode 393014 |
| | | | | | | RegionName 393016 | | | 0..1 393018 | LANGUAGEINDEPENDENT_MEDIUM_Name 393020 |

FIG. 39-94

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetPostalCode 393022 | | | 0..1 393024 | PostalCode 393026 |
| | | | | | | POBoxPostalCode 393028 | | | 0..1 393030 | PostalCode 393032 |
| | | | | | | CompanyPostalCode 393034 | | | 0..1 393036 | PostalCode 393038 |
| | | | | | | CityName 393040 | | | 0..1 393042 | LANGUAGEINDEPENDENT_MEDIUM_Name 393044 |
| | | | | | | AdditionalCityName 393046 | | | 0..1 393048 | LANGUAGEINDEPENDENT_MEDIUM_Name 393050 |

FIG. 39-95

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | DistrictName 393052 | | | 0..1 393054 | LANGUAGEINDEPENDENT_MEDIUM_Name 393056 |
| | | | | | | | | POBoxID 393058 | | | 0..1 393060 | POBoxID 393062 |
| | | | | | | | | POBoxIndicator 393064 | | | 0..1 393066 | Indicator 393068 |
| | | | | | | | | POBoxCountryCode 393070 | | | 0..1 393072 | CountryCode 393074 |
| | | | | | | | | POBoxCountryName 393076 | | | 0..1 393078 | MEDIUM_Name 393080 |

FIG. 39-96

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionCode 393082 | | | 0..1 393084 | RegionCode 393086 |
| | | | | | | POBoxRegionName 393088 | | | 0..1 393090 | LANGUAGEINDEPENDENT_MEDIUM_Name 393092 |
| | | | | | | POBoxCityName 393094 | | | 0..1 393096 | LANGUAGEINDEPENDENT_MEDIUM_Name 393098 |
| | | | | | | StreetName 393100 | | | 0..1 393102 | StreetName 393104 |
| | | | | | | StreetPrefixName 393106 | | | 0..N 393108 | LANGUAGEINDEPENDENT_MEDIUM_Name 393110 |

FIG. 39-97

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetSuffixName 393112 | | | 0..N 393114 | LANGUAGEINDEPENDENT_MEDIUM_Name 393116 |
| | | | | | | HouseID 393118 | | | 0..1 393120 | HouseID 393122 |
| | | | | | | AdditionalHouseID 393124 | | | 0..1 393126 | HouseID 393128 |
| | | | | | | BuildingID 393130 | | | 0..1 393132 | BuildingID 393134 |
| | | | | | | FloorID 393136 | | | 0..1 393138 | FloorID 393140 |
| | | | | | | RoomID 393142 | | | 0..1 393144 | RoomID 393146 |

FIG. 39-98

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | CareOfName 393148 | | | 0..1 393150 | LANGUAGEINDEPENDENT_MEDIUM_Name 393152 |
| | | | | | | | | Description 393154 | | | 0..N 393156 | Description 393158 |
| | | | | | | | TaxJurisdictionCode 393160 | | | | 0..1 393162 | TaxJurisdictionCode 393164 |
| | | | | | | | TimeZoneDifferenceValue 393166 | | | | 0..1 393168 | TimeZoneDifferenceValue 393170 |
| | | | | | | | GeoCoordinates 393172 | | | | 0..1 393174 | GeoCoordinates 393176 |

FIG. 39-99

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | Communication 393180 | | | | 0..1 393182 | Communication 393184 |
| | | | | | | | | | CorrespondenceLanguageCode 393186 | | | 0..1 393188 | LanguageCode 393190 |
| | | | | | | | | | CorrespondenceLanguageName 393192 | | | 0..1 393194 | MEDIUM_Name 393196 |
| | | | | | | | | | Telephone 393198 | | | 0..N 393200 | Telephone 393202 |
| | | | | | | | | | | Number 393204 | | 1 393206 | PhoneNumber 393208 |

FIG. 39-100

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 393210 | | 0..1 393212 | Indicator 393214 |
| | | | | | | | NumberDefaultIndicator 393216 | | 1 393218 | Indicator 393220 |
| | | | | | | | NumberDescription 393222 | | 0..N 393224 | Description 393226 |
| | | | | | | | NumberUsageDenialIndicator 393228 | | 1 393230 | Indicator 393232 |
| | | | | | | MobilePhone 393234 | | | 0..N 393236 | Telephone 393238 |

FIG. 39-101

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 393240 | | 1 393242 | PhoneNumber 393244 |
| | | | | | | | SMSEnabledIndicator 393246 | | 0..1 393248 | Indicator 393250 |
| | | | | | | | NumberDefaultIndicator 393252 | | 1 393254 | Indicator 393256 |
| | | | | | | | NumberDescription 393258 | | 0..N 393260 | Description 393262 |
| | | | | | | | NumberUsageDenialIndicator 393264 | | 1 393266 | Indicator 393268 |

FIG. 39-102

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Facsimile 393270 | | | 0..N 393272 | Facsimile 393274 |
| | | | | | | | Number 393276 | | 1 393278 | PhoneNumber 393280 |
| | | | | | | | NumberDefaultIndicator 393282 | | 1 393284 | Indicator 393286 |
| | | | | | | | NumberDescription 393288 | | 0..N 393290 | Description 393292 |
| | | | | | | | NumberUsageDenialIndicator 393294 | | 1 393296 | Indicator 393298 |
| | | | | | | Email 393300 | | | 0..N 393302 | Email 393304 |

FIG. 39-103

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | URI 393306 | | 1 393308 | EmailURI 393310 |
| | | | | | | | | | URIDefaultIndicator 393312 | | 1 393314 | Indicator 393316 |
| | | | | | | | | | URIDescription 393318 | | 0..N 393320 | Description 393322 |
| | | | | | | | | | URIUsageDenialIndicator 393324 | | 1 393326 | Indicator 393328 |
| | | | | | | | | Web 393330 | | | 0..N 393332 | Web 393334 |
| | | | | | | | | | URI 393336 | | 1 393338 | WebURI 393340 |

FIG. 39-104

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 393342 | | 1 393344 | Indicator 393346 |
| | | | | | | | URIDescription 393348 | | 0..N 393350 | Description 393352 |
| | | | | ContactPerson 393354 | | | | | 0..1 393356 | INTERNAL_ContactPerson 393358 |
| | | | | | InternalID 393360 | | | | 0..1 393362 | ContactPersonInternalID 393364 |
| | | | | | Address 393368 | | | | 0..1 393370 | Address 393372 |
| | | | | | | OrganisationFormOfAddress 393374 | | | 0..1 393376 | FormOfAddress 393378 |

FIG. 39-105

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 393380 | | | 0..N 393382 | LANGUAGEINDEPENDENT_MEDIUM_Name 393384 |
| | | | | | | PersonName 393386 | | | 0..1 393388 | PersonName 393390 |
| | | | | | | FunctionalTitleName 393392 | | | 0..1 393394 | LANGUAGEINDEPENDENT_MEDIUM_Name 393396 |
| | | | | | | DepartmentName 393398 | | | 0..1 393400 | LANGUAGEINDEPENDENT_MEDIUM_Name 393402 |
| | | | | | | Office 393406 | | | 0..1 393408 | Office 393410 |

FIG. 39-106

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | Physical Address 393414 | | | 0..1 393416 | PhysicalAddress 393418 |
| | | | | | | | | | Country Code 393420 | | 0..1 393422 | CountryCode 393424 |
| | | | | | | | | | Country Name 393426 | | 0..1 393428 | MEDIUM_Name 393430 |
| | | | | | | | | | RegionCode 393432 | | 0..1 393434 | RegionCode 393436 |
| | | | | | | | | | RegionName 393438 | | 0..1 393440 | LANGUAGEINDEPENDENT_MEDIUM_Name 393442 |
| | | | | | | | | | StreetPostalCode 393444 | | 0..1 393446 | PostalCode 393448 |

FIG. 39-107

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 393450 | | 0..1 393452 | PostalCode 393454 |
| | | | | | | | CompanyPostalCode 393456 | | 0..1 393458 | PostalCode 393460 |
| | | | | | | | CityName 393462 | | 0..1 393464 | LANGUAGEINDEPENDENT_MEDIUM_Name 393466 |
| | | | | | | | AdditionalCityName 393468 | | 0..1 393470 | LANGUAGEINDEPENDENT_MEDIUM_Name 393472 |
| | | | | | | | DistrictName 393474 | | 0..1 393476 | LANGUAGEINDEPENDENT_MEDIUM_Name 393478 |

FIG. 39-108

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | | | | | POBoxID 393480 | | 0..1 393482 | POBoxID 393484 |
| | | | | | | | | | POBoxIndicator 393486 | | 0..1 393488 | Indicator 393490 |
| | | | | | | | | | POBoxCountryCode 393492 | | 0..1 393494 | CountryCode 393496 |
| | | | | | | | | | POBoxCountryName 393498 | | 0..1 393500 | MEDIUM_Name 393502 |
| | | | | | | | | | POBoxRegionCode 393504 | | 0..1 393506 | RegionCode 393508 |

FIG. 39-109

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 393510 | | 0..1 393512 | LANGUAGEINDEPENDENT_MEDIUM_Name 393514 |
| | | | | | | | POBoxCityName 393516 | | 0..1 393518 | LANGUAGEINDEPENDENT_MEDIUM_Name 393520 |
| | | | | | | | StreetName 393522 | | 0..1 393524 | StreetName 393526 |
| | | | | | | | StreetPrefixName 393528 | | 0..N 393530 | LANGUAGEINDEPENDENT_MEDIUM_Name 393532 |
| | | | | | | | StreetSuffixName 393534 | | 0..N 393536 | LANGUAGEINDEPENDENT_MEDIUM_Name 393538 |

FIG. 39-110

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 393540 | | 0..1 393542 | HouseID 393544 |
| | | | | | | | AdditionalHouseID 393546 | | 0..1 393548 | HouseID 393550 |
| | | | | | | | BuildingID 393552 | | 0..1 393554 | BuildingID 393556 |
| | | | | | | | FloorID 393558 | | 0..1 393560 | FloorID 393562 |
| | | | | | | | RoomID 393564 | | 0..1 393566 | RoomID 393568 |
| | | | | | | | CareOfName 393570 | | 0..1 393572 | LANGUAGEINDEPENDENT_MEDIUM_Name 393574 |

FIG. 39-111

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 393576 | | 0..N 393578 | Description 393580 |
| | | | | | | TaxJurisdictionCode 393582 | | | 0..1 393584 | TaxJurisdictionCode 393586 |
| | | | | | | TimeZoneDifferenceValue 393588 | | | 0..1 393590 | TimeZoneDifferenceValue 393592 |
| | | | | | | GeoCoordinates 393594 | | | 0..1 393596 | GeoCoordinates 393598 |
| | | | | | | Communication 393602 | | | 0..1 393604 | Communication 393606 |

FIG. 39-112

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 393608 | | 0..1 393610 | LanguageCode 393612 |
| | | | | | | | CorrespondenceLanguageName 393614 | | 0..1 393616 | MEDIUM_Name 393618 |
| | | | | | | | Telephone 393620 | | 0..N 393622 | Telephone 393624 |
| | | | | | | | | Number 393626 | 1 393628 | PhoneNumber 393630 |
| | | | | | | | | SMSEnabledIndicator 393632 | 0..1 393634 | Indicator 393636 |

FIG. 39-113

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number DefaultIndicator 393638 | 1 393640 | Indicator 393642 |
| | | | | | | | | Number Description 393644 | 0..N 393646 | Description 393648 |
| | | | | | | | | Number UsageDenialIndicator 393650 | 1 393652 | Indicator 393654 |
| | | | | | | | MobilePhone 393656 | | 0..N 393658 | Telephone 393660 |
| | | | | | | | | Number 393662 | 1 393664 | PhoneNumber 393666 |

FIG. 39-114

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 393668 | 0..1 393670 | Indicator 393672 |
| | | | | | | | | NumberDefaultIndicator 393674 | 1 393676 | Indicator 393678 |
| | | | | | | | | NumberDescription 393680 | 0..N 393682 | Description 393684 |
| | | | | | | | | NumberUsageDenialIndicator 393686 | 1 393688 | Indicator 393690 |
| | | | | | | | Facsimile 393692 | | 0..N 393694 | Facsimile 393696 |

FIG. 39-115

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 393698 | 1 393700 | PhoneNumber 393702 |
| | | | | | | | | NumberDefaultIndicator 393704 | 1 393706 | Indicator 393708 |
| | | | | | | | | NumberDescription 393710 | 0..N 393712 | Description 393714 |
| | | | | | | | | NumberUsageDenialIndicator 393716 | 1 393718 | Indicator 393720 |
| | | | | | | | Email 393722 | | 0..N 393724 | Email 393726 |
| | | | | | | | | URI 393728 | 1 393730 | EmailURI 393732 |

FIG. 39-116

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 393734 | 1 393736 | Indicator 393738 |
| | | | | | | | | URIDescription 393740 | 0..N 393742 | Description 393744 |
| | | | | | | | | URIUsageDenialIndicator 393746 | 1 393748 | Indicator 393750 |
| | | | | | | | Web 393752 | | 0..N 393754 | Web 393756 |
| | | | | | | | | URI 393758 | 1 393760 | WebURI 393762 |
| | | | | | | | | URIDefaultIndicator 393764 | 1 393766 | Indicator 393768 |

FIG. 39-117

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 393770 | 0..N 393772 | Description 393774 |
| | | | | SCAC 393776 | | | | | 0..1 393778 | PartyID 393780 |
| | | | | CarrierProgressiveNumber 393782 | | | | | 0..1 393784 | BusinessTransactionDocumentReference 393786 |
| | | | AttachmentFolderDocument 393790 | | | | | | 0..N 393792 | WaybillNotificationAttachmentFolderDocument 393794 |
| | | | | TypeCode 393796 | | | | | 0..1 393798 | DocumentTypeCode 393800 |

FIG. 39-118

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | TypeDescription 393802 | | | | | 0..1 393804 | SHORT_Description 393806 |
| | | | Delivery 393808 | | | | Delivery 393810 | | | | | | 1..N 393812 | WaybillNotificationDelivery 393814 |
| | | | | | | | | DeliveryID 393816 | | | | | 1 393818 | BusinessTransactionDocumentID 393820 |
| | | | | | | | | GrandTotalWeightMeasure 393822 | | | | | 0..1 393824 | Measure 393826 |
| | | | | | | | | GrandTotalVolumeMeasure 393828 | | | | | 0..1 393830 | Measure 393832 |

FIG. 39-119

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | DeliveryText 393834 | | | | | 0..N 393836 | Text 393838 |
| | | | | ShipToLocation 393842 | | | | | 0..N 393844 | WaybillNotificationDeliveryShipToLocation 393846 |
| | | | | | LocationID 393848 | | | | 0..1 393850 | LocationID 393852 |
| | | | | | LocationAlternativeID 393854 | | | | 0..N 393856 | LocationStandardID 393858 |
| | | | | | PartyID 393860 | | | | 0..1 393862 | PartyID 393864 |
| | | | | | Address 393866 | | | | 0..1 393868 | Address 393870 |

FIG. 39-120

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormOfAddress 393872 | | | 0..1 393874 | FormOfAddress 393876 |
| | | | | | | OrganisationFormattedName 393878 | | | 0..N 393880 | LANGUAGEINDEPENDENT_MEDIUM_Name 393882 |
| | | | | | | PersonName 393884 | | | 0..1 393886 | PersonName 393888 |
| | | | | | | FunctionalTitleName 393890 | | | 0..1 393892 | LANGUAGEINDEPENDENT_MEDIUM_Name 393894 |
| | | | | | | DepartmentName 393896 | | | 0..1 393898 | LANGUAGEINDEPENDENT_MEDIUM_Name 393900 |

FIG. 39-121

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Office 393904 | | | 0..1 393906 | Office 393908 |
| | | | | | | Physical Address 393912 | | | 0..1 393914 | PhysicalAddress 393916 |
| | | | | | | | Country Code 393918 | | 0..1 393920 | CountryCode 393922 |
| | | | | | | | Country Name 393924 | | 0..1 393926 | MEDIUM_Name 393928 |
| | | | | | | | RegionC ode 393930 | | 0..1 393932 | RegionCode 393934 |
| | | | | | | | RegionN ame 393936 | | 0..1 393938 | LANGUAGEINDE PENDENT_MEDI UM_Name 393940 |

FIG. 39-122

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetPostalCode 393942 | | 0..1 393944 | PostalCode 393946 |
| | | | | | | | POBoxPostalCode 393948 | | 0..1 393950 | PostalCode 393952 |
| | | | | | | | CompanyPostalCode 393954 | | 0..1 393956 | PostalCode 393958 |
| | | | | | | | CityName 393960 | | 0..1 393962 | LANGUAGEINDEPENDENT_MEDIUM_Name 393964 |
| | | | | | | | AdditionalCityName 393966 | | 0..1 393968 | LANGUAGEINDEPENDENT_MEDIUM_Name 393970 |

FIG. 39-123

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | DistrictName 393972 | | 0..1 393974 | LANGUAGEINDEPENDENT_MEDIUM_Name 393976 |
| | | | | | | | POBoxID 393978 | | 0..1 393980 | POBoxID 393982 |
| | | | | | | | POBoxIndicator 393984 | | 0..1 393986 | Indicator 393988 |
| | | | | | | | POBoxCountryCode 393990 | | 0..1 393992 | CountryCode 393994 |
| | | | | | | | POBoxCountryName 393996 | | 0..1 393998 | MEDIUM_Name 394000 |

FIG. 39-124

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionCode 394002 | | 0..1 394004 | RegionCode 394006 |
| | | | | | | | POBoxRegionName 394008 | | 0..1 394010 | LANGUAGEINDEPENDENT_MEDIUM_Name 394012 |
| | | | | | | | POBoxCityName 394014 | | 0..1 394016 | LANGUAGEINDEPENDENT_MEDIUM_Name 394018 |
| | | | | | | | StreetName 394020 | | 0..1 394022 | StreetName 394024 |
| | | | | | | | StreetPrefixName 394026 | | 0..N 394028 | LANGUAGEINDEPENDENT_MEDIUM_Name 394030 |

FIG. 39-125

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetSuffixName 394032 | | 0..N 394034 | LANGUAGEINDEPENDENT_MEDIUM_Name 394036 |
| | | | | | | | HouseID 394038 | | 0..1 394040 | HouseID 394042 |
| | | | | | | | AdditionalHouseID 394044 | | 0..1 394046 | HouseID 394048 |
| | | | | | | | BuildingID 394050 | | 0..1 394052 | BuildingID 394054 |
| | | | | | | | FloorID 394056 | | 0..1 394058 | FloorID 394060 |
| | | | | | | | RoomID 394062 | | 0..1 394064 | RoomID 394066 |

FIG. 39-126

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CareOfName 394068 | | 0..1 394070 | LANGUAGEINDEPENDENT_MEDIUM_Name 394072 |
| | | | | | | | Description 394074 | | 0..N 394076 | Description 394078 |
| | | | | | | TaxJurisdictionCode 394080 | | | 0..1 394082 | TaxJurisdictionCode 394084 |
| | | | | | | TimeZoneDifferenceValue 394086 | | | 0..1 394088 | TimeZoneDifferenceValue 394090 |
| | | | | | | GeoCoordinates 394092 | | | 0..1 394094 | GeoCoordinates 394096 |

FIG. 39-127

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Communication 394100 | | | 0..1 394102 | Communication 394104 |
| | | | | | | | CorrespondenceLanguageCode 394106 | | 0..1 394108 | LanguageCode 394110 |
| | | | | | | | CorrespondenceLanguageName 394112 | | 0..1 394114 | MEDIUM_Name 394116 |
| | | | | | | | Telephone 394118 | | 0..N 394120 | Telephone 394122 |
| | | | | | | | | Number 394124 | 1 394126 | PhoneNumber 394128 |

FIG. 39-128

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 394130 | 0..1 394132 | Indicator 394134 |
| | | | | | | | | NumberDefaultIndicator 394136 | 1 394138 | Indicator 394140 |
| | | | | | | | | NumberDescription 394142 | 0..N 394144 | Description 394146 |
| | | | | | | | | NumberUsageDenialIndicator 394148 | 1 394150 | Indicator 394152 |
| | | | | | | | MobilePhone 394154 | | 0..N 394156 | Telephone 394158 |

FIG. 39-129

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 394160 | 1 394162 | PhoneNumber 394164 |
| | | | | | | | | SMSEnabledIndicator 394166 | 0..1 394168 | Indicator 394170 |
| | | | | | | | | NumberDefaultIndicator 394172 | 1 394174 | Indicator 394176 |
| | | | | | | | | NumberDescription 394178 | 0..N 394180 | Description 394182 |
| | | | | | | | | NumberUsageDenialIndicator 394184 | 1 394186 | Indicator 394188 |

FIG. 39-130

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Facsimile 394190 | | 0..N 394192 | Facsimile 394194 |
| | | | | | | | | Number 394196 | 1 394198 | PhoneNumber 394200 |
| | | | | | | | | NumberDefaultIndicator 394202 | 1 394204 | Indicator 394206 |
| | | | | | | | | NumberDescription 394208 | 0..N 394210 | Description 394212 |
| | | | | | | | | NumberUsageDenialIndicator 394214 | 1 394216 | Indicator 394218 |
| | | | | | | | Email 394220 | | 0..N 394222 | Email 394224 |

FIG. 39-131

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URI 394226 | 1 394228 | EmailURI 394230 |
| | | | | | | | | URIDefaultIndicator 394232 | 1 394234 | Indicator 394236 |
| | | | | | | | | URIDescription 394238 | 0..N 394240 | Description 394242 |
| | | | | | | | | URIUsageDenialIndicator 394244 | 1 394246 | Indicator 394248 |
| | | | | | | | Web 394250 | | 0..N 394252 | Web 394254 |
| | | | | | | | | URI 394256 | 1 394258 | WebURI 394260 |

FIG. 39-132

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | | URIDefaultIndicator 394262 | 1 394264 | Indicator 394266 |
| | | | | | | | | | | | | | URIDescription 394268 | 0..N 394270 | Description 394272 |
| | | | | Item 394274 | | | | | Logistics Package 394276 | | | | | 0..N 394278 | WaybillNotificationDeliveryLogisticsPackage 394280 |
| | | | | | | | | | | LogisticUnitID 394282 | | | | 0..1 394284 | LogisticUnitID 394286 |
| | | | | | | | | | | LogisticUnitDescription 394288 | | | | 0..1 394290 | SHORT_Description 394292 |

FIG. 39-133

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | LogisticPackgeQuantity 394294 | | | | 0..1 394296 | Quantity 394298 |
| | | | | | PackageTypeCode 394300 | | | | 0..1 394302 | PackageTypeCode 394304 |
| | | | | | PackageTypeDescription 394306 | | | | 0..1 394308 | SHORT_Description 394310 |
| | | | | | GrossWeightMeasure 394312 | | | | 0..1 394314 | Measure 394316 |
| | | | | | GrossVolumeMeasure 394318 | | | | 0..1 394320 | Measure 394322 |

FIG. 39-134

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | OuterPackageIndicator 394324 | | | | 0..1 394326 | Indicator 394328 |
| | | | | | | | | | | ContentReportedIndicator 394330 | | | | 0..1 394332 | Indicator 394334 |
| | | | | DeliveryItem 394336 | | | | | | PackedItem 394338 | | | | 0..N 394340 | WaybillNotificationDeliveryLogisticsPackagePackedItem 394342 |
| | | | | | | | | | | | DeliveryItemID 394344 | | | 1 394346 | BusinessTransactionDocumentItemID 394348 |
| | | | | | | | | | | | ProductID 394350 | | | 0..1 394352 | ProductID 394354 |

FIG. 39-135

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | ProductDescription 394356 | | | 0..1 394358 | SHORT_Description 394360 |
| | | | | | | ProductQuantity 394362 | | | 0..1 394364 | Quantity 394366 |
| | | | | | | ProductQuantityTypeCode 394368 | | | 0..1 394370 | QuantityTypeCode 394372 |
| | | | | | | GrossWeightMeasure 394374 | | | 0..1 394376 | Measure 394378 |
| | | | | | | GrossVolumeMeasure 394380 | | | 0..1 394382 | Measure 394384 |

FIG. 39-136

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | DeliveryItemText 394386 | | | 0..N 394388 | Text 394390 |
| | | | | | Detail 394394 | | | | 1..N 394396 | WaybillNotificationDeliveryLogisticsPackageDetail 394398 |
| | | | | | | LogisticUnitID 394400 | | | 0..1 394402 | LogisticUnitID 394404 |
| | | | | | | LogisticUnitDescription 394406 | | | 0..1 394408 | SHORT_Description 394410 |
| | | | | | | LogisticPackgeQuantity 394412 | | | 0..1 394414 | Quantity 394416 |

FIG. 39-137

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | PackageTypeCode 394418 | | | 0..1 394420 | PackageTypeCode 394422 |
| | | | | | | PackageTypeDescription 394424 | | | 0..1 394426 | SHORT_Description 394428 |
| | | | | | | GrossWeightMeasure 394430 | | | 0..1 394432 | Measure 394434 |
| | | | | | | GrossVolumeMeasure 394436 | | | 0..1 394438 | Measure 394440 |

FIG. 39-138

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | PackedItemDetail 394444 | | | 0..N 394446 | WaybillNotificationDeliveryLogisticsPackageDetailPackedItemDetail 394448 |
| | | | | | | | DeliveryItemID 394450 | | 1 394452 | BusinessTransactionDocumentItemID 394454 |
| | | | | | | | ProductID 394456 | | 0..1 394458 | ProductID 394460 |
| | | | | | | | ProductDescription 394462 | | 0..1 394464 | SHORT_Description 394466 |
| | | | | | | | iStockID 394468 | | 0..1 394470 | IdentifiedStockID 394472 |

FIG. 39-139

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | iStockDescription 394474 | | 0..1 394476 | MEDIUM_Description 394478 |
| | | | | | | | Product Quantity 394480 | | 0..1 394482 | Quantity 394484 |
| | | | | | | | Product Quantity TypeCode 394486 | | 0..1 394488 | QuantityTypeCode 394490 |
| | | | | | | | GrossWeightMeasure 394492 | | 0..1 394494 | Measure 394496 |
| | | | | | | | GrossVolumeMeasure 394498 | | 0..1 394500 | Measure 394502 |

FIG. 39-140

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Identification 394506 | | | 0..N 394508 | WaybillNotificationDeliveryLogisticsPackageDetailIdentification 394510 |
| | | | | | | | GoodsTagID 394512 | | 0..1 394514 | GoodsTagID 394516 |
| | | | | Item 394520 | | | | | 0..N 394522 | WaybillNotificationDeliveryItem 394524 |
| | | | | | DeliveryItemID 394526 | | | | 1 394528 | BusinessTransactionDocumentItemID 394530 |
| | | | | | ProductID 394532 | | | | 0..1 394534 | ProductID 394536 |

FIG. 39-141

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | ProductDescription 394538 | | | | 0..1 394540 | SHORT_Description 394542 |
| | | | | | ProductQuantity 394544 | | | | 0..1 394546 | Quantity 394548 |
| | | | | | ProductQuantityTypeCode 394550 | | | | 0..1 394552 | QuantityTypeCode 394554 |
| | | | | | DeliveryItemText 394556 | | | | 0..N 394558 | Text 394560 |
| | | | | | UnpackedIndicator 394562 | | | | 0..1 394564 | Indicator 394566 |

FIG. 39-142

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GrossWeightMeasure 394568 | | | | 0..1 394570 | Measure 394572 |
| | | | | | GrossVolumeMeasure 394574 | | | | 0..1 394576 | Measure 394578 |
| | | | | | Detail 394582 | | | | 1..N 394584 | WaybillNotificationDeliveryItemDetail 394586 |
| | | | | | | DeliveryItemID 394588 | | | 1 394590 | BusinessTransactionDocumentItemID 394592 |
| | | | | | | ProductID 394594 | | | 0..1 394596 | ProductID 394598 |

FIG. 39-143

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | ProductDescription 394600 | | | 0..1 394602 | SHORT_Description 394604 |
| | | | | | | iStockID 394606 | | | 0..1 394608 | IdentifiedStockID 394610 |
| | | | | | | iStockDescription 394612 | | | 0..1 394614 | MEDIUM_Description 394616 |
| | | | | | | ProductQuantity 394618 | | | 0..1 394620 | Quantity 394622 |
| | | | | | | ProductQuantityTypeCode 394624 | | | 0..1 394626 | QuantityTypeCode 394628 |

FIG. 39-144

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | GrossWeightMeasure 394630 | | | 0..1 394632 | Measure 394634 |
| | | | | | | | | | | GrossVolumeMeasure 394636 | | | 0..1 394638 | Measure 394640 |
| | | | | | | | | | | Identification 394644 | | | 0..N 394646 | WaybillNotificationDeliveryItemDetailIdentification 394648 |
| | | | | | | | | | | | GoodsTagID 394650 | | 0..1 394652 | GoodsTagID 394654 |
| | | | ItemReference 394656 | | | | | ItemReference 394658 | | | | | 0..N 394660 | WaybillNotificationDeliveryItemReference 394662 |

FIG. 39-145

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | OriginPurchaseOrderReferenceID 394664 | | | | 0..1 394666 | BusinessTransactionDocumentID 394668 |
| | | | | | | | | | NumberOfPackagesQuantity 394670 | | | | 0..1 394672 | Quantity 394674 |
| | | | | | | | | | TotalWeightMeasure 394676 | | | | 0..1 394678 | Measure 394680 |
| | | | | | | | | | TotalVolumeMeasure 394682 | | | | 0..1 394684 | Measure 394686 |

MANAGING CONSISTENT INTERFACES FOR BUSINESS DOCUMENT MESSAGE MONITORING VIEW, CUSTOMS ARRANGEMENT, AND FREIGHT LIST BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In one aspect, a tangible computer readable medium includes program code for providing a message-based interface for exchanging information related to a view used for monitoring a business document message, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for a notification about a transmission status of the business document message that includes a first message package derived from the common business object model and hierarchically organized in memory as: a business document message status notification message entity and a business document message status package that includes a business document message status entity and a technical message reference package includes a technical message reference entity. The business document message status entity includes an action code, a business document message identifier (ID), a message type code, a business document message transmission status code and a transmission completed indicator, and where the technical message reference entity includes a message ID, a sender party ID and a recipient party ID. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The business document message status entity further includes at least one of the following: a reference business document message identifier, a business document message direction code, a business document message creation date time, a business document message transmission status last change date time, and a business document message transmission status reason description. The business document message status package further includes a party package.

In another aspect, a distributed system operating in a landscape of computer systems providing message-based services defined in a service registry, the system includes a graphical user interface includes computer readable instructions, embedded on tangible media, for a notification about a transmission status of a business document message using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a business document message status notification message entity. The system further includes a business document message status package includes a business document message status entity and a technical message reference package includes a technical message reference entity. The business document message status entity includes an action code, a business document message identifier (ID), a message type code, a business document message transmission status code, and a transmission completed indicator, and where the technical message reference entity includes a message ID, a sender party ID, and a recipient party ID. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

In another aspect, a tangible computer readable medium includes program code for providing a message-based interface for exchanging information regarding an arrangement by a customs authority for a business partner for submitting and processing customs declarations for customs-relevant goods movement, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for requesting information regarding an arrangement by the customs authority for the business partner for submitting and processing customs declarations for customs-relevant goods movement that includes a first message package derived from the common business object model and hierarchically organized in memory as: a customs arrangement request message entity. The system further includes a customs arrangement package includes a customs arrangement entity. The customs arrangement entity includes an identifier (ID), a party universally unique identifier (UUID), a party key, a customs authority country code, a key, a customs authentication ID, a customs export software version code, and system administrative data. The system further includes program code for processing the first message according to the hierarchical organization of the first message package. Processing the first message includes unpacking the first message package based on the common business object model. The system further includes program code for sending a second message to the heterogeneous application responsive to the first message. The second message includes a second message package derived from the common business object model to provide consistent semantics with the first message package.

Implementations can include any, all, or none of the following features. The customs arrangement package further includes at least one of the following: a customs authorization package, a contact party package, an attachment folder package, and a text collection package.

In another aspect, a distributed system operating in a landscape of computer systems providing message-based services defined in a service registry, the system includes a graphical user interface includes computer readable instructions, embedded on tangible media, for requesting information regarding an arrangement by a customs authority for a business partner for submitting and processing customs declarations for customs-relevant goods movement using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a customs arrangement request message entity. The system further includes a customs arrangement package includes a customs arrangement entity. The customs arrangement entity includes an identifier (ID), a party universally unique identifier (UUID), a party key, a customs authority country code, a key, a customs authentication ID, a customs export software version code, and system administrative data. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

In another aspect, a tangible computer readable medium includes program code for providing a message-based interface for exchanging information for a document detailing a list of shipped goods that are to be transported, one or more business partners, and a mode of transportation, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for notification about the creation of a waybill that is sent to an output channel that includes a first message package derived from the common business object model and hierarchically organized in memory as: a form waybill notification message entity and a freight list package that includes a freight list entity and a delivery package. The freight list entity includes an identifier, and where the delivery package includes a grand total weight and a grand total volume. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The freight list package further includes at least one of the following: a ship from location package, a ship to location package, a bill to party package, a freight forwarder party package, a product recipient party package, an attachment folder document package, and a form freight list predefined extension package. The freight list entity includes at least one of the following: a cash on delivery amount, a declared amount, a freight charges prepaid indicator, a cash on delivery fee prepaid indicator, a customer check allowed indicator, a third party initiated action indicator, a freight loader party role category code, a loaded by description, a freight counting code, a counted by description, incoterms, seal IDs, a truck ID, a trailer ID, a transport mode code, a transport mode name, a total gross weight, a total gross volume, a shipping date time, a creation date time, a print date time, a shippers instruction text, a special agreements text, a material content description text, an internal text, and a ship from location.

In another aspect, a distributed system operating in a landscape of computer systems providing message-based services defined in a service registry, the system includes a graphical user interface includes computer readable instructions, embedded on tangible media, for notification about the creation of a waybill that is sent to an output channel using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a form waybill notification message entity. The system further includes a freight list package includes a freight list entity and a delivery package. The freight list entity includes an identifier, and where the delivery package includes a grand total weight and a grand total volume. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

BRIEF DESCRIPTION OF THE DRAWINGS

FIGS. 33-1 through 33-9 show an example configuration of an Element Structure that includes a BusinessDocumentMessageStatusNotification package.

FIGS. 34-1 through 34-4 depict an example object model for a business object Customs Arrangement.

FIGS. 35-1 through 35-5 depicts an example object model for a business object Freight List.

FIGS. 36-1 through 36-3 depict an example Form Waybill Notification Message Data Type.

FIGS. 37-1 through 37-4 depict an example Waybill Notification Message Data Type.

FIGS. 38-1 through 38-147 show an example configuration of an Element Structure that includes a FormWaybillNotification package.

FIGS. 39-1 through 39-145 show an example configuration of an Element Structure that includes a WaybillNotification package.

DETAILED DESCRIPTION

A. Overview

Figure 1:
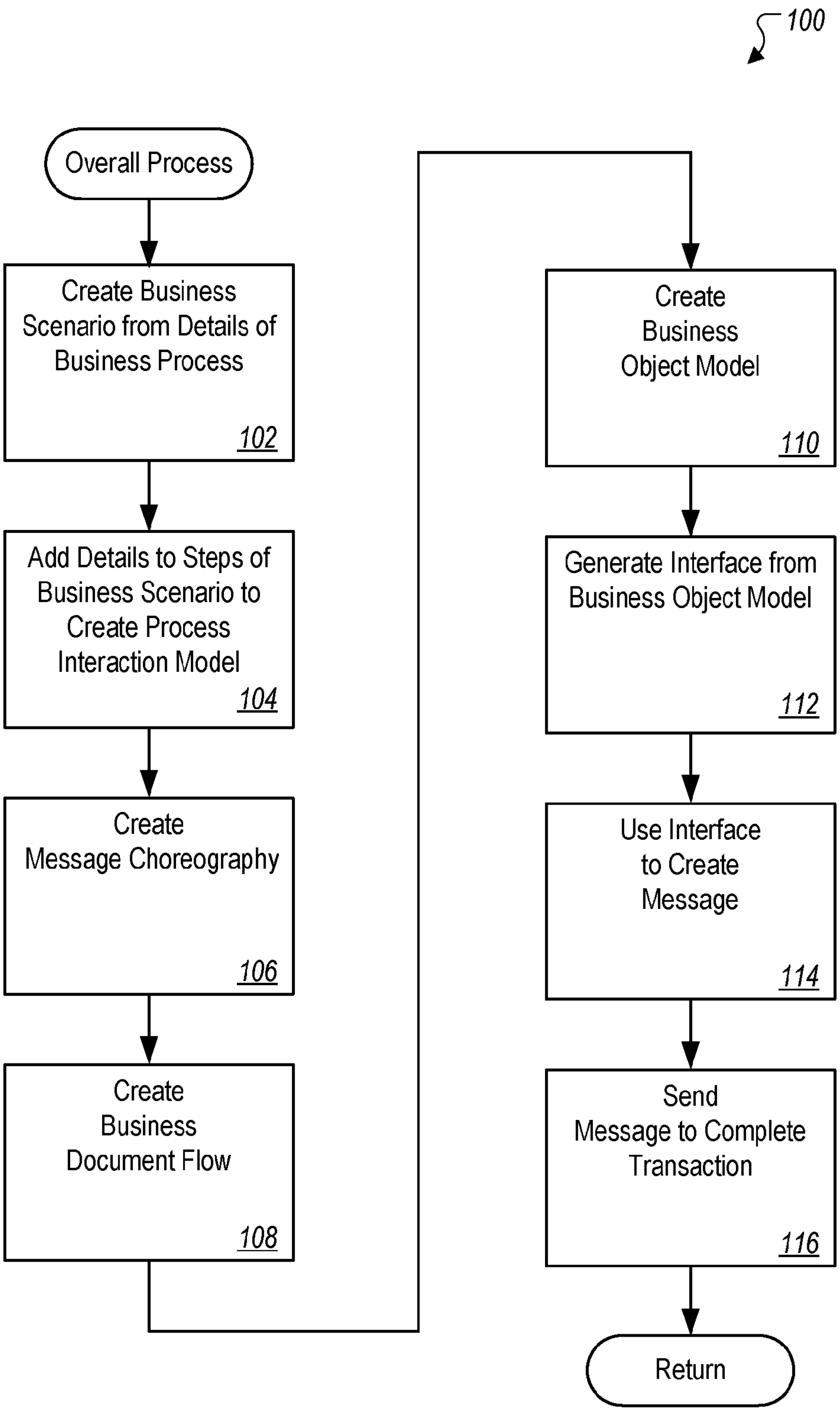
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
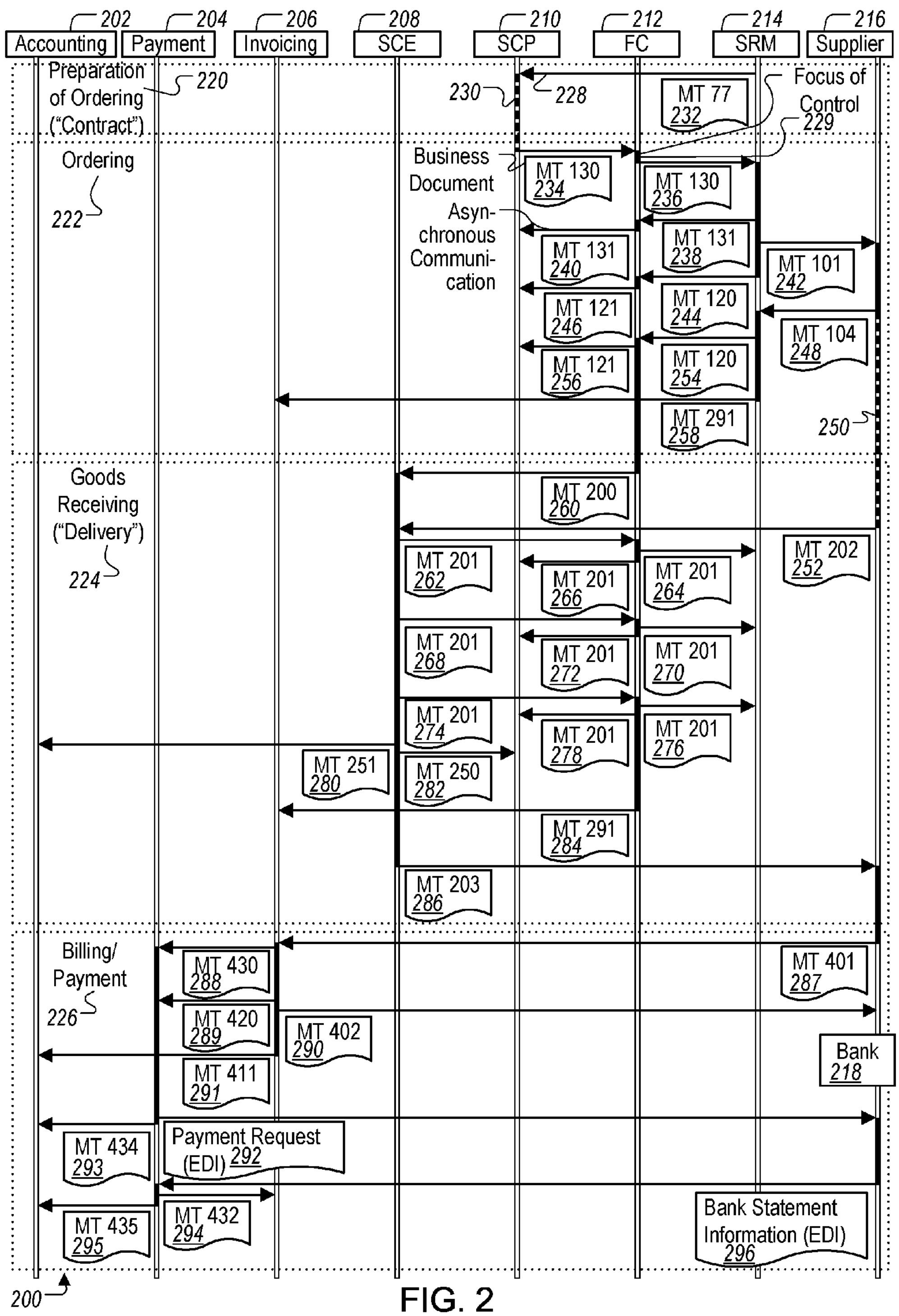
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
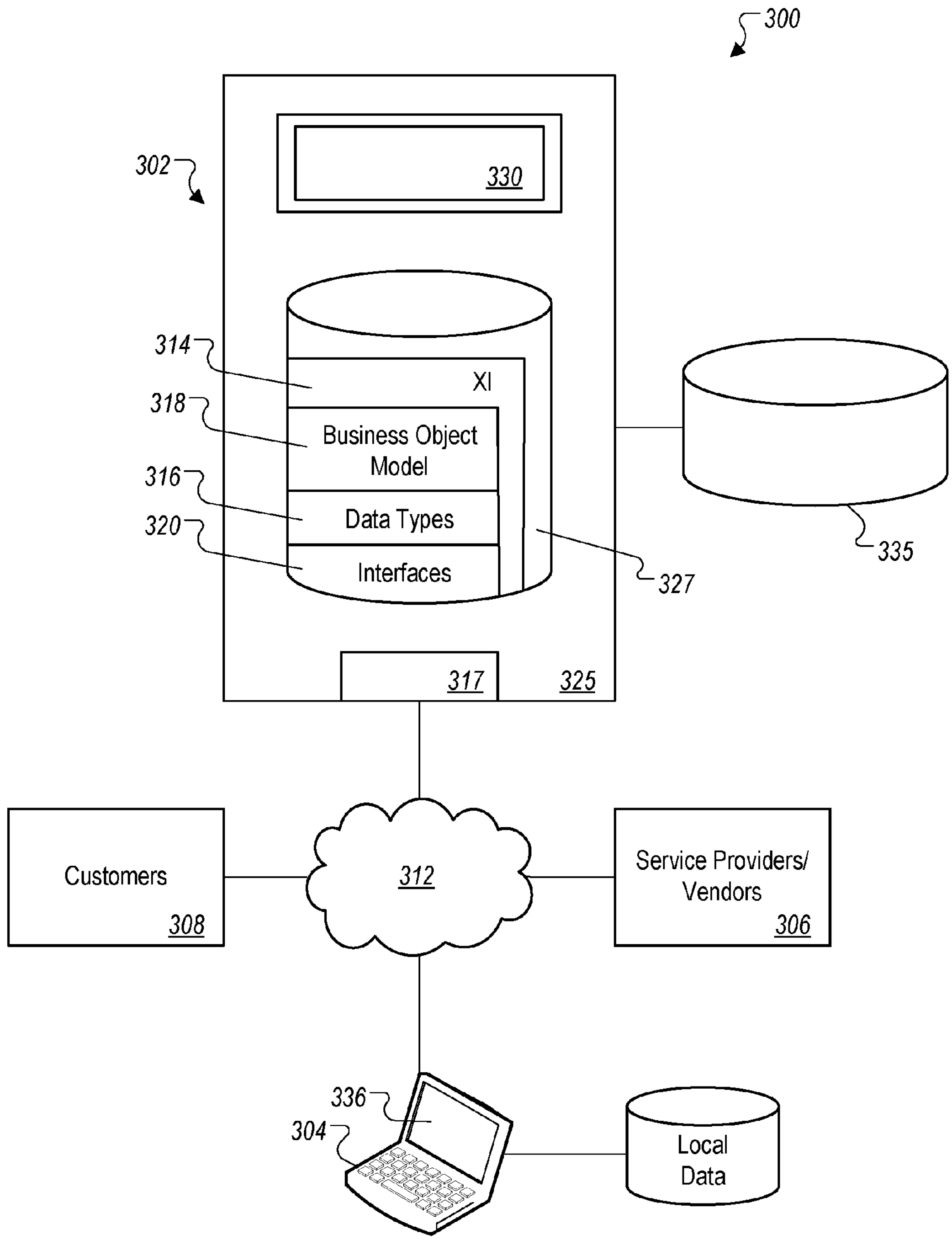
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
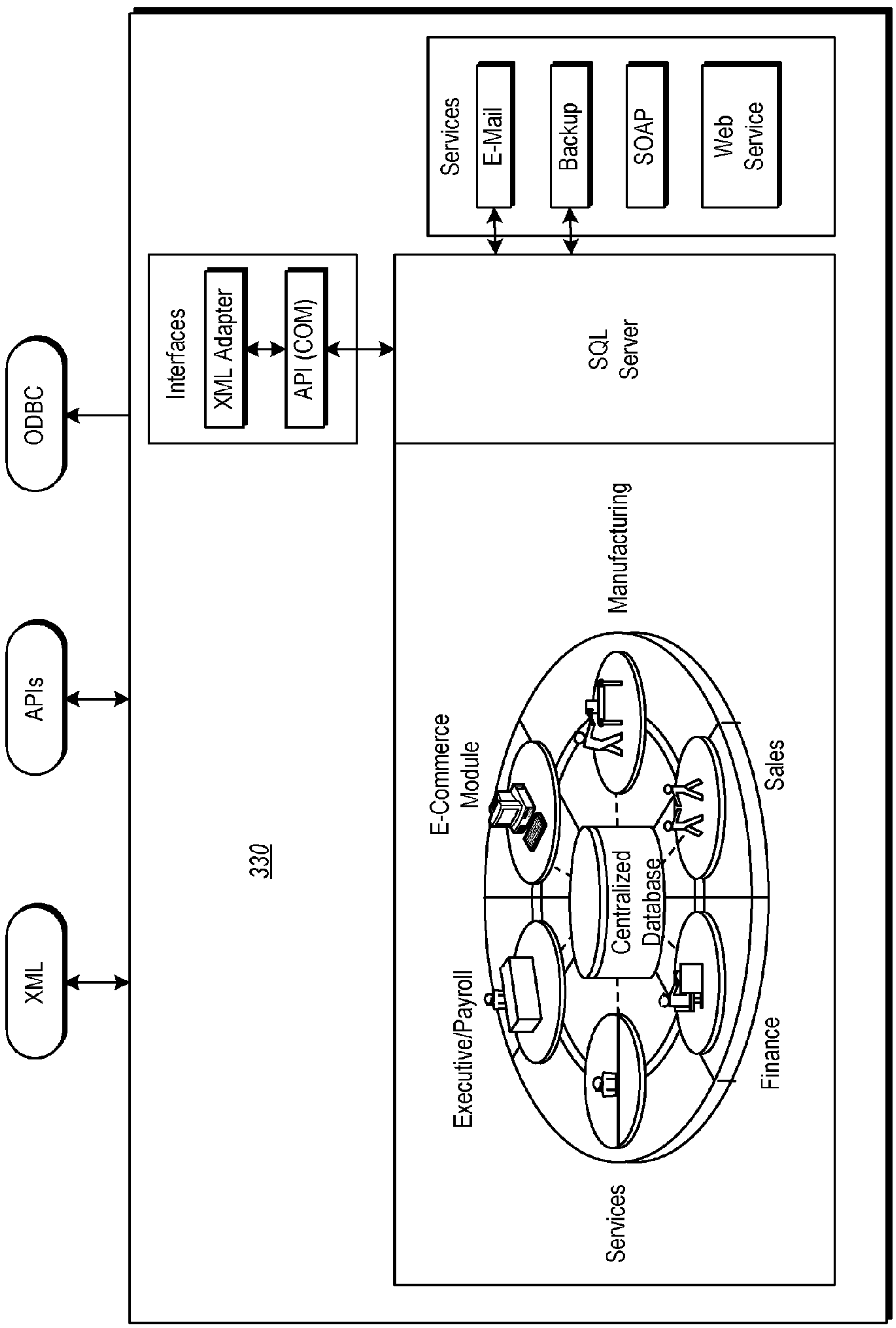
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
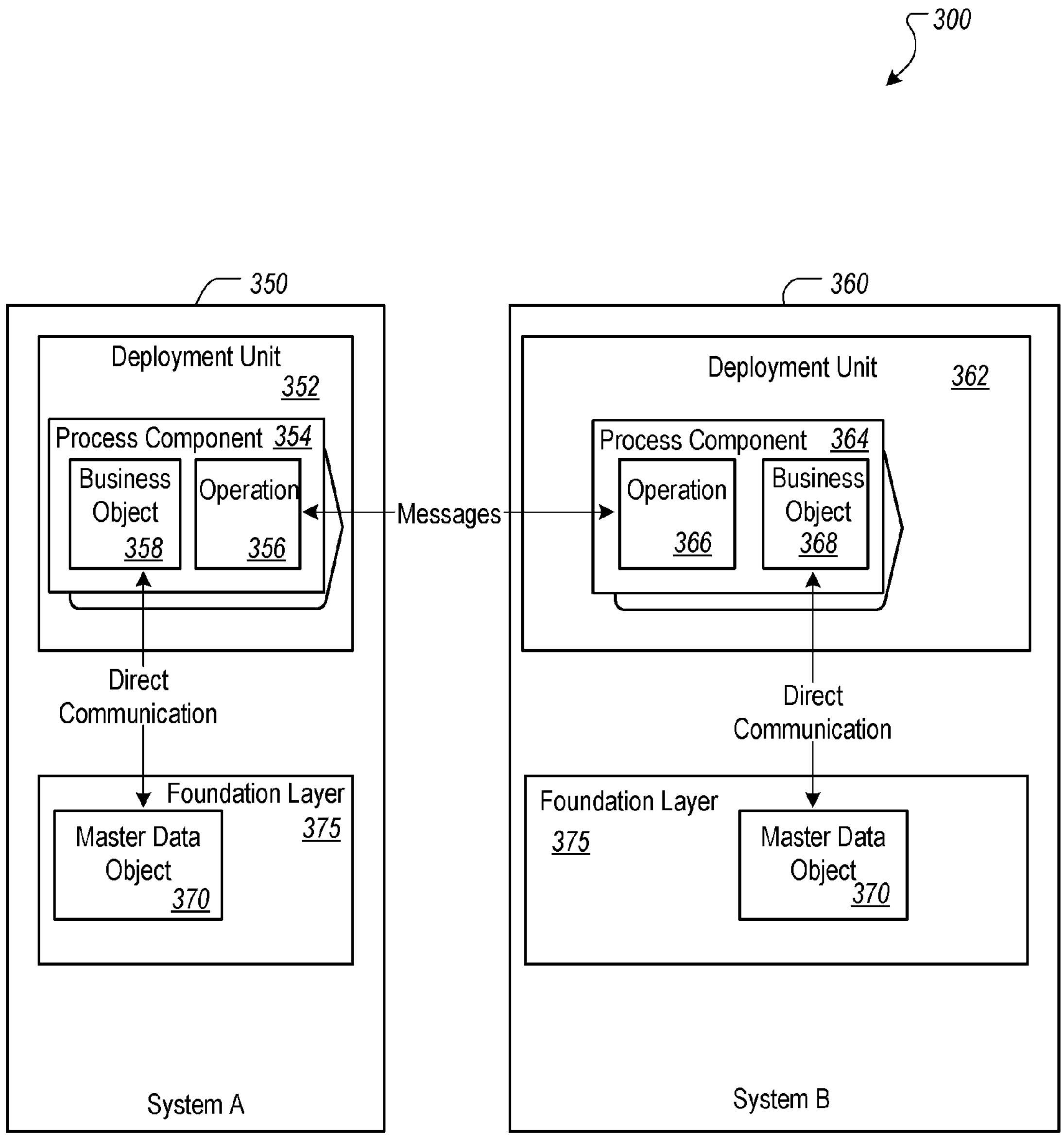

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
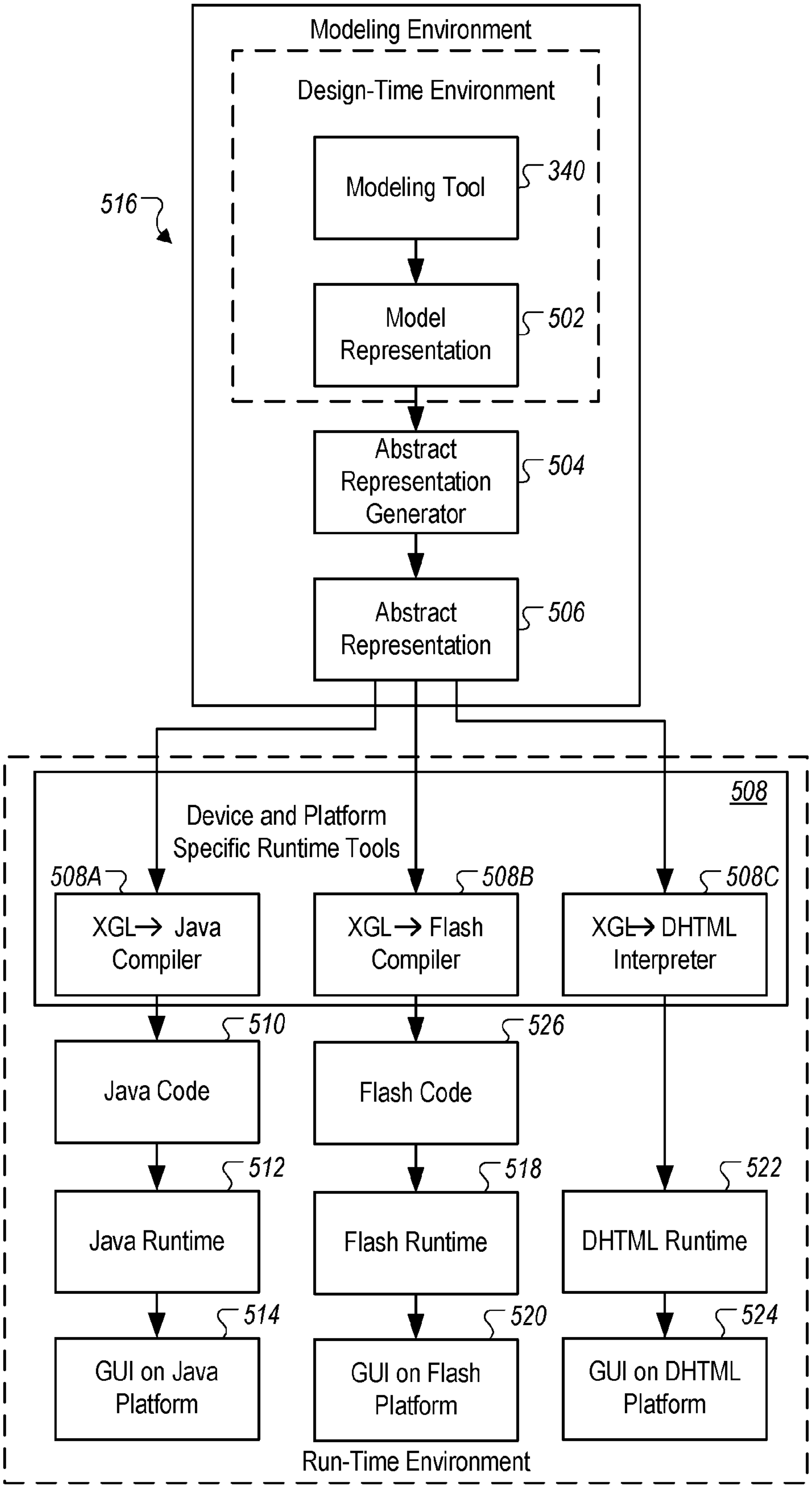
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 may be a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
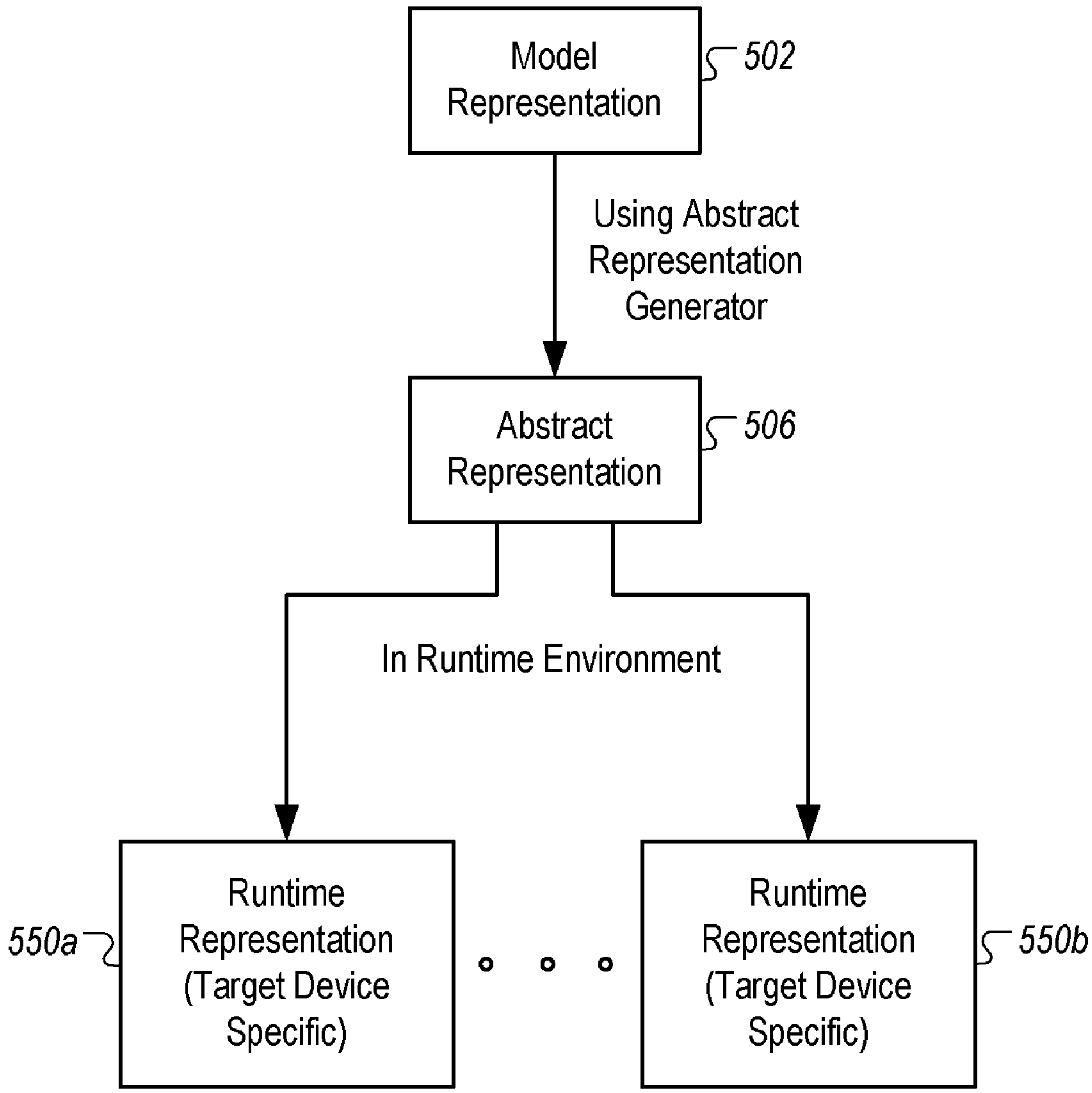
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
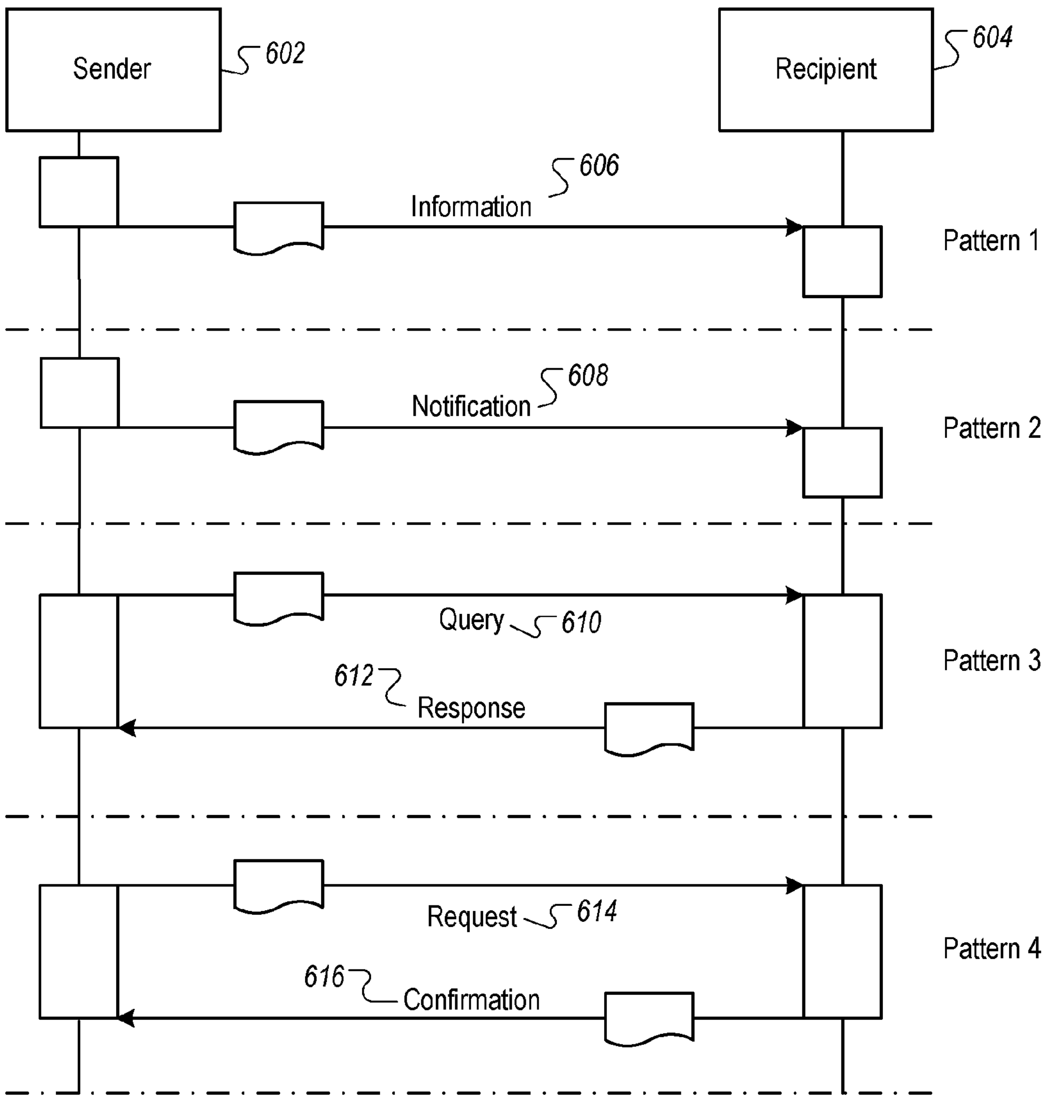
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
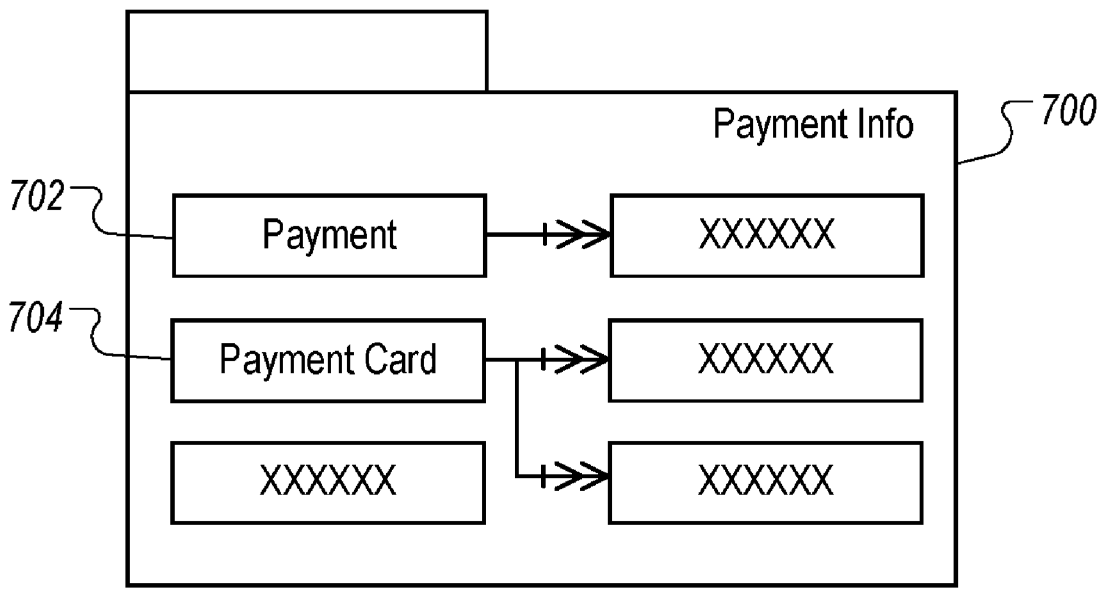
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
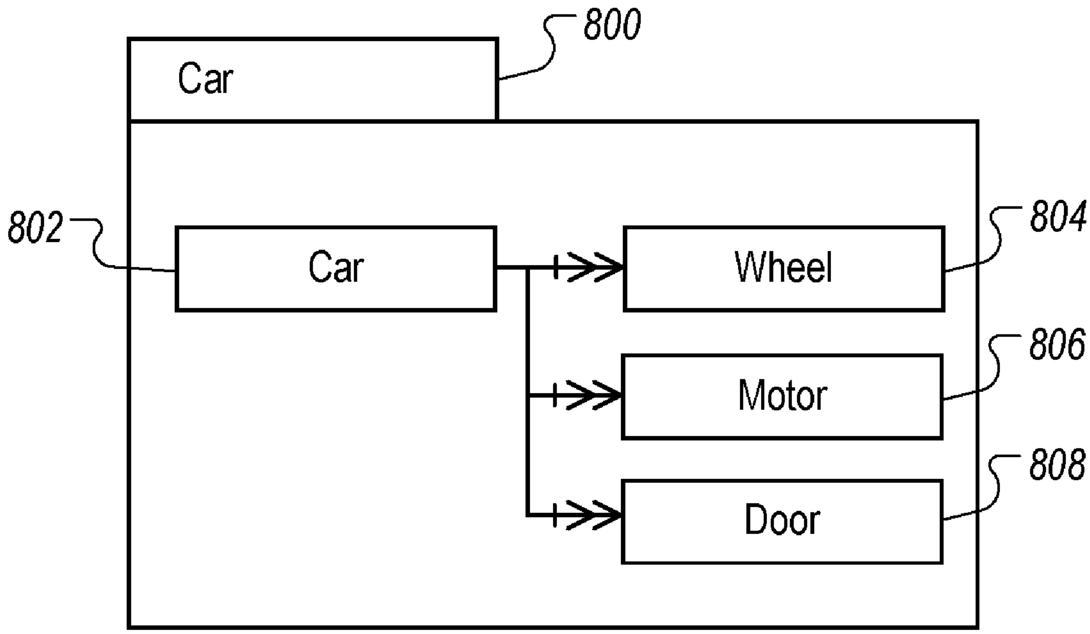
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
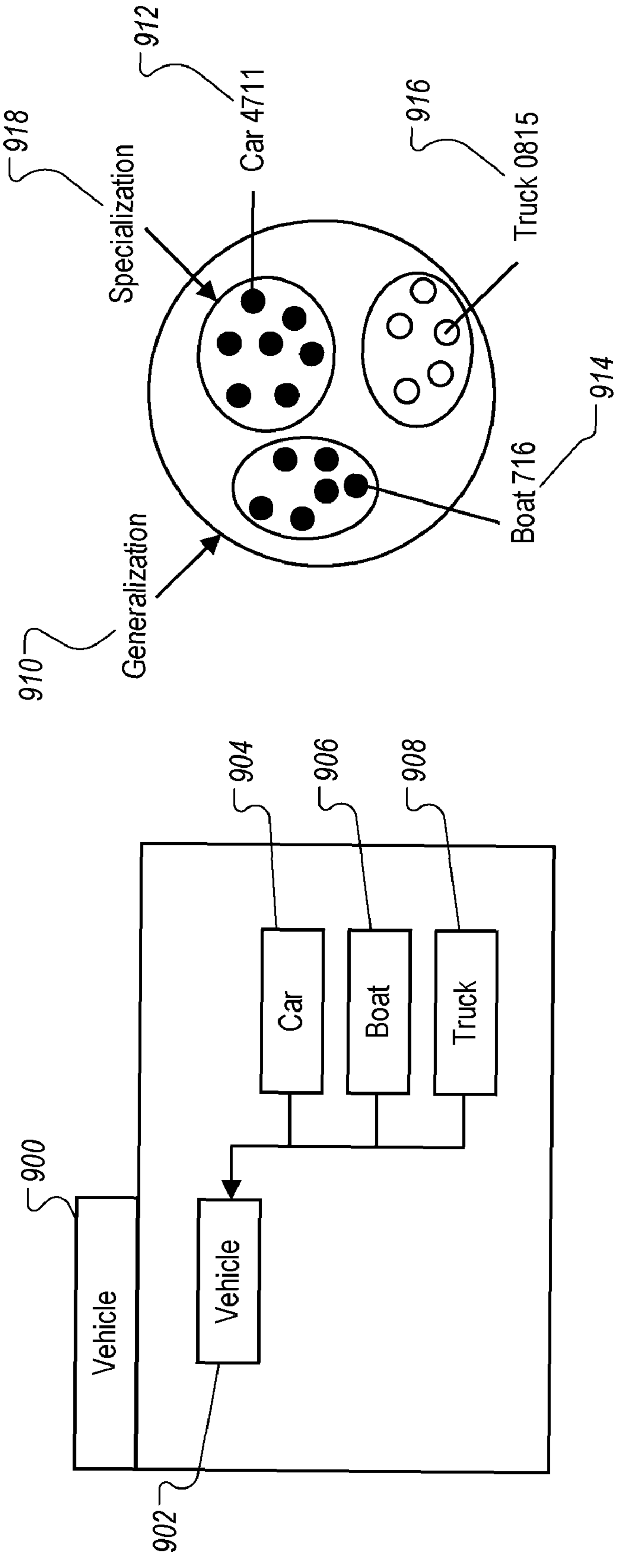
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
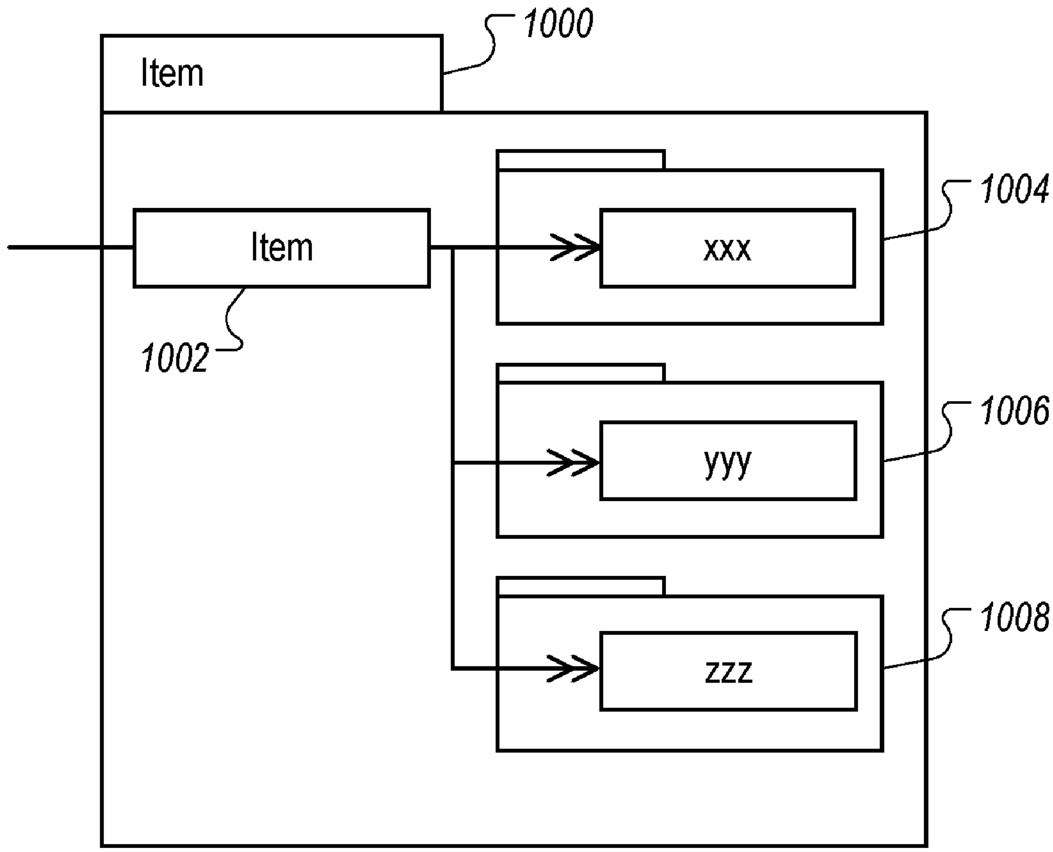
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
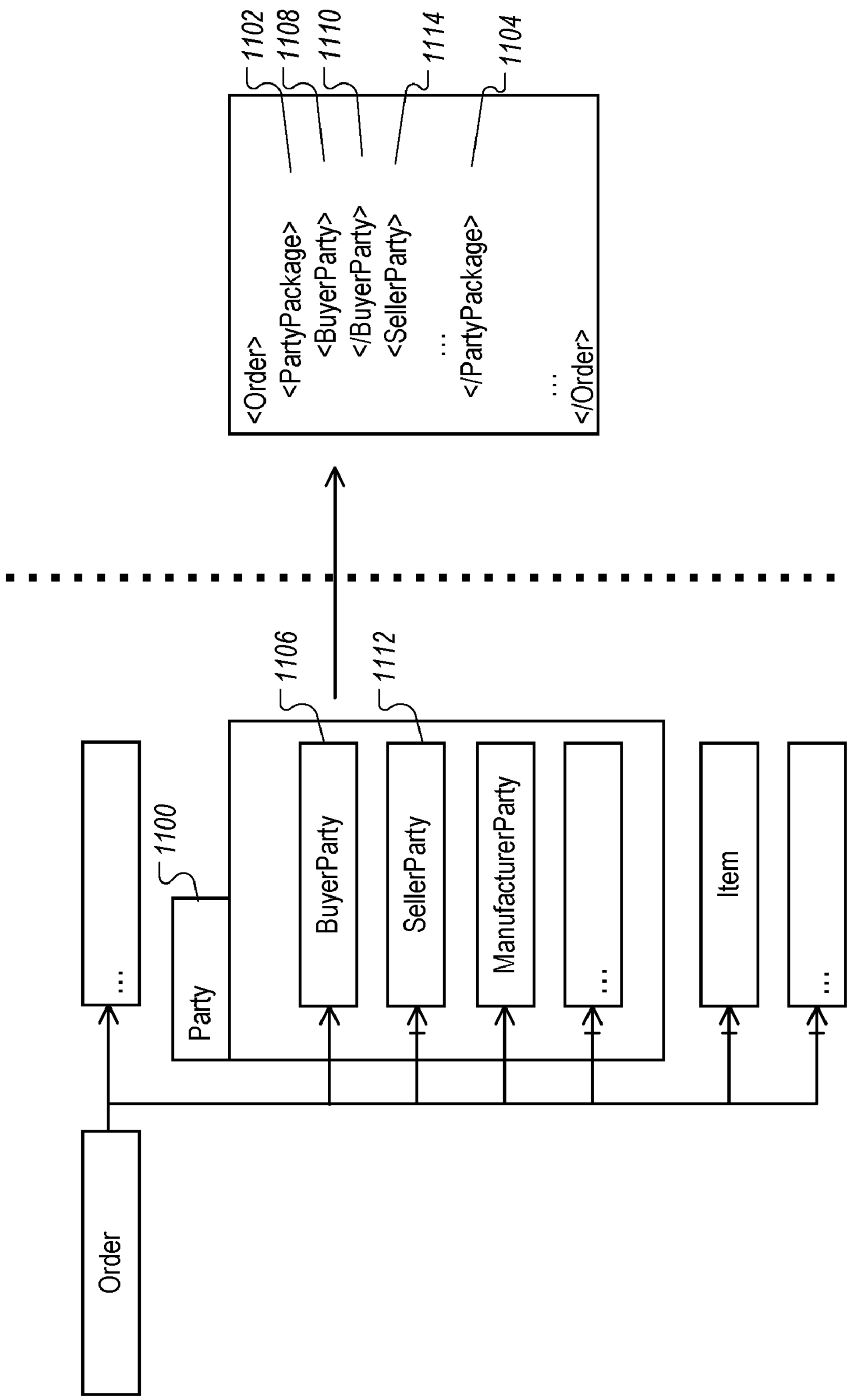
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
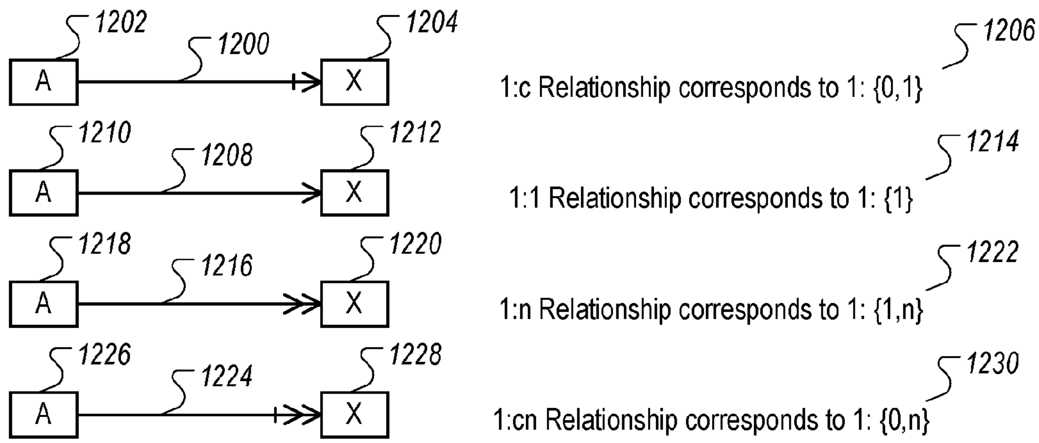
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
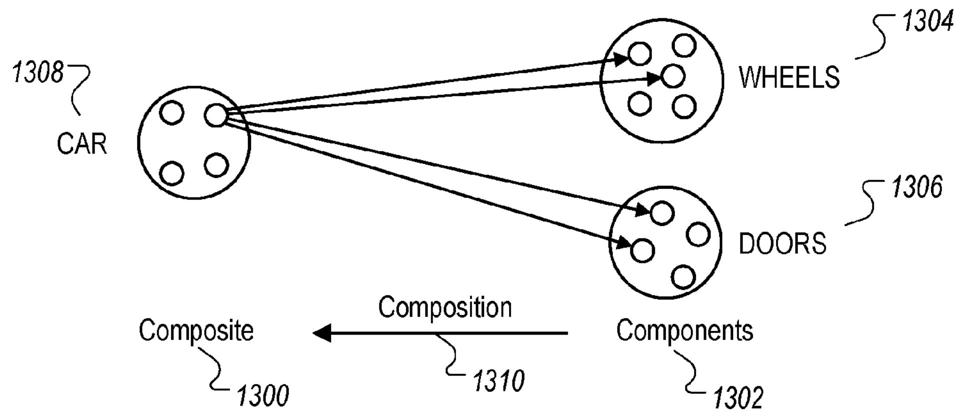
FIG. 13 depicts an example of a composition in accordance with methods and systems consistent with the subject matter described herein.
Figure 14:
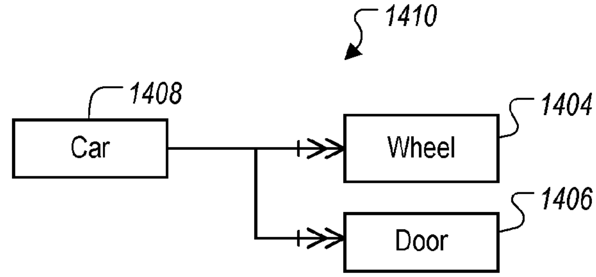
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
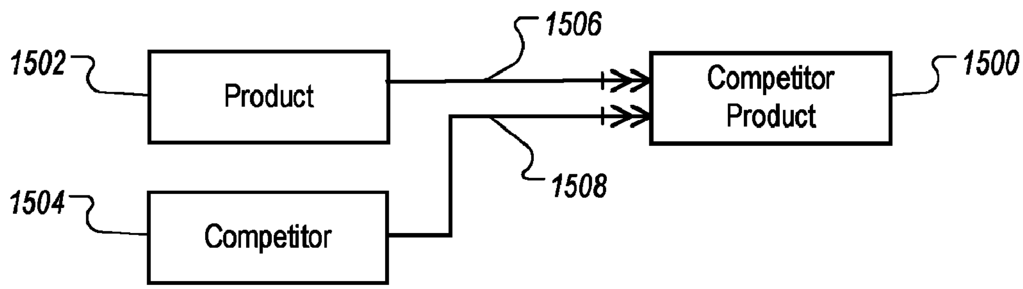
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
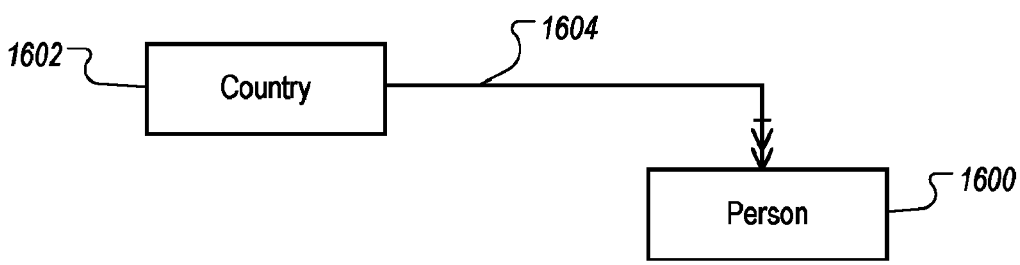
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
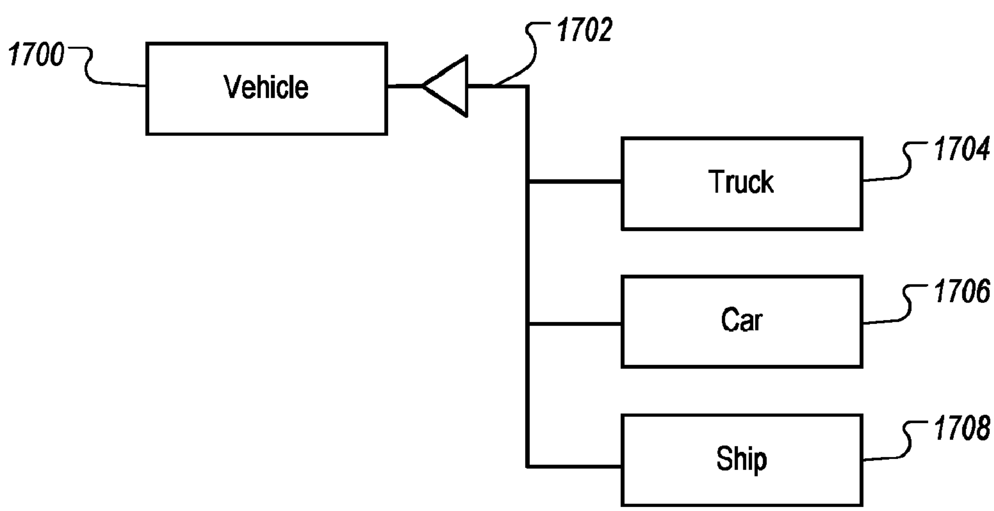
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
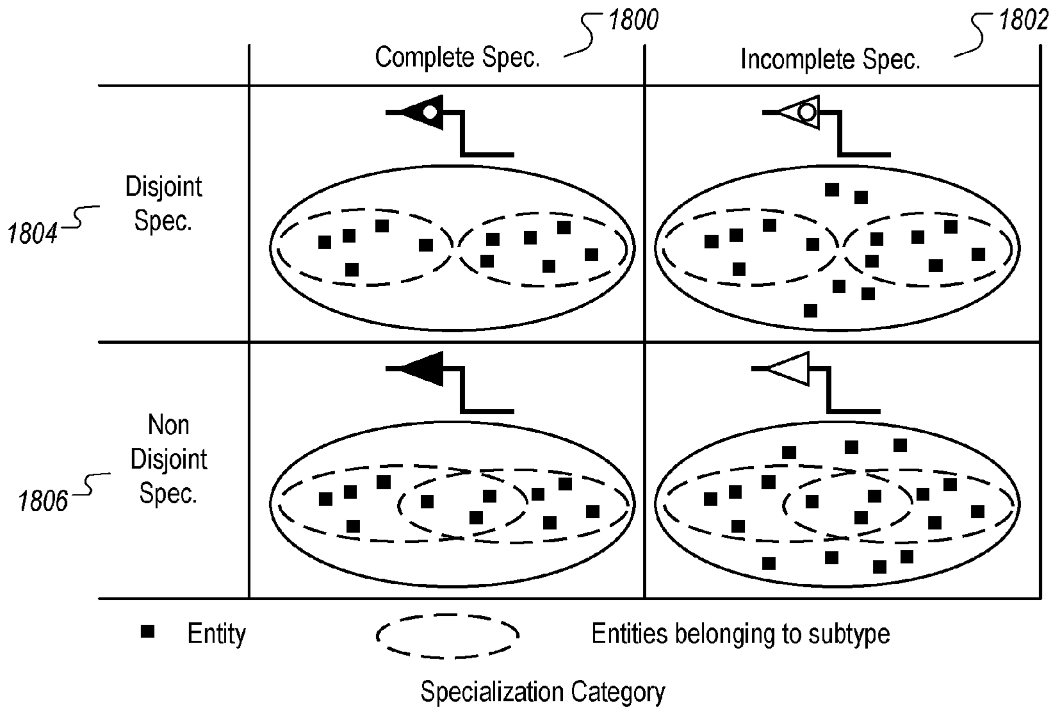
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
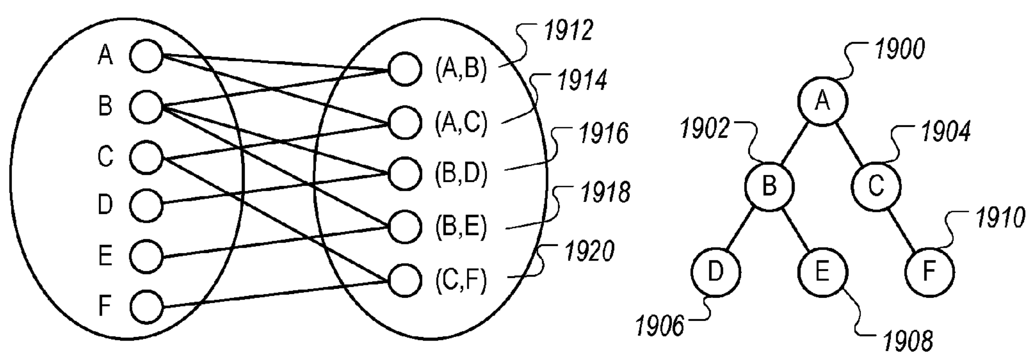
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
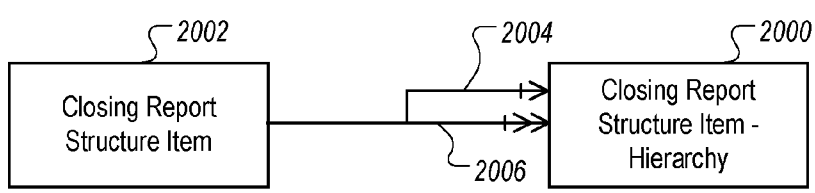
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
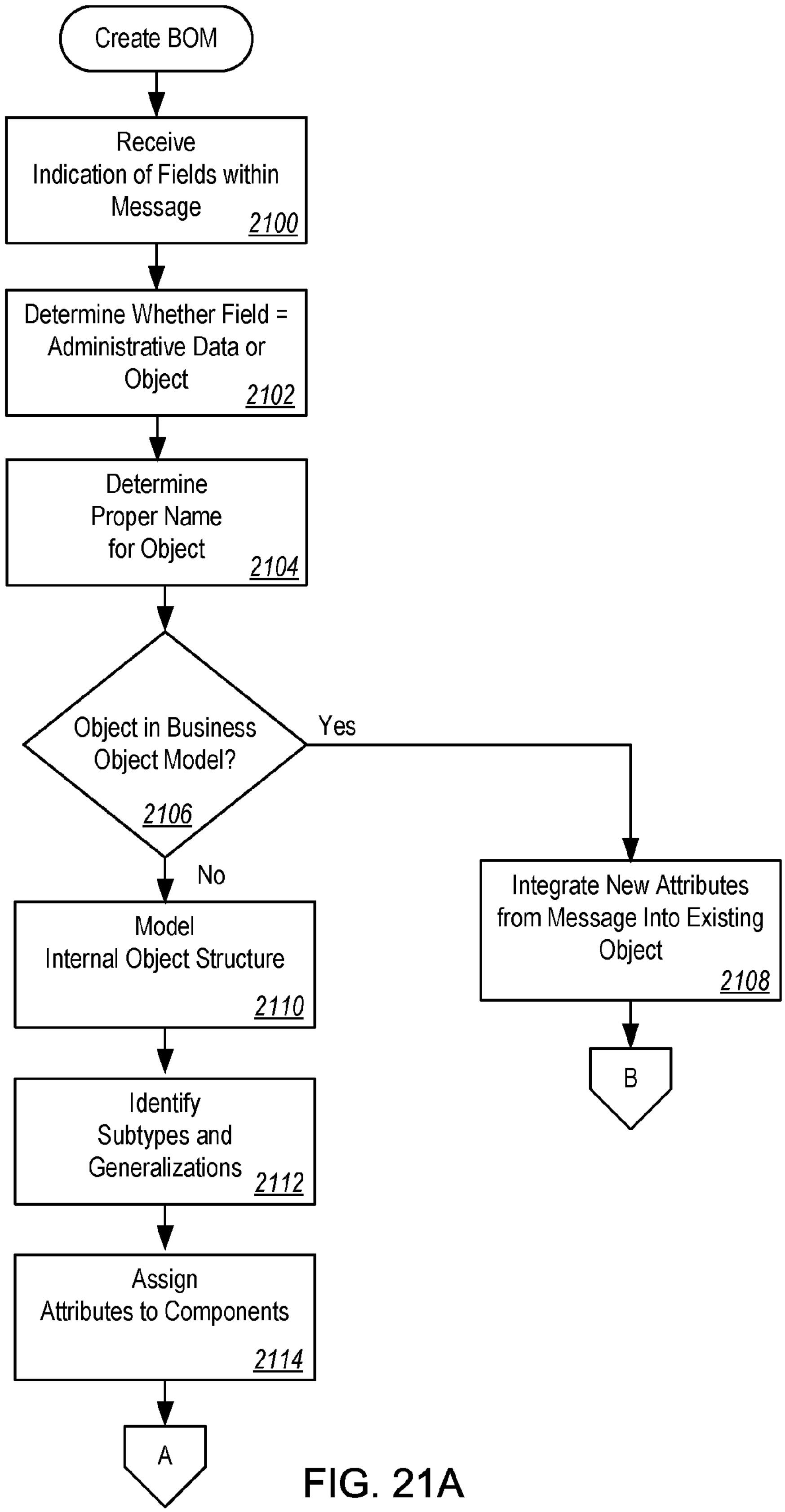
FIGS. 21A-B depict a flow diagram of the steps performed to create a business object model in accordance with methods and systems consistent with the subject matter described herein.
Figure 21B:
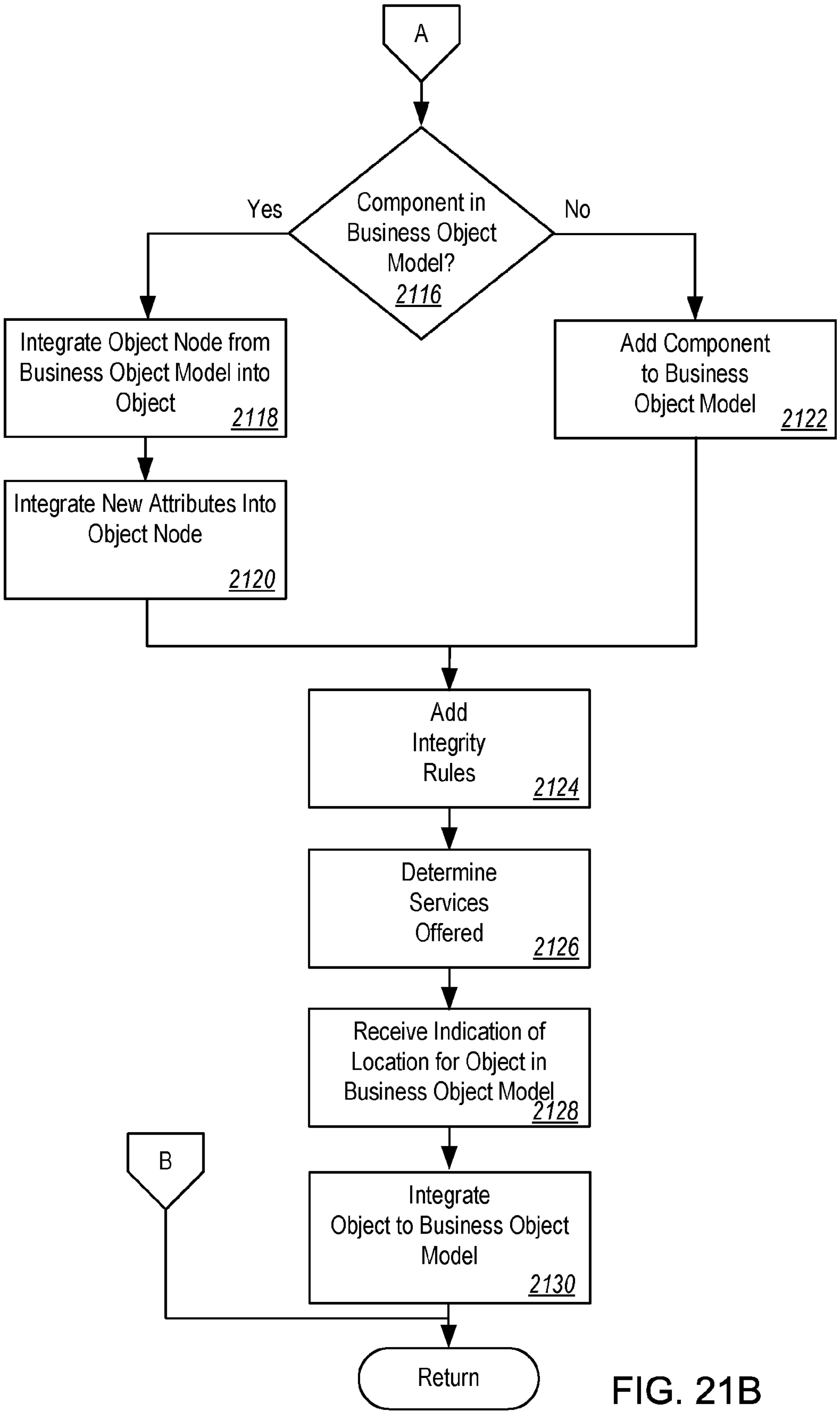

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |

-continued

| |
|---|
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobileNumber |
| Facsimile |
| Email |
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |

-continued

| |
|---|
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Pur- | |
| AdditionalID | chase | |
| PostingDate | Order | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |

-continued

| | | |
|---|---|---|
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |

-continued

| | |
|---|---|
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |

-continued

| | | | | |
|---|---|---|---|---|
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | |
|---|---|---|---|---|
| Purchase Order | | | | 1 |
| | PurchaseOrder Update | | | |
| | | PurchaseOrder Request | | |
| | | PurchaseOrder Change | | |
| | | PurchaseOrder Confirmation | | |
| | PurchaseOrder Cancellation | | | |
| | PurchaseOrder Information | | | |
| | Party | | | |
| | | BuyerParty | | 0 . . . 1 |
| | | | Address | 0 . . . 1 |
| | | | ContactPerson | 0 . . . 1 |
| | | | Address | 0 . . . 1 |
| | | SellerParty | | 0 . . . 1 |
| | Location | | | |
| | | ShipToLocation | | 0 . . . 1 |
| | | | Address | 0 . . . 1 |
| | | ShipFromLocation | | 0 . . . 1 |
| | | | Address | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCash Discount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Party | | |
| | | | BuyerParty | 0 . . . 1 |
| | | | SellerParty | 0 . . . 1 |
| | | Location | | |
| | | | ShipTo Location | 0 . . . 1 |
| | | | ShipFrom Location | 0 . . . 1 |
| | | DeliveryTerms | | 0 . . . 1 |
| | | Attachment | | 0 . . . n |
| | | Description | | 0 . . . 1 |
| | | Confirmation Description | | 0 . . . 1 |
| | | ScheduleLine | | 0 . . . n |
| | | | Delivery Period | 1 |
| | | ConfirmedScheduleLine | | 0 . . . n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0 . . . 1 |
| | BuyerPosting DateTime | 0 . . . 1 |

-continued

| | |
|---|---|
| BuyerLast ChangeDate Time | 0 . . . 1 |
| SellerPosting DateTime | 0 . . . 1 |
| SellerLast ChangeDate Time | 0 . . . 1 |
| Acceptance StatusCode | 0 . . . 1 |
| Note | 0 . . . 1 |
| ItemList | 0 . . . 1 |

-continued

| | | | |
|---|---|---|---|
| Complete Transmission Indicator | | | |
| BuyerParty | | | 0 . . . 1 |
| | StandardID | | 0 . . . n |
| | BuyerID | | 0 . . . 1 |
| | SellerID | | 0 . . . 1 |
| | Address | | 0 . . . 1 |
| | ContactPerson | | 0 . . . 1 |
| | | BuyerID | 0 . . . 1 |
| | | SellerID | 0 . . . 1 |
| | | Address | 0 . . . 1 |
| SellerParty | | | 0 . . . 1 |
| Product | | | 0 . . . 1 |
| RecipientParty | | | |
| VendorParty | | | 0 . . . 1 |
| Manufacturer Party | | | 0 . . . 1 |
| BillToParty | | | 0 . . . 1 |
| PayerParty | | | 0 . . . 1 |
| CarrierParty | | | 0 . . . 1 |
| ShipTo Location | | | 0 . . . 1 |
| | StandardID | | 0 . . . n |
| | BuyerID | | 0 . . . 1 |
| | SellerID | | 0 . . . 1 |
| | Address | | 0 . . . 1 |
| ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
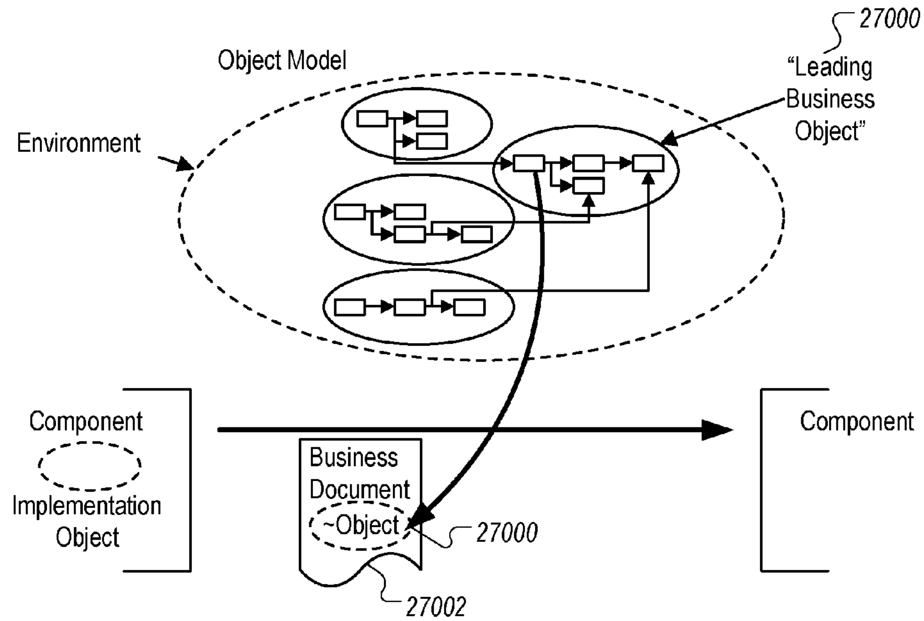
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
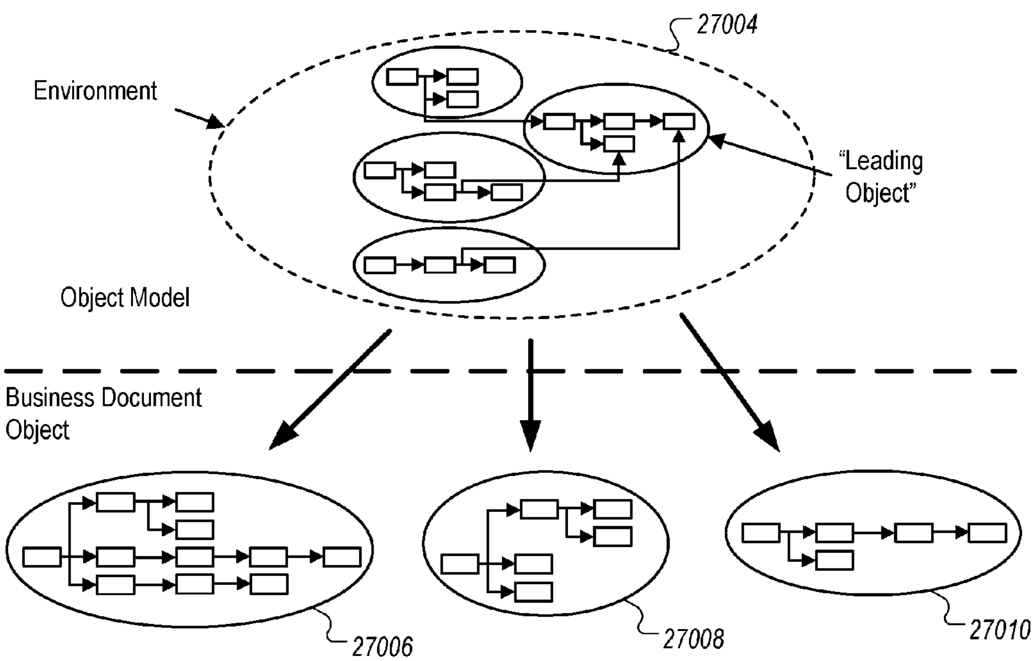

As illustrated in FIG. 27B, several business document objects 27006, 27008, and 27010 as overlapping views may be derived for a given leading object 27004. Each business document object results from the object model by hierarchization.

Figure 27C:
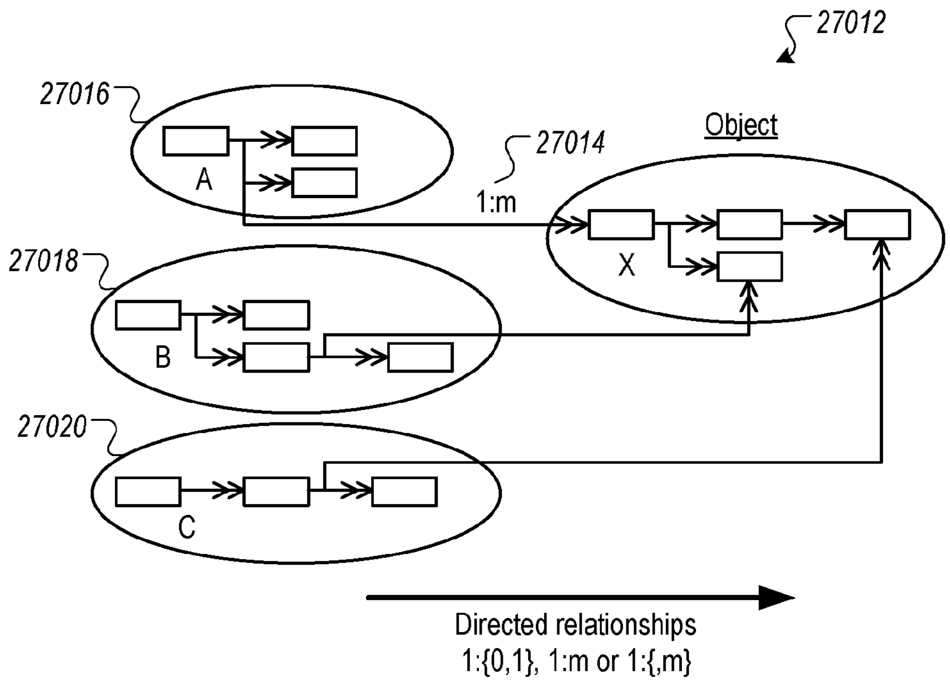

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
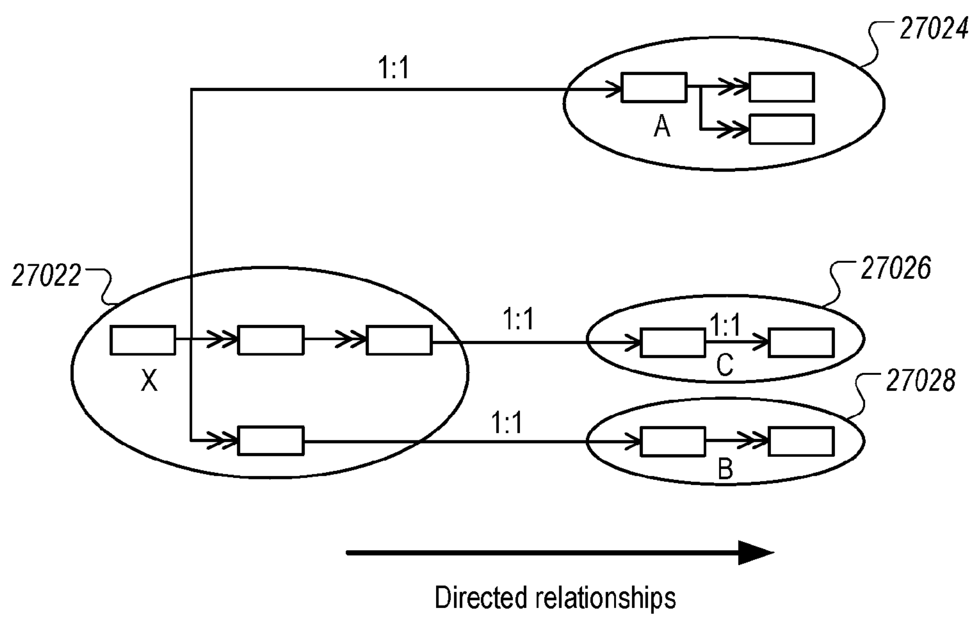

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
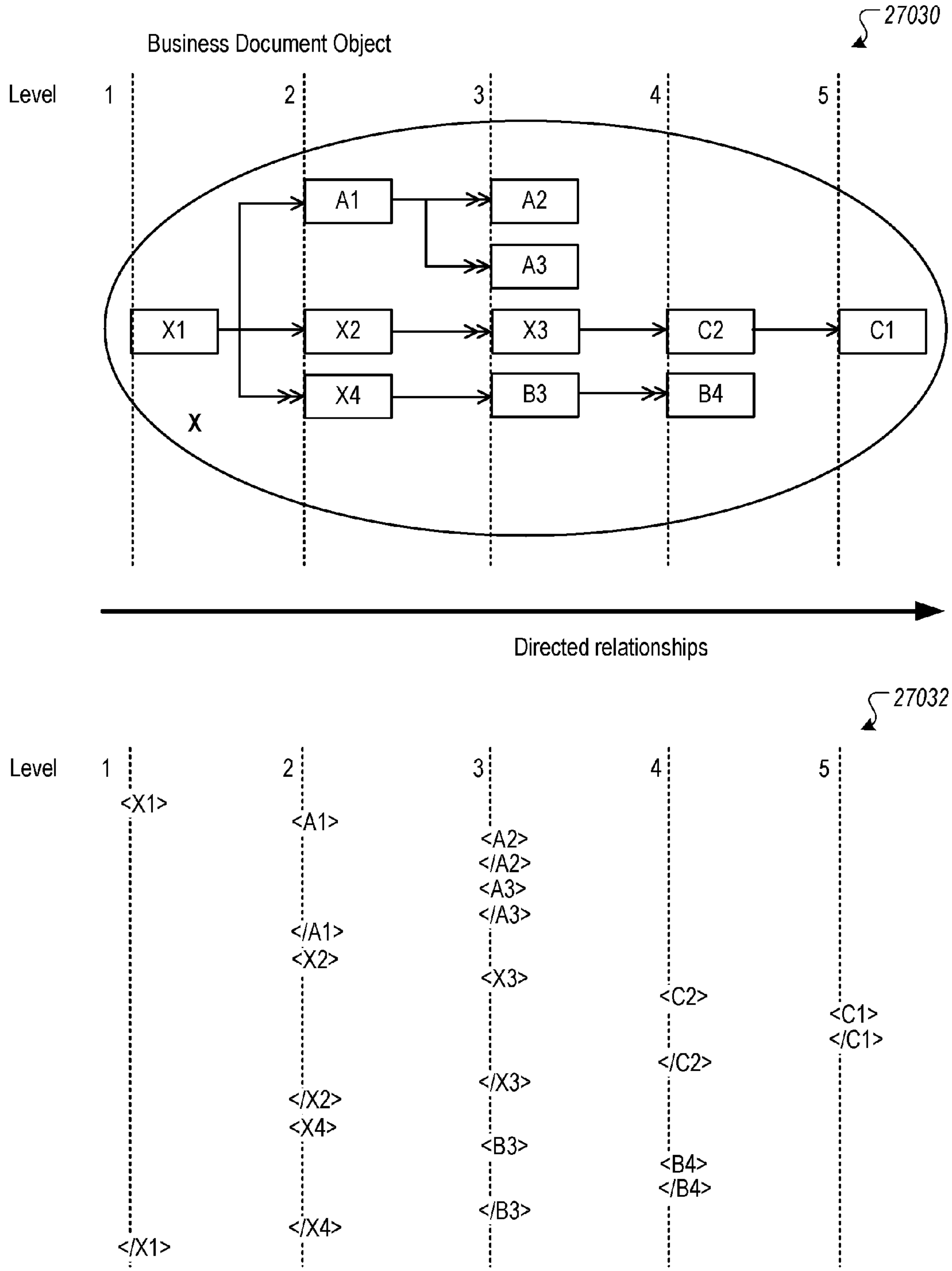

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
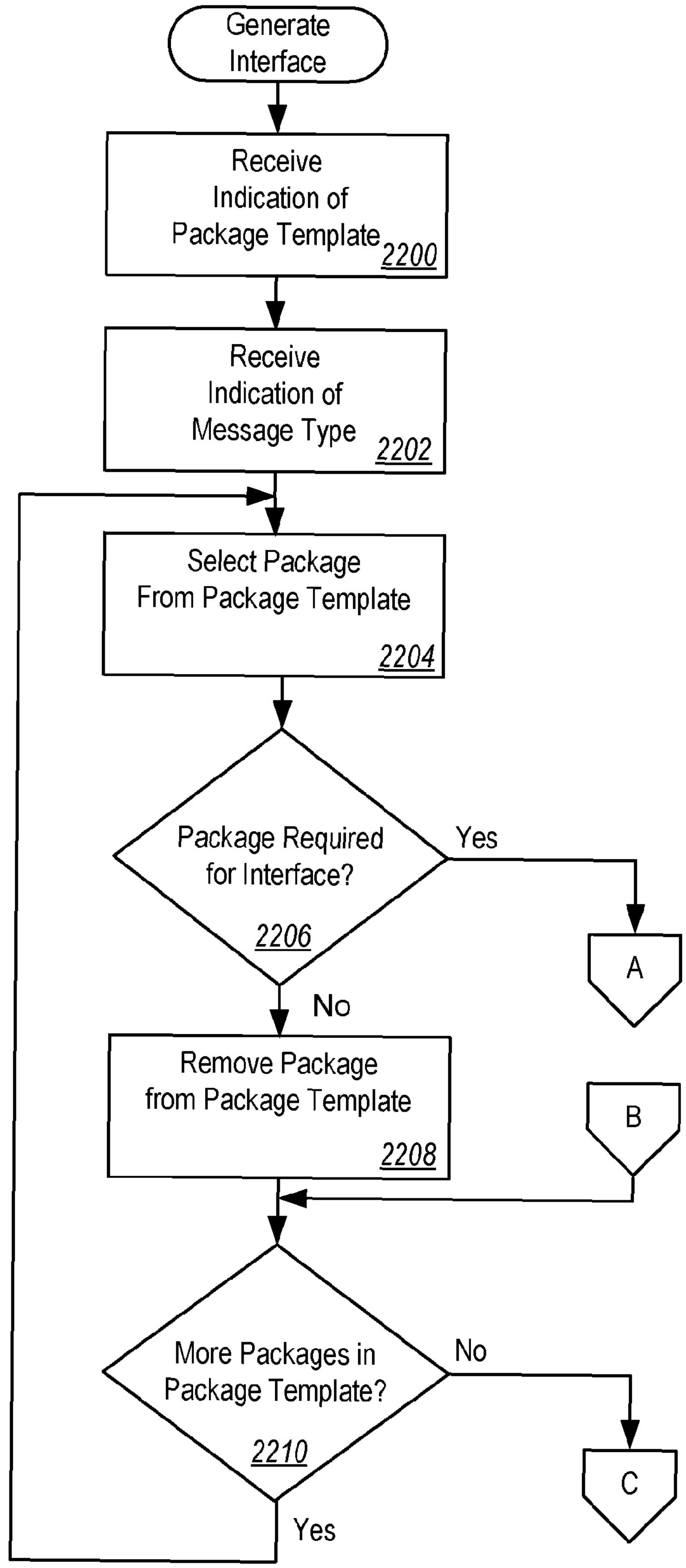
FIGS. 22A-F depict a flow diagram of the steps performed to generate an interface from the business object model in accordance with methods and systems consistent with the subject matter described herein.
Figure 22B:
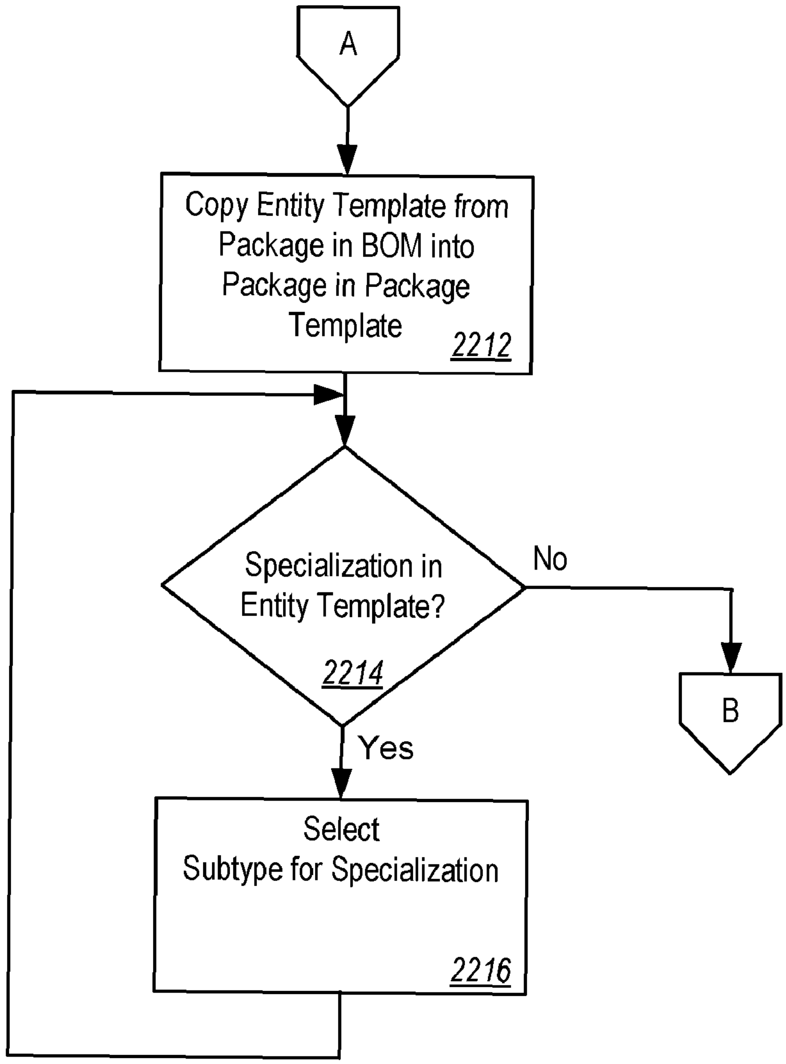
Figure 22C:
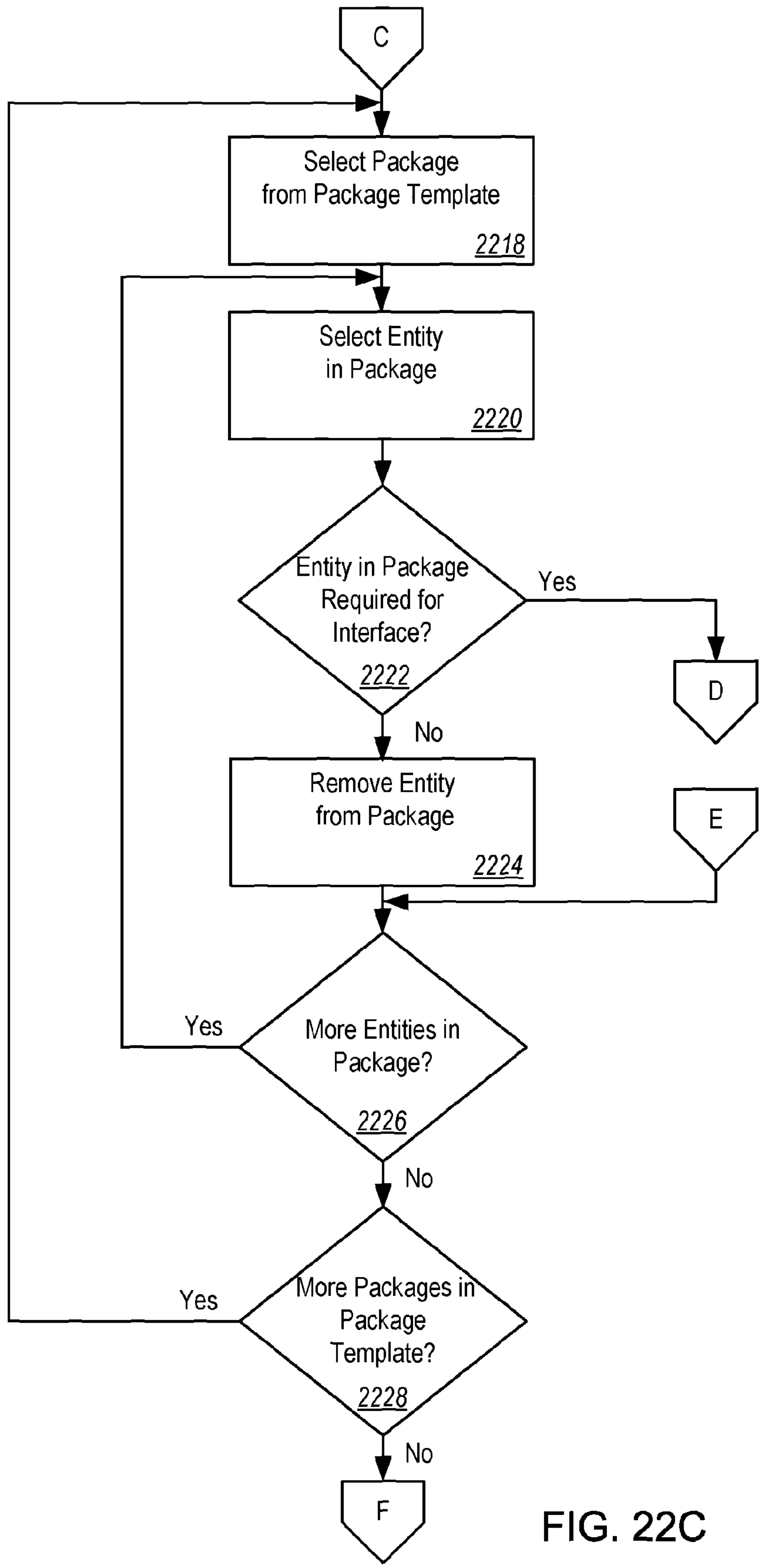

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
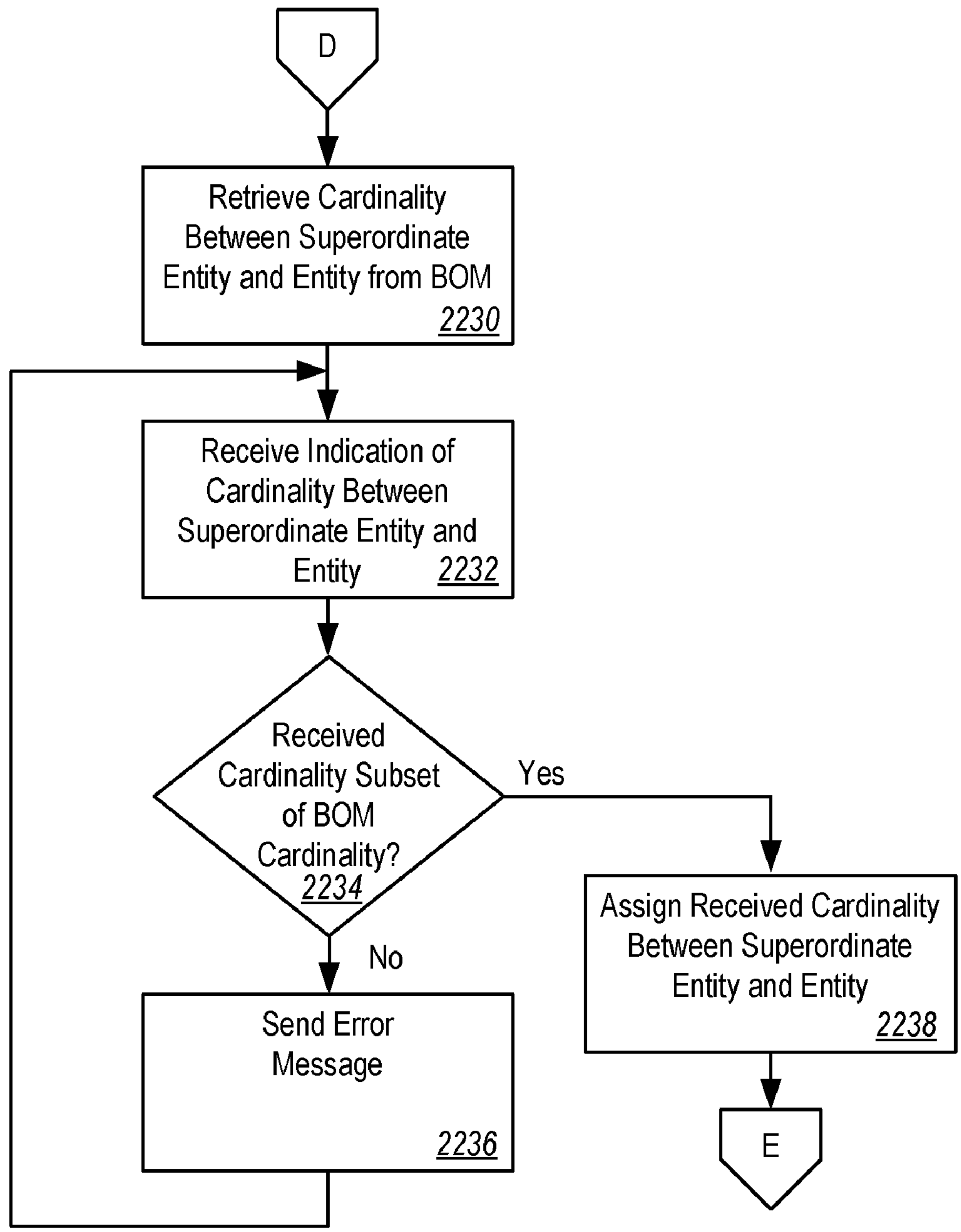

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
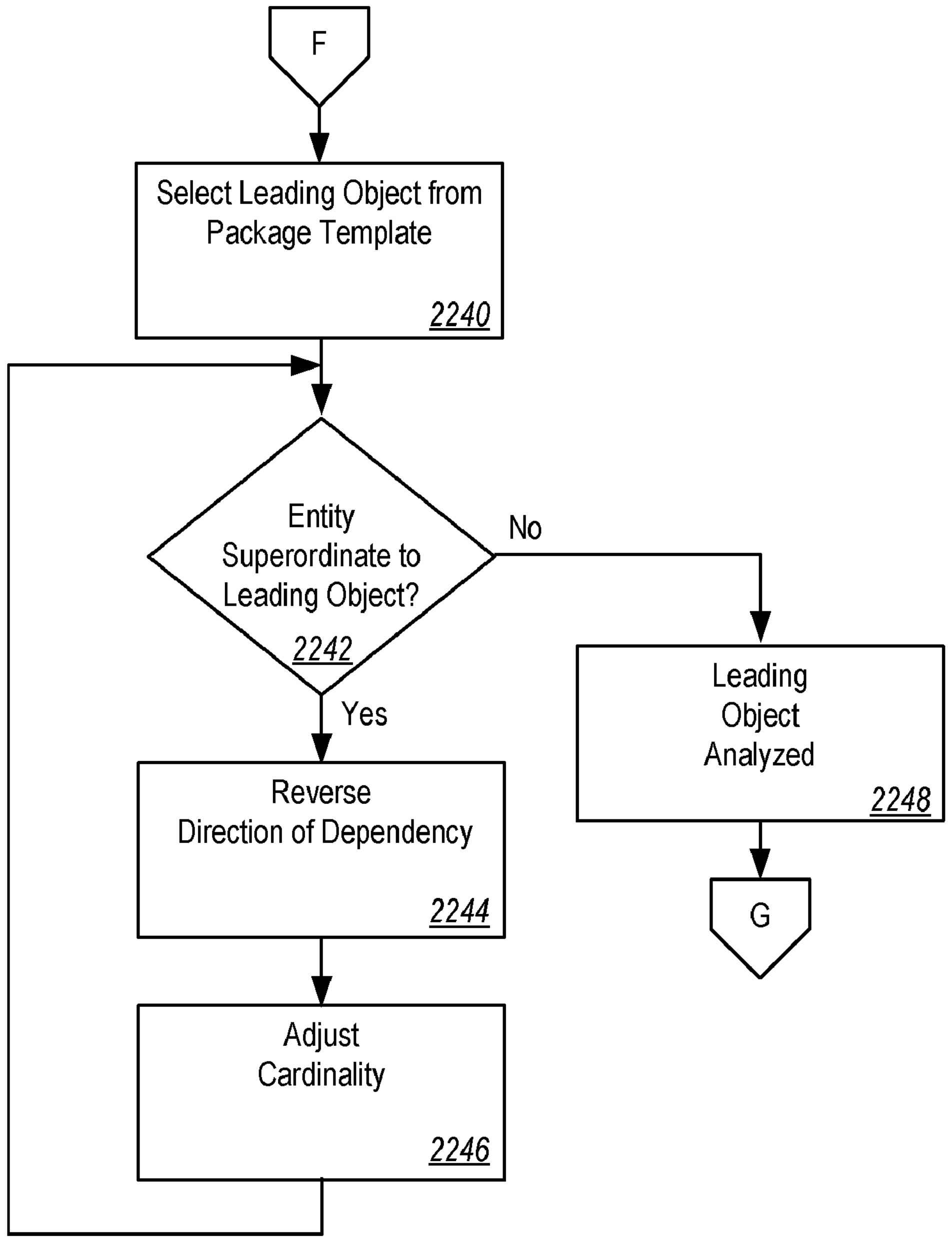

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
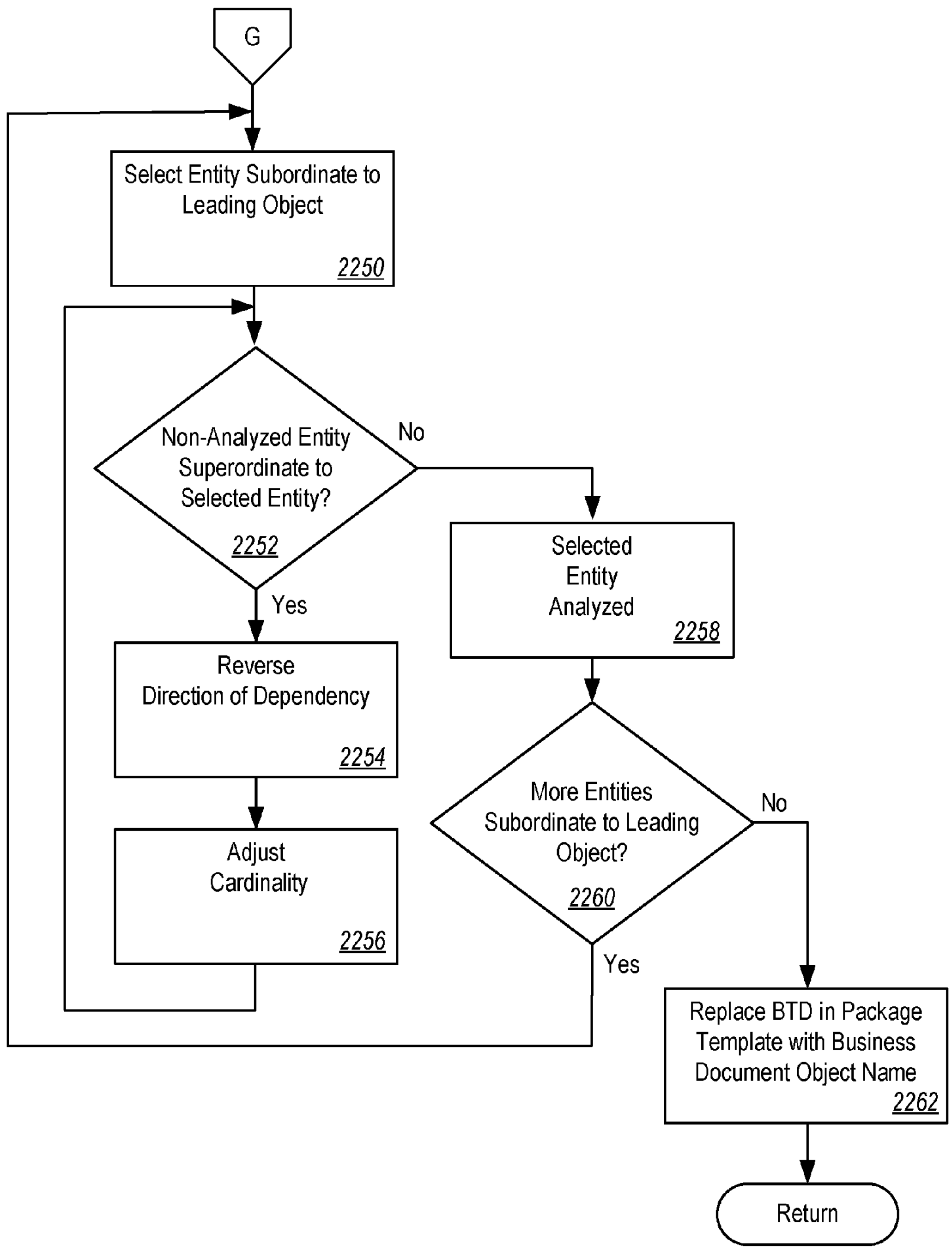

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
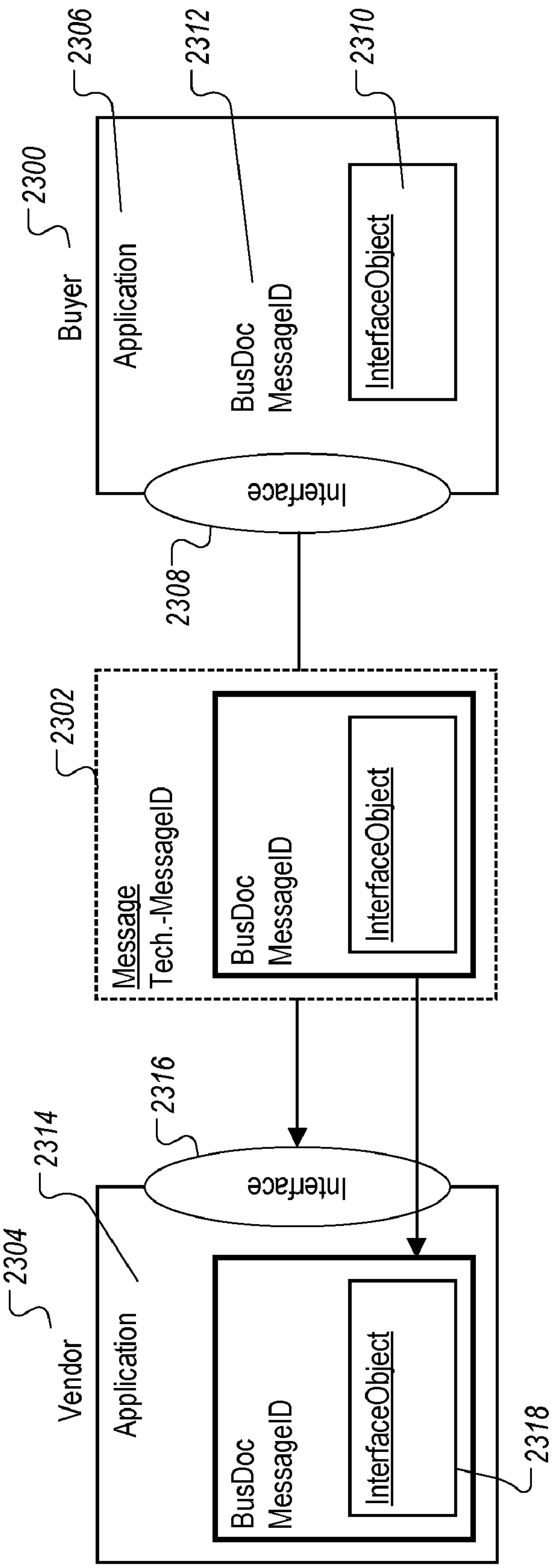
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
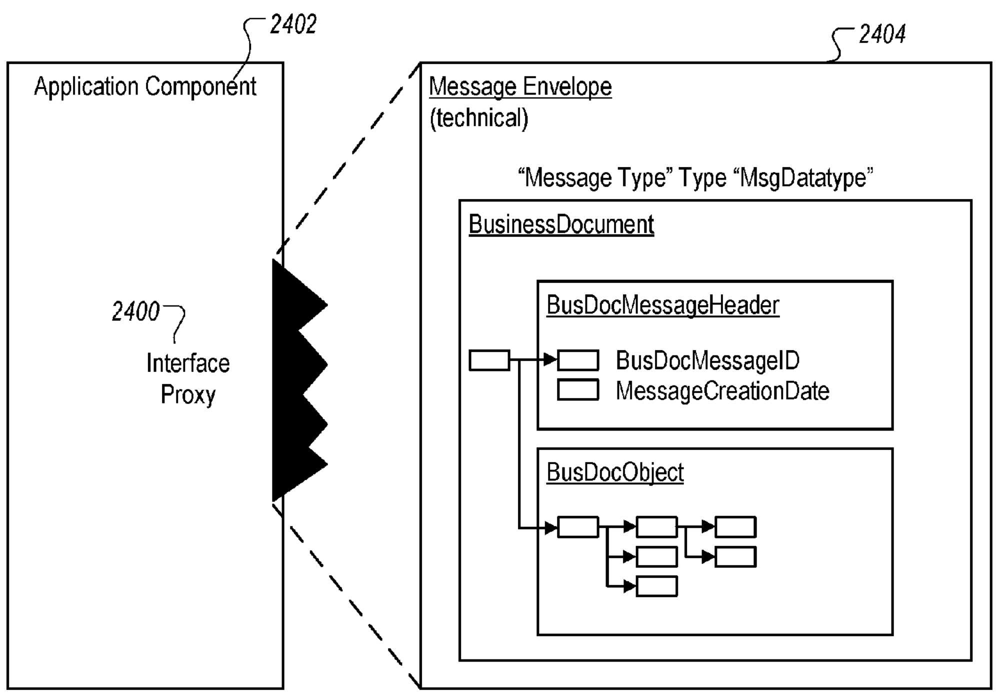
FIG. 24 depicts an interface proxy in accordance with methods and systems consistent with the subject matter described herein.
Figure 25:
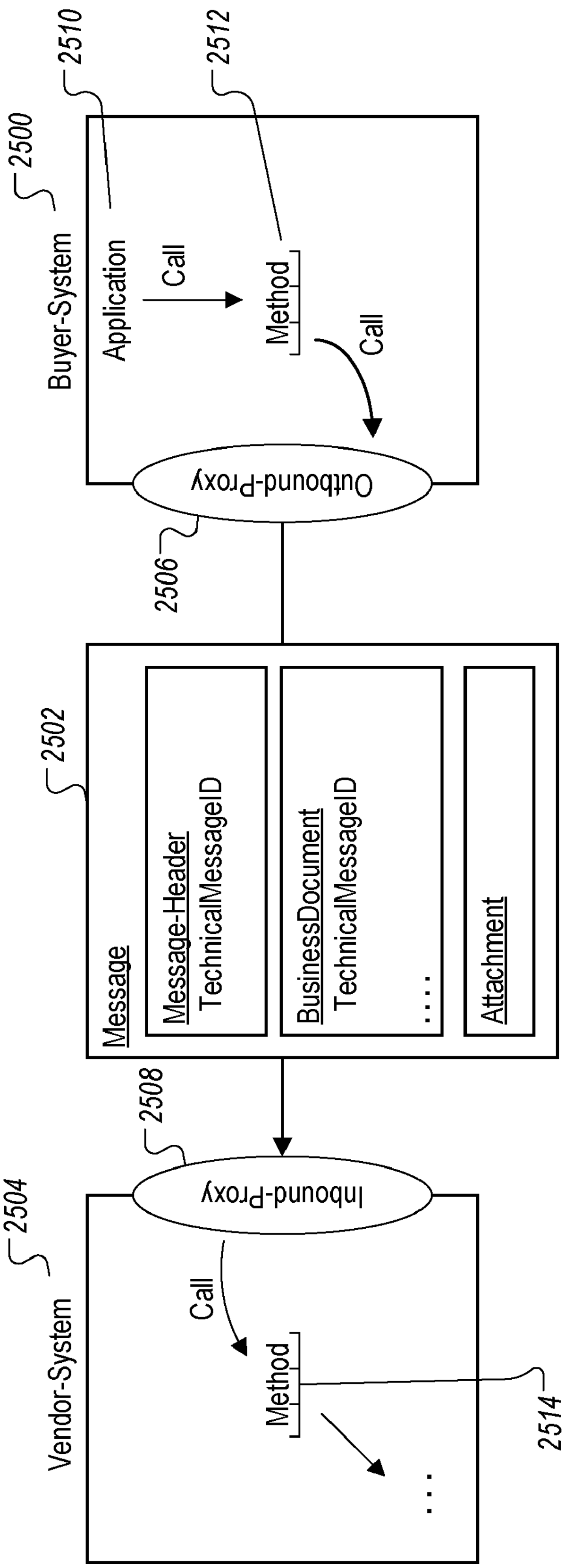
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
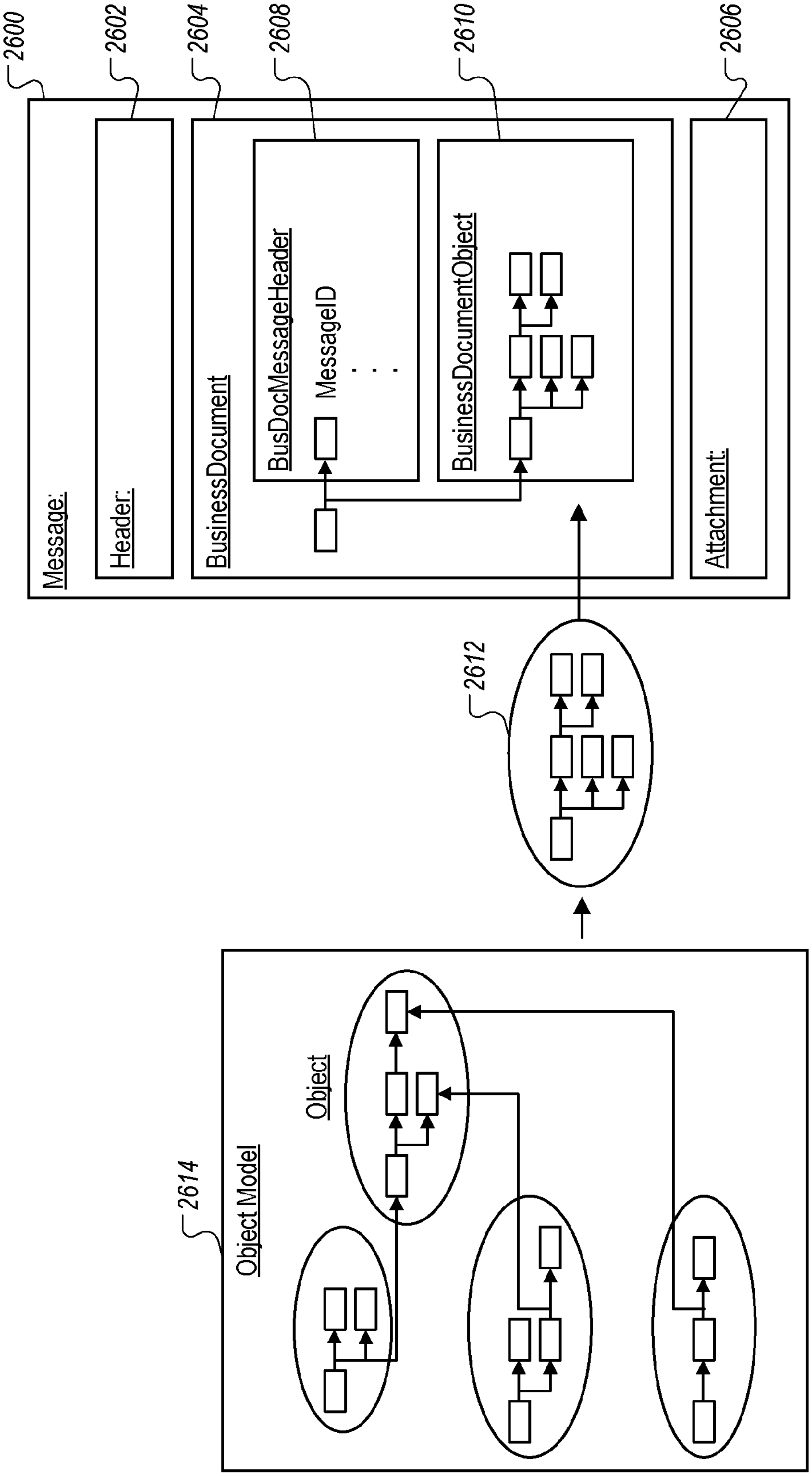
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
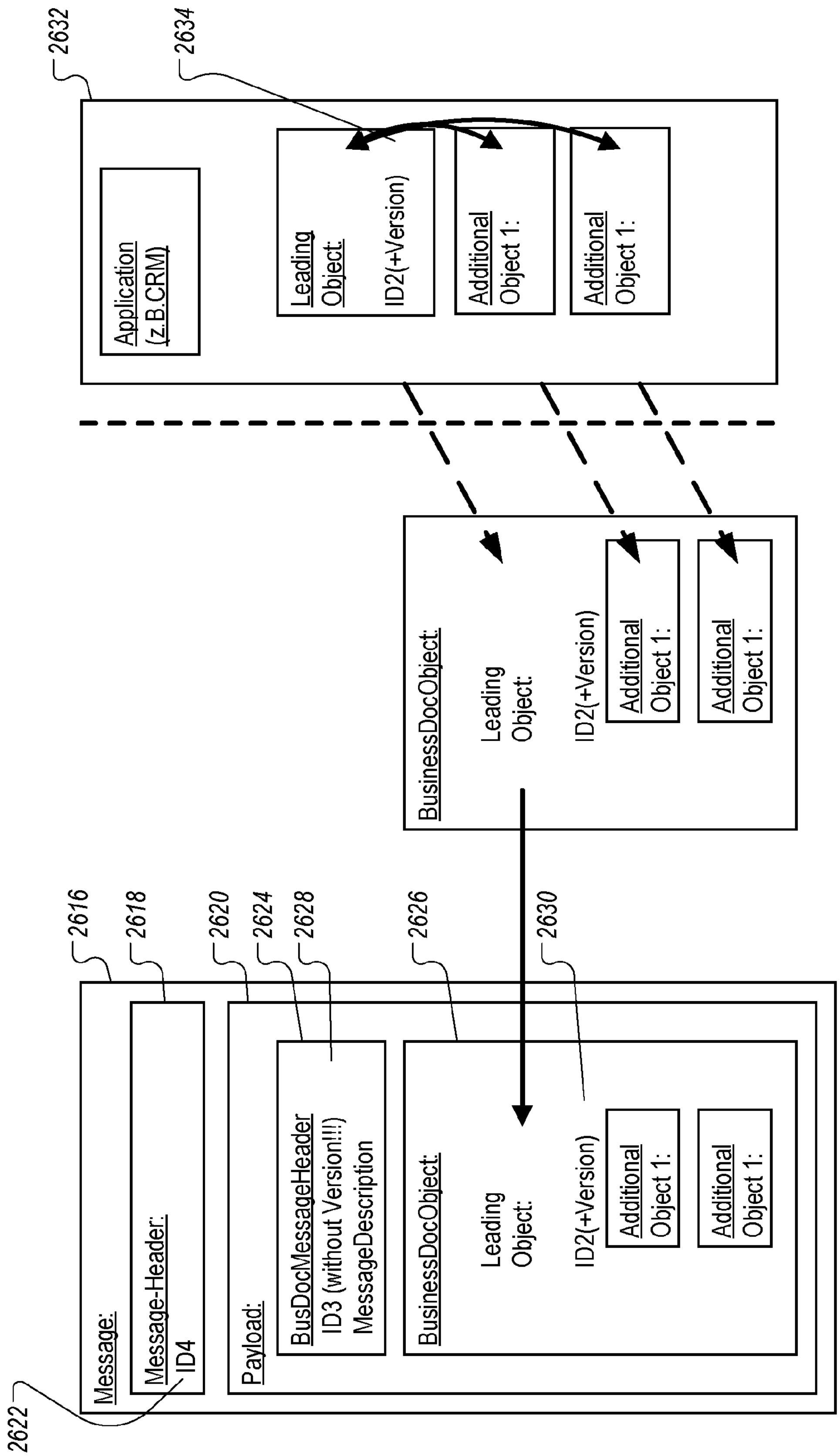
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
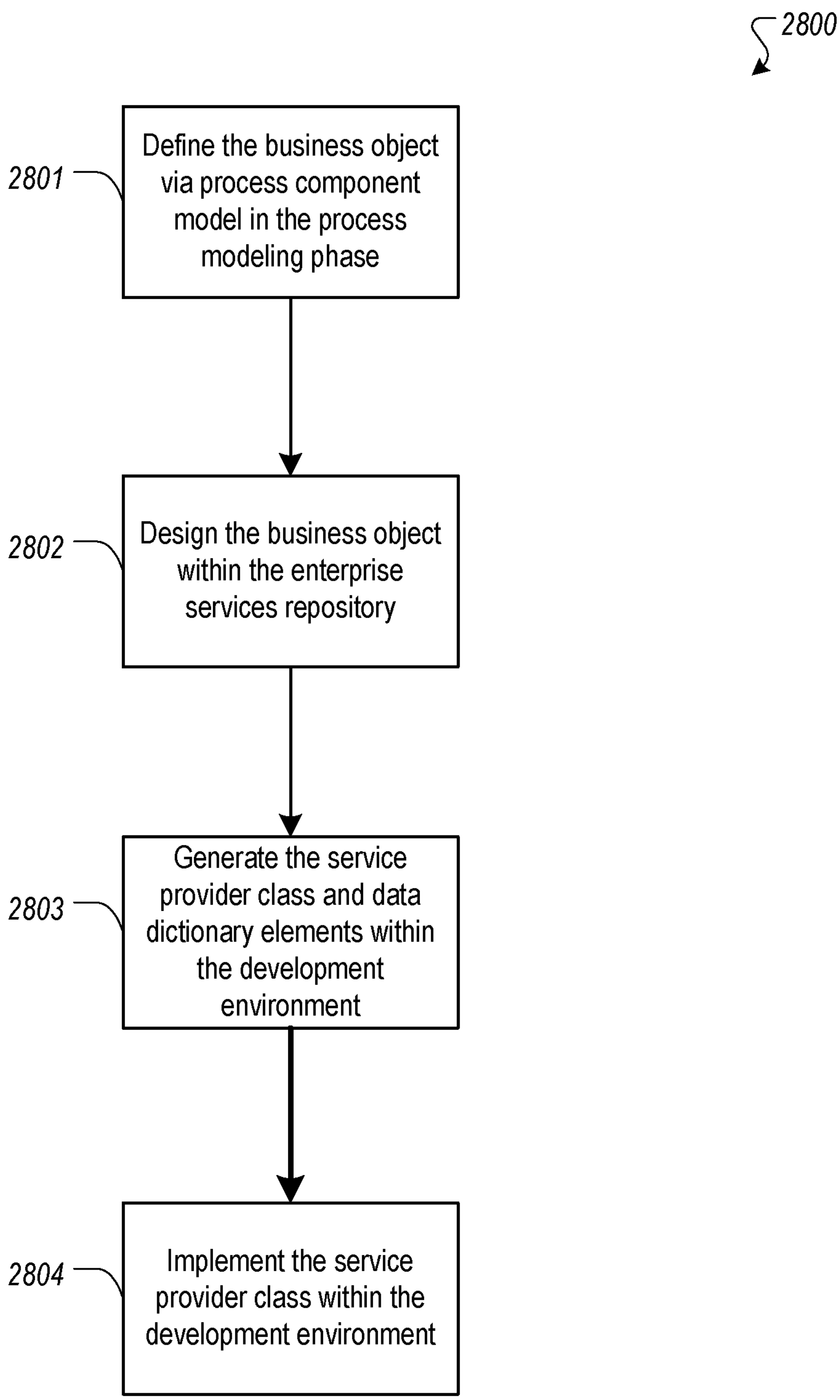
FIG. 28 illustrates an example method for service enabling in accordance with one embodiment of the present disclosure.
Figure 29:
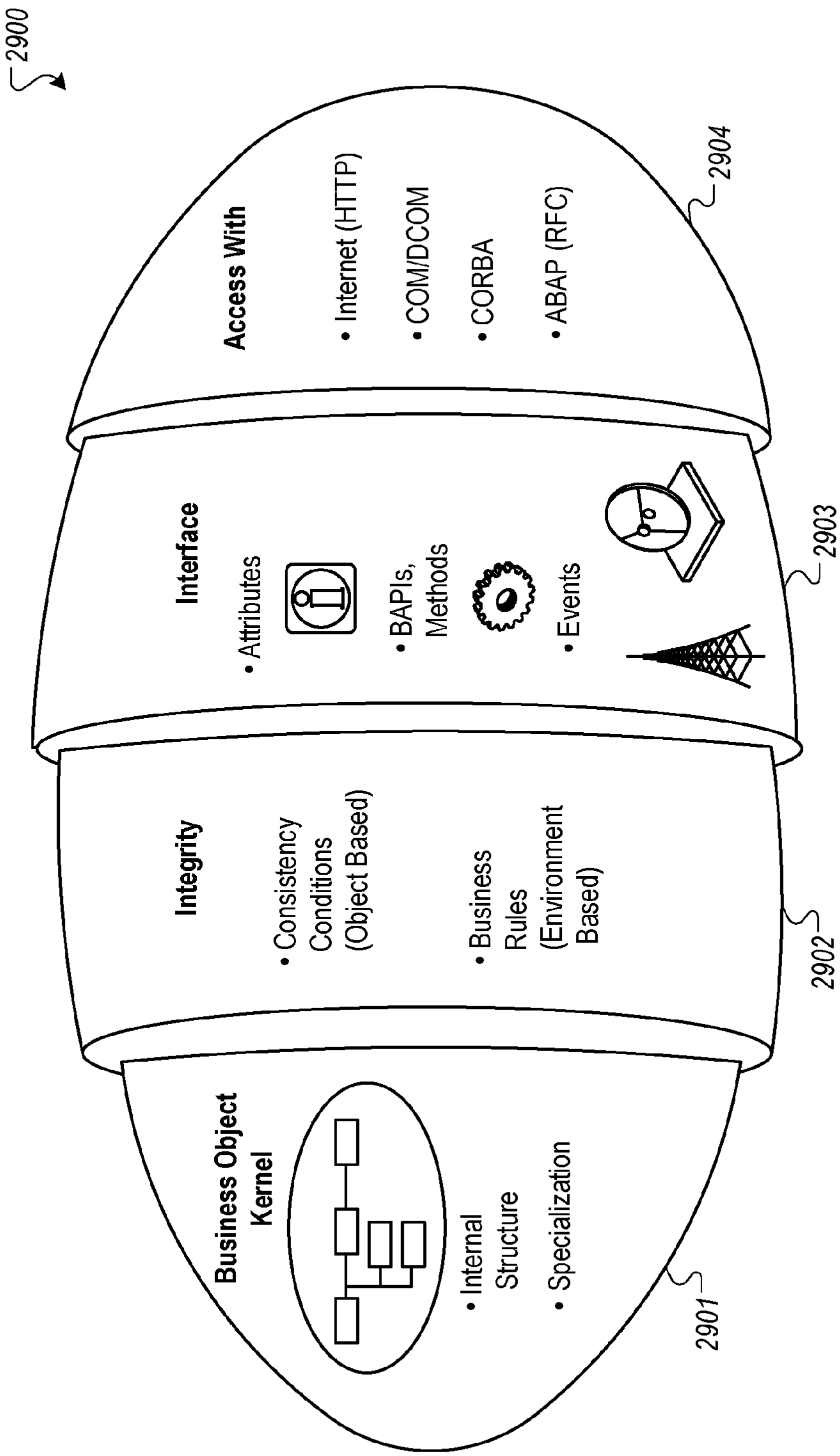
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
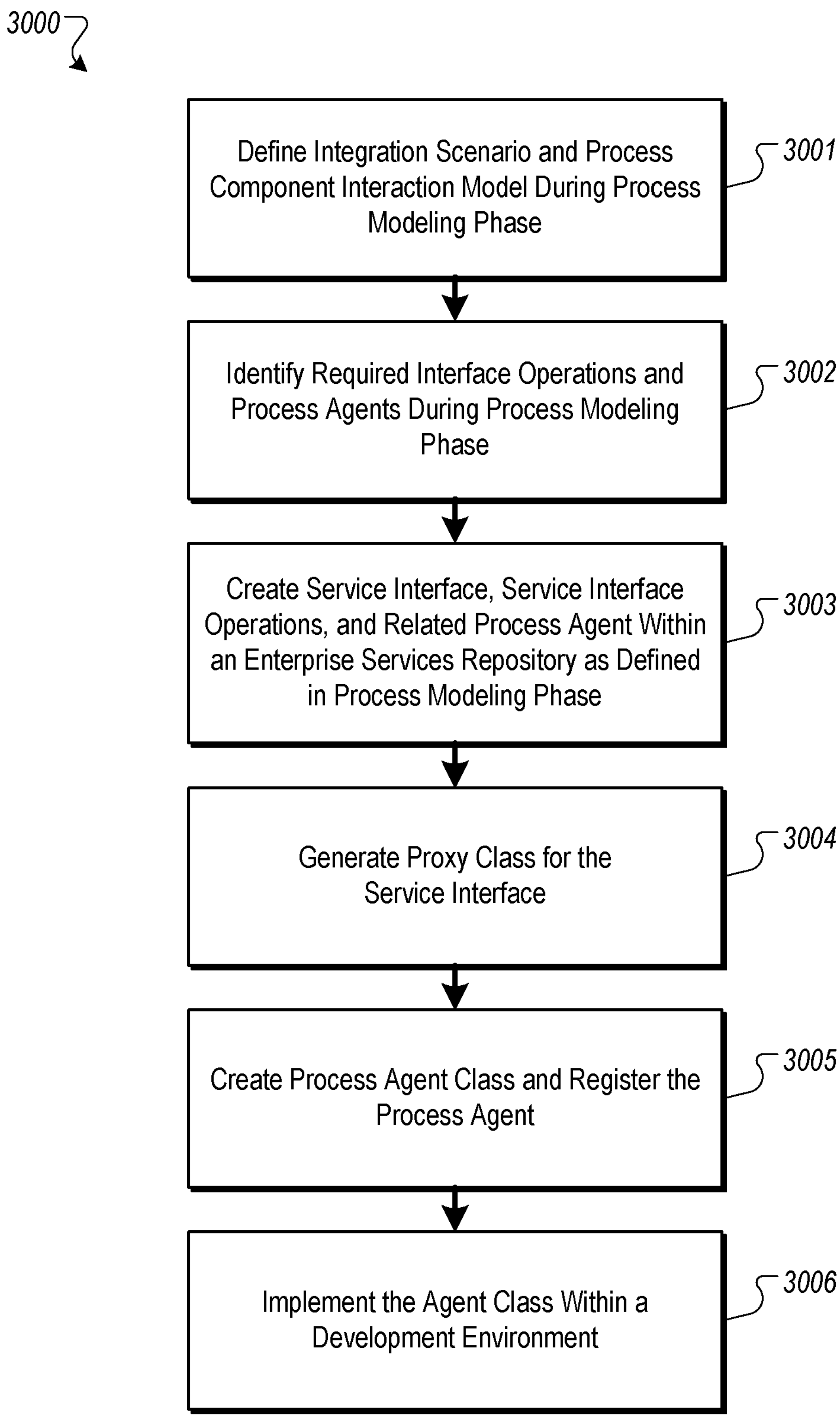
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
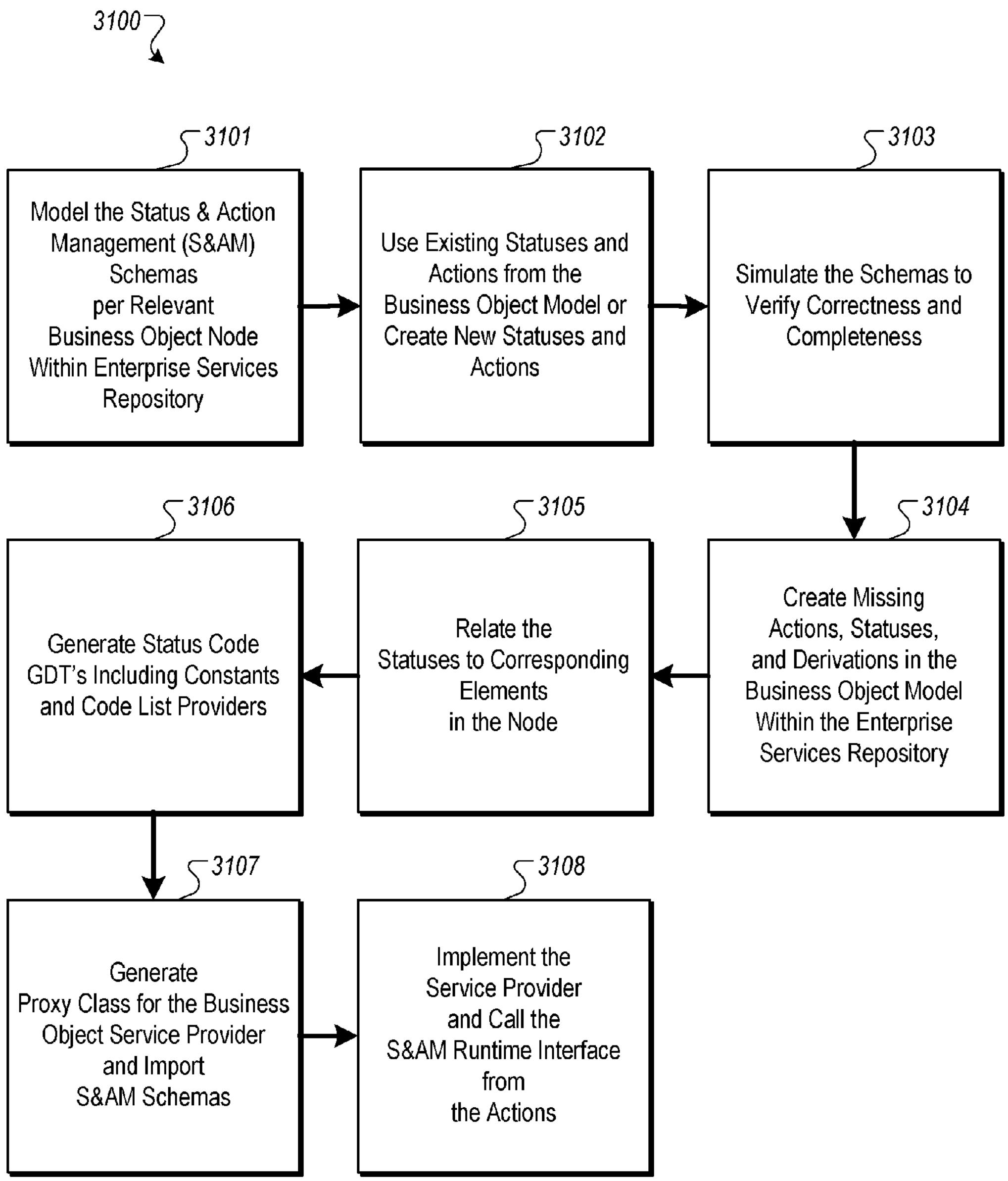
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

A business object Business Document Message Monitoring View (not shown in a figure) is a view to monitor the transmission status as well as key data of a business document message. The business object Business Document Message Monitoring View belongs to the process component Business Document Flow Processing and to the deployment unit Foundation. A business document message is a message that is used to communicate information included in a business document between two business partners. A business document message monitoring view includes three main components: information about the parties involved in message transmission, the status of the message, and references to the technical messages representing the business document message. The business object Business Document Message Monitoring View has an Object Category of Business Process Object and a Technical Category of Standard business object. The business object Business Document Message Monitoring View is involved in the Business Document Flow Proc at Communication Partner_Business Document Flow Proc Process Component Interaction.

The business object Business Document Message Monitoring View may include a service interface Message Monitoring In, which may have a technical name of BusinessDocumentFlowProcessingMessageMonitoringIn. The Service Interface Message Monitoring In is part of the Business Document Flow Proc at Communication Partner_Business Document Flow Proc Process Component Interaction. The Service Interface Message Monitoring In is an interface to monitor the transmission status of a business document message.

The Message Monitoring In interface may include a Maintain Business Document Message Monitoring View operation, which may have a technical name of BusinessDocumentFlowProcessingMessageMonitoringIn.MaintainBusinessDocumentMessageMonitoringView. The Maintain Business Document Message Monitoring View operation may be used to create or update the business document message monitoring view and may be based on message type Business Document Message Status Notification (derived from business object Business Document Message Monitoring View).

The Business Document Message Monitoring View Root Node represents a view of a business document message that is used to monitor the transmission status as well as key data of the message. The elements located directly at the node Business Document Message Monitoring View are defined by the data type BusinessDocumentMessageMonitoringViewElements. These elements may include UUID, BusinessDocumentMessageID, ReferenceBusinessDocumentMessageID, MessageTypeCode, BusinessDocumentMessageDirectionCode, MessageCommunicationProfileTypeCode, CompoundServiceOperationCode, CommunicationArrangementUUID, LocalPartyUUID, LocalPartyInternalID, LocalPartyStandardID, LocalPartyIdentifierTypeCode, RemotePartyUUID, RemotePartyInternalID, RemotePartyStandardID, RemotePartyIdentifierTypeCode, BusinessDocumentMessageCreationDateTime, SystemAdministrativeData, TransmissionCompletedIndicator, BusinessDocumentMessageTransmissionStatusReasonDescription, ObjectNodeReference, Status, and BusinessDocumentMessageTransmissionStatusLastChangeDateTime.

UUID may be an alternative key, is a universally unique identifier for the business document message monitoring view, and may be based on datatype GDT: UUID. BusinessDocumentMessageID may be an alternative key, is a unique identifier for message-monitored business document and may be based on datatype GDT: BusinessDocumentMessageID. ReferenceBusinessDocumentMessageID may be optional, is a unique identifier for the business document message to which the message-monitored business document refers, and may be based on datatype GDT: BusinessDocumentMessageID with a qualifier of Reference. MessageTypeCode may be optional, is a coded representation of the type of business document message monitored, and may be based on datatype GDT: MessageTypeCode. BusinessDocumentMessageDirectionCode may be optional, is a coded representation of the direction of message transmission, and may be based on datatype GDT: BusinessDocumentMessageDirectionCode. MessageCommunicationProfileTypeCode may be optional, is a coded representation of the communication profile type used for a monitored business document message, and may be based on datatype GDT: MessageCommunicationProfileTypeCode. CompoundServiceOperationCode may be optional, is a coded representation of the compound service operation used for sending or receiving a monitored business document message, and may be based on datatype GDT: CompoundServiceOperationCode. CommunicationArrangementUUID may be optional, is a universally unique identifier for a communication arrangement that includes communication settings for a monitored business document message, and may be based on datatype GDT: UUID. LocalPartyUUID may be optional, is a universally unique identifier for a local party involved in a monitored business document message, and may be based on datatype GDT: UUID. LocalPartyInternalID may be optional, is an internal identifier for a local party involved in a monitored business document message, and may be based on datatype GDT: NOCONVERSION_PartyID with a qualifier of Local. LocalPartyStandardID may be optional, is a standardized identifier for a local party involved in a monitored business document message, and may be based on datatype GDT: PartyStandardID with a qualifier of Local. LocalPartyIdentifierTypeCode may be optional, is a coded representation of the type of standardized identifier for a local party involved in a monitored business document message, and may be based on datatype GDT: PartyIdentifierTypeCode with a qualifier of Local. RemotePartyUUID may be optional, is a universally unique identifier for a remote party involved in a monitored business document message, and may be based on datatype GDT: UUID. RemotePartyInternalID may be optional, is an internal identifier for a remote party involved in a monitored business document message, and may be based on datatype GDT: NOCONVERSION_PartyID with a qualifier of Remote. RemotePartyStandardID may be optional, is a standardized identifier for a remote party involved in a monitored business document message, and may be based on datatype GDT: PartyStandardID with a qualifier of Remote. RemotePartyIdentifierTypeCode may be optional, is a coded representation of the type of standardized identifier for a remote party involved in a monitored business document message, and may be based on datatype GDT: PartyIdentifierTypeCode with a qualifier of Remote. BusinessDocumentMessageCreationDateTime may be optional, is a point in time at which a monitored business document message is created, and may be based on datatype GDT: GLOBAL_DateTime with a qualifier of Creation. SystemAdministrativeData is a collection of data that identifies a user who created a business document message monitoring view, the user who last changed the business document message monitoring view, the date and time when the business document message monitoring view was created, and the date and time when the business document message monitoring view was last changed. SystemAdministrativeData may be based on datatype GDT: SystemAdministrativeData. TransmissionCompletedIndicator is an indicator that specifies whether or not the transmission of a monitored business document message has been completed, and may be based on datatype GDT: Indicator with a qualifier of Completed. BusinessDocumentMessageTransmissionStatusReasonDescription may be optional, is a description of the transmission status of a monitored business document message, and may be based on datatype GDT: LONG_Description with a qualifier of BusinessDocumentMessageTransmissionStatusReason. ObjectNodeReference may be optional, is a unique reference to the business object node that sent or received a message, and may be based on datatype GDT: ObjectNodeReference. In some implementations, ObjectNodeReference exists if LocalIndicator is "true". Status is status information of a monitored business document message, and may be based on datatype BOIDT: BusinessDocumentMessageMonitoringViewStatus. BusinessDocumentMessageTransmissionStatusCode is a coded representation of the transmission status of a monitored business document message and may be based on datatype GDT: BusinessDocumentMessageTransmissionStatusCode. BusinessDocumentMessageTransmissionStatusLastChangeDateTime may be optional, is a point in time at which a BusinessDocumentMessageTransmissionStatus was last changed, and may be based on datatype GDT: GLOBAL_DateTime with a qualifier of LastChange.

The following composition relationships to subordinate nodes may exist: Status History Item with a cardinality of 1:N, Technical Message Reference with a cardinality of 1:N, and Email Message Information with a cardinality of 1:C. The following Inbound Association Relationships may exist from the business object Business Document Message Monitoring View/node Business Document Message Monitoring View: ReferenceBusinessDocumentMessageMonitoringView with a cardinality of C:C, which represents a business document message monitoring view of the business document message to which the monitored business document message refers. The following Inbound Association Relationships may exist from the business object Communication Arrangement/node Communication Arrangement: Communication Arrangement with a cardinality of C:CN, which represents a communication arrangement that is used to configure a connection for transmitting a monitored business document message. The following Inbound Association Relationships may exist from the business object Identity/node Identity: Creation Identity, with a cardinality of 1:CN, which represents the identity of a user who created a business document message monitoring view. The following Inbound Association Relationships may exist from the business object Identity/node Identity: Last Change Identity, with a cardinality of 1:CN, which represents the identity of a user who last changed a business document message monitoring view. The following Inbound Association Relationships may exist from the business object Party/node Party: LocalParty, with a cardinality of C:CN, which represents a party that is the local communication party of a message. The following Inbound Association Relationships may exist from the business object Party/node Party: RemoteParty, with a cardinality of C:CN, which represents a party that is a remote communication party of a message.

The following Specialization Associations for Navigation may exist to the business object Business Document Flow/node Business Document Flow: Business Document Flow, which enables navigation to a business document flow in which a business document message monitoring view participates. The following Specialization Associations for Navigation may exist to the node Business Document Message Monitoring View: Referencing Business Document Message Monitoring View, which is an association to the Business Document Message Monitoring Views that refer to a Business Document Message Monitoring View. The following Specialization Associations for Navigation may exist to the node Status History Item: Most Recent Status History Item, which is an association to the most recent status history item. The following Specialization Associations for Navigation may exist to the node Technical Message Reference: Local Technical Message Reference, which is an association to a technical message reference for a message sent or received by a local business system.

The following Enterprise Service Infrastructure Actions may be included: Maintain From Technical Monitors, Resend, and Set Status. The Maintain From Technical Monitors action accesses technical monitoring data available in a local system and maintains corresponding business document message monitoring view instances. The action elements for the Maintain From Technical Monitors action are defined by the data type BusinessDocumentMessageMonitoringViewMaintainFromTechnicalMonitorsActionElements. These elements may include CacheUseIndicator and MessageCreationDateTimePeriod. CacheUseIndicator indicates whether an internal message cache should be used and may be based on datatype GDT: Indicator. In some implementations, a default value is "true". MessageCreationDateTimePeriod may be optional, is an interval of creation dates and times containing messages that are read from internal monitors, may be based on datatype GDT: UPPEROPEN_GLOBAL_DateTimePeriod, and may be used to specify which date/time interval should be scanned for new/updated business to business messages. In some implementations, the default value is "now minus four weeks" if the CacheUseIndicator is false. In some implementations, if the CacheUseIndicator is true, the MessageCreationDateTime is ignored. In some implementations, MessageCreationDateTimePeriod is not provided if the "CacheUseIndicator" is true.

The Resend action resends a business document message and may trigger a reconciliation message. In some implementations, the resend action is used for outgoing business document messages that have a status of "Timeout" or "Technical Error". The Set Status action sets a status of a business document message monitoring view. The Set Status action elements are defined by the data type BusinessDocumentMessageMonitoringViewSetStatusActionElements which may include BusinessDocumentMessageTransmissionStatusCode and BusinessDocumentMessageTransmissionStatusReasonDescription. BusinessDocumentMessageTransmissionStatusCod may be optional, is a coded representation of a transmission status of a monitored business document message, and may be based on datatype GDT: BusinessDocumentMessageTransmissionStatusCode. BusinessDocumentMessageTransmissionStatusReasonDescription may be optional, is a description of a transmission status of a monitored business document message, and may be based on datatype GDT: LONG_Description with a qualifier of BusinessDocumentMessageTransmissionStatusReason.

A Query By Elements Query and a Select All Query may be included. The Select All query provides the NodeIDs of all instances of a node and may be used to enable the initial load of data for a Fast Search Infrastructure.

The Query By Elements query returns a list of all business document message monitoring views matching a specified selection criteria. The selection criteria are specified by a logical "AND" combination of query elements. The query elements of the Query by Elements Query are defined by the data type: BusinessDocumentMessageMonitoringViewElementsQueryElements. These elements may include MessageTypeCode, BusinessDocumentMessageTransmissionStatusCode, BusinessDocumentMessageTransmissionStatusLastChangeDateTime, BusinessDocumentMessageDirectionCode, MessageCommunicationProfileTypeCode, ReferenceBusinessDocumentMessageID, ObjectNodeReference, LocalPartyKey, RemotePartyKey, LocalPartyFormattedName, RemotePartyFormattedName, TransmissionCompletedIndicator, SystemAdministrativeDataCreationDateTime, and SystemAdministrativeDataLastChangeDateTime. LocalPartyKey may include PartyTypeCode and PartyID. RemotePartyKey may include PartyTypeCode and PartyID. MessageTypeCode may be based on datatype GDT: MessageTypeCode. BusinessDocumentMessageTransmissionStatusCode may be based on datatype GDT: BusinessDocumentMessageTransmissionStatusCode. BusinessDocumentMessageTransmissionStatusLastChangeDateTime may be based on datatype GDT: GLOBAL_DateTime with a qualifier of LastChange. BusinessDocumentMessageDirectionCode may be based on datatype GDT: BusinessDocumentMessageDirectionCode. MessageCommunicationProfileTypeCode may be based on datatype GDT: MessageCommunicationProfileTypeCode. ReferenceBusinessDocumentMessageID may be based on datatype GDT: BusinessDocumentMessageID with a qualifier of Reference. ObjectNodeReference may be based on datatype GDT: ObjectNodeReference. LocalPartyKey and RemotePartyKey may each be based on datatype KDT: PartyKey. PartyTypeCode is a coded representation of a type of party and may be based on datatype GDT: BusinessObjectTypeCode. PartyID is an identifier for a party and may be based on datatype GDT: PartyID. LocalPartyFormattedName may be based on datatype GDT: LONG_Name with a qualifier of PartyFormatted. RemotePartyFormattedName may be based on datatype GDT: LONG_Name with a qualifier of PartyFormatted. TransmissionCompletedIndicator may be based on datatype GDT: Indicator with a qualifier of Completed. SystemAdministrativeDataCreationDateTime may be based on datatype GDT: GLOBAL_DateTime with a qualifier of Creation. SystemAdministrativeDataLastChangeDateTime may be based on datatype GDT: GLOBAL_DateTime with a qualifier of LastChange.

The business object Business Document Message Monitoring View may include a Status History Item, which is an item of the status history of a monitored business document message that provides information about the message status and the time when the status was changed. The Status History Item may be time dependent on a Time Point. The elements located directly at the node Status History Item are defined by the data type BusinessDocumentMessageMonitoringViewStatusHistoryItemElementsand may include BusinessDocumentMessageTransmissionStatusCode, BusinessDocumentMessageTransmissionStatusReasonDescription, BusinessDocumentMessageTransmissionStatusLastChangeDateTime, TransmissionCompletedIndicator, MostRecentIndicator, OriginatingMessageID, and LastChangeIdentityUUID.

BusinessDocumentMessageTransmissionStatusCode is a coded representation of a transmission status of a monitored business document message and may be based on datatype GDT: BusinessDocumentMessageTransmissionStatusCode. BusinessDocumentMessageTransmissionStatusReasonDescription may be optional, is a description of a transmission status of a monitored business document message, and may be based on datatype GDT: LONG_Description with a qualifier of BusinessDocumentMessageTransmissionStatusReason. BusinessDocumentMessageTransmissionStatusLastChangeDateTime is the date and time when the business document message status was changed, and may be based on datatype GDT: GLOBAL_DateTime with a qualifier of LastChange. TransmissionCompletedIndicator is an indicator that specifies whether or not a transmission of a monitored business document message has been completed. TransmissionCompletedIndicator may be based on datatype GDT: Indicator with a qualifier of Completed. MostRecentIndicator indicates whether or not the status history item is the most recent one and may be based on datatype GDT: Indicator with a qualifier of MostRecent. OriginatingMessageID is a unique identifier for a technical message that triggered the status and may be based on datatype GDT: MessageID with a qualifier of Originating. LastChangeIdentityUUID is a universally unique identifier of an entity who performed the last change and and may be based on datatype GDT: UUID.

The following Inbound Association Relationships may exist from the business object Business Document Message Monitoring View/node Technical Message Reference: Technical Message Reference, with a cardinality of C:CN, which represents a reference to a technical message that has created a status history item. To Parent and To Root Specialization Associations for Navigation may exist to the node Business Document Message Monitoring View. In some implementations, the most recent item of the status history corresponds to the overall status of a business document message monitoring view.

The business object Business Document Message Monitoring View may include a Technical Message Reference, which is a reference to a technical message that represents a business document message in the communication process. The elements located directly at the node Technical Message Reference are defined by the data type BusinessDocumentMessageMonitoringViewTechnicalMessageReferenceElements and may include MessageID, SenderBusinessTransactionDocumentReference, RecipientBusinessTransactionDocumentReference, MessageFormattedContentWebURI, ProcessIntegrationInboundErrorUUID, SoftwareProblemReportUUID, MessageProcessingLogWebURI, SenderPartyID, RecipientPartyID, SenderBusinessSystemID, RecipientBusinessSystemID, and LocalIndicator.

MessageID is a unique identifier for a technical message that represents a monitored business document message and may be based on datatype GDT: MessageID. SenderBusinessTransactionDocumentReference may be optional, is reference to the business transaction document issued by the sender, and may be based on datatype GDT: BusinessTransactionDocumentReference with a qualifier of Sender. RecipientBusinessTransactionDocumentReference may be optional, is a reference to a business transaction document issued by a recipient, and may be based on datatype GDT: BusinessTransactionDocumentReference with a qualifier of Recipient. MessageFormattedContentWebURI may be optional, is a unique digital address of a formatted representation of message content, and may be based on datatype GDT: WebURI with a qualifier of MessageFormattedContent. ProcessIntegrationInboundErrorUUID may be optional, is a universally unique identifier for a process integration inbound error that occurred during message processing, and may be based on datatype GDT: UUID. SoftwareProblemReportUUID may be optional, is a universally unique identifier for a software problem report describing an incident, and may be based on datatype GDT: UUID. MessageProcessingLogWebURI may be optional, is a unique digital address of a message processing log, and may be based on datatype GDT: WebURI with a qualifier of MessageProcessingLog. SenderPartyID may be optional, is a unique identifier for a sending party of the message, and may be based on datatype GDT: NOCONVERSION_PartyID with a qualifier of Sender.

RecipientPartyID may be optional, is a unique identifier for a receiving party of the message, and may be based on datatype GDT: NOCONVERSION_PartyID with a qualifier of Recipient. SenderBusinessSystemID may be optional, is a unique identifier for a business system that participates in message exchange as a sending system, and may be based on datatype GDT: BusinessSystemID with a qualifier of Sender. RecipientBusinessSystemID may be optional, is a unique identifier for a business system that participates in message exchange as a receiving system, and may be based on datatype GDT: BusinessSystemID with a qualifier of Recipient. LocalIndicator is an indicator that specifies whether a technical message reference refers to a message sent or received by a local business system. LocalIndicate may be based on datatype GDT: Indicator with a qualifier of Local.

A Process Integration Inbound Error Inbound Association Relationship may exist from the business object Process Integration Inbound Error/node Process Integration Inbound Error, with a cardinality of C:C, which represents an inbound error that triggered a status of a business document message monitoring view. To Parent and To Root Specialization Associations for Navigation may exist to the node Business Document Message Monitoring View. In some implementations, a technical message reference either refers to a message within an application platform or to a technical message that represents a business document message outside the system. If the technical message reference refers to a message within the application platform, the following elements may be used: MessageID, MessageContentRepresentationWebURI, ProcessIntegrationInboundErrorUUID, and SoftwareProblemReportUUID. If the technical message reference refers to a technical message that represents a business document message outside the system, the following elements may be used: MessageID, MessageContentRepresentationWebURI, and MessageProcessingLogWebURI.

The business object Business Document Message Monitoring View may include an Email Message Information, which is information specific to electronic mail messages. To Parent and to Root Specialization Associations for Navigation may exist to the node Business Document Message Monitoring View. The elements located directly at the node Email Message Information are defined by thedata type BusinessDocumentMessageMonitoringViewEmailMessageInformationElements and may include SenderEmailURI, SenderName, RecipientEmailURI, RecipientName, SubjectText, InformationSensitivityCode, and PriorityCode. SenderEmailURI may be optional, is an identifier of the sender of the email message, and may be based on datatype GDT: EmailURI. SenderName may be optional, is a name of a sender of an email message, and may be based on datatype GDT: LANGUAGEINDEPENDENT_LONG_Name. RecipientEmailURI may be optional, is an identifier of a recipient of an Email message, and may be based on datatype GDT: EmailURI. RecipientName may be optional, is a name of a recipient of an email message, and may be based on datatype GDT: LANGUAGEINDEPENDENT_LONG_Name. SubjectText may be optional, is a subject of an email message, and may be based on datatype GDT: ElectronicMessageSubjectText. InformationSensitivityCode may be optional, is a coded representation of the sensitivity of information included in an email message, and may be based on datatype GDT: InformationSensitivityCode. PriorityCode may be optional, is a coded representation of the priority of an email message, and may be based on datatype GDT: InformationSensitivityCode.

Figure 32:
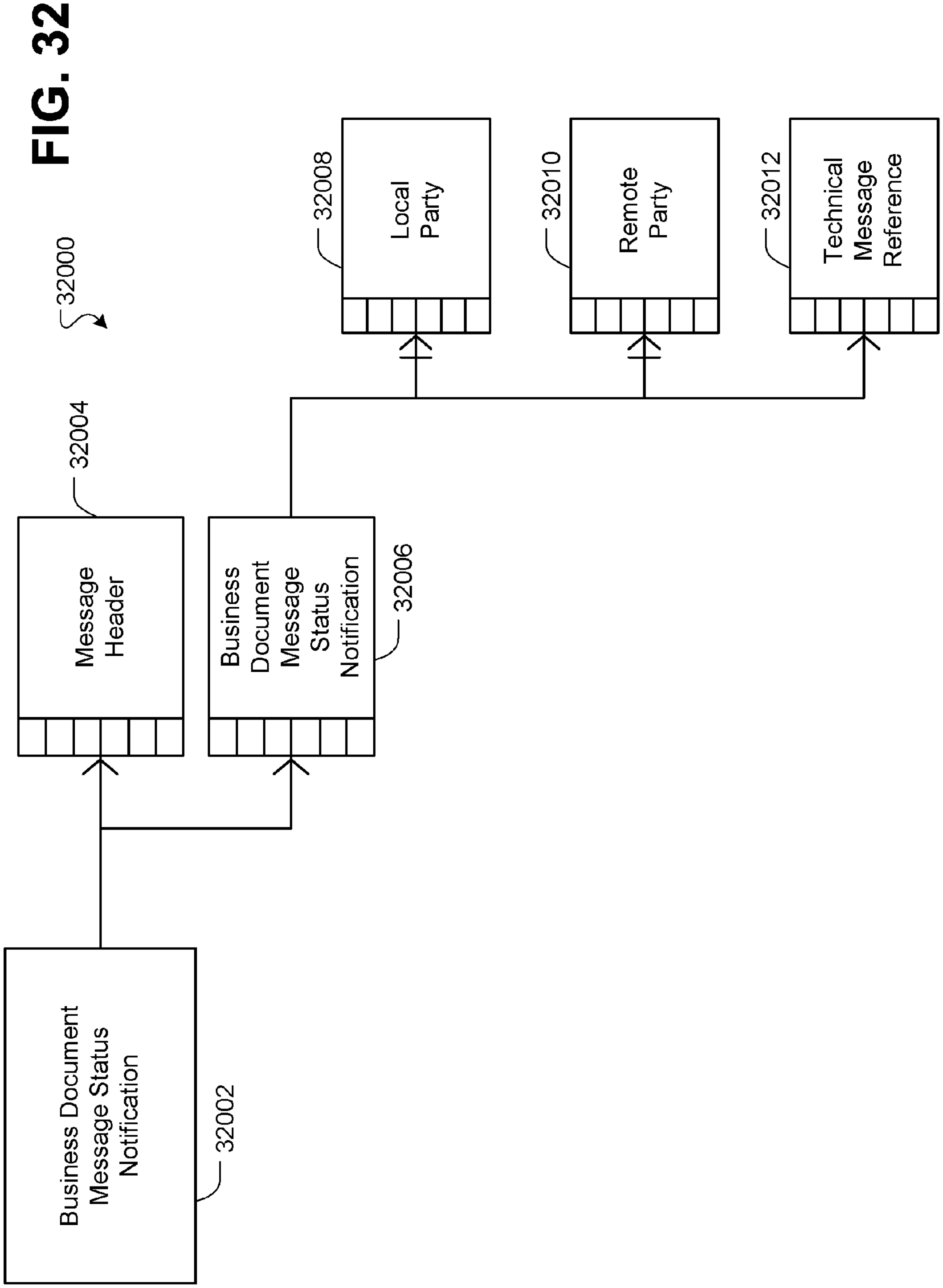
FIG. 32 depicts an example Business Document Message Status Notification Message Data Type.

FIG. 32 depicts an example Business Document Message Status Notification Message Data Type 32000, which comprises elements 32002-32012, hierarchically related as shown. For example, the Business Document Message Status Notification 32002 includes a Message Header 32004.

The message type Business Document Message Status Notification is derived from the business object Business Document Message Monitoring View as a leading object together with its operation signature. The Business Document Message Status Notification message type is a notification about a transmission status of a business document message. A business document message is a message including a business document. The structure of this message type is determined by the message data type BusinessDocumentMessageStatusNotificationMessage. The Business Document Message Status Notification message is used to notify the Business Document Message Monitoring View about changes to the status of a business document monitored message.

The Business Document Message Status Notification message data type includes the object BusinessDocumentMessageStatusNotification which is included in the business document, the business information that is relevant for sending a business document in a message, the MessageHeader package, and the BusinessDocumentMessageStatusNotification package. The Business Document Message Status Notification message data type provides the structure for the Business Document Message Status Notification message type associated operations.

The MessageHeader package includes a grouping of business information that is relevant for sending a business document in a message. The MessageHeader package includes the MessageHeader node. MessageHeader includes a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader, and the following elements of the GDT may be used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

SenderParty is the partner responsible for sending a business document at a business application level. The SenderParty is of the type GDT:BusinessDocumentMessageHeaderParty. RecipientParty is of the type GDT: BusinessDocumentMessageHeaderParty. RecipientParty is the partner responsible for receiving a business document at a business application level.

The BusinessDocumentMessageStatusNotification package is a grouping of BusinessDocumentMessageStatusNotification with its associated Party and TechnicalMessageReference packages, and the BusinessDocumentMessageStatusNotification entity. A Business Document Message Status Notification is a notification about the status of a business document message. BusinessDocumentMessageStatusNotification includes the actionCo de attribute, which may be based on GDT:ActionCode. BusinessDocumentMessageStatusNotification includes the non-node elements BusinessDocumentMessageID, ReferenceBusinessDocumentMessageID, MessageTypeCode, BusinessDocumentMessageDirectionCode, BusinessDocumentMessageCreationDateTime, BusinessDocumentMessageTransmissionStatusCode, BusinessDocumentMessageTransmissionStatusLastChangeDateTime, BusinessDocumentMessageTransmissionStatusReasonDescription, and TransmissionCompletedIndicator.

BusinessDocumentMessageID is an identifier of a message-monitored business document and may be based on datatype GDT:BusinessDocumentMessageID. ReferenceBusinessDocumentMessageID may be optional, is an identifier of a business document message referenced by a message-monitored business document, and may be based on datatype GDT:BusinessDocumentMessageID with a qualifier of Reference. MessageTypeCode is a coded representation of the type of a monitored message and may be based on datatype GDT:MessageTypeCode. BusinessDocumentMessageDirectionCode may be optional and is a coded representation of the direction of message transmission. The direction may be specified with respect to the LocalParty. A business document message sent from the LocalParty to the RemoteParty is "Outgoing" and a message sent from the RemoteParty to the LocalParty is "Incoming". BusinessDocumentMessageDirectionCode may be based on datatype GDT:BusinessDocumentMessageDirectionCode. BusinessDocumentMessageCreationDateTime may be optional and may be based on datatype CDT:GLOBAL_DateTime with a qualifier of Creation. BusinessDocumentMessageTransmissionStatusCode is a coded representation of the status of a message-monitored business document and may be based on datatype GDT:BusinessDocumentMessageTransmissionStatusCode. BusinessDocumentMessageTransmissionStatusLastChangeDateTime may be optional, is the point in time at which the BusinessDocumentMessageTransmissionStatus was last changed, and may be based on datatype CDT:GLOBAL_DateTime with a qualifier of LastChange. BusinessDocumentMessageTransmissionStatusReasonDescription may be optional, is a description of the status of a message-monitored business document and may be based on datatype GDT:LONG_Description with a qualifier of BusinessDocumentMessageTransmissionStatusReason. TransmissionCompletedIndicator specifies whether the transmission of the business document message is completed and may be based on datatype CDT:Indicator with a qualifier of Completed.

BusinessDocumentMessageStatusNotification includes the node elements LocalParty with a cardinality of 1:C, RemoteParty with a cardinality of 1:C, and TechnicalMessageReference with a cardinality of 1:1.

The BusinessDocumentMessageStatusParty package includes the LocalParty and RemoteParty entities. A local party is the local party involved in a message-monitored business document. LocalParty is typed by BusinessDocumentMessageHeaderParty. "Local" refers to the logical location of the receiver of the message. A remote party is the remote party involved in a message-monitored business document. RemoteParty is typed by BusinessDocumentMessageHeaderParty. The RemoteParty is the counterpart to the local party and is not necessarily identical to the party that sends the BusinessDocumentMessageStatusNotification.

The BusinessDocumentMessageStatusTechnicalMessageReference package includes the TechnicalMessageReference entity, which is a reference to a technical message that represents the business document message in the communication process. TechnicalMessageReference contains the following (non-node) elements: MessageID, SenderBusinessTransactionDocumentReference, RecipientBusinessTransactionDocumentReference, MessageFormattedContentWebURI, MessageProcessingLogWebURI, SenderPartyID, and RecipientPartyID. MessageID may be based on datatype GDT:MessageID. SenderBusinessTransactionDocumentReference may be optional and may be based on datatype GDT:BusinessTransactionDocumentReference with a qualifier of Sender. RecipientBusinessTransactionDocumentReference may be optional and may be based on datatype GDT:BusinessTransactionDocumentReference with a qualifier of Recipient. MessageFormattedContentWebURI may be optional and may be based on datatype GDT:WebURI with a qualifier of MessageFormattedContent. MessageProcessingLogWebURI may be optional and may be based on datatype GDT:WebURI with a qualifier of MessageProcessingLog. SenderPartyID may be based on datatype GDT:PartyID with a qualifier of Sender. RecipientPartyID may be based on datatype GDT:PartyID with a qualifier of Recipient.

FIGS. 33-1 through 33-9 show an example configuration of an Element Structure that includes a BusinessDocumentMessageStatusNotification 33000 package. Specifically, these figures depict the arrangement and hierarchy of various components such as one or more levels of packages, entities, and datatypes, shown here as 33000 through 33268. As described above, packages may be used to represent hierarchy levels. Entities are discrete business elements that are used during a business transaction. Data types are used to type object entities and interfaces with a structure. For example, the BusinessDocumentMessageStatusNotification 33000 includes, among other things, a BusinessDocumentMessageStatusNotification 33002. Accordingly, heterogeneous applications may communicate using this consistent message configured as such.

Figures 1, 34:
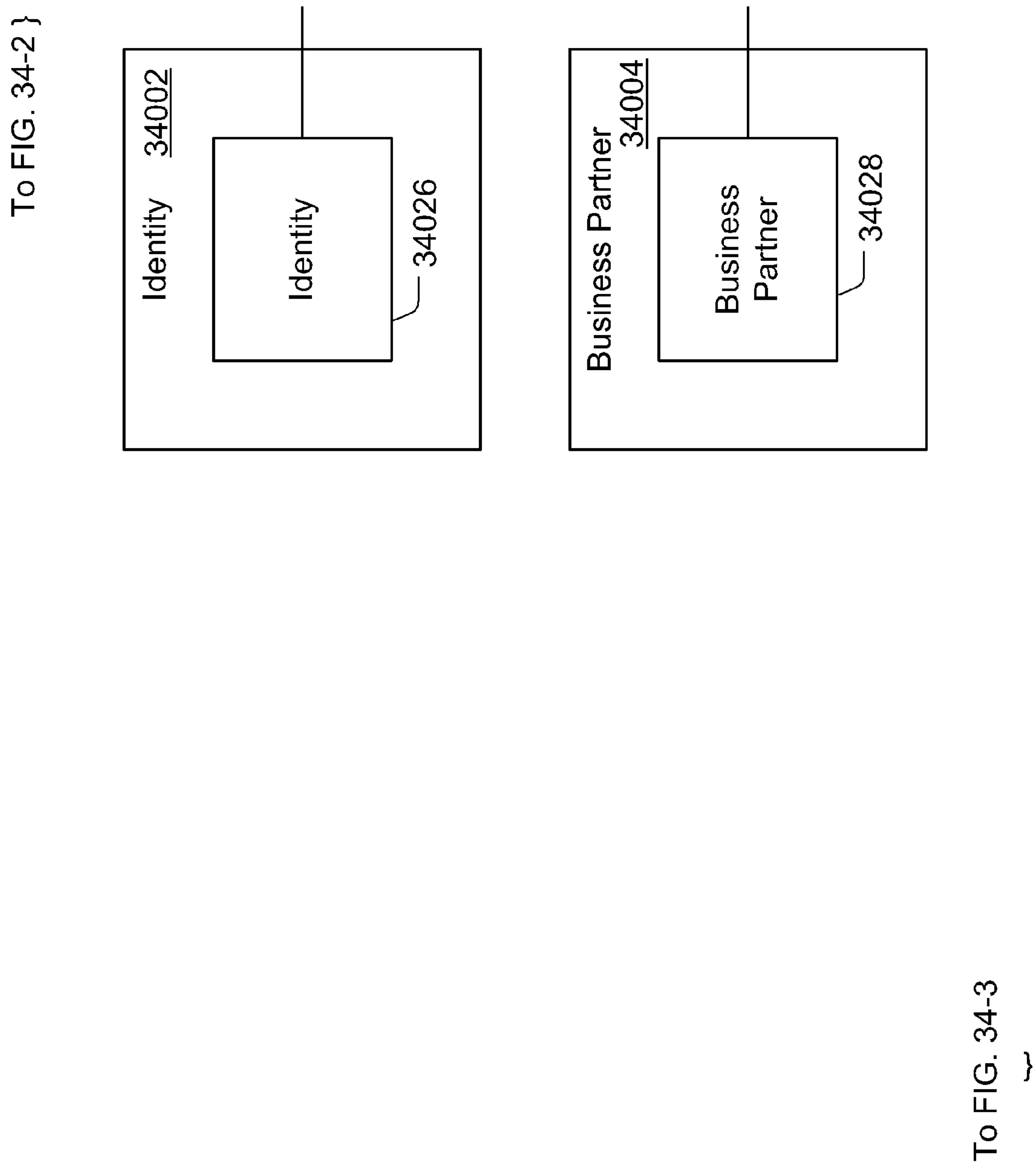
Figures 2, 34:
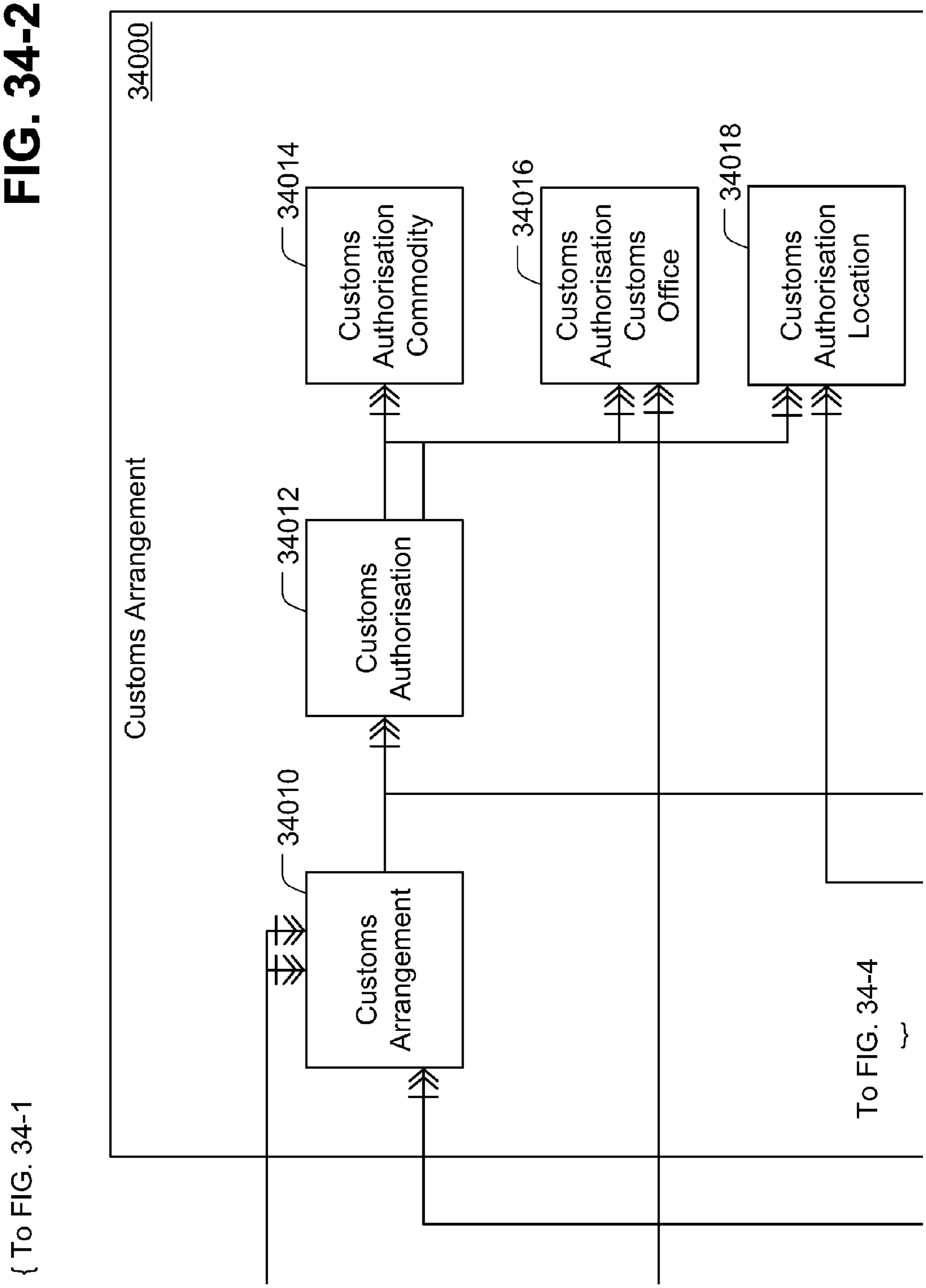

FIGS. 34-1 through 34-4 depict an example object model for a business object Customs Arrangement 34000. The business object 34000 has relationships with other objects 34002-34008, as shown with lines and arrows. The business object 34000 hierarchically comprises elements 34010-34024. The other objects 34002-34008 include respective elements 34026-34032 as shown.

The business object Customs Arrangement is an arrangement by a customs authority for a business partner for submitting and processing customs declarations for customs-relevant goods movement. The business object Customs Arrangement belongs to the process component Customs Processing. In some implementations, arrangements for business partners with category "Organization" are supported. The arrangement includes required data, for example, authorization for a simplified customs procedure, or the assignment to a customs office. The business object Customs Arrangement includes a root node which represents an arrangement by a customs authority for a business partner for submitting and processing customs declarations for customs-relevant goods movement. The elements located directly at the node Customs Arrangement are defined by the data type CustomsArrangementElements. These elements may include ID, PartyUUID, PartyKey, PartyTypeCode, PartyID, CustomsAuthorityCountryCode, Key, PartyUUID, CustomsAuthorityCountryCode, CustomsAuthenticationID, CustomsExportSoftwareVersionCode, and SystemAdministrativeData.

ID, which may be an alternative key, is a unique identifier of the Customs Arrangement, and may be of datatype GDT: CustomsArrangementID. PartyUUID is a universally unique identifier of the party that the Customs Arrangement is valid for and may be of datatype GDT: UUID. PartyKey is a key of the party that the Customs Arrangement is valid for and may be of datatype KDT: PartyKey. PartyTypeCode is a coded representation of a type of party and may be of datatype GDT: BusinessObjectTypeCode. PartyID is an identifier for a party and may be of datatype GDT: PartyID. CustomsAuthorityCountryCode is a coded representation of the country of a customs authority and may be of datatype GDT: CountryCode with a qualifier of CustomsAuthority. Key, which may be an alternative key, is a unique key for a Customs Arrangement and may be of datatype KDT: CustomsArrangementKey. PartyUUID is a universally unique identifier of the party that a Customs Arrangement is valid for and may be of datatype GDT: UUID. CustomsAuthorityCountryCode is a coded representation of a country for which a Customs Arrangement is valid and may be of datatype GDT: CountryCode with a qualifier of CustomsAuthority. CustomsAuthenticationID is an identifier for an authentication of a business partner at a customs authority and may be of datatype GDT: CustomsAuthenticationID. CustomsExportSoftwareVersionCode is the version of the export software of a customs authority and may be of datatype GDT: CustomsExportSoftwareVersionCode. SystemAdministrativeData is administrative data recorded by the system, which may include system user and change times, and may be of datatype GDT: SystemAdministrativeData.

The following composition relationships to subordinate nodes may exist: Customs Authorisation with a cardinality of 1:CN, Contact Party with a cardinality of 1:C, Attachment Folder with a cardinality of 1:C, and Text Collection with a cardinality of 1:C. An inbound aggregation relationship named Party may exist from the business object Party/node Party with a cardinality of 1:CN which represents a party for which the Customs Arrangement is valid. The following inbound association relationships may exist: A LastChangeIdentity relationship, from the business object Identity/node Identity, with a cardinality of 1:CN, which specifies the identity of a user who did the last change of a Customs Arrangement.; and a CreationIdentify relationship, from the business object Identity/node Identity, with a cardinality of 1:CN, which specifies the identity of a user who has created a Customs Arrangement.

A Select All query may provide the NodeIDs of all instances of this node and may be used to enable an initial load of data for a Fast Search Infrastructure (FSI). A Query By Elements query may provide a list of all Customs Arrangements found based upon given parameters. Query elements for the Query By Elements query may be defined by the data type CustomsArrangementElementsQueryElements and may include ID, PartyUUID, PartyTypeCode, PartyID, CustomsAuthorityCountryCode, SystemAdministrativeData, CreationDateTime, CreationIdentityUUID, CreationIdentityID, CreationIdentityBusinessPartnerinternalID, CreationIdentityBusinessPartnerPersonFamilyName, CreationIdentityBusinessPartnerPersonGivenName, CreationIdentityEmployeeID, LastChangeDateTime, LastChangeIdentityUUID, LastChangeIdentityID, LastChangeIdentityBusinessPartnerinternalID, LastChangeIdentityBusinessPartnerPersonFamilyName, LastChangeIdentityBusinessPartnerPersonGivenName, LastChangeIdentityEmployeeID.

ID may be optional and may be an alternative key and may be based on datatype GDT: CustomsArrangementID. PartyUUID may be optional and may be based on datatype GDT: UUID. PartyTypeCode may be optional and may be based on datatype GDT: BusinessObjectTypeCode. PartyID may be optional and may be based on datatype GDT: PartyID. CustomsAuthorityCountryCode may be optional and may be based on datatype GDT: CountryCode with a qualifier of CustomsAuthority. SystemAdministrativeData may be optional and may be based on datatype QueryIDT: QueryElementSystemAdministrativeData. CreationDateTime, which may be optional, is the point in time date and time stamp of the creation and may be based on datatype GDT: GLOBAL_DateTime. CreationIdentityUUID, which may be optional, is a globally unique identifier for the identity who did the creation and may be based on datatype GDT: UUID. CreationIdentityID, which may be optional, is an identifier for the identity who did the creation and may be based on datatype GDT: IdentityID. CreationIdentityBusinessPartnerinternalID, which may be optional, may be based on datatype GDT: BusinessPartnerinternalID, and is a proprietary identifier for a business partner that is attributed to the creation identity and that can be reached following the relationships of the creation identity. CreationIdentityBusinessPartnerPersonFamilyName may be optional, is the family name of the business partner of the category person that is attributed to the creation identity and that can be reached following the relationships of the creation identity, and may be based on datatype GDT: LANGUAGEINDEPENDENT_MEDIUM_Name. CreationIdentityBusinessPartnerPersonGivenName may be optional, is the given name of the business partner of the category person that is attributed to the creation identity and that can be reached following the relationships of the creation identity, and may be based on datatype GDT: LANGUAGEINDEPENDENT_MEDIUM_Name. CreationIdentityEmployeeID may be in optional, is an identifier for an employee that is attributed to the creation identity and that can be reached following the relationships of the creation identity, and may be based on datatype GDT: EmployeeID. LastChangeDateTime may be optional, is the point-in-time date and time stamp of the last change, and may be based on datatype GDT: GLOBAL_DateTime. LastChangeIdentityUUID may be optional, is a globally unique identifier for an identity who made the last changes, and may be based on datatype GDT: UUID. LastChangeIdentityID may be optional, is an identifier for an identity who made the last changes, and may be based on datatype GDT: IdentityID. LastChangeIdentityBusinessPartnerInternalID may be optional, is a proprietary identifier for the business partner that is attributed to the last change identity and that can be reached following the relationships of the last change identity, and may be based on datatype GDT: BusinessPartnerInternalID. LastChangeIdentityBusinessPartnerPersonFamilyName may be optional, is the family name of the business partner of the category person that is attributed to the last change identity and that can be reached following the relationships of the last change identity, and may be based on datatype GDT: LANGUAGEINDEPENDENT_MEDIUM_Name. LastChangeIdentityBusinessPartnerPersonGivenName may be optional, is the given name of the business partner of the category person that is attributed to the last change identity and that can be reached following the relationships of the last change identity, and may be based on datatype GDT: LANGUAGEINDEPENDENT_MEDIUM_Name. LastChangeIdentityEmployeeID may be optional, is an identifier for the employee that is attributed to the last change identity and that can be reached following the relationships of the last change identity, and may be based on datatype GDT: EmployeeID.

The business object Customs Arrangement may include a Customs Authorisation, which is an authorization that a customs authority issues on request for a business partner specifying the possible customs procedures in customs declarations. The elements located directly at the node Customs Authorisation are defined by thedata type: CustomsArrangementCustomsAuthorisationElements. These elements may include InternalID, ID, TypeCode, ReleaseStampPrintingAllowedIndicator, ReleaseStampPrintingCustomsAuthorisationID, ValidityStartDate, and ValidityEndDate.

InternalID may be an alternative key, is internally assigned unique ID of a Customs Authorisation, and may be based on datatype GDT: CustomsAuthorisationInternalID. ID is an identifier for an authorization from the customs authority, and may be based on datatype GDT: CustomsAuthorisationID. TypeCode is a coded representation of the type of a Customs Authorisation and may be based on datatype GDT: CustomsAuthorisationTypeCode. ReleaseStampPrintingAllowedIndicator indicates whether or not it is allowed to print the release stamp instead of requesting it at the authority and may be based on datatype GDT: Indicator with a qualifier of Allowed. ReleaseStampPrintingCustomsAuthorisationID may be optional, is an identifier from a customs authority to be printed in a certain field of the release stamp, and may be based on datatype GDT: CustomsAuthorisationID. ValidityStartDate is the date onward from which the authorization is valid and may be based on datatype GDT: Date with a qualifier of Start. ValidityEndDate is the date until which the authorization is valid and may be based on datatype GDT: Date with a qualifier of End.

The following composition relationships to subordinate nodes exist: a Customs Authorisation Commodity relationship with a cardinality of 1:CN, a Customs Authorisation Customs Office relationship with a cardinality of 1:CN, and a Customs Authorisation Location relationship with a cardinality of 1:CN. In some implementations, if no subnode "Customs Authorisation Commodity" is provided, all commodities are valid. In the case there is such a subnode provided, it may only be valid for the limited commodities. In some implementations, if no subnode "Customs Authorisation Location" is provided, all locations are valid. In the case there is such a subnode provided, it may only be valid for the limited locations. In some implementations, if no subnode "Customs Office" is provided, all Customs Offices are valid. In the case there is such a subnode provided, it may only be valid for the limited customs offices.

Customs Authorisation may include a Query By Elements query which provides a list of all Customs Authorisations found based upon given parameters. The query elements for the Query By Elements query are defined by the data type CustomsArrangementCustomsAuthorisationElementsQueryElements and may include CustomsArrangementID, CustomsArrangementPartyUUID, CustomsArrangementPartyTypeCode, CustomsArrangementPartyID, CustomsArrangementCustomsAuthorityCountryCode, InternalID, TypeCode, ID, ValidityStartDate, and ValidityEndDate. CustomsArrangementID may be optional, may be an alternative key, is a unique identifier of a Customs Arrangement, and may be based on datatype GDT: CustomsArrangementID. CustomsArrangementPartyUUID may be optional, is a universally unique identifier of the party that a Customs Arrangement is valid for, and may be based on datatype GDT: UUID. CustomsArrangementPartyTypeCode may be optional, is a coded representation of a type of party, and may be based on datatype GDT: BusinessObjectTypeCode. CustomsArrangementPartyID may be optional, is an identifier for a party, and may be based on datatypeGDT: PartyID. CustomsArrangementCustomsAuthorityCountryCode may be optional, is a coded representation of the country of a customs authority, and may be based on datatype GDT: CountryCode with a qualifier of CustomsAuthority. InternalID may be optional, may be an alternative key, and may be based on datatype GDT: CustomsAuthorisationInternalID. TypeCodemay be optional and may be based on datatype GDT: CustomsAuthorisationTypeCode. ID may be optional and may be based on datatype GDT: CustomsAuthorisationID. ValidityStartDate may be optional and may be based on datatype GDT: Date with a qualifier of Start. ValidityEndDate may be optional and may be based on datatype GDT: Date with a qualifier of End.

Customs Authorisation may include a Customs Authorisation Commodity, which is a group of commodities for which the Customs Authorization is valid. The elements located directly at the node Customs Authorisation Commodity are defined by the data type CustomsArrangementCustomsAuthorisationCommodityElements which may include CustomsCommodityClassificationCode. CustomsCommodityClassificationCode is a commodity code as defined by an authority and may be based on datatype GDT: CustomsCommodityClassificationCode. In some implementations, if no CommodityClassificationCode is maintained, the Customs Authorisation is valid for all codes. A CommodityCatalogueItem Specialization Associations for Navigation to business object ForeignTradeCommodityCatalogue/Node Item may exist with a cardinality of 1:C, which delivers details of the BO ForeignTradeCommodityCatalogue-ITEM to a given CustomCommodityClassificationCode (such as MeasureUnitForAuthorityCode and assigned Text-Collection Elements). In some implementations, no item information may be found (e.g., with an old classification).

Customs Authorisation may include a Customs Authorisation Customs Office, which is a customs office that is involved in exporting and that is responsible for a location where commodities are presented to customs authorities. The elements located directly at the node Customs Authorisation Customs Office are defined by the data type CustomsArrangementCustomsAuthorisationCustomsOfficeElements and may include CustomsOfficeUUID, CustomsOfficeInternalID, RoleCategoryCode, and RoleCode.

CustomsOfficeUUID is a universally unique identifier of a customs office and may be based on datatype GDT: UUID. CustomsOfficeInternalID is a unique internally assigned identifier for a customs office and may be based on datatype GDT: BusinessPartnerinternalID. RoleCategoryCode is a role category of a customs office in an authorization and may be based on datatype GDT: PartyRoleCategoryCode. In some implementations, PartyRoleCategoryCode may have a value which represents Export Customs Office Party. RoleCode may be optional, is the role of a customs office in an authorization, and may be based on datatype GDT: PartyRoleCode. A CustomsOffice Inbound Aggregation Relationship from the business object Business Partner/node Business Partner may exist with a cardinality of 1:CN, which represents a referenced Business Partner in master data.

Customs Authorisation may include a Customs Authorisation Location, which is a location for presenting commodities to customs authorities. The elements located directly at the node Customs Authorisation Location are defined by the data type CustomsArrangementCustomsAuthorisationLocationElements and may include LocationUUID, LocationID, LocationCustomsAuthorityID, RoleCategoryCode, and RoleCode. LocationUUID is a unique identifier of the location and may be based on datatype GDT: UUID. LocationID is a unique identifier of the location and may be based on datatype GDT: LocationID. LocationCustomsAuthorityID is an identifier for a location given by a customs authority and may be based on datatype GDT: LocationPartyID. RoleCategoryCode is a role category of a location for which an authorization is valid for and may be based on datatype GDT: LocationRoleCategoryCode. In some implementations, LocationRoleCategoryCode may have a value which represents a Presentation Location. RoleCode may be optional, is the role of the location in the authorization, and may be based on datatype GDT: LocationRoleCode.

A Location Inbound Aggregation Relationship from the business object Location/node Location with a cardinality of 1:CN, which represents a location corresponding to the Location.

The business object Customs Arrangement may include a Contact Party, which is a contact party of the business partner that can be contacted in processes based on an arrangement. The contact may be a contact person or, for example, a secretary's office. Usually, communication data for the contact is available. The elements located directly at the node Contact Party are defined by the data type CustomsArrangementContactPartyElements and may include PartyKey, PartyUUID, and AddressReference. PartyKey is a key of the Party in this PartyRole in the Customs Arrangement and may be based on KDT: PartyKey. PartyTypeCode is a coded representation of a type of party and may be based on datatype GDT: BusinessObjectTypeCode. PartyID is an identifier for a party and may be based on datatype GDT: PartyID. PartyUUID is a unique identifier of the contact in this PartyRole in the Customs Arrangement and may be based on datatype GDT: UUID. AddressReference may be optional, includes information to reference the address of a contact, and may be based on datatype GDT: PartyAddressReference. A Party Inbound Aggregation Relationship from the business object Party/node Party with a cardinality of 1:CN may exist, which represents a referenced Party in master data.

Figures 1, 35:
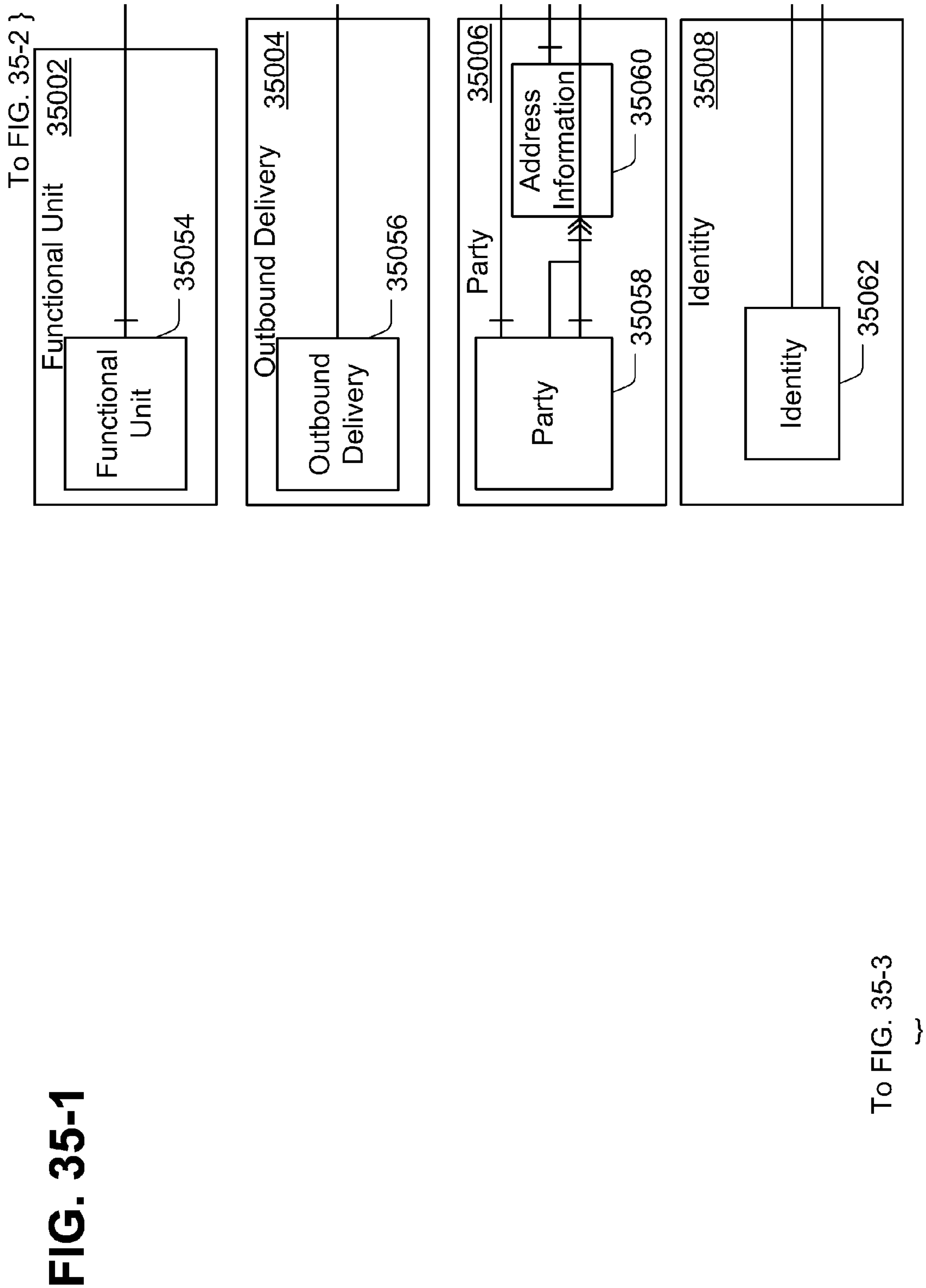
Figures 2, 35:
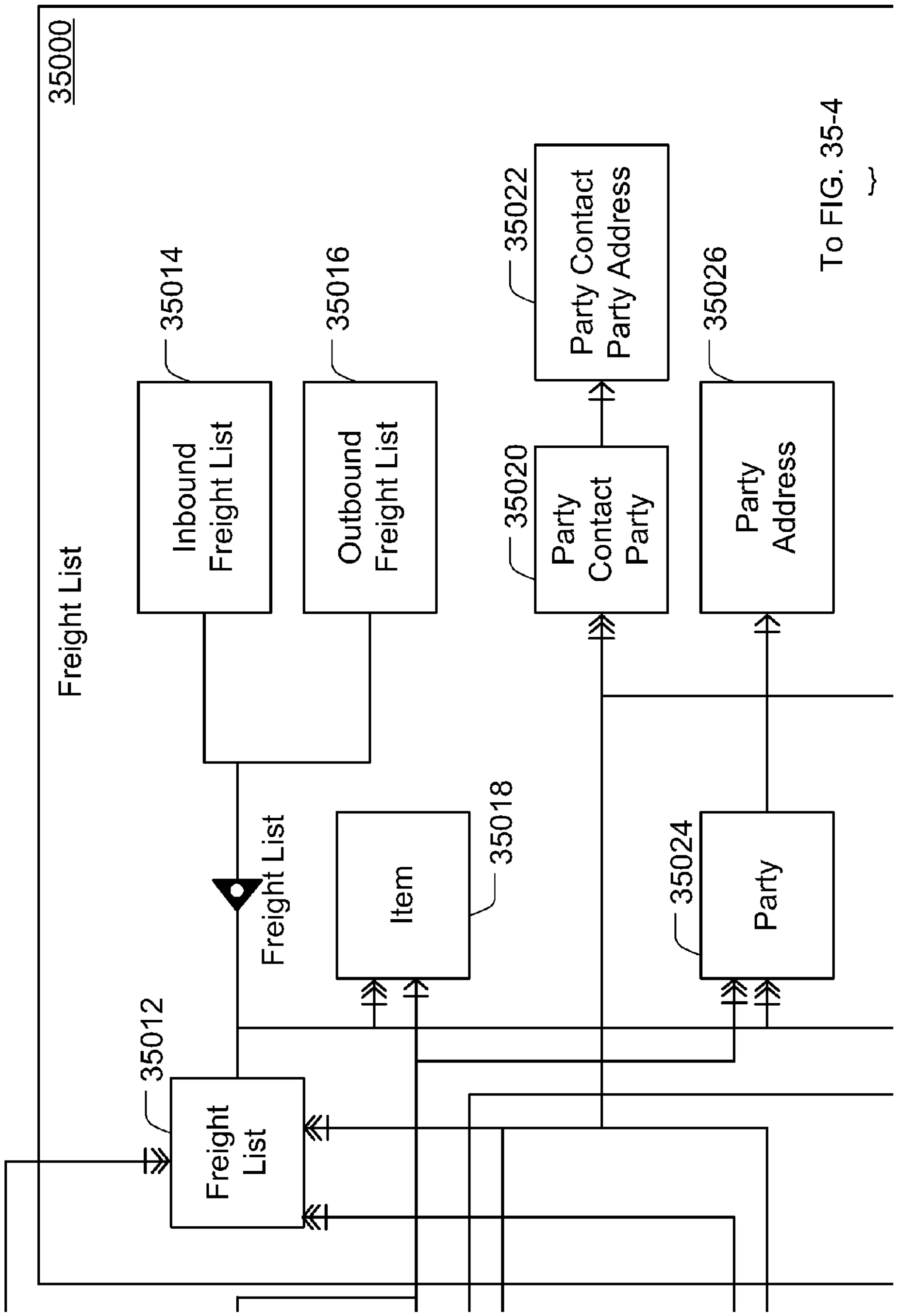
Figures 3, 35:
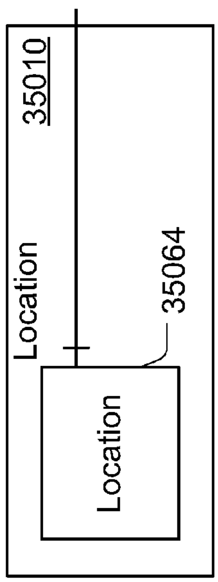
Figures 4, 35:
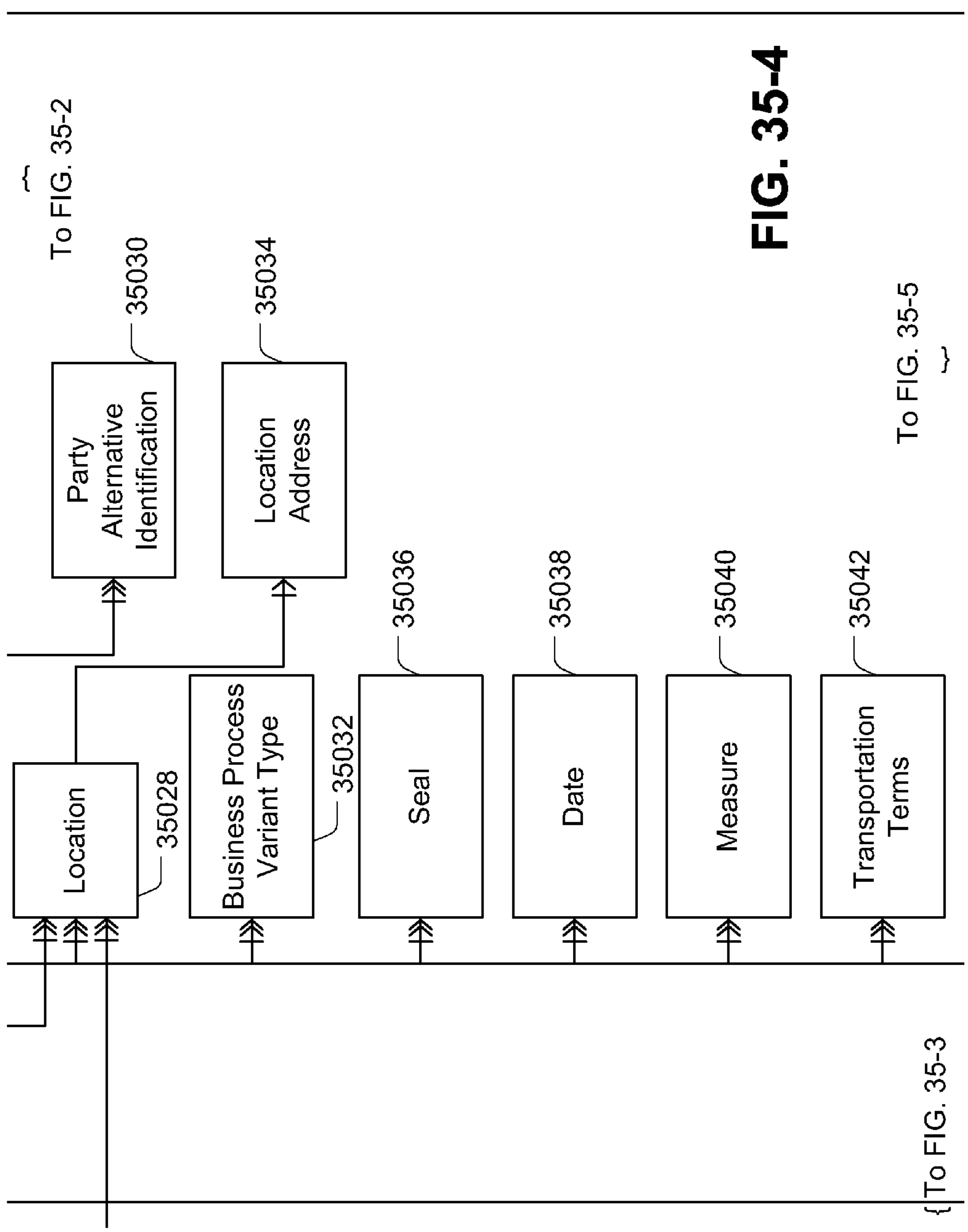
Figures 5, 35:
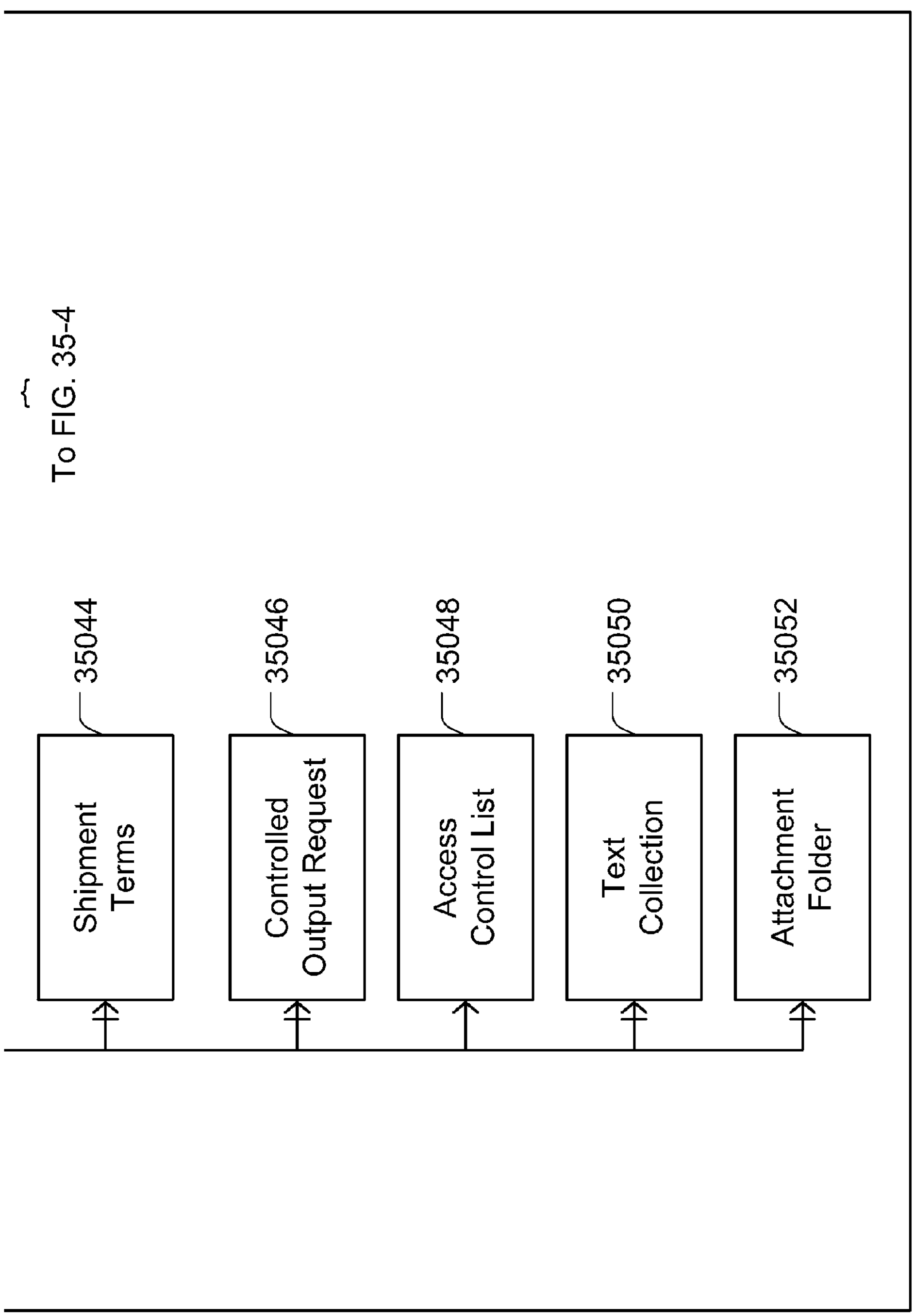

FIGS. 35-1 through 35-5 depicts an example object model for a business object Freight List 35000. The business object 35000 has relationships with other objects 35002-35010, as shown with lines and arrows. The business object 35000 hierarchically comprises elements 35012-35052. The other objects 35002-35010 include respective elements 35054-35064 as shown.

The business object Freight List is a document detailing a list of shipped goods that are to be transported, associated business partners, and a mode of transportation. The business object Freight List belongs to the process component Freight Documents Processing. A Freight List includes the following information: ship-to and ship-from locations, business parties involved (e.g., shipper, freight forwarder), commercial terms, a list of shipped goods, a declared value of the shipment, actual measurements, attached documents relevant to the shipment, and seal information. The business object Freight List may be associated with a Freight Documents Processing_Transportation Management at Freight Forwarder process component interaction model. A service interface Waybill Notification Out may have a technical name of FreightDocumentsProcessingWaybillNotificationOut, may be part of a Freight Documents Processing_Transportation Management at Freight Forwarder process component interaction model, and is an interface to create a waybill. An Output Waybill service interface may have a technical name of FreightDocumentsProcessingWaybillNotificationOut.OutputWaybill, may be used to print a waybill, and may be based on message type Form Waybill Notification derived from business object Freight List. The business object Freight List may be time dependent on Time Point. A Freight List root node may occur in the following complete, not-disjoint specializations: Inbound Freight List and Outbound Freight List. In some implementations, a specialization type Freight List is implemented by Type Attribute.

The elements located directly at the node Freight List are defined by the data type FreightListElements. These elements include: UUID, ID, TypeCode, SystemAdministrativeData, Status, ReleaseStatusCode, CancellationStatusCode, ConsistencyStatusCode, CashOnDeliveryAmount, DeclaredAmount, FreightChargesPrepaidIndicator, CashOnDeliveryFeePrepaidIndicator, CustomerCheckAllowedIndicator, FunctionalUnitUUID, FunctionalUnitID, FreightLoadingPartyRoleCategoryCode, FreightCountingCode, ProgressiveID, PredefinedExtensionFolder, and PredefinedExtension.

UUID may be an alternative key, is a universally unique identifier of a freight list for referencing purposes, and may be based on datatype GDT: UUID. ID is a unique identifier of a freight list and may be based on datatype GDT: BusinessTransactionDocumentID. An internal number range for Freight List ID may be supported. TypeCode is a coded representation of a type of freight list, and may be based on datatype GDT: BusinessTransactionDocumentTypeCode. In some implementations, a freight list type can either be outbound shipment or inbound shipment. SystemAdministrativeData includes administrative data recorded by the system. This data includes system users and change times. SystemAdministrativeData may be based on datatype GDT: SystemAdministrativeData. Status is a current step in a life cycle of a Freight List and may be based on datatype BOIDT: FreightListStatus. ReleaseStatusCode is a coded representation that indicates if a freight list has been released, and may be based on datatype GDT: ReleaseStatusCode. CancellationStatusCode is a coded representation that indicates if a freight list has been cancelled and may be based on datatype GDT: CancellationStatusCode. ConsistencyStatusCode is a coded representation that indicates if a root node of a freight list is consistent. The node is consistent if content of obligatory attributes is completely filled and if content of all attributes includes no contradictions, (i.e., all predefined constraints regarding this content are fulfilled). ConsistencyStatusCode may be based on datatype GDT: ConsistencyStatusCode. CashOnDeliveryAmount may be optional, is a cash amount that is received when a shipment is delivered, and may be based on datatype GDT: Amount with a qualifier of CashOnDelivery. DeclaredAmount may be optional, is a declared value of goods to be shipped, and may be based on datatype GDT: Amount with a qualifier of Declared. FreightChargesPrepaidIndicator may be optional, indicates if the freight charges are prepaid by shipper or by product recipient, and may be based on datatype GDT: Indicator with a qualifier of Prepaid. CashOnDeliveryFeePrepaidIndicator may be optional, indicates if a fee for Cash On Delivery is prepaid, and may be based on datatype GDT: Indicator with a qualifier of Prepaid. CustomerCheckAllowedIndicator may be optional, indicates if a shipper accepts a payment by check, and may be based on datatype GDT: Indicator with a qualifier of Allowed. FunctionalUnitUUID may be optional, is a universally unique identifier of a specific functional unit in which a freight list is executed, and may be based on datatype GDT: UUID. FunctionalUnitID may be optional, is a unique identifier of a specific functional unit in which a freight list is executed, and may be based on datatype GDT: OrganisationalCentreID. FreightLoadingPartyRoleCategoryCode may be optional, is a coded representation of an entity that is responsible for loading freight list goods, and may be based on datatype GDT: PartyRoleCategoryCode with a qualifier of FreightLoading. FreightCountingCode may be optional, is a coded representation of an entity that is responsible for counting freight list goods and of a counting method, and may be based on datatype GDT: FreightCountingCode. ProgressiveID may be optional, is a progressive identifier for a single shipment assigned by a carrier, and may be based on datatype GDT: BusinessTransactionDocumentID. The progressive identifier may be a number that a carrier assigns to a shipment in the carrier's system and may be intended to be used for communication with a carrier. PredefinedExtensionFolder may be optional, includes predefined extension fields which may enable a key user at a customer site for self-service with customer specific business semantics on a need basis, and may be based on datatype BOIDT: FreightListPredefinedExtensionFolderElements. PredefinedExtension may be optional, is a predefined extension of a Freight list, and may be based on datatype BOIDT: FreightListPredefinedExtension.

The following composition relationships to subordinate nodes may exist: Item with a cardinality of 1:CN, Party with a cardinality of 1:CN, Location with a cardinality of 1:CN, Business Process Variant Type with a cardinality of 1:CN, Seal with a cardinality of 1:CN, Date with a cardinality of 1:CN, Measure with a cardinality of 1:CN, TransportationTerms with a cardinality of 1:CN, ShipmentTerms with a cardinality of 1:C, Controlled Output Request with a cardinality of 1:C, Access Control List with a cardinality of 1:1, TextCollection with a cardinality of 1:C, and Attachment Folder with a cardinality of 1:C. The following inbound association relationships may exist: FunctionalUnit, from the business object Functional Unit/node Functional Unit, with a cardinality of C:CN, which represents a functional unit which a freight list is executed in; CreationIdentity, from the business object Identity/node Identity, with a cardinality of 1:CN, which identifies an identity that created a freight list; and LastChangeIdentity, from the business object Identity/node Identity, with a cardinality of 1:CN, which identifies an identity which last changed a freight list.

The following specialization associations for navigation may exist: BusinessDocumentFlow, to the business object BusinessDocumentFlow/node Root, which enables navigation to the BusinessDocumentFlow instance that a Freight List takes part in; ProductRecipientParty, VendorParty, FreightForwarderParty, and BillToParty to the node Party; ShipToLocation and ShipFromLocation to the node Location; ShippingPeriod to the node Date; TruckTransportMeans and TrailerTransportMeans to the node TransportationTerms; CarrierProgressiveNumber to the node BusinessTransactionDocumentReference; and GrossWeight and GrossVolume to the node Measure.

The following enterprise service infrastructure actions may exist: Adjust Responsible Agent And Access Control List, Release, CancelRelease, RevokeCancellation, and Create With Reference. The Adjust Responsible Agent And Access Control List action may be used to adjust responsible agents and corresponding entries in an Access Control list based on current responsibility settings. Responsible agents may be functional units for a Freight List. The Adjust Responsible Agent And Access Control List action may be used for adjustments of Responsible Functional Units and an Access Control List resulting from changes in responsibility settings for Functional Units. The Release action may be used to release a a freight list. The release action may result in a status change, such as indicating that the acted upon freight list is currently released. The Release action may be performed manually by a user after entering data. The CancelRelease action may be used to cancel a release of a freight list. The CancelRelease action may result in a status change, such as indicating that the acted-upon freight list is currently "ReleaseCanceled". The CancelRelease action may be performed manually by a user. The Cancel action may be used to cancel a freight list and set a status to Canceled. The Cancel action may result in a status change, such as indicating that the acted-upon freight list is currently "Canceled". The RevokeCancellation action may be used to revoke a cancellation of a freight list object. The RevokeCancellation action may result in a status change, such as indicating that the acted-upon freight list is currently "Not Canceled". The Create with Reference action may be used to create a freight list based on a provided business object reference.

The business object Freight List may be associated with a Query By Elements query and a Select All query. The Select All query provides NodeIDs of all instances of an acted-upon node. The Select All query may be used to enable an initial load of data for a fast search infrastructure. The Query By Elements query provides a list of all freight lists that satisfy selection criteria specified by the query elements. The query elements are defined by the data type FreightListElementsQueryElements and may include ID, SystemAdministrativeData, CreationIdentityUUID, CreationIdentityID, CreationIdentityBusinessPartnerInternalID, CreationIdentityBusinessPartnerPersonFamilyName, CreationIdentityBusinessPartnerPersonGivenName, CreationIdentityEmployeeID, LastChangeDateTime, LastChangeIdentityUUID, LastChangeIdentityID, LastChangeIdentityBusinessPartnerInternalID, LastChangeIdentityBusinessPartnerPersonFamilyName, LastChangeIdentityBusinessPartnerPersonGivenName, LastChangeIdentityEmployeeID, ProductRecipientPartyKey, PartyID, FreightForwarderPartyKey, ShipToLocationID, ShipFromLocationID, ConsistencyStatusCode, ReleaseStatusCode, CancellationStatusCode, OutboundDeliveryID, SalesOrderItemReference, ServiceOrderItemReference, StockTransferOrderItemReference, ShippingDateTime, SearchText, PredefinedExtensionFolder, and PredefinedExtension.

ID may be optional and may be based on datatype GDT: BusinessTransactionDocumentID. SystemAdministrativeData may be optional and may be based on datatype QueryIDT: QueryElementSystemAdministrativeData. CreationDateTime may be optional, is a date and time stamp of a creation, and may be based on datatype GDT: GLOBAL_DateTime. CreationIdentityUUID may be optional, is a globally unique identifier for an identity who performed a creation, and may be based on datatype GDT: UUID. CreationIdentityID may be optional, is an identifier for an identity who performed a creation, and may be based on datatype GDT: IdentityID. CreationIdentityBusinessPartnerInternalID may be optional, is a proprietary identifier for a business partner that is attributed to a creation identity and that can be reached following relationships of a creation identity, and may be based on datatype GDT: BusinessPartnerInternalID. CreationIdentityBusinessPartnerPersonFamilyName may be optional, is a family name of a business partner of a category person that is attributed to a creation identity and that can be reached following the relationships of a creation identity, and may be based on datatype GDT: LANGUAGEINDEPENDENT_MEDIUM_Name. CreationIdentityBusinessPartnerPersonGivenName may be optional, is a given name of a business partner of a category person that is attributed to a creation identity and that can be reached following the relationships of a creation identity, and may be based on datatype GDT: LANGUAGEINDEPENDENT_MEDIUM_Name. CreationIdentityEmployeeID may be optional, is an identifier for an employee that is attributed to a creation identity and that can be reached following the relationships of a creation identity, and may be based on datatype GDT: EmployeeID. LastChangeDateTime may be optional, is a date and time stamp of a last change, and may be based on datatype GDT: GLOBAL_DateTime. LastChangeIdentityUUID may be optional, is a globally unique identifier for an identity who made the last changes, and may be based on datatype GDT: UUID. LastChangeIdentityID may be optional, is an identifier for an identity who made the last changes, and may be based on datatype GDT: IdentityID. LastChangeIdentity-BusinessPartnerintemalID may be optional, is a proprietary identifier for a business partner that is attributed to a last change identity and that can be reached following the relationships of a last change identity, and may be based on datatype GDT: BusinessPartnerInternalID. LastChangeIdentityBusinessPartnerPersonFamilyName may be optional, is a family name of a business partner of a category person that is attributed to a last change identity and that can be reached following the relationships of a last change identity, and may be based on datatype GDT: LANGUAGEINDEPENDENT-_MEDIUM_Name. LastChangeIdentityBusiness-PartnerPersonGivenName may be optional, is a given name of a business partner of a category person that is attributed to a last change identity and that can be reached following the relationships of the last change identity, and may be based on datatype GDT: LANGUAGEINDEPENDENT_MEDIUM-_Name. LastChangeIdentityEmployeeID may be optional, is an identifier for an employee that is attributed to a last change identity and that can be reached following the relationships of the last change identity, and may be based on datatype GDT: EmployeeID. ProductRecipientPartyKey may be optional and may be based on datatype KDT: PartyKey. PartyType-Code is a coded representation of a type of party and may be based on datatype GDT: BusinessObjectTypeCode. PartyID is an identifier for a party and may be based on datatype GDT: PartyID. In some implementations, a query element is derived from the PartyRoleCode and the PartyKey of the Party node. FreightForwarderPartyKey may be optional and may be based on KDT: PartyKey. PartyTypeCode is a coded representation of a type of party and may be based on datatype GDT: BusinessObjectTypeCode. PartyID is an identifier for a party and may be based on datatype GDT: PartyID. Ship-ToLocationID may be optional and may be based on datatype GDT: LocationID with a qualifier of ShipTo. In some implementations, a query element is derived from the Location-RoleCode and the LocationID of the Location node. Ship-FromLocationID may be optional and may be based on datatype GDT: LocationID with a qualifier of ShipFrom. In some implementations, a query element is derived from the LocationRoleCode and the LocationID of the Location node. ConsistencyStatusCode may be optional and may be based on datatype GDT: ConsistencyStatusCode. ReleaseStatusCode may be optional and may be based on datatype GDT: Releas-eStatusCode. CancellationStatusCode may be optional and may be based on datatype GDT: CancellationStatusCode. OutboundDeliveryID may be optional and may be based on datatype GDT: BusinessTransactionDocumentID. In some implementations, a query element is derived from Busi-nessTransactionDocument element at root node in Business object Outbound Delivery. SalesOrderItemReference may be optional and may be based on datatype GDT: BusinessTrans-actionDocumentReference. In some implementations, ahe query element is derived from a BusinessTransactionDocu-ment element at Item node in business object Outbound Delivery. ServiceOrderItemReference may be optional and may be based on datatype GDT: BusinessTransactionDocu-mentReference. In some implementations, ahe query element is derived from BusinessTransactionDocument element at Item node in Business object Outbound Delivery. Stock-TransferOrderItemReference may be optional and may be based on datatype GDT: BusinessTransactionDocumen-tReference. In some implementations, a query element is derived from BusinessTransactionDocument element at Item node in Business object Outbound Delivery. ShippingDa-teTime may be optional and may be based on datatype GDT: LOCALNORMALISED_DateTime with a qualifier of Shipping. In some implementations, a query element is derived from the Date node. SearchText may be optional, includes text including one or several search terms to search for a freight list, and may be based on datatype GDT: SearchText. In some implementations, for every query that includes SearchText as a query parameter, an application-specific subset of the other query parameters is defined. The query result is calculated using a method where the search terms are assigned to a subset of query parameters in such a way that every search term is used exactly once in an assignment. Several search terms may be assigned to the same query parameter. For each of these assignments a query result is calculated. The total result is then the union of the results calculated per assignment. PredefinedExtensionFolder may be optional, includes predefined extension fields as delivered fields to enable a key user at a customer site to for self-service with customer specific business semantics. PredefinedExtensionFolder may be based on datatype QueryIDT: Freight-ListElementsPredefinedExtensionFolderQueryElements. PredefinedExtension may be optional, is a predefined extension of Freight list specific information, and may be based on datatype BOIDT: FreightListPredefinedExtension.

Inbound Freight List includes a collection of inbound deliveries to be shipped, involved parties, and a mode of transportation. Outbound Freight List includes a collection of outbound deliveries to be shipped, involved parties, and a mode of transportation. Item is a Freight List item that refers to a document from which detailed information about shipped goods are derived. The elements located directly at node Item are defined by a data type FreightListItemElements. These elements include UUID. UUID may be an alternative key, is a universal unique identifier of a Freight List Item for referencing purposes, and may be based on datatype GDT: UUID. BusinessTransactionDocumentReference is a unique reference to a business document that is included in a freight list, and may be based on datatype GDT: BusinessTransaction-DocumentReference. An OutboundDelivery inbound aggregation relationship may exist from the business object Outbound Delivery/node Outbound Delivery, with a cardinality of 1:C, which represents an outbound delivery included in a freight list.

Party is a natural or legal person, organization, organizational unit, or group that is involved in a freight list in a party role. A party may keep a reference to a business partner or to a specialization (e.g., customer, supplier). A party may keep a reference to a specialization of an organizational unit (e.g., company). A party may exist without reference to a business partner or an organizational unit. The elements located directly at the node Party are defined by the data type Freight-ListPartyElements. These elements include: PartyKey, Party-TypeCode, PartyID, PartyUUID, RoleCategoryCode, Role-Code, and AddressReference.

PartyKey may be optional, is a key of a party in this PartyRole in a business document or a master data object, and may be based on datatype KDT: PartyKey. PartyTypeCode is a coded representation of a type of party and may be based on datatype GDT: BusinessObjectTypeCode. PartyID is an identifier for a party and may be based on datatype GDT: PartyID. PartyUUID may be optional, is a universally unique identifier for a business partner, an organizational unit, or its specializations, and may be based on datatype GDT: UUID. Role-CategoryCode may be optional, is a coded representation of a role category for a party in a business document or a master data object, and may be based on datatype GDT: PartyRole-CategoryCode. RoleCode may be optional, is a coded representation of a role for a party in a business document or a master data object, and may be based on datatype GDT: PartyRoleCode. AddressReference may be optional, is a reference to an address of a party, and may be based on datatype GDT: PartyAddressReference. The following composition relationships to subordinate nodes may exist: PartyContactParty with a cardinality of 1:CN, Party Address with a cardinality of 1:C, and Party Alternative Identification with a cardinality of 1:CN. A Party inbound aggregation relationships may exist from the business object Party/node Party with a cardinality of C:CN, which may represent a referenced Party in master data.

A UsedAddress implemented specialization association for navigation may exist to business object UsedAddress/node Root, for an address used for the Party. In a first case, the address can be a referenced address of a master data object. In a second case, the address may be a PartyAddress used in a composition relationship. It may be possible to determine which case applies by means of a PartyAddressHostTypeCode element. An instance of TO UsedAddress may represent the address. In the first case, the node ID of a node in a master data object may be determined using PartyTypeCode, PartyAddressUUID and PartyAddressHostTypeCode elements that have a composition relationship to a DO (dependent object) address that is to be represented by the TO UsedAddress. In the second case, the TO UsedAddress is informed of the BusinessObjectTypeCode, BusinessObjectNodeTypeCode and Node ID of its own business object node Party. Additionally, information is provided specifying that a referenced address is not used. In the second case, the TO UsedAddress represents the DO address used at the business object node Party using a PartyAddress composition relationship. A UsedAddressOverview specialization association for navigation may exist to business object UsedAddress/node Overview, which is equal to the association to the UsedAddress association. An IdentifiedByFreightForwarderParty association may exist to node PartyAlternativeIdentification and a MainContactParty association may exist to node PartyContactParty.

In some implementations, there may only be one aggregation relationship to a business partner, an organizational unit, or their specializations. In such implementations, if the PartyUUID exists, the PartyTypeCode also exists, parties may only be referenced via a Transformed Object Party, and there may only be one association to an address, where the one address is a master data address of a business partner, organizational unit, or their specializations referenced by PartyUUID.

Party Contact Party is a natural person or organizational unit that can be contacted for a party. Communication data for a contact may be available. Examples of a a contact may include a contact person or a secretary's office. The elements located directly at the node Party Contact Party are defined by the data type FreightListPartyContactPartyElements. These elements include: PartyKey, PartyTypeCode, PartyID, PartyUUID, AddressReference, MainIndicator, and Name. PartyKey may be optional, is a key of the Party in a PartyRole in a business document or a master data object, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. PartyUUID may be optional, is a unique identifier of a contact in a PartyRole in a business document or a master data object, and may be based on datatype GDT: UUID. AddressReference may be optional, includes information to reference an address of a Party, and may be based on datatype GDT: PartyAddressReference. MainIndicator indicates whether a PartyContactParty is emphasized in a group of contact parties with a same PartyRole, and may be based on datatype GDT: Indicator with a qualifier of Main. Name may be optional, is a name of a PartyContactParty, and may be based on datatype GDT: LONG_Name.

A composition relationship between Party to a subordinate node PartyContactPartyAddress may exist with a 1:C cardinality relationship. An inbound aggregation relationship may exist from the business object Party/node Party to Party, in a C:CN cardinality relationship, indicating a referenced Party in master data. A specialization association for navigation may exist from Party to a business object UsedAddress/node Root which may be a referenced address of a master data object or an address referenced via a composition to PartyAddress. An association may exist from Party to a business object UsedAddress/node Overview, which may be equal to the UsedAddress/Root association described above. In some implementations, there may only be one association to an address and the address may be a master data address of a business partner, organizational unit, or their specialization, referenced by PartyUUID.

Party Contact Party may include an Address dependent object Inclusion Node which is includes a document specific address of a contact party. Data may be defined by the dependent object address.

Party Alternative Identification is an alternative identification to an identified party in a Party node. The elements located directly at the node Party Alternative Identification are defined by the data type FreightListPartyAlternativeIdentificationElements. These elements include: PartyID, PartyIdentifierTypeCode, IdentifiedByPartyRoleCode, and IdentifiedByPartyRoleCategoryCode PartyID is an identifier of an alternative identified party, and may be based on datatype GDT: NOALPHANUMERICCONVERSION_PartyID. PartyIdentifierTypeCode may be optional, is a coded representation of a type of identifier for a party, and may be based on datatype GDT: PartyIdentifierTypeCode. IdentifiedByPartyRoleCode may be optional, is a role code of a party that identifies a party, and may be based on datatype GDT: PartyRoleCode with a qualifier of IdentifiedBy. IdentifiedByPartyRoleCategoryCode may be optional, is a role category code of a party that identifies a party, and may be based on datatype GDT: PartyRoleCategoryCode with a qualifier of IdentifiedBy.

Location is a location is a physical place which is part of a shipment process in a LocationRole. A location may store a reference to a business object location, a reference to an address, a reference to a business partner or one of its specializations, or a reference to an organizational unit or one of its specializations. A location role describes a role of a location in a shipment process. The elements located directly at the node Location are defined by the data type FreightListLocationElements. These elements include: LocationID, LocationUUID, AddressReference, AddressHostUUID, BusinessObjectTypeCode, AddressHostTypeCode, PartyKey, PartyTypeCode, PartyID, InstalledBaseID, InstallationPointID, RoleCode, and RoleCategoryCode. LocationID may be optional, is a unique identifier of a location, and may be based on datatype GDT: LocationID. LocationUUID may be optional, is a universally unique identifier of a Location, and may be based on datatype GDT: UUID. AddressReference may be optional, includes information to reference an address of a Party, an InstalledBase or an InstallationPoint, and may be based on datatype BOIDT: ObjectNodeLocationAddressReference. AddressHostUUID may be optional, is a universally unique identifier for an address of a business partner, an organizational unit or its specializations, a business object InstalledBase, or a business object Installation-Point, and may be based on datatype GDT: UUID. BusinessObjectTypeCode may be optional, is a coded representation of a type of a business object in which an address referenced in the LocationAddressUUID is integrated as a dependent object, and may be based on datatype GDT: BusinessObject-TypeCode. AddressHostTypeCode may be optional, is a coded representation of an address host type of an address referenced by an AddressUUID or an address included using a Location Address composition, and may be based on datatype GDT: AddressHostTypeCode. PartyKey may be optional, is an alternative identifier of a party representing a business partner or an organizational unit that references an address using an AddressUUID, and may be based on datatype KDT: PartyKey. PartyTypeCode is a coded representation of a type of party, and may be based on datatype GDT: BusinessObjectTypeCode. PartyID is an identifier for a party, and may be based on datatype GDT: PartyID. InstalledBaseID may be optional, is an identifier for an installed base that references an address using an AddressUUID, and may be based on datatype GDT: InstalledBaseID. InstallationPointID may be optional, is an identifier for an installation point that references an address using an AddressUUID, and may be based on datatype GDT: InstallationPointID. RoleCode is a coded representation of a role of a Freight List Location in a business document or a master data object, and may be based on datatype GDT: LocationRoleCode. RoleCategoryCode may be optional, is a coded representation of a role category of a Freight List Location in a business document or a master data object, and may be based on datatype GDT: LocationRoleCategoryCode.

A composition relationship may exist from Location to a subordinate node Location Address with a cardinality of 1:C. An inbound aggregation relationship may exist from the business object Location/node Location with a cardinality of C:CN, which represents a location corresponding to a Location. A PartyAddressInformation inbound aggregation relationship may exist from the business object Party/node with a cardinality of C:CN which includes address information of a representative of a Business Partner or Organizational Centre corresponding to a Location. An implemented specialization association for navigation may exist from Location to the business object UsedAddress/node Root, representing an address used for a location. The address can be a referenced address of a master data object or an address that is integrated via a composition relationship LocationAddress. Which type of address is used may be determined by element AddressHostTypeCode. An instance of a TO UsedAddress represents the address. A UsedAddressOverview association to a business object UsedAddress/node Overview may exist which is equivalent to the association to UsedAddress/Root described above.

Location may include a Location Address dependent object Inclusion Node which includes a document specific address of a location. Data may be defined by a dependent object address.

Business Process Variant Type defines a character of a business process variant of a freight list and represents a typical way of processing a freight list within a process component from a business point of view. A business process variant is a configuration of a process component. A business process variant may belong to exactly one process component. The elements located directly at the node Business Process Variant Type are defined by the data type FreightList-BusinessProcessVariantTypeElements. These elements include: BusinessProcessVariantTypeCode, and MainIndicator. BusinessProcessVariantTypeCode is a coded representation of a business process variant type of a Freight List, and may be based on datatype GDT: BusinessProcessVariant-TypeCode. MainIndicator indicates if a current Business Process Variant Type Code is a main type code, and may be based on datatype GDT: Indicator with a qualifier of Main.

Seal is a material, such as a sticker, label, or lock that is placed on a shipment. A seal is used to determine if a shipment has been tampered with. The elements located directly at a node Seal are defined by the data type FreightListSealElements. These elements include SealID, which is a unique identifier of a seal, and may be based on datatype GDT: SealID.

Date is a time specification for a freight list based on a day, month and year. A date can be given with varying degrees of precision. For example, a data can be second-precise, minute-precise, day-precise, etc. The elements located directly at the node Date are defined by the data type FreightListDateElements. These elements include: PeriodRoleCode and DateTimePeriod. PeriodRoleCode is a coded representation of the semantics of a period in a freight list, and may be based on datatype GDT: PeriodRoleCode. DateTimePeriod is a time period that is relevant for a Freight List, and may be based on datatype GDT: UPPEROPEN_LOCALNORMALISED_DateTimePeriod.

Measure is a specific quantity or size required for a freight list, such as gross weight or gross volume. The elements located directly at the node Measure are defined by the data type FreightListMeasureElements. These elements include: Measure and MeasureTypeCode. Measure is a physical measurement with a corresponding unit of measure, and may be based on datatype GDT: Measure. MeasureTypeCode is a coded representation of a type of a measure, and may be based on datatype GDT: MeasureTypeCode.

Transportation Terms include conditions and agreements negotiated when an order is placed that are valid for transportation or for services and activities required for transportation. The elements located directly at the node Transportation Terms are defined by the data type FreightListTransportationTermsElements. These elements include: TransportMeans and TransportModeCode. TransportMeans is a description of a type of transport, and may be based on datatype GDT: TransportMeans. TransportModeCode may be optional, is a coded representation of a transport mode of a shipment, and may be based on datatype GDT: TransportModeCode.

Shipment Terms includes conditions and agreements negotiated when a sales order was placed that are valid for shipment or for services and activities required for shipment. The elements located directly at the node Shipment Terms are defined by the data type FreightListShipmentTermsElements. These elements include Incoterms, which are typical contract formulations for delivery conditions that correspond to rules defined by the International Chamber of Commerce (ICC). Incoterms may be based on datatype GDT: Incoterms.

Freight List may include: a Controlled Output Request dependent object Inclusion Node which represents a controller of output requests and output history entries, an Access Control List dependent object Inclusion Node which represents a list of access groups that have access to an employment during a validity period, a Text Collection dependent object Inclusion Node which includes natural language text linked to a Freight List that supports a shipment processing, and an Attachment Folder dependent object Inclusion Node which is a container of documents that describe a freight List and its related processes.

Figures 3, 34:
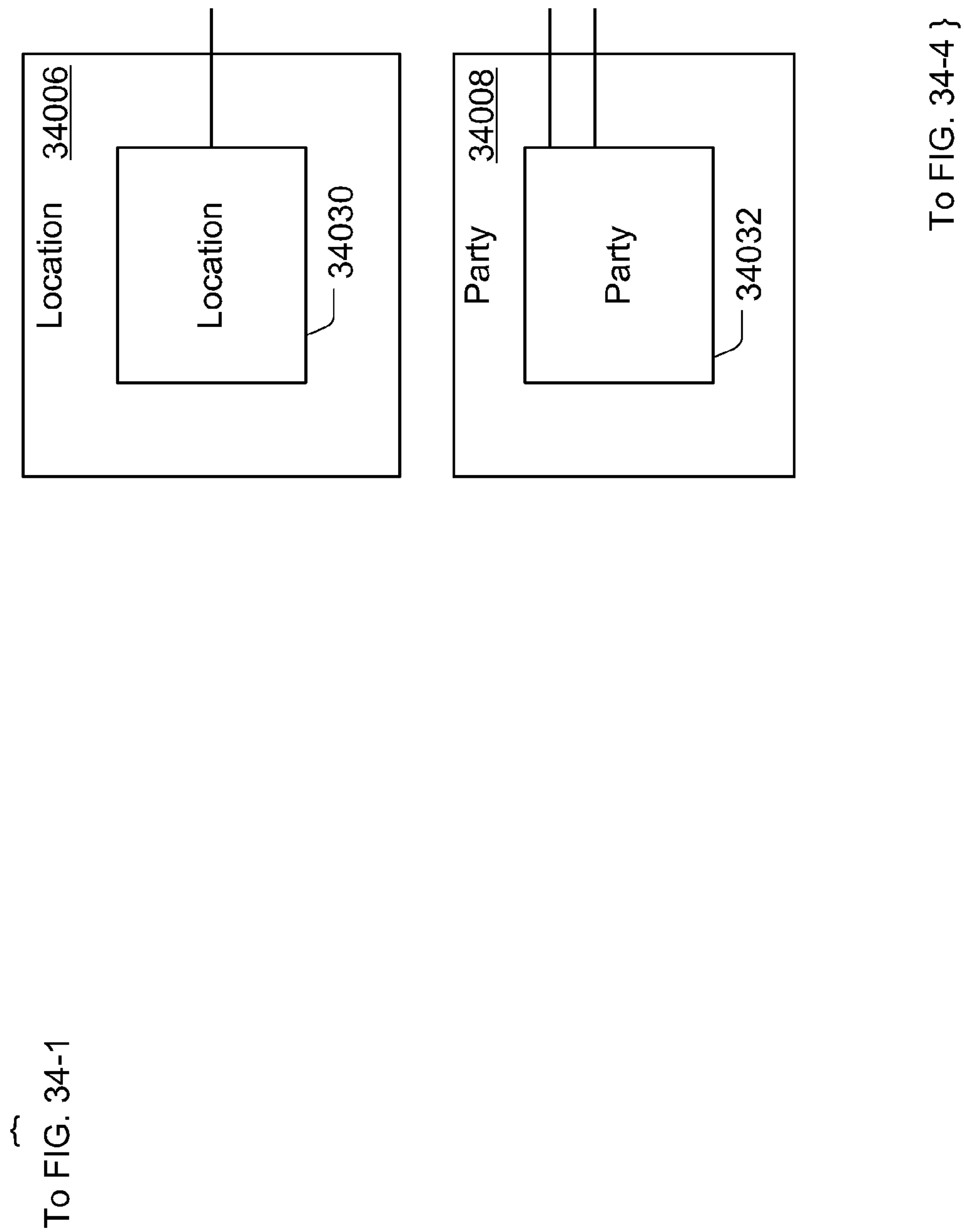
Figures 4, 34:
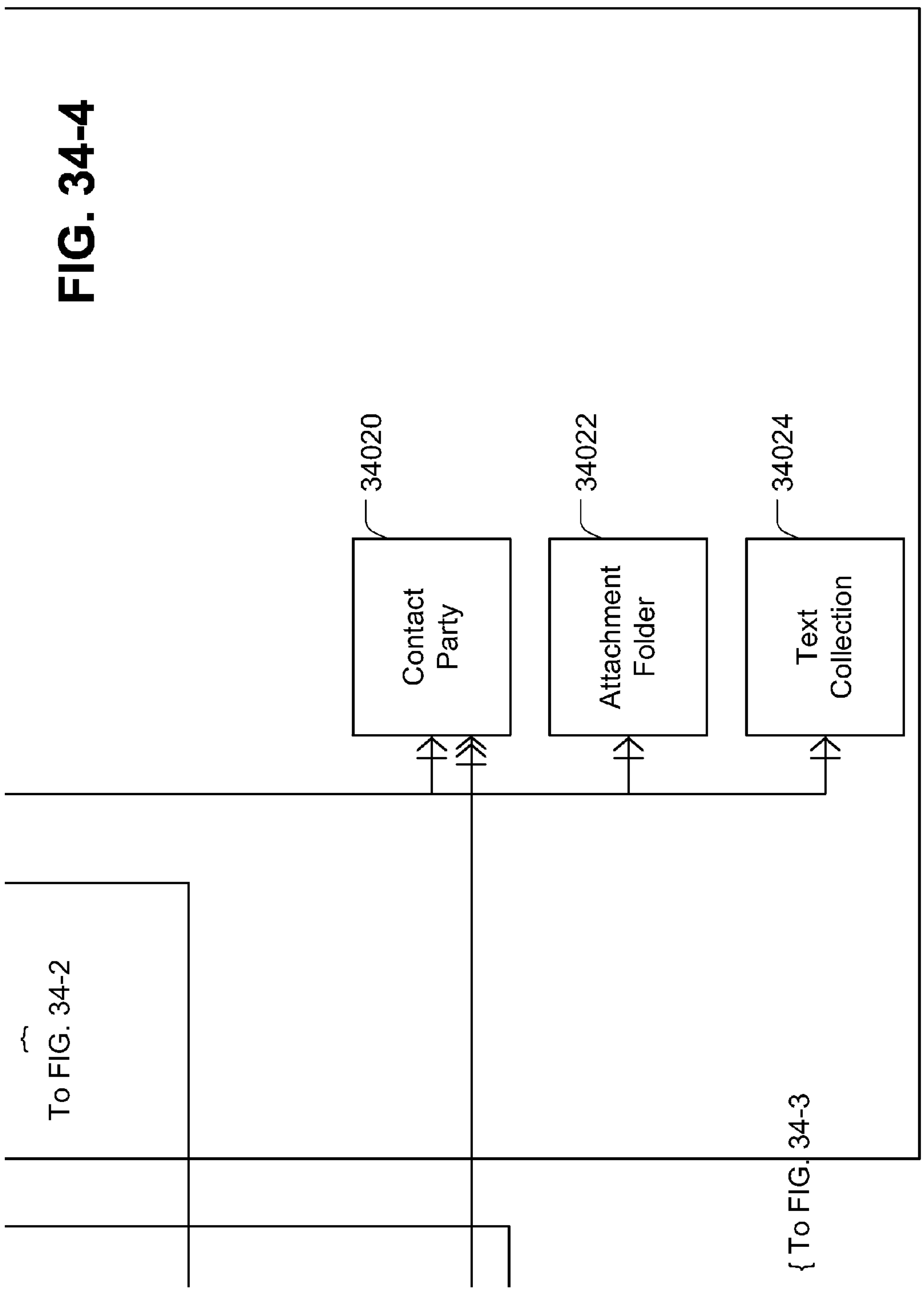
Figures 1, 36:
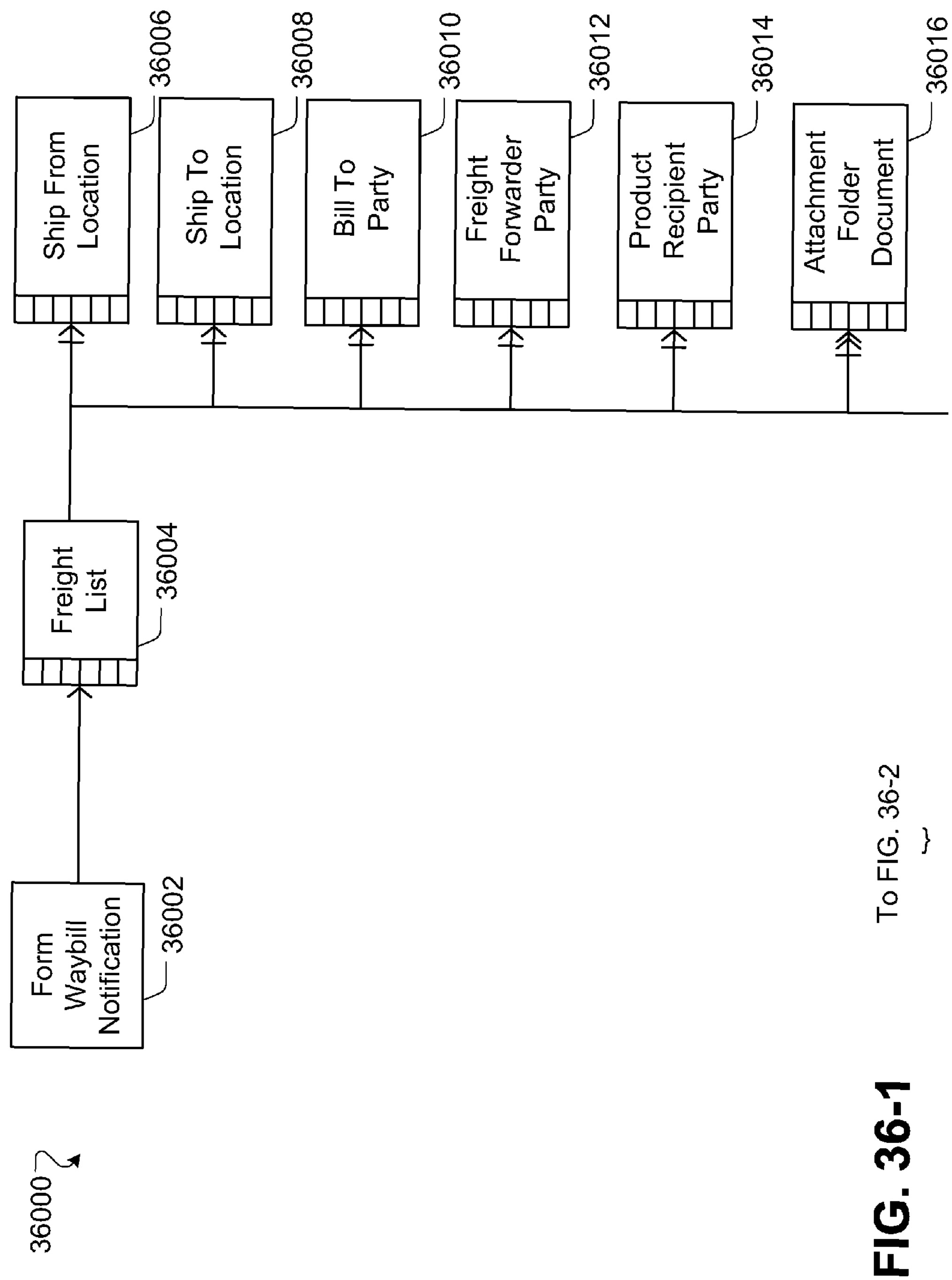
Figures 2, 36:
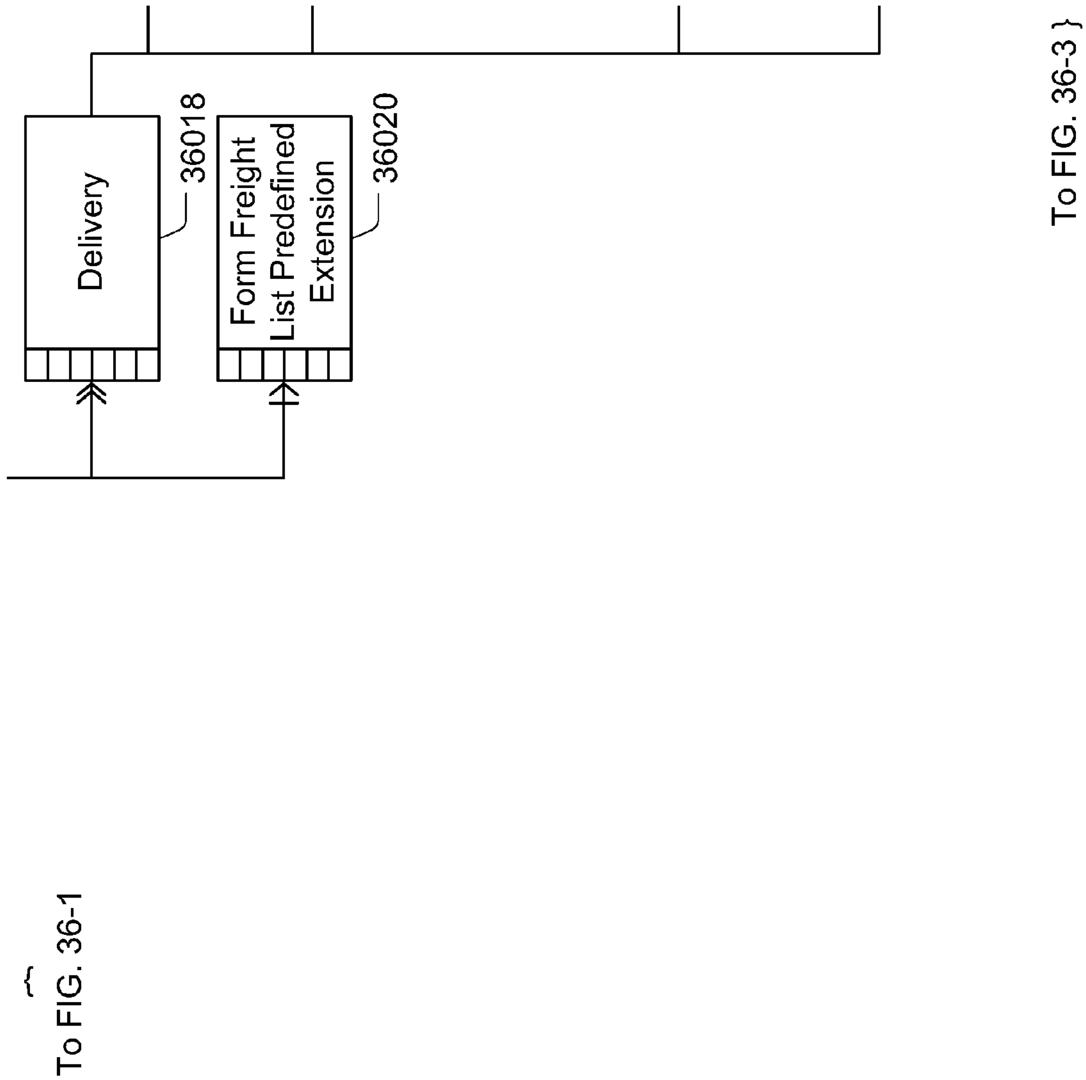
Figures 3, 36:
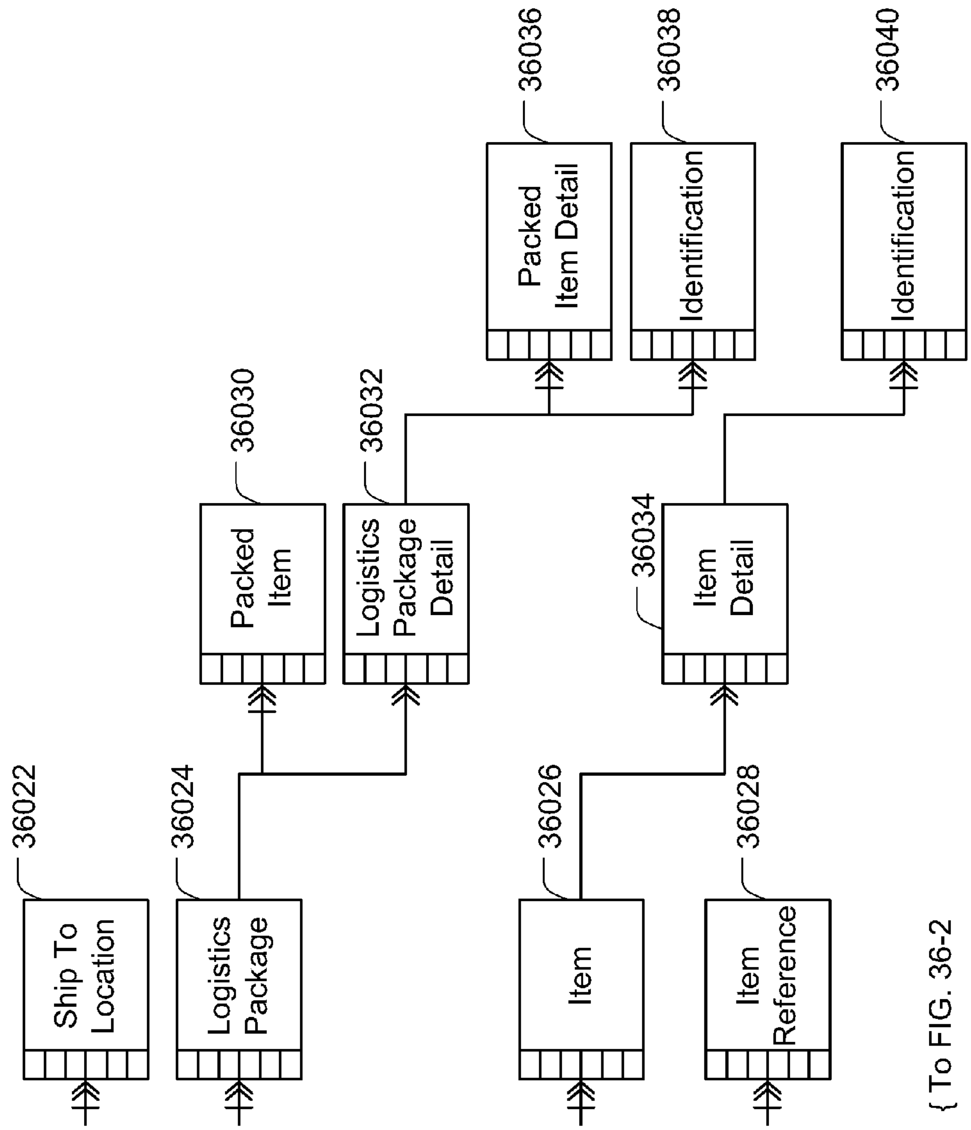

FIGS. 36-1 through 36-3 depict an example Form Waybill Notification Message Data Type 36000, which comprises elements 36002-36040, hierarchically related as shown. For example, the Form Waybill Notification 36002 includes a Freight List 36004.

The message type Form Waybill Notification is derived from a business object Freight List as a leading object together with its operation signature. The message type Form Waybill Notification is a notification about the creation of a waybill that is sent to an output channel. The structure of the message type Form Waybill Notification is determined by a message data type FormWaybillNotificationMessage. The FormWaybillNotificationMessage message data type includes an object FreightList which is included in a business document, business information that is relevant for sending a business document in a message, the MessageHeader package, and the FreightList package. The message data type FormWaybillNotificationMessage provides a structure for the Form Waybill Notification message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader.

SenderParty is the partner responsible for sending a business document at a business application level. The SenderParty is of the type GDT:BusinessDocumentMessageHeaderParty. RecipientParty is of the type GDT: BusinessDocumentMessageHeaderParty. RecipientParty is the partner responsible for receiving a business document at a business application level.

The FreightList package is a grouping of FreightList with its Delivery and FormFreightListPredefinedExtension packages and with the FreightList entity. FreightList includes high-level information about a waybill, business partners, and a mode of transportation. FreightList includes the following non-node elements: ID, CashOnDeliveryAmount, DeclaredAmount, FreightChargesPrepaidIndicator, CashOnDeliveryFeePrepaidIndicator, CustomerCheckAllowedIndicator, ThirdPartylnitiatedActionIndicator, FreightLoaderPartyRoleCategoryCode, LoadedByDescription, FreightCountingCode, CountedByDescription, Incoterms, ClassificationCode, ClassificationName, TransferLocationName, SealIDs, TruckID, TrailerID, TransportModeCode, TransportModeName, TotalGrossWeight, Measure, MeasureUnitCodeName, TotalGrossVolume, MeasureUnitCodeName, ShippingDateTime, CreationDateTime, PrintDateTime, ShippersInstructionText, SpecialAgreementsText, MaterialContentDescriptionText, and InternalText.

ID is a unique identifier of a freight list, and may be based on datatype GDT:BusinessTransactionDocumentID. CashOnDeliveryAmount may be optional, is a cash amount that is received when a shipment is delivered, and may be based on datatype CDT:Amount with a qualifier of Cash On Delivery. DeclaredAmount may be optional, is a declared value of the goods to be shipped, and may be based on datatype CDT: Amount. FreightChargesPrepaidIndicator may be optional, indicates if freight charges are prepaid by shipper or product recipient, and may be based on datatype CDT:Indicator with a qualifier of Prepaid. CashOnDeliveryFeePrepaidIndicator may be optional, indicates if a fee for Cash On Delivery is prepaid, and may be based on datatype CDT:Indicator with a qualifier of Prepaid. CustomerCheckAllowedIndicator may be optional, indicates if a shipper allows payment by check, and may be based on datatype CDT:Indicator with a qualifier of Allowed. ThirdPartylnitiatedActionIndicator may be optional and indicates if a payment is done by a third party, and may be based on datatype CDT:Indicator with a qualifier of PartyInitiatedAction. FreightLoaderPartyRoleCategoryCode may be optional, is a coded representation of a party responsible for a freight list goods load, and may be based on datatype GDT:PartyRoleCategoryCode. LoadedByDescription may be optional and may be based on datatype GDT: SHORT_Description. FreightCountingCode may be optional, is a coded representation of a freight list goods count, and may be based on datatype GDT:FreightCountingCode. CountedByDescription may be optional, and may be based on datatype GDT:SHORT_Description. Incoterms may be optional, are typical contract formulations for delivery conditions that correspond to rules defined by the International Chamber of Commerce (ICC), and may be based on datatype FMIDT:FormIncoterms. ClassificationCode may be based on datatype GDT:IncotermsClassificationCode. ClassificationName may be based on datatype CDT:Name. TransferLocationName may be optional and may be based on datatype GDT:IncotermsTransferLocationName. SealIDs may be optional, includes one or more unique identifiers of seals, and may be based on datatype GDT:LANGUAGEINDEPENDENT_LONG_Description. TruckID may be optional, is a unique identifier of a truck, and may be based on datatype GDT:TransportMeansID. TrailerID may be optional, is an identification of a trailer, and may be based on datatype GDT:TransportMeansID. TransportModeCode may be optional, is a coded representation of a transport mode of a shipment, and may be based on datatype GDT:TransportModeCode. TransportModeName may be optional and may be based on datatype CDT:LONG_Name. TotalGrossWeight may be optional, is a measure for a total gross weight of freight goods, and may be based on datatype FMIDT:FormMeasure. Measure may be based on datatype CDT:Measure. MeasureUnitCodeName may be optional and may be based on datatype CDT:Name. TotalGrossVolume may be optional, is a measure for a total gross volume of the freight goods, and may be based on datatype FMIDT:FormMeasure. ShippingDateTime may be optional, is a point in time indicating when a freight was shipped, and may be based on datatype CDT: LOCALNORMALISED_DateTime. CreationDateTime may be optional, is a point in time indicating when a freight list was created, and may be based on datatype CDT:LOCALNORMALISED_DateTime. PrintDateTime may be optional, is a point in time indicating when a message was sent, and may be based on datatype CDT:LOCALNORMALISED_DateTime. ShippersInstructionText may be based on datatype CDT:Text. SpecialAgreementsText may be based on datatype CDT:Text. MaterialContentDescriptionText may be based on datatype CDT:Text. InternalText may be based on datatype CDT:Text.

The FreightList package may include the node element ShipFromLocation in a 1:C cardinality relationship, the node element ShipToLocation in a 1:C cardinality relationship, the node element BillToParty in a 1:C cardinality relationship, the node element FreightForwarderParty in a 1:C cardinality relationship, the node element ProductRecipientParty in a 1:C cardinality relationship, the node element AttachmentFolderDocument in a 1:CN cardinality relationship, the node element Delivery in a 1:N cardinality relationship, and the node element FormFreightListPredefinedExtension in a 1:C cardinality relationship.

ShipFromLocation is a location from which a good is to be delivered. ShipFromLocation includes the following non-node elements: LocationID, LocationAlternativeID, PartyID, and Address. LocationID may be optional, is a unique identifier of a location, and may be based on datatype GDT: LocationID. LocationAlternativeID is an alternative identifier of a location identified in Location, and may be based on datatype GDT:LocationStandardID. PartyID may be optional, is an identifier of a party, and may be based on datatype GDT:PartyID. Address may be optional, is an address of a location, and may be based on datatype GDT: Address.

ShipToLocation a location to which a good is to be delivered. ShipToLocation includes the following non-node elements: LocationID, LocationAlternativeID, PartyID, and Address. LocationID may be optional, is a unique identifier of a location, and may be based on datatype GDT:LocationID. LocationAlternativeID is an alternative identifier of a location identified in Location, and may be based on datatype GDT:LocationStandardID. PartyID may be optional, is an identifier of a party, and may be based on datatype GDT: PartyID. Address may be optional, is an address of a location, and may be based on datatype GDT:Address.

BillToParty is a party to which an invoice for goods or services is sent. BillToParty includes the following non-node elements: PartyID, Address, and ContactPerson. PartyID may be optional, is an identifier of a party, and may be based on datatype GDT:PartyID. Address may be optional, is an address of a location, and may be based on datatype GDT: Address. ContactPerson may be optional, is a contact person of a Party, and may be based on datatype GDT:INTERNAL-_ContactPerson.

FreightForwarderParty is a party that supplements their own service by subcontracting transportation and other associated services and offering combined services to customers in a single package. FreightForwarderParty includes the following non-node elements: PartyID, Address, ContactPerson, SCAC, and CarrierProgressiveNumber. PartyID may be optional, is an identifier of a party, and may be based on datatype GDT:PartyID. Address may be optional, is an address of a location, and may be based on datatype GDT: Address. ContactPerson may be optional, is a contact person of a Party, and may be based on datatype GDT:INTERNAL-_ContactPerson. SCAC may be optional, is a Standard Carrier Alpha Code (SCAC) uniquely identifying a carrier according to National Motor Freight Traffic Association, and may be based on datatype GDT:PartyID. CarrierProgressiveNumber may be optional, is an identifier of a Freight forwarder party, and may be based on datatype GDT:BusinessTransactionDocumentReference.

ProductRecipientParty is a party to which goods are delivered or for whom services are provided. ProductRecipientParty includes the following non-node elements: PartyID, Address, ContactPerson, SCAC, and CarrierProgressiveNumber. PartyID may be optional, is an identifier of a party, and may be based on datatype GDT:PartyID. Address may be optional, is an address of a location, and may be based on datatype GDT:Address. ContactPerson may be optional, is a contact person of a Party, and may be based on datatype GDT:INTERNAL_ContactPerson. SCAC may be optional, is a Standard Carrier Alpha Code (SCAC) uniquely identifying a carrier according to National Motor Freight Traffic Association, and may be based on datatype GDT:PartyID. CarrierProgressiveNumber may be optional, is an identifier of a Freight forwarder party, and may be based on datatype GDT:BusinessTransactionDocumentReference.

AttachmentFolderDocument is a document that is attached to a Freight List. AttachmentFolderDocument includes the following non-node elements: TypeCode and TypeDescription. TypeCode may be optional, is a type of an attached document, and may be based on datatype GDT:DocumentTypeCode. TypeDescription may be optional and may be based on datatype GDT:SHORT_Description.

FreightListDelivery package includes the Delivery entity. Delivery includes the following non-node elements: DeliveryID, GrandTotalWeightMeasure, GrandTotalVolumeMeasure, and DeliveryText. DeliveryID is a unique identifier of a delivery item and may be based on datatype GDT:BusinessTransactionDocumentID. GrandTotalWeightMeasure may be optional, is a measure for a total weight of goods in all PurchaseOrders, and may be based on datatype CDT:Measure. GrandTotalVolumeMeasure may be optional, is a measure for a total volume of goods in all PurchaseOrders, and may be based on datatype CDT:Measure. DeliveryText may be based on datatype CDT:Text.

Delivery may include the node elements ShipToLocation in a 1:CN cardinality relationship, Logisticspackage in a 1:CN cardinality relationship, Item in a 1:CN cardinality relationship, and ItemReference in a 1:CN cardinality relationship. The element GrandTotalWeight may be calculated as a total of associated ItemReference TotalWeight values. The element GrandTotalVolume may be calculated as a total of associated ItemReference TotalVolume values.

ShipToLocation is a location to which a good is to be delivered. ShipToLocation includes the following non-node elements: LocationID, LocationAlternativeID, PartyID, and Address. LocationID may be optional, is a unique identifier of a location, and may be based on datatype GDT:LocationID. LocationAlternativeID is an alternative identifier of a location identified in Location, and may be based on datatype GDT:LocationStandardID. PartyID may be optional, is an identifier of a party, and may be based on datatype GDT: PartyID. Address may be optional, is an address of a location, and may be based on datatype GDT:Address.

The FreightListDeliveryItem package includes the LogisticsPackage and Item entities. LogisticsPackage includes the following non-node elements: LogisticUnitID, LogisticUnitDescription, LogisticPackgeQuantity, PackageTypeCode, PackageTypeDescription, GrossWeightMeasure, GrossVolumeMeasure, OuterpackageIndicator, and ContentReportedIndicator. LogisticUnitID may be optional, is an identification of a logistic unit, and may be based on datatype GDT: LogisticUnitID. LogisticUnitDescription may be optional, is a language-dependent short description of a LogisticUnit, and may be based on datatype GDT:SHORT_Description. LogisticPackgeQuantity may be optional, is a quantity of a package content, and may be based on datatype CDT:Quantity. PackageTypeCode may be optional, is a coded representation of a package quantity variation for quantity-based processing, and may be based on datatype GDT: PackageTypeCode. PackageTypeDescription may be optional, is a description of a package type, and may be based on datatype GDT:SHORT_Description. GrossWeightMeasure may be optional, is a measure for a gross weight of a tagged package, and may be based on datatype CDT:Measure. GrossVolumeMeasure may be optional, is a measure for a gross volume of a tagged package, and may be based on datatype CDT:Measure. OuterpackageIndicator may be optional, is an indicator that specifies whether a package is an outer package, and may be based on datatype CDT:Indicator with a qualifier of Outerpackage. ContentReportedIndicator may be optional, is an indicator that specifies whether a package content is reported, and may be based on datatype CDT:Indicator with a qualifier of Reported.

The FreightListDeliveryItem package may include the node elements PackedItem in a 1:CN cardinality relationship and Detail in a 1:N cardinality relationship. The FreightListDeliveryItemDeliveryItem package includes the PackedItem and Detail entities. PackedItem is a shipped good included in a logistics package, aggregated by stock separators. PackedItem includes the following non-node elements: DeliveryItemID, ProductID, ProductDescription, ProductQuantity, ProductQuantityTypeCode, GrossWeightMeasure, GrossVolumeMeasure, and DeliveryItemText. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT: Measure. DeliveryItemText is a measure for a gross weight of a tagged product or package and may be based on datatype CDT:Text.

A LogisticspackageDetail is a detailed package in which a shipped good is packed. Detail includes the following non-node elements: LogisticUnitID, LogisticUnitDescription, LogisticPackgeQuantity, packageTypeCode, packageTypeDescription, GrossWeightMeasure, and GrossVolumeMeasure. LogisticUnitID may be optional, is an identification of a logistic unit, and may be based on datatype GDT:LogisticUnitID. LogisticUnitDescription may be optional, is a language-dependent short description of a LogisticUnit, and may be based on datatype GDT:SHORT_Description. LogisticPackgeQuantity may be optional, is a quantity of a package content, and may be based on datatype CDT:Quantity. PackageTypeCode may be optional, is a coded representation of a package quantity variation for quantity-based processing, and may be based on datatype GDT:packageTypeCode. PackageTypeDescription may be optional, is a description of a package type, and may be based on datatype GDT:SHORT_Description. GrossWeightMeasure may be optional, is a measure for a gross weight of a tagged package, and may be based on datatype CDT:Measure. GrossVolumeMeasure may be optional, is a measure for a gross volume of a tagged package, and may be based on datatype CDT:Measure.

Detail may include the node elements PackedItemDetail in a 1:CN cardinality relationship and Identification in a 1:CN cardinality relationship. PackedItemDetail includes the following non-node elements: DeliveryItemID, ProductID, ProductDescription, iStockID, iStockDescription, ProductQuantity, ProductQuantityTypeCode, GrossWeightMeasure, and GrossVolumeMeasure. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. iStockID may be optional and may be based on datatype GDT:IdentifiedStockID. iStockDescription may be optional and may be based on datatype GDT: MEDIUM_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT: Measure.

Identification includes the GoodsTagID element. GoodsTagID may be optional, is a unique identifier of a goods tag, and may be based on datatype GDT:GoodsTagID. An Item is a shipped good included in a delivery document, aggregated by stock separators. Item includes the following non-node elements: DeliveryItemID, ProductID, ProductDescription, ProductQuantity, ProductQuantityTypeCode, DeliveryItemText, UnpackedIndicator, GrossWeightMeasure, and GrossVolumeMeasure.

DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. DeliveryItemText is a measure for a gross weight of a tagged product or package and may be based on datatype CDT:Text. UnpackedIndicator may be optional, is an indicator that specifies whether an item is not packed in a logistics package, and may be based on datatype CDT:Indicator with a qualifier of Unpacked. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT:Measure.

Item may include the node element Detail in a 1:N cardinality relationship. ItemDetail is a specific shipped good included in a delivery document. ItemDetail includes the following non-node elements: DeliveryItemID, ProductID, ProductDescription, iStockID, iStockDescription, ProductQuantity, ProductQuantityTypeCode, GrossWeightMeasure, and GrossVolumeMeasure. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT:SHORT_Description. iStockID may be optional, is an identifier for an Identified Stock, and may be based on datatype GDT:IdentifiedStockID. iStockDescription may be optional, is a language-dependent IdentifiedStock description, and may be based on datatype GDT:MEDIUM_Description. ProductQuantity may be optional, is a product quantity with a corresponding unit of measure, and may be based on datatype CDT:Quantity. ProductQuantityTypeCode may be optional, is a product quantity type code, and may be based on datatype GDT: QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT:Measure.

Item may include the node element Identification in a 1:CN cardinality relationship. An Identification is a unique identifier of an item. Identification includes the GoodsTagID element, which may be optional, is a unique identifier of a goods tag, and may be based on datatype GDT: Goods TagID.

The FreightListDeliveryItemReference package includes the ItemReference entity. ItemReference is a business document that is referenced by an item. ItemReference includes the following non-node elements: OriginPurchaseOrderReferenceID, NumberOfpackagesQuantity, TotalWeightMeasure, and TotalVolumeMeasure. OriginPurchaseOrderReferenceID may be optional, is a unique identifier of a Purchase order item, and may be based on datatype GDT:BusinessTransactionDocumentID. NumberOfpackagesQuantity may be optional, is a total number of packages per Purchase Order, and may be based on datatype CDT:Quantity. TotalWeightMeasure may be optional, is a total weight per PurchaseOrder, and may be based on datatype CDT:Measure. TotalVolumeMeasure may be optional, is a total volume per PurchaseOrder, and may be based on datatype CDT:Measure.

The FreightListFormFreightListPredefinedExtension package includes the FormFreightListPredefinedExtension entity. FormFreightListPredefinedExtension is a redefined extension of an Freight list.

Figures 1, 37:
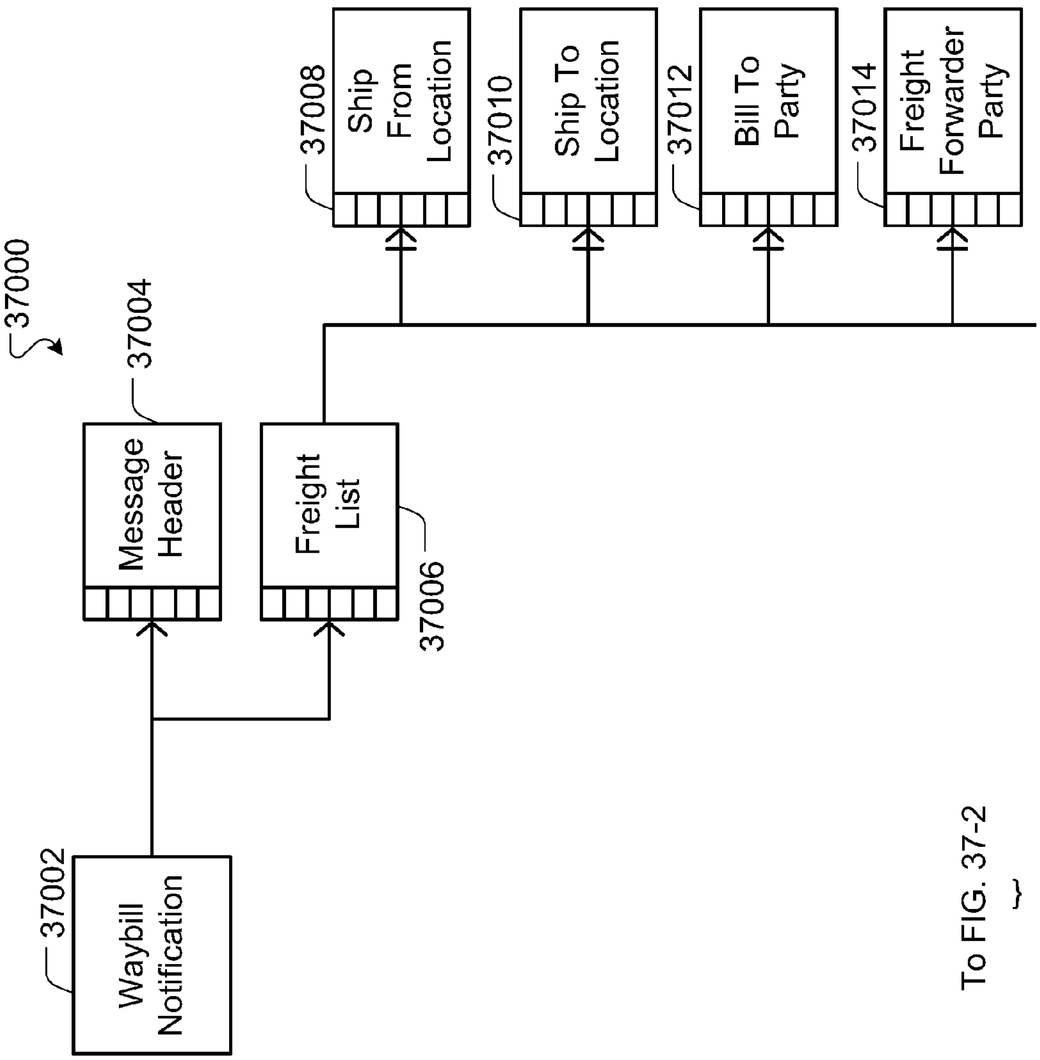
Figures 2, 37:
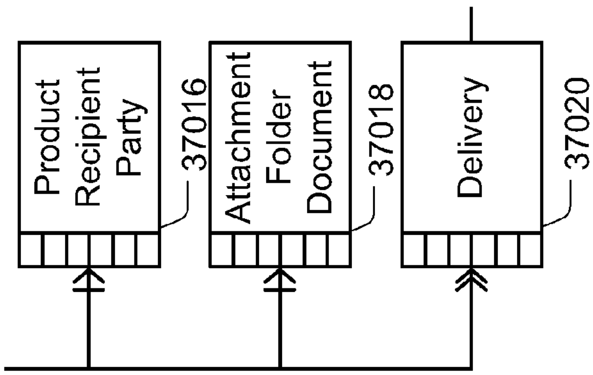
Figures 3, 37:
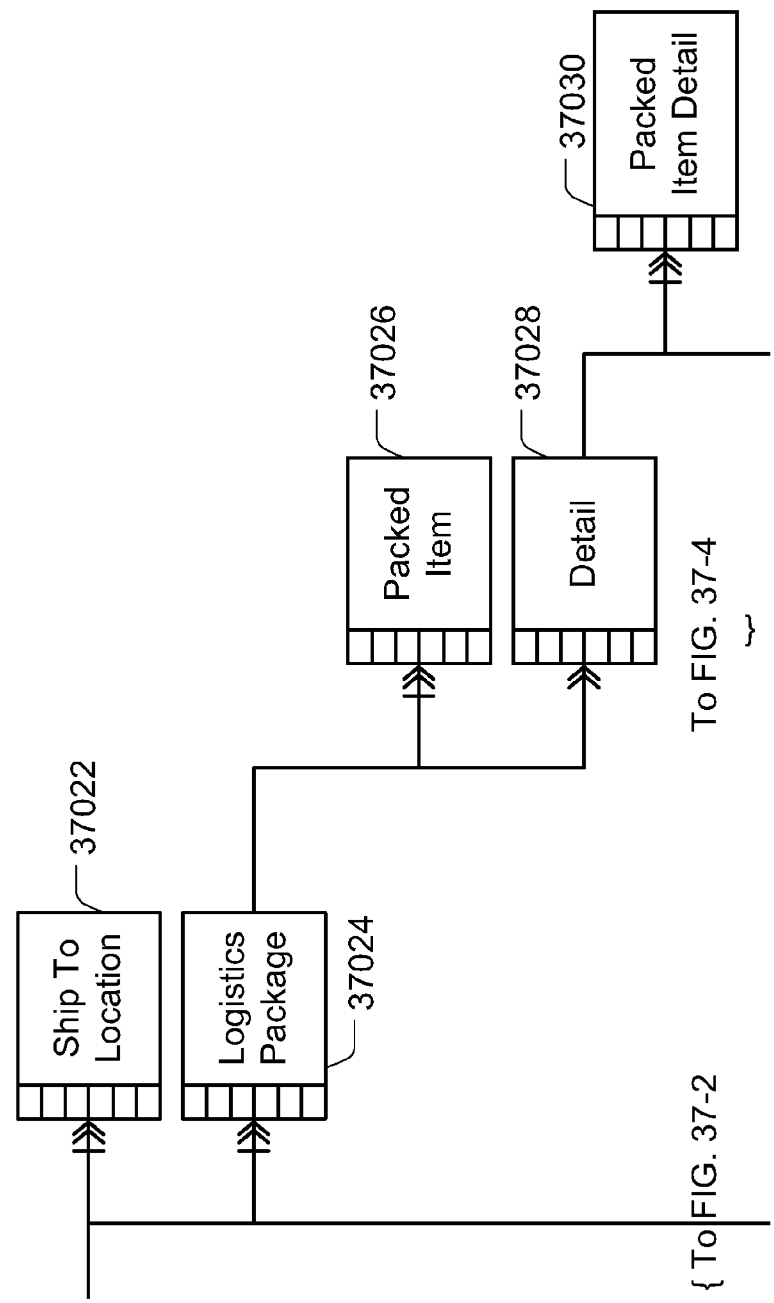
Figures 4, 37:
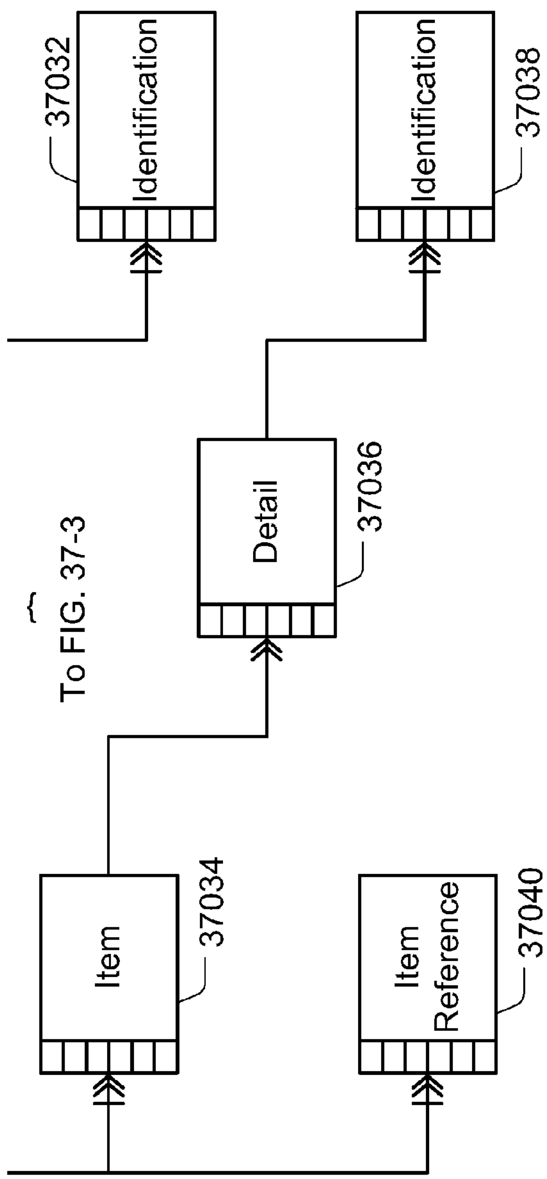

FIGS. 37-1 through 37-4 depict an example Waybill Notification Message Data Type 37000, which comprises elements 37002-37040, hierarchically related as shown. For example, the Waybill Notification 37002 includes a Message Header 37004.

The message type Waybill Notification is derived from the business object Freight List as a leading object together with its operation signature. The message type Waybill Notification is a notification about the creation of a waybill that is sent to an output channel. The structure of the message type Waybill Notification is determined by the message data type WaybillNotificationMessage. The message data type WaybillNotificationMessage includes an object FreightList which is included in a business document, business information that is relevant for sending a business document in a message, the MessageHeader package, and the FreightList package. The message data type WaybillNotificationMessage provides a structure for the Waybill Notification message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader.

The following elements of the GDT may be used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

SenderParty is the partner responsible for sending a business document at a business application level. The SenderParty is of the type GDT:BusinessDocumentMessageHeaderParty. RecipientParty is of the type GDT: BusinessDocumentMessageHeaderParty. RecipientParty is the partner responsible for receiving a business document at a business application level.

The FreightList package is a grouping of FreightList with its Delivery package and the FreightList entity. FreightList includes high-level information about a waybill, business partners, and a mode of transportation. FreightList includes the following non-node elements: ID, CashOnDeliveryAmount, DeclaredAmount, FreightChargesPrepaidIndicator, CashOnDeliveryFeePrepaidIndicator, CustomerCheckAllowedIndicator, ThirdPartyInitiatedActionIndicator, FreightLoaderPartyRoleCategoryCode, LoadedByDescription, FreightCountingCode, CountedByDescription, Incoterms, SealIDs, TruckID, TrailerID, TransportModeCode, TransportModeName, TotalGrossWeightMeasure, TotalGrossVolumeMeasure, ShippingDateTime, CreationDateTime, PrintDateTime, ShippersInstructionText, SpecialAgreementsText, MaterialContentDescriptionText, and InternalText.

ID is a unique identifier of a freight list and may be based on datatype GDT:BusinessTransactionDocumentID. CashOnDeliveryAmount may be optional, is a cash amount that is received when a shipment is delivered, and may be based on datatype CDT:Amount with a qualifier of Cash On Delivery. DeclaredAmount may be optional, is a declared value of the goods to be shipped, and may be based on datatype CDT: Amount. FreightChargesPrepaidIndicator may be optional, indicates if freight charges are prepaid by shipper or product recipient, and may be based on datatype CDT:Indicator with a qualifier of Prepaid. CashOnDeliveryFeePrepaidIndicator may be optional, indicates if a fee for Cash On Delivery is prepaid, and may be based on datatype CDT:Indicator with a qualifier of Prepaid. CustomerCheckAllowedIndicator may be optional, indicates if a shipper allows payment by check, and may be based on datatype CDT:Indicator with a qualifier of Allowed. ThirdPartyInitiatedActionIndicator may be optional, indicates if a payment is done by a third party, and may be based on datatype CDT:Indicator with a qualifier of PartyInitiatedAction. FreightLoaderPartyRoleCategoryCode may be optional, is a coded representation of a responsible of a freight list goods load, and may be based on datatype GDT:PartyRoleCategoryCode. LoadedByDescription may be optional and may be based on datatype GDT: SHORT_Description. FreightCountingCode may be optional, is a coded representation of a freight list goods count, and may be based on datatype GDT:FreightCountingCode. CountedByDescription may be optional and may be based on datatype GDT:SHORT_Description. Incoterms may be optional and may be based on datatype GDT:Incoterms. Incoterms are typical contract formulations for delivery conditions that correspond to rules defined by the International Chamber of Commerce (ICC). SealIDs may be optional, include unique identifiers of seals, and may be based on datatype GDT:LANGUAGEINDEPENDENT_LONG_Description. TruckID may be optional, is an identification of a truck, and may be based on datatype GDT:TransportMeansID. TrailerID may be optional, is an identification of a trailer, and may be based on datatype GDT:TransportMeansID. TransportModeCode may be optional, is a coded representation of a transport mode of a shipment, and may be based on datatype GDT:TransportModeCode. TransportModeName may be optional and may be based on datatype CDT:LONG_Name. TotalGrossWeightMeasure may be optional, is a measure for a total gross weight of freight goods, and may be based on datatype CDT:Measure. TotalGrossVolumeMeasure may be optional, is a measure for a total gross volume of freight goods, and may be based on datatype CDT:Measure. ShippingDateTime may be optional, is a point in time indicating when a freight was shipped, and may be based on datatype CDT:LOCALNORMALISED_DateTime. CreationDateTime may be optional, is a point in time indicating when a freight list was created, and may be based on datatype CDT:LOCALNORMALISED_DateTime. PrintDateTime may be optional, is a point in time indicating when a message was sent, and may be based on datatype CDT:LOCALNORMALISED_DateTime. ShippersInstructionText may be based on datatype CDT:Text. SpecialAgreementsText may be based on datatype CDT:Text. MaterialContentDescriptionText may be based on datatype CDT:Text. InternalText may be based on datatype CDT:Text.

The FreightList package may include the node element ShipFromLocation in a 1:C cardinality relationship, ShipToLocation in a 1:C cardinality relationship, BillToParty in a 1:C cardinality relationship, FreightForwarderParty in a 1:C cardinality relationship, ProductRecipientParty in a 1:C cardinality relationship, AttachmentFolderDocument in a 1:CN cardinality relationship, and Delivery in a 1:N cardinality relationship.

ShipFromLocation is a location from which a good is to be delivered. ShipFromLocation includes the following non-node elements: LocationID, LocationAlternativeID, PartyID, and Address. LocationID may be optional, is a unique identifier of a location, and may be based on datatype GDT:LocationID. LocationAlternativeID is an alternative identifier of a location identified in Location, and may be based on datatype GDT:LocationStandardID. PartyID may be optional, is an identifier of a party, and may be based on datatype GDT:PartyID. Address may be optional, is an address of a location, and may be based on datatype GDT:Address.

ShipToLocation a location to which a good is to be delivered. ShipToLocation includes the following non-node elements: LocationID, LocationAlternativeID, PartyID, and Address. LocationID may be optional, is a unique identifier of a location, and may be based on datatype GDT:LocationID. LocationAlternativeID is an alternative identifier of a location identified in Location, and may be based on datatype GDT:LocationStandardID. PartyID may be optional, is an identifier of a party, and may be based on datatype GDT:PartyID. Address may be optional, is an address of a location, and may be based on datatype GDT:Address.

BillToParty is a party to which an invoice for goods or services is sent. BillToParty includes the following non-node elements: PartyID, Address, and ContactPerson. PartyID may be optional, is an identifier of a party, and may be based on datatype GDT:PartyID. Address may be optional, is an address of a location, and may be based on datatype GDT:Address. ContactPerson may be optional, is a contact person of a Party, and may be based on datatype GDT:INTERNAL-_ContactPerson.

FreightForwarderParty is a party that supplements their own service by subcontracting transportation and other associated services and offering combined services to customers in a single package. FreightForwarderParty includes the following non-node elements: PartyID, Address, ContactPerson, SCAC, and CarrierProgressiveNumber. PartyID may be optional, is an identifier of a party, and may be based on datatype GDT:PartyID. Address may be optional, is an address of a location, and may be based on datatype GDT:Address. ContactPerson may be optional, is a contact person of a Party, and may be based on datatype GDT:INTERNAL-_ContactPerson. SCAC may be optional, is a Standard Carrier Alpha Code (SCAC) uniquely identifying a carrier according to National Motor Freight Traffic Association, and may be based on datatype GDT:PartyID. CarrierProgressiveNumber may be optional, is an identifier of a Freight forwarder party, and may be based on datatype GDT:BusinessTransactionDocumentReference.

ProductRecipientParty is a party to which goods are delivered or for whom services are provided. ProductRecipientParty includes the following non-node elements: PartyID, Address, ContactPerson, SCAC, and CarrierProgressiveNumber. PartyID may be optional, is an identifier of a party, and may be based on datatype GDT:PartyID. Address may be optional, is an address of a location, and may be based on datatype GDT:Address. ContactPerson may be optional, is a contact person of a Party, and may be based on datatype GDT:INTERNAL_ContactPerson. SCAC may be optional, is a Standard Carrier Alpha Code (SCAC) uniquely identifying a carrier according to National Motor Freight Traffic Association, and may be based on datatype GDT:PartyID. CarrierProgressiveNumber may be optional, is an identifier of a Freight forwarder party, and may be based on datatype GDT:BusinessTransactionDocumentReference.

AttachmentFolderDocument is a document that is attached to a Freight List. AttachmentFolderDocument includes the following non-node elements: TypeCode and TypeDescription. TypeCode may be optional, is a type of an attached document, and may be based on datatype GDT:DocumentTypeCode. TypeDescription may be optional and may be based on datatype GDT:SHORT_Description.

FreightListDelivery package includes the Delivery entity. Delivery includes the following non-node elements: DeliveryID, GrandTotalWeightMeasure, GrandTotalVolumeMeasure, and DeliveryText. DeliveryID is a unique identifier of a delivery item and may be based on datatype GDT:BusinessTransactionDocumentID. GrandTotalWeightMeasure may be optional, is a measure for a total weight of goods in all PurchaseOrders, and may be based on datatype CDT:Measure. GrandTotalVolumeMeasure may be optional, is a measure for a total volume of goods in all PurchaseOrders, and may be based on datatype CDT:Measure. DeliveryText may be based on datatype CDT:Text.

Delivery may include the node elements ShipToLocation in a 1:CN cardinality relationship, Logisticspackage in a 1:CN cardinality relationship, Item in a 1:CN cardinality relationship, and ItemReference in a 1:CN cardinality relationship. The element GrandTotalWeight may be calculated as a total of associated ItemReference TotalWeight values. The element GrandTotalVolume may be calculated as a total of associated ItemReference TotalVolume values.

ShipToLocation is a location to which a good is to be delivered. ShipToLocation includes the following non-node elements: LocationID, LocationAlternativeID, PartyID, and Address. LocationID may be optional, is a unique identifier of a location, and may be based on datatype GDT:LocationID. LocationAlternativeID is an alternative identifier of a location identified in Location, and may be based on datatype GDT:LocationStandardID. PartyID may be optional, is an identifier of a party, and may be based on datatype GDT:PartyID. Address may be optional, is an address of a location, and may be based on datatype GDT:Address.

The FreightListDeliveryItem package includes the LogisticsPackage and Item entities. LogisticsPackage includes the following non-node elements: LogisticUnitID, LogisticUnitDescription, LogisticPackgeQuantity, PackageTypeCode, PackageTypeDescription, GrossWeightMeasure, GrossVolumeMeasure, OuterpackageIndicator, and ContentReportedIndicator. LogisticUnitID may be optional, is an identification of a logistic unit, and may be based on datatype GDT:

LogisticUnitID. LogisticUnitDescription may be optional, is a language-dependent short description of a LogisticUnit, and may be based on datatype GDT:SHORT_Description. LogisticPackgeQuantity may be optional, is a quantity of a package content, and may be based on datatype CDT:Quantity. PackageTypeCode may be optional, is a coded representation of a package quantity variation for quantity-based processing, and may be based on datatype GDT: PackageTypeCode. PackageTypeDescription may be optional, is a description of a package type, and may be based on datatype GDT:SHORT_Description. GrossWeightMeasure may be optional, is a measure for a gross weight of a tagged package, and may be based on datatype CDT:Measure. GrossVolumeMeasure may be optional, is a measure for a gross volume of a tagged package, and may be based on datatype CDT:Measure. OuterpackageIndicator may be optional, is an indicator that specifies whether a package is an outer package, and may be based on datatype CDT:Indicator with a qualifier of Outerpackage. ContentReportedIndicator may be optional, is an indicator that specifies whether a package content is reported, and may be based on datatype CDT:Indicator with a qualifier of Reported.

The FreightListDeliveryItem package may include the node elements PackedItem in a 1:CN cardinality relationship and Detail in a 1:N cardinality relationship. The FreightListDeliveryItemDeliveryItem package includes the PackedItem and Detail entities. PackedItem is a shipped good included in a logistics package, aggregated by stock separators. PackedItem includes the following non-node elements: DeliveryItemID, ProductID, ProductDescription, ProductQuantity, ProductQuantityTypeCode, GrossWeightMeasure, GrossVolumeMeasure, and DeliveryItemText. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT: Measure. DeliveryItemText is a measure for a gross weight of a tagged product or package and may be based on datatype CDT:Text.

A LogisticspackageDetail is a detailed package in which a shipped good is packed. Detail includes the following non-node elements: LogisticUnitID, LogisticUnitDescription, LogisticPackgeQuantity, packageTypeCode, packageTypeDescription, GrossWeightMeasure, and GrossVolumeMeasure. LogisticUnitID may be optional, is an identification of a logistic unit, and may be based on datatype GDT:LogisticUnitID. LogisticUnitDescription may be optional, is a language-dependent short description of a LogisticUnit, and may be based on datatype GDT:SHORT_Description. LogisticPackgeQuantity may be optional, is a quantity of a package content, and may be based on datatype CDT:Quantity. PackageTypeCode may be optional, is a coded representation of a package quantity variation for quantity-based processing, and may be based on datatype GDT:packageTypeCode. PackageTypeDescription may be optional, is a description of a package type, and may be based on datatype GDT:SHORT_Description. GrossWeightMeasure may be optional, is a measure for a gross weight of a tagged package, and may be based on datatype CDT:Measure. GrossVolumeMeasure may be optional, is a measure for a gross volume of a tagged package, and may be based on datatype CDT:Measure.

Detail may include the node elements PackedItemDetail in a 1:CN cardinality relationship and Identification in a 1:CN cardinality relationship. PackedItemDetail includes the following non-node elements: DeliveryItemID, ProductID, ProductDescription, iStockID, iStockDescription, ProductQuantity, ProductQuantityTypeCode, GrossWeightMeasure, and GrossVolumeMeasure. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. iStockID may be optional and may be based on datatype GDT:IdentifiedStockID. iStockDescription may be optional and may be based on datatype GDT: MEDIUM_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT: Measure.

Identification includes the GoodsTagID element. GoodsTagID may be optional, is a unique identifier of a goods tag, and may be based on datatype GDT:GoodsTagID. An Item is a shipped good included in a delivery document, aggregated by stock separators. Item includes the following non-node elements: DeliveryItemID, ProductID, ProductDescription, ProductQuantity, ProductQuantityTypeCode, DeliveryItemText, UnpackedIndicator, GrossWeightMeasure, and GrossVolumeMeasure.

DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT: SHORT_Description. ProductQuantity may be optional, is a product quantity with a corresponding unit of measure, and may be based on datatype CDT:Quantity. ProductQuantityTypeCode may be optional, is a product quantity type code, and may be based on datatype GDT:QuantityTypeCode. DeliveryItemText is a measure for a gross weight of a tagged product or package and may be based on datatype CDT:Text. UnpackedIndicator may be optional, is an indicator that specifies whether an item is not packed in a logistics package, and may be based on datatype CDT:Indicator with a qualifier of Unpacked. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT:Measure.

Item may include the node element Detail in a 1:N cardinality relationship. ItemDetail is a specific shipped good included in a delivery document. ItemDetail includes the following non-node elements: DeliveryItemID, ProductID, ProductDescription, iStockID, iStockDescription, ProductQuantity, ProductQuantityTypeCode, GrossWeightMeasure, and GrossVolumeMeasure. DeliveryItemID is a unique identifier of a delivery item and may be based on datatype GDT:BusinessTransactionDocumentItemID. ProductID may be optional, is an identifier for a product, and may be based on datatype GDT:ProductID. ProductDescription may be optional, is a language-dependent product description, and may be based on datatype GDT:SHORT_Description. iStockID may be optional, is an identifier for an Identified Stock, and may be based on datatype GDT:IdentifiedStockID. iStockDescription may be optional, is a language-dependent IdentifiedStock description, and may be based on datatype GDT:MEDIUM_Description. ProductQuantity may be optional, is a product quantity with a corresponding unit of measure, and may be based on datatype CDT:Quantity. ProductQuantityTypeCode may be optional, is a product quantity type code, and may be based on datatype GDT: QuantityTypeCode. GrossWeightMeasure may be optional, is a measure for a gross weight of a tagged product or package, and may be based on datatype CDT:Measure. GrossVolumeMeasure may be optional, is a measure for a gross volume of a tagged product or package, and may be based on datatype CDT:Measure.

Item may include the node element Identification in a 1:CN cardinality relationship. An Identification is a unique identifier of an item. Identification includes the GoodsTagID element, which may be optional, is a unique identifier of a goods tag, and may be based on datatype GDT:GoodsTagID.

The FreightListDeliveryItemReference package includes the ItemReference entity. ItemReference is a business document that is referenced by an item. ItemReference includes the following non-node elements: OriginPurchaseOrderReferenceID, NumberOfpackagesQuantity, TotalWeightMeasure, and TotalVolumeMeasure. OriginPurchaseOrderReferenceID may be optional, is a unique identifier of a Purchase order item, and may be based on datatype GDT:BusinessTransactionDocumentID. NumberOfpackagesQuantity may be optional, is a total number of packages per Purchase Order, and may be based on datatype CDT:Quantity. TotalWeightMeasure may be optional, is a total weight per PurchaseOrder, and may be based on datatype CDT:Measure. TotalVolumeMeasure may be optional, is a total volume per PurchaseOrder, and may be based on datatype CDT:Measure.

FIGS. 38-1 through 38-147 show an example configuration of an Element Structure that includes a FormWaybillNotification 380000 package. Specifically, these figures depict the arrangement and hierarchy of various components such as one or more levels of packages, entities, and datatypes, shown here as 380000 through 384722. As described above, packages may be used to represent hierarchy levels. Entities are discrete business elements that are used during a business transaction. Data types are used to type object entities and interfaces with a structure. For example, the FormWaybillNotification 380000 includes, among other things, a FormWaybillNotification 380002. Accordingly, heterogeneous applications may communicate using this consistent message configured as such.

FIGS. 39-1 through 39-145 show an example configuration of an Element Structure that includes a WaybillNotification 390000 package. Specifically, these figures depict the arrangement and hierarchy of various components such as one or more levels of packages, entities, and datatypes, shown here as 390000 through 394686. As described above, packages may be used to represent hierarchy levels. Entities are discrete business elements that are used during a business transaction. Data types are used to type object entities and interfaces with a structure. For example, the WaybillNotification 390000 includes, among other things, a WaybillNotification 390002. Accordingly, heterogeneous applications may communicate using this consistent message configured as such.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium comprising program code, which, when executed by a processor, provides a message-based interface for exchanging information related to a view used for monitoring a business document message, the medium further comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a notification about a transmission status of the business document message that includes a first message package derived from the common business object model and hierarchically organized in memory as:

a business document message status notification message entity; and a business document message status package comprising a business document message status notification entity and a technical message reference package comprising a technical message reference entity, where the business document message status notification entity includes an action code, a business document message identifier (ID), a message type code, a business document message transmission status code, and a transmission completed indicator, and where the technical message reference entity includes a message ID, a sender party ID, and a recipient party ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the business document message status entity further comprises at least one of the following: a reference business document message identifier, a business document message direction code, a business document message creation date time, a business document message transmission status last change date time, and a business document message transmission status reason description.

3. The computer readable medium of claim 1, wherein the business document message status package further comprises a party package.

4. A distributed system operating in a plurality of computer systems providing message-based services defined in a service registry, the system comprising:

at least one processor operable to execute computer readable instructions embodied on non-transitory media;

a graphical user interface executable by the at least one processor and comprising computer readable instructions, embedded on non-transitory media, for providing a notification about a transmission status of a business document message using a request;

a first memory storing a user interface controller executable by the at least one processor for processing the request and involving a message including a message package derived from a common business object model, where the common business object model includes business objects having relationships that enable derivation of message-based service interfaces and message packages, the message package hierarchically organized as:

a business document message status notification message entity; and a business document message status package comprising a business document message status notification entity and a technical message reference package comprising a technical message reference entity, where the business document message status notification entity includes an action code, a business document message identifier (ID), a message type code, a business document message transmission status code, and a transmission completed indicator, and where the technical message reference entity includes a message ID, a sender party ID, and a recipient party ID; and a second memory, remote from the graphical user interface, storing a plurality of message-based service interfaces executable by the at least one processor and derived from the common business object model to provide consistent semantics with messages derived from the common business object model, where one of the message-based service interfaces processes the message according to the hierarchical organization of the message package, where processing the message includes unpacking the first message package based on the common business object model.

5. The distributed system of claim 4, wherein the first memory is remote from the graphical user interface.

6. The distributed system of claim 4, wherein the first memory is remote from the second memory.

* * * * *